US008818100B2

(12) United States Patent  (10) Patent No.: US 8,818,100 B2
Bastos dos Santos et al.  (45) Date of Patent: Aug. 26, 2014

(54) AUTOMATIC FORMS PROCESSING SYSTEMS AND METHODS

(75) Inventors: Jose Eduardo Bastos dos Santos, Shawnee, KS (US); Brian G. Anderson, Overland Park, KS (US); Scott T. R. Coons, Lawrence, KS (US); David E. Kelley, Olathe, KS (US); Humayun H. Khan, Overland Park, KS (US); Jess B. Sturgeon, Lawrence, KS (US); Richard L. Taylor, Olathe, KS (US)

(73) Assignee: Lexmark International, Inc., Kentucky ( * ) Notice: Subject to any disclaimer, the term of this patent is extended or adjusted under 35 U.S.C. 154(b) by 927 days.

(21) Appl. No.: 12/861,915

(22) Filed: Aug. 24, 2010

(65) Prior Publication Data

US 2011/0047448 A1  Feb. 24, 2011

Related U.S. Application Data

(63) Continuation of application No. 12/431,528, filed on Apr. 28, 2009, now Pat. No. 8,261,180.

(51) Int. Cl.
*G06K 9/00* (2006.01)

(52) U.S. Cl.
USPC ............ 382/180; 382/224; 382/173; 382/177

(58) Field of Classification Search
USPC ................... 382/173–177, 180, 224
See application file for complete search history.

(56) References Cited

U.S. PATENT DOCUMENTS

| | | | | |
|---|---|---|---|---|
| 4,933,979 A * | 6/1990 | Suzuki et al. | ................ | 382/173 |
| 5,485,566 A * | 1/1996 | Rahgozar | ................ | 715/200 |
| 5,784,487 A * | 7/1998 | Cooperman | ................ | 382/175 |
| 5,848,184 A * | 12/1998 | Taylor et al. | ................ | 382/173 |
| 6,006,240 A * | 12/1999 | Handley | ................ | 715/220 |
| 6,173,073 B1 * | 1/2001 | Wang | ................ | 382/176 |
| 6,363,381 B1 * | 3/2002 | Lee et al. | ................ | 1/1 |
| 6,542,635 B1 * | 4/2003 | Hu et al. | ................ | 382/173 |
| 6,721,463 B2 * | 4/2004 | Naoi et al. | ................ | 382/305 |
| 7,305,612 B2 * | 12/2007 | Chakraborty | ................ | 715/221 |
| 7,392,473 B2 * | 6/2008 | Meunier | ................ | 715/247 |
| 8,122,339 B2 * | 2/2012 | Bastos dos Santos et al. | ................ | 715/227 |
| 8,171,392 B2 * | 5/2012 | Bastos dos Santos et al. | ................ | 715/227 |
| 8,214,733 B2 * | 7/2012 | Bastos dos Santos et al. | ................ | 715/227 |
| 8,261,180 B2 * | 9/2012 | Bastos dos Santos et al. | ................ | 715/227 |
| 8,358,852 B2 * | 1/2013 | Bastos dos Santos et al. | ................ | 382/203 |
| 8,358,853 B2 * | 1/2013 | Bastos dos Santos et al. | ................ | 382/203 |
| 8,559,729 B2 * | 10/2013 | Bastos dos Santos et al. | ................ | 382/203 |
| 2008/0317348 A1 * | 12/2008 | Saito | ................ | 382/182 |
| 2009/0110288 A1 * | 4/2009 | Fujiwara | ................ | 382/190 |
| 2011/0047448 A1 * | 2/2011 | Bastos dos Santos et al. | ................ | 715/227 |

* cited by examiner

*Primary Examiner* — Wesley Tucker

(74) *Attorney, Agent, or Firm* — Christine K. Garcia

(57) ABSTRACT

Systems and methods analyze the physical structure of text rows in a document image, including the positions of one or more alignments of one or more character blocks in one or more text rows of the document image. The systems and methods determine one or more groups of text rows that are placed into a class based on the structures of the text rows, such as the positions of the one or more alignments of the one or more character blocks in each text row.

63 Claims, 95 Drawing Sheets

| | | | | |
|---|---|---|---|---|
| 116→1 | AAAAAAAAAAAAAAA | 222 | @@@@@ | |
| 118→2 | BBBBBBBBBBBBB? | 1234567890123456789000 | ααααααα | ββ CCCC DDDDDD! |
| 120→3 | #$#$#$#$#$#$#$#$ | LLLLLLLLLLLLLL | MMMMMM | NN! MMMM EEEEEEE |
| 122→4 | QQQQQQQQQQQQQ | RRRRRRR/R | SSSSSS_SSS_SSSS | OO PPP"P" FFFFFFFFF |
| 124→5 | TTTTTT(T)(T)TTTTTT | UUUUUUUUUUUU | VV WW XXXXXXXX | YY ZZZZZZ GGGGGG |
| 126→6 | 3333333333 | 444444444444444 | 555555555 | 666666666 7777777777777777777 888888 HHHHHHHHHHHHH |
| 128→7 | ABA | CDCDCDCDCD | EFEFEF | GHI 99999999999999999999 JIJIJIJIJ |
| 130→8 | JKL | MNOPQRDTUV | WXWX? | YZ? 10101010101010101010101 KIKIKIKI |

FIG. 1A

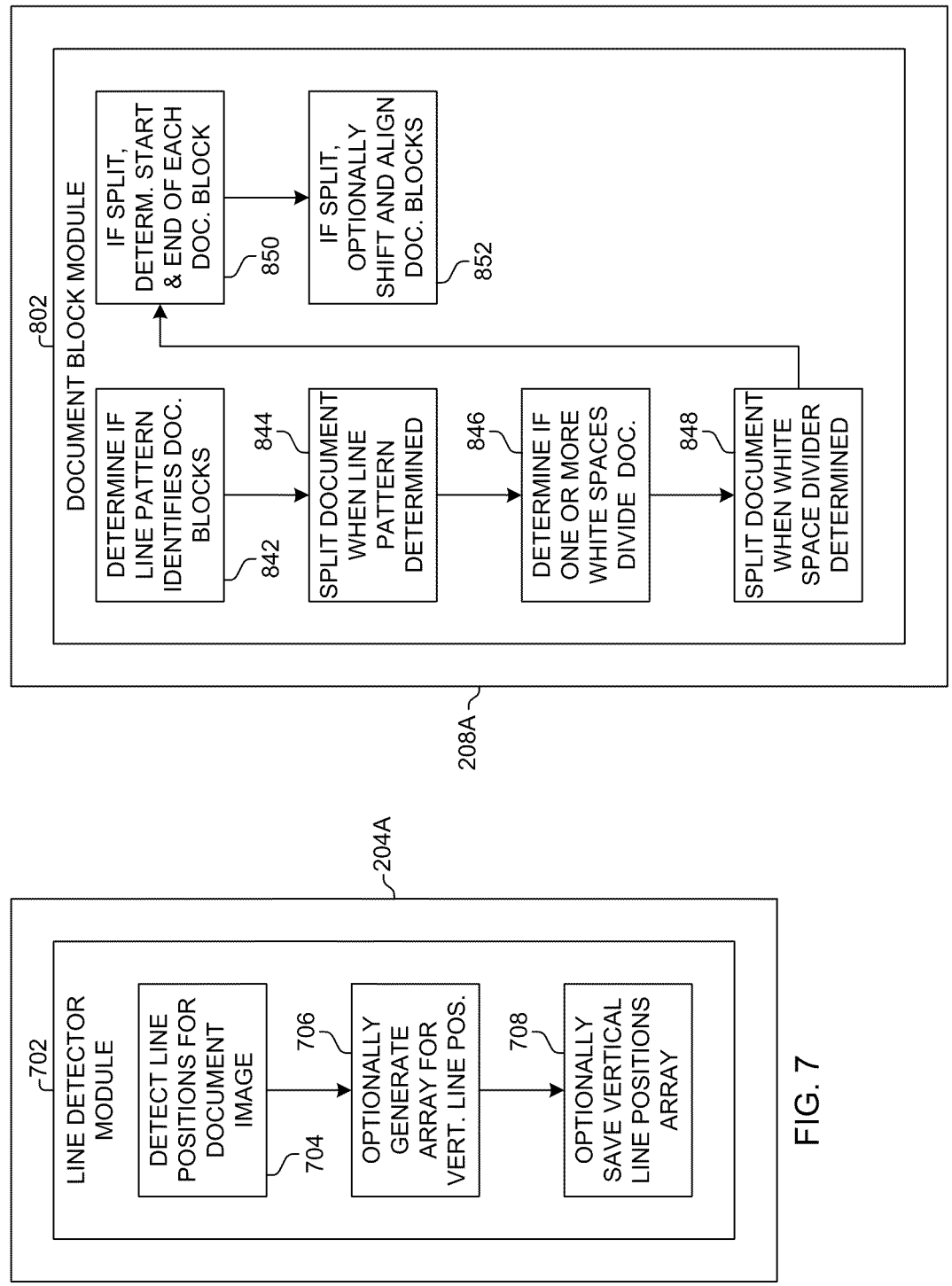

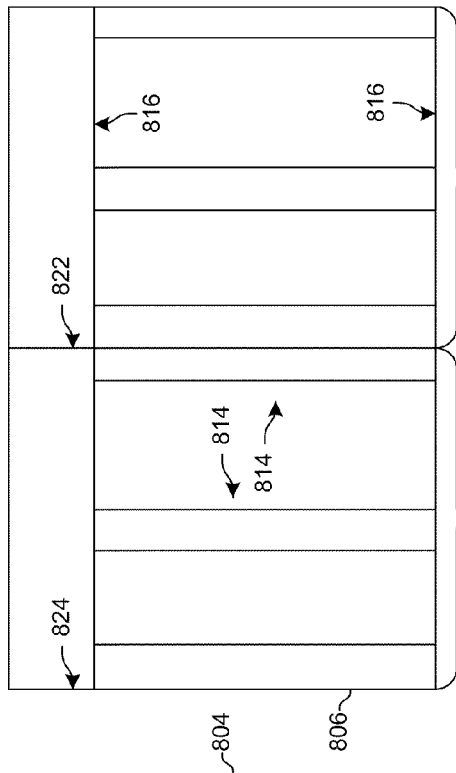
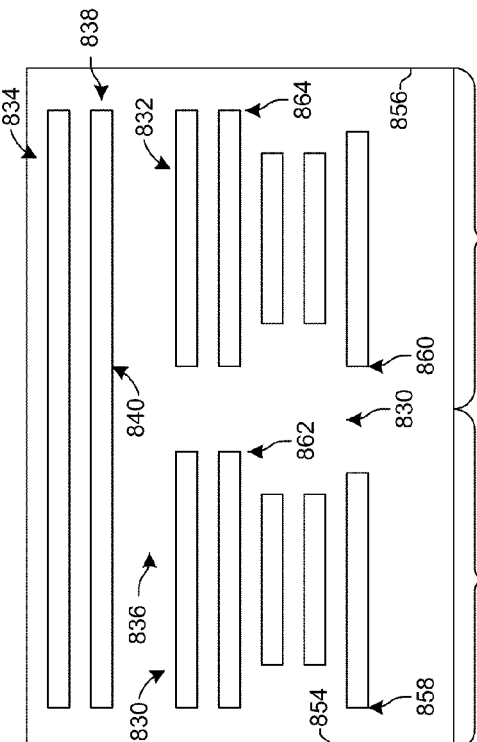
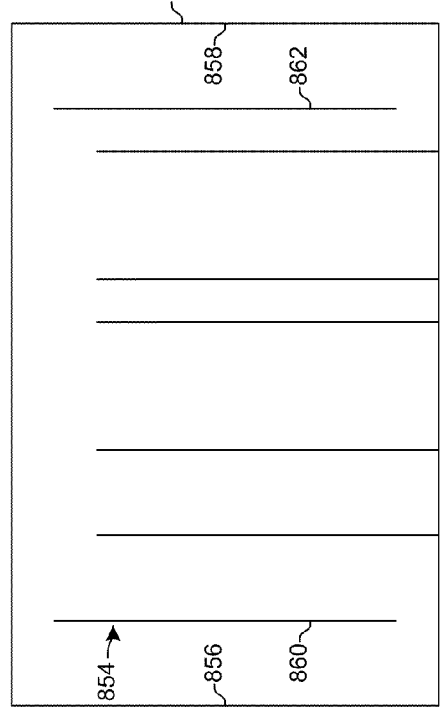
FIG. 8A
FIG. 8B
FIG. 8C
FIG. 8D

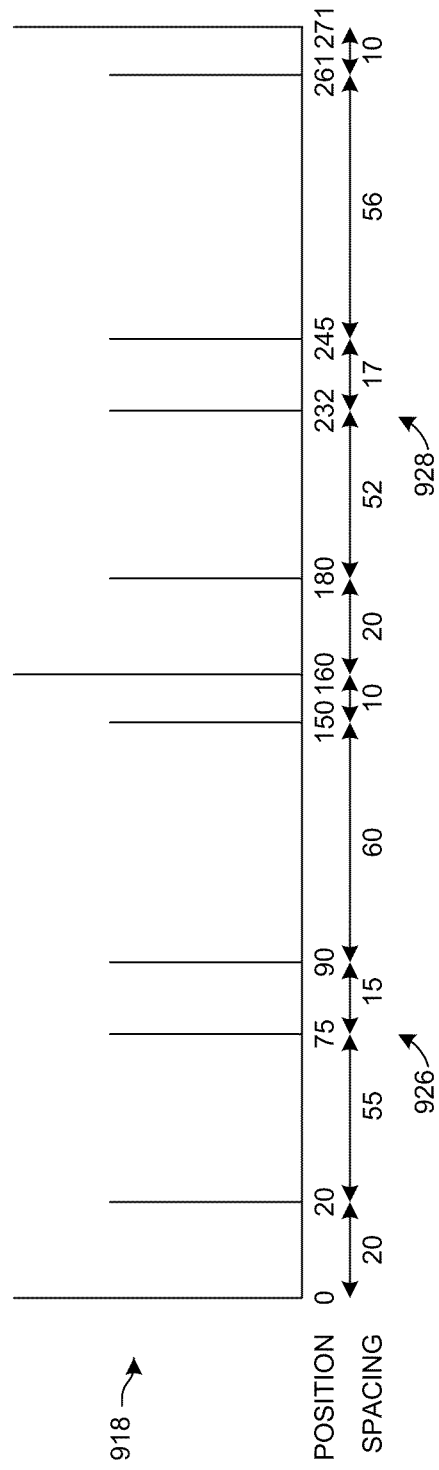
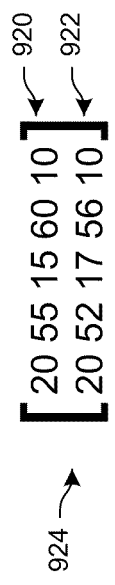
FIG. 9A
FIG. 9B

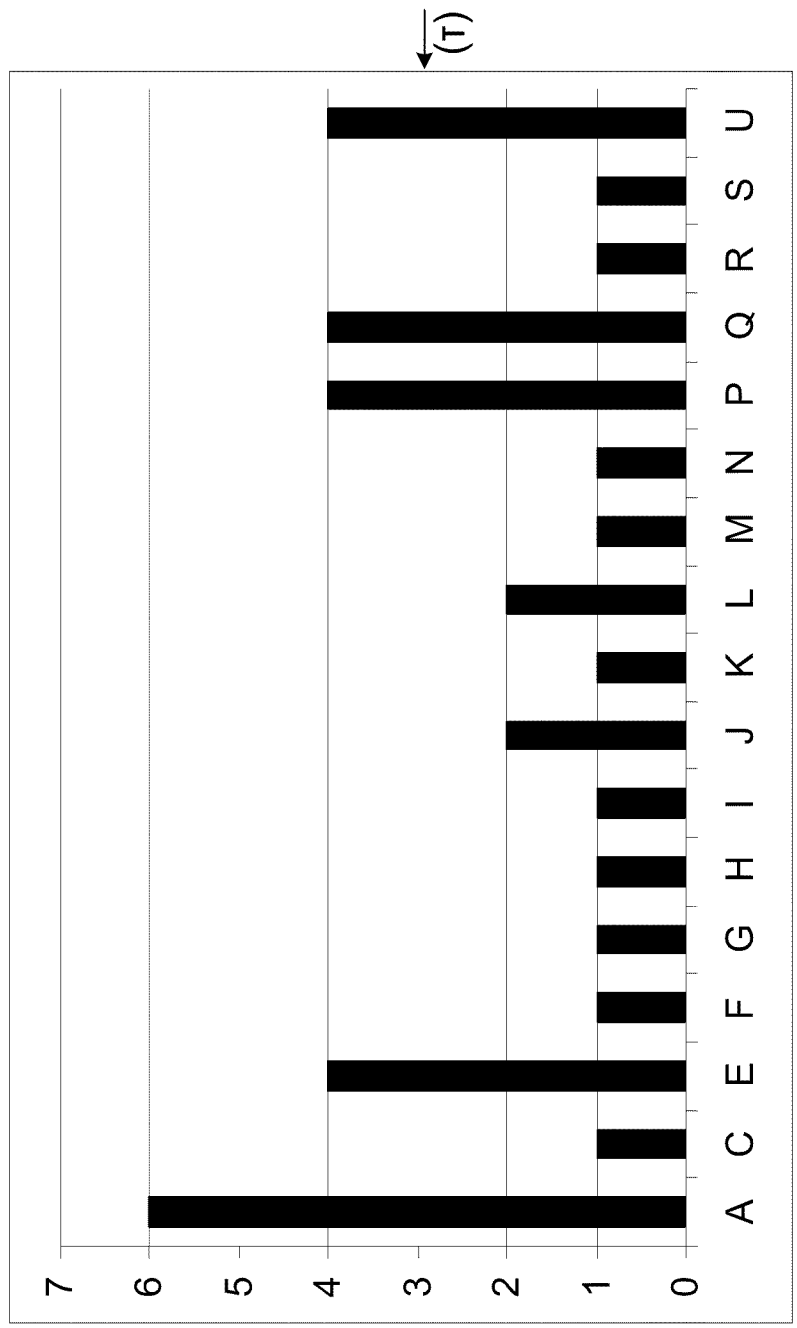

|  | A | B | C | D | E | F | G | H | I | J | K | L | M | N | O | P | Q | R | S | T | U | D(RI, MR) | T1 | T2 |
|---|---|---|---|---|---|---|---|---|---|---|---|---|---|---|---|---|---|---|---|---|---|---|---|---|
| M.R. | 0 | 1 | 0 | 1 | 0 | 0 | 0 | 1 | 0 | 0 | 0 | 1 | 0 | 0 | 1 | 0 | 0 | 0 | 0 | 1 | 0 | NA | -1 | -1 |
| ROW 7 | 0 | 1 | 0 | 1 | 0 | 0 | 0 | 1 | 0 | 0 | 0 | 1 | 0 | 0 | 1 | 0 | 0 | 0 | 0 | 1 | 0 | 0 | | |
| ROW 8 | 0 | 1 | 0 | 1 | 0 | 0 | 0 | 1 | 0 | 0 | 0 | 1 | 0 | 0 | 1 | 0 | 0 | 0 | 0 | 1 | 0 | 0 | | |
| FREQ. | 0 | 2 | 0 | 2 | 0 | 0 | 0 | 2 | 0 | 0 | 0 | 2 | 0 | 0 | 2 | 0 | 0 | 0 | 0 | 2 | 0 | NA | | |

FIG. 24

|  | A | B | C | D | E | F | G | H | I | J | K | L | M | N | O | P | Q | R | S | T | U | D(RI, MR) | T1 | T2 |
|---|---|---|---|---|---|---|---|---|---|---|---|---|---|---|---|---|---|---|---|---|---|---|---|---|
| M.R. | 0 | 1 | 0 | 1 | 0 | 0 | 0 | 1 | 0 | 0 | 0 | 1 | 0 | 0 | 1 | 0 | 0 | 0 | 0 | 1 | 0 | NA | -1 | -1 |
| ROW 7 | 0 | 1 | 0 | 1 | 0 | 0 | 0 | 1 | 0 | 0 | 0 | 1 | 0 | 0 | 1 | 0 | 0 | 0 | 0 | 1 | 0 | 0 | | |
| ROW 8 | 0 | 1 | 0 | 1 | 0 | 0 | 0 | 1 | 0 | 0 | 0 | 1 | 0 | 0 | 1 | 0 | 0 | 0 | 0 | 1 | 0 | 0 | | |
| FREQ. | 0 | 2 | 0 | 2 | 0 | 0 | 0 | 2 | 0 | 0 | 0 | 2 | 0 | 0 | 2 | 0 | 0 | 0 | 0 | 2 | 0 | NA | | |

FIG. 25

|  | A | B | C | D | E | F | G | H | I | J | K | L | M | N | O | P | Q | R | S | T | U | D(RI, MR) | T1 | T2 |
|---|---|---|---|---|---|---|---|---|---|---|---|---|---|---|---|---|---|---|---|---|---|---|---|---|
| M.R. | 1 | 0 | 0 | 0 | 0 | 1 | 0 | 0 | 0 | 0 | 0 | 1 | 0 | 0 | 0 | 1 | 1 | 0 | 0 | 0 | 1 | NA | 2.99 | 1.99 |
| ROW 2 | 1 | 0 | 0 | 0 | 0 | 1 | 0 | 0 | 0 | 0 | 0 | 1 | 0 | 0 | 0 | 1 | 1 | 0 | 0 | 0 | 1 | 1 | | |
| ROW 3 | 1 | 0 | 0 | 0 | 0 | 1 | 0 | 0 | 0 | 0 | 0 | 1 | 0 | 0 | 0 | 1 | 1 | 0 | 0 | 0 | 1 | 1 | | |
| ROW 4 | 1 | 0 | 0 | 0 | 0 | 1 | 0 | 0 | 0 | 1 | 0 | 0 | 0 | 0 | 0 | 1 | 1 | 0 | 0 | 0 | 1 | 1 | | |
| ROW 5 | 1 | 0 | 0 | 0 | 0 | 1 | 0 | 0 | 0 | 0 | 1 | 0 | 0 | 1 | 1 | 0 | 0 | 0 | 0 | 1 | 0 | 3 | | |
| FREQ. | 4 | 0 | 0 | 0 | 0 | 4 | 0 | 0 | 0 | 1 | 2 | 2 | 0 | 1 | 1 | 4 | 4 | 0 | 0 | 0 | 4 | NA | | |

FIG. 26

|  | A | B | C | D | E | F | G | H | I | J | K | L | M | N | O | P | Q | R | S | T | U | D(RI, MR) | T1 | T2 |
|---|---|---|---|---|---|---|---|---|---|---|---|---|---|---|---|---|---|---|---|---|---|---|---|---|
| M.R. | 0 | 1 | 0 | 0 | 0 | 0 | 1 | 0 | 0 | 0 | 0 | 1 | 0 | 0 | 0 | 1 | 0 | 0 | 0 | 1 | 0 | NA | 1.49 | 3.49 |
| ROW 1 | 1 | 1 | 0 | 0 | 0 | 1 | 1 | 0 | 0 | 0 | 0 | 1 | 0 | 0 | 0 | 0 | 0 | 0 | 0 | 1 | 0 | 7 | | |
| ROW 7 | 0 | 1 | 0 | 0 | 0 | 0 | 1 | 0 | 0 | 0 | 0 | 1 | 0 | 0 | 0 | 1 | 0 | 0 | 0 | 1 | 0 | 0 | | |
| ROW 8 | 0 | 1 | 0 | 0 | 0 | 0 | 1 | 0 | 0 | 0 | 0 | 1 | 0 | 0 | 0 | 1 | 0 | 0 | 0 | 1 | 0 | 0 | | |
| FREQ. | 1 | 3 | 0 | 0 | 0 | 1 | 3 | 0 | 0 | 0 | 0 | 3 | 0 | 0 | 0 | 2 | 0 | 0 | 0 | 2 | 0 | NA | | |

| M.R. | A | B | C | D | E | F | G | H | I | J | K | L | M | N | O | P | Q | R | S | T | U | D(RI, MR) | T1 | T2 |
|---|---|---|---|---|---|---|---|---|---|---|---|---|---|---|---|---|---|---|---|---|---|---|---|---|
| | 1 | 0 | 0 | 1 | 0 | 0 | 0 | 0 | 0 | 0 | 0 | 0 | 0 | 0 | 0 | 1 | 1 | 0 | 0 | 0 | 1 | NA | 1.49 | .996 |
| ROW 3 | 1 | 0 | 0 | 0 | 0 | 0 | 0 | 0 | 0 | 1 | 0 | 0 | 0 | 0 | 0 | 0 | 1 | 0 | 0 | 0 | 1 | 0 | | |
| ROW 5 | 1 | 0 | 0 | 0 | 0 | 0 | 0 | 0 | 0 | 0 | 1 | 0 | 1 | 1 | 0 | 1 | 0 | 0 | 0 | 0 | 1 | 2 | | |
| FREQ. | 2 | 0 | 0 | 0 | 0 | 0 | 0 | 0 | 0 | 2 | 0 | 0 | 1 | 1 | 0 | 2 | 2 | 0 | 0 | 0 | 2 | NA | | |

FIG. 29

| M.R. | A | B | C | D | E | F | G | H | I | J | K | L | M | N | O | P | Q | R | S | T | U | D(RI, MR) | T1 | T2 |
|---|---|---|---|---|---|---|---|---|---|---|---|---|---|---|---|---|---|---|---|---|---|---|---|---|
| | 0 | 0 | 0 | 0 | 0 | 0 | 0 | 0 | 0 | 0 | 0 | 1 | 0 | 0 | 0 | 0 | 0 | 0 | 0 | 0 | 0 | NA | 2.99 | 5.98 |
| ROW 2 | 1 | 0 | 0 | 1 | 0 | 0 | 0 | 0 | 0 | 0 | 0 | 0 | 1 | 0 | 1 | 1 | 0 | 0 | 0 | 1 | 1 | 5 | | |
| ROW 5 | 1 | 0 | 0 | 0 | 0 | 0 | 0 | 0 | 1 | 0 | 1 | 0 | 1 | 1 | 0 | 1 | 0 | 0 | 0 | 0 | 1 | 7 | | |
| ROW 7 | 0 | 1 | 0 | 1 | 0 | 0 | 0 | 1 | 0 | 0 | 0 | 1 | 0 | 1 | 0 | 0 | 1 | 0 | 0 | 1 | 0 | 5 | | |
| ROW 8 | 0 | 1 | 0 | 1 | 0 | 0 | 0 | 0 | 0 | 0 | 0 | 1 | 0 | 0 | 1 | 0 | 0 | 0 | 1 | 0 | 0 | 5 | | |
| FREQ. | 2 | 2 | 0 | 2 | 0 | 0 | 0 | 1 | 1 | 0 | 1 | 2 | 2 | 2 | 2 | 2 | 1 | 0 | 1 | 2 | 2 | NA | | |

FIG. 30

| M.R. | A | B | C | D | E | F | G | H | I | J | K | L | M | N | O | P | Q | R | S | T | U | D(RI, MR) | T1 | T2 |
|---|---|---|---|---|---|---|---|---|---|---|---|---|---|---|---|---|---|---|---|---|---|---|---|---|
| | 0 | 1 | 0 | 1 | 0 | 0 | 0 | 1 | 0 | 0 | 0 | 1 | 0 | 0 | 1 | 0 | 0 | 0 | 0 | 1 | 0 | NA | -1 | -1 |
| ROW 7 | 0 | 1 | 0 | 1 | 0 | 0 | 0 | 1 | 0 | 0 | 0 | 1 | 0 | 0 | 1 | 0 | 0 | 1 | 0 | 0 | 0 | 0 | | |
| ROW 8 | 0 | 1 | 0 | 1 | 0 | 0 | 0 | 0 | 0 | 0 | 0 | 1 | 0 | 0 | 1 | 0 | 0 | 0 | 1 | 0 | 0 | 0 | | |
| FREQ. | 0 | 2 | 0 | 2 | 0 | 0 | 0 | 2 | 0 | 0 | 0 | 2 | 0 | 0 | 2 | 0 | 0 | 2 | 0 | 2 | 0 | NA | | |

FIG. 31

| M.R. | A | B | C | D | E | F | G | H | I | J | K | L | M | N | O | P | Q | R | S | T | U | D(RI, MR) | T1 | T2 |
|---|---|---|---|---|---|---|---|---|---|---|---|---|---|---|---|---|---|---|---|---|---|---|---|---|
| | 0 | 0 | 0 | 0 | 0 | 0 | 0 | 0 | 0 | 0 | 0 | 1 | 0 | 0 | 0 | 0 | 0 | 0 | 0 | 0 | 0 | NA | 2.99 | 1.99 |
| ROW 2 | 1 | 0 | 0 | 1 | 0 | 0 | 0 | 0 | 0 | 0 | 0 | 0 | 1 | 0 | 1 | 1 | 0 | 0 | 0 | 1 | 1 | 1 | | |
| ROW 3 | 1 | 0 | 0 | 0 | 0 | 0 | 0 | 0 | 0 | 1 | 0 | 0 | 0 | 0 | 0 | 0 | 1 | 0 | 0 | 0 | 1 | 1 | | |
| ROW 4 | 1 | 0 | 0 | 0 | 0 | 0 | 0 | 0 | 1 | 0 | 0 | 0 | 0 | 1 | 0 | 1 | 1 | 0 | 0 | 0 | 1 | 1 | | |
| ROW 5 | 1 | 0 | 0 | 0 | 0 | 0 | 0 | 0 | 0 | 0 | 1 | 0 | 1 | 1 | 0 | 1 | 0 | 0 | 0 | 0 | 1 | 3 | | |
| FREQ. | 4 | 0 | 0 | 1 | 0 | 0 | 0 | 0 | 1 | 1 | 1 | 1 | 2 | 2 | 1 | 3 | 2 | 0 | 0 | 1 | 4 | NA | | |

FIG. 32

| M.R. | A | B | C | D | E | F | G | H | I | J | K | L | M | N | O | P | Q | R | S | T | U | D(RI, MR) | T1 | T2 |
|---|---|---|---|---|---|---|---|---|---|---|---|---|---|---|---|---|---|---|---|---|---|---|---|---|
|  | 1 | 0 | 0 | 0 | 1 | 0 | 0 | 0 | 0 | 0 | 0 | 0 | 0 | 0 | 0 | 0 | 0 | 0 | 0 | 0 | 1 | NA | 2.99 | 1.99 |
| ROW 2 | 1 | 0 | 0 | 0 | 1 | 0 | 0 | 0 | 0 | 0 | 0 | 0 | 0 | 0 | 0 | 1 | 1 | 0 | 0 | 0 | 1 | 1 |  |  |
| ROW 3 | 1 | 0 | 0 | 0 | 1 | 0 | 0 | 0 | 0 | 0 | 0 | 1 | 0 | 0 | 0 | 1 | 0 | 0 | 0 | 0 | 1 | 1 |  |  |
| ROW 4 | 1 | 0 | 0 | 0 | 1 | 0 | 0 | 0 | 1 | 0 | 0 | 0 | 0 | 0 | 0 | 1 | 1 | 0 | 0 | 0 | 1 | 1 |  |  |
| ROW 5 | 1 | 0 | 0 | 0 | 1 | 0 | 0 | 0 | 0 | 0 | 1 | 0 | 1 | 0 | 1 | 1 | 0 | 0 | 0 | 1 | 1 | 3 |  |  |
| FREQ. | 4 | 0 | 0 | 0 | 4 | 0 | 0 | 0 | 1 | 2 | 0 | 2 | 1 | 0 | 2 | 4 | 2 | 0 | 0 | 1 | 4 | NA |  |  |

FIG. 33

| M.R. | A | B | C | D | E | F | G | H | I | J | K | L | M | N | O | P | Q | R | S | T | U | D(RI, MR) | T1 | T2 |
|---|---|---|---|---|---|---|---|---|---|---|---|---|---|---|---|---|---|---|---|---|---|---|---|---|
|  | 0 | 1 | 0 | 1 | 0 | 0 | 0 | 1 | 0 | 0 | 0 | 0 | 1 | 0 | 0 | 1 | 0 | 0 | 0 | 1 | 0 | NA | -1 | -1 |
| ROW 7 | 0 | 1 | 0 | 1 | 0 | 0 | 0 | 1 | 0 | 0 | 0 | 0 | 1 | 0 | 0 | 0 | 0 | 0 | 0 | 1 | 0 | 0 |  |  |
| ROW 8 | 0 | 1 | 0 | 1 | 0 | 0 | 0 | 1 | 0 | 0 | 0 | 0 | 1 | 0 | 0 | 1 | 0 | 0 | 0 | 1 | 0 | 0 |  |  |
| FREQ. | 0 | 2 | 0 | 2 | 0 | 0 | 0 | 2 | 0 | 0 | 0 | 0 | 2 | 0 | 0 | 2 | 0 | 0 | 0 | 2 | 0 | NA |  |  |

FIG. 34

| M.R. | A | B | C | D | E | F | G | H | I | J | K | L | M | N | O | P | Q | R | S | T | U | D(RI, MR) | T1 | T2 |
|---|---|---|---|---|---|---|---|---|---|---|---|---|---|---|---|---|---|---|---|---|---|---|---|---|
|  | 1 | 0 | 0 | 0 | 1 | 0 | 0 | 0 | 0 | 0 | 0 | 0 | 0 | 0 | 0 | 0 | 0 | 0 | 0 | 0 | 1 | NA | 2.99 | 1.99 |
| ROW 2 | 1 | 0 | 0 | 0 | 1 | 0 | 0 | 0 | 0 | 0 | 0 | 0 | 0 | 0 | 0 | 1 | 1 | 0 | 0 | 0 | 1 | 1 |  |  |
| ROW 3 | 1 | 0 | 0 | 0 | 1 | 0 | 0 | 0 | 0 | 0 | 0 | 1 | 0 | 0 | 0 | 1 | 0 | 0 | 0 | 0 | 1 | 1 |  |  |
| ROW 4 | 1 | 0 | 0 | 0 | 1 | 0 | 0 | 0 | 1 | 0 | 0 | 0 | 0 | 0 | 0 | 1 | 1 | 0 | 0 | 0 | 1 | 1 |  |  |
| ROW 5 | 1 | 0 | 0 | 0 | 1 | 0 | 0 | 0 | 0 | 0 | 1 | 0 | 1 | 0 | 1 | 1 | 0 | 0 | 0 | 1 | 1 | 3 |  |  |
| FREQ. | 4 | 0 | 0 | 0 | 4 | 0 | 0 | 0 | 1 | 2 | 0 | 2 | 1 | 0 | 2 | 4 | 2 | 0 | 0 | 1 | 4 | NA |  |  |

FIG. 35

| COLUMN | FREQUENCY | AVERAGE DISTANCE | SIGMA | MASTER ROW LENGTH | CONFIDENCE FACTOR |
|---|---|---|---|---|---|
| A | 4 | 1.5 | 1 | 5 | 128 |
| B | 2 | 0 | 1 | 6 | 48 |
| D | 2 | 0 | 1 | 6 | 48 |
| E | 3 | 1 | 1 | 5 | 67.5 |
| H | 2 | 0 | 1 | 6 | 48 |
| J | 1 | 0 | 1 | 1 | 6 |
| L | 3 | 5 | 1 | 6 | 4.5 |
| O | 2 | 0 | 1 | 6 | 48 |
| P | 3 | 1 | 1 | 5 | 67.5 |
| Q | 3 | 1 | 1 | 5 | 67.5 |
| T | 2 | 0 | 1 | 6 | 48 |
| U | 3 | 1 | 1 | 5 | 67.5 |

FIG. 36

| ROW | CF | CF | CF | CF | CF | CF | BEST CF |
|---|---|---|---|---|---|---|---|
| 1 | F=0 | | | | | | 0 |
| 2 | A=128 | E=67.5 | L=4.5 | P=67.5 | Q=67.5 | U=67.5 | 128 |
| 3 | A=128 | E=67.5 | J=0 | P=67.5 | Q=67.5 | O=48 | 128 |
| 4 | A=128 | E=67.5 | I=0 | P=67.5 | Q=67.5 | O=48 | 128 |
| 5 | A=128 | M=0 | | | | | 128 |
| 6 | C=0 | G=0 | K=0 | N=0 | R=0 | S=0 | 0 |
| 7 | B=48 | D=48 | H=48 | L=4.5 | O=48 | T=48 | 48 |
| 8 | B=48 | D=48 | H=48 | L=4.5 | O=48 | T=48 | 48 |

FIG. 37

| | A | B | C | D | E | F | G | H | I | J | K | L | M | N | O | P | Q | R | S | T | U | NO. MATCHES |
|---|---|---|---|---|---|---|---|---|---|---|---|---|---|---|---|---|---|---|---|---|---|---|
| M.R. | 1 | 0 | 0 | 0 | 1 | 0 | 0 | 0 | 0 | 0 | 0 | 1 | 0 | 0 | 0 | 1 | 1 | 0 | 0 | 0 | 1 | N/A |
| ROW 1 | 1 | 0 | 0 | 0 | 0 | 0 | 0 | 1 | 0 | 0 | 0 | 0 | 0 | 0 | 1 | 0 | 0 | 0 | 0 | 0 | 0 | N/A |
| MATCHES | 1 | 0 | 0 | 0 | 0 | 0 | 0 | 0 | 0 | 0 | 0 | 0 | 0 | 0 | 0 | 0 | 0 | 0 | 0 | 0 | 0 | 1 |

FIG. 38

| M.R. | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| ROW 1 | 1 | 0 | 0 | 0 | 0 | 0 | 1 | 0 | 1 | 0 | 0 | 0 | 0 | 0 | 0 | 0 | 0 | 0 | 0 | 0 | 1 |
| ROW 2 | 1 | 0 | 0 | 0 | 0 | 1 | 0 | 0 | 0 | 0 | 0 | 0 | 0 | 0 | 0 | 1 | 0 | 0 | 0 | 0 | 0 |
| ROW 3 | 1 | 0 | 0 | 0 | 0 | 0 | 1 | 0 | 0 | 0 | 0 | 0 | 1 | 0 | 0 | 0 | 0 | 0 | 0 | 0 | 1 |
| ROW 4 | 1 | 0 | 0 | 0 | 0 | 0 | 0 | 0 | 1 | 0 | 0 | 0 | 0 | 1 | 0 | 0 | 1 | 0 | 0 | 0 | 1 |
| ROW 5 | 1 | 0 | 0 | 0 | 1 | 0 | 0 | 0 | 0 | 0 | 1 | 0 | 0 | 0 | 0 | 1 | 0 | 1 | 0 | 0 | 1 |
| ROW 6 | 1 | 0 | 1 | 0 | 0 | 1 | 0 | 0 | 0 | 1 | 0 | 1 | 0 | 0 | 1 | 0 | 0 | 1 | 1 | 0 | 0 |
| FREQ. | 6 | 0 | 1 | 0 | 1 | 2 | 2 | 0 | 2 | 1 | 1 | 1 | 1 | 1 | 1 | 2 | 1 | 2 | 1 | 0 | 4 |

FIG. 39

| POINT | ROW | ROW DISTANCE | NUMBER OF ROW MATCHES | ROW LENGTH |
|---|---|---|---|---|
| POINT 1 | 1 | 6 | 1 | 369 |
| POINT 2 | 2 | 1 | 5 | 918 |
| POINT 3 | 3 | 1 | 5 | 918 |
| POINT 4 | 4 | 1 | 5 | 918 |
| POINT 5 | 5 | 3 | 5 | 918 |
| POINT 6 | 6 | 10 | 1 | 918 |

FIG. 40

| POINT | ROW | NORMALIZED ROW DISTANCE | NORMALIZED NO. OF ROW MATCHES | NORMALIZED ROW LENGTH |
|---|---|---|---|---|
| POINT 1 | 1 | 0.273 | 0.0455 | 0.0744 |
| POINT 2 | 2 | 0.0455 | 0.227 | 0.185 |
| POINT 3 | 3 | 0.0455 | 0.227 | 0.185 |
| POINT 4 | 4 | 0.0455 | 0.227 | 0.185 |
| POINT 5 | 5 | 0.136 | 0.227 | 0.185 |
| POINT 6 | 6 | 0.455 | 0.0455 | 0.185 |
| CENTER 1 | N/A | 0.0678 | 0.226 | 0.0457 |
| CENTER 2 | N/A | 0.371 | 0.0457 | 0.135 |

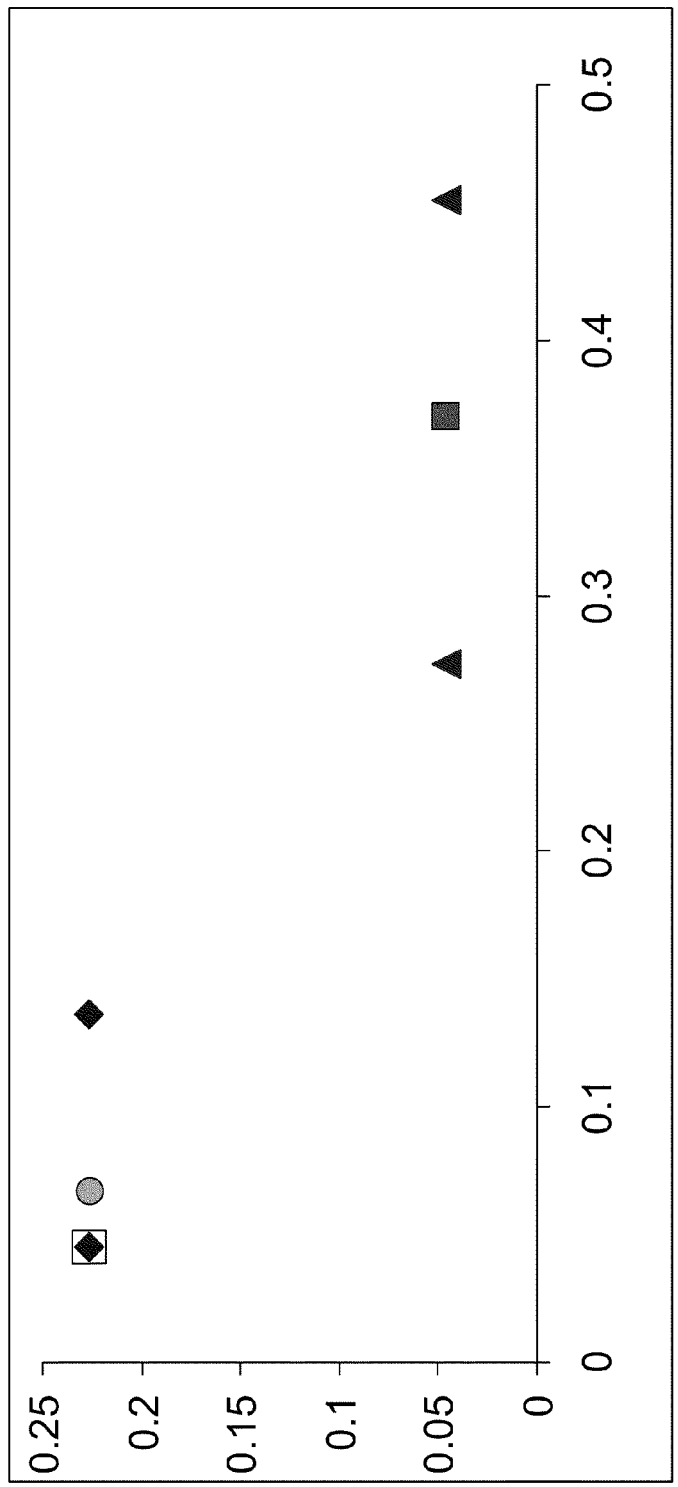

FIG. 43

| M.R. | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| ROW 7 | 0 | 1 | 0 | 1 | 0 | 0 | 0 | 0 | 1 | 0 | 0 | 1 | 0 | 0 | 1 | 0 | 0 | 0 | 0 | 1 | 0 |
| ROW 8 | 0 | 1 | 0 | 1 | 0 | 0 | 0 | 0 | 1 | 0 | 0 | 1 | 0 | 0 | 1 | 0 | 0 | 0 | 0 | 1 | 0 |
| FREQ. | 0 | 2 | 0 | 2 | 0 | 0 | 0 | 0 | 2 | 0 | 0 | 2 | 0 | 0 | 2 | 0 | 0 | 0 | 0 | 2 | 0 |

FIG. 44

| POINT | ROW | ROW DISTANCE | NUMBER OF ROW MATCHES | ROW LENGTH |
|---|---|---|---|---|
| POINT 1 | 7 | 0 | 6 | 844 |
| POINT 2 | 8 | 0 | 6 | 844 |

FIG. 45

| POINT | ROW | NORMALIZED ROW DISTANCE | NORMALIZED NO. OF ROW MATCHES | NORMALIZED ROW LENGTH |
|---|---|---|---|---|
| POINT 1 | 7 | 0 | 0.5 | 0.5 |
| POINT 2 | 8 | 0 | 0.5 | 0.5 |
| CENTER 1 | N/A | 0 | 0.5 | 0.5 |
| CENTER 2 | N/A | 0 | 0.5 | 0.5 |

FIG. 46

|  | CLUSTER CENTER DISTANCE TO CLUSTER 1 | CLUSTER CENTER DISTANCE TO CLUSTER 2 |
|---|---|---|
| POINT 1 | 0 | 0 |
| POINT 2 | 0 | 0 |
| AVERAGE | 0 | 0 |

| M.R. | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| ROW 7 | 0 | 1 | 0 | 1 | 0 | 0 | 0 | 1 | 0 | 0 | 0 | 1 | 0 | 0 | 1 | 0 | 0 | 0 | 1 | 1 | 0 |
| ROW 8 | 0 | 1 | 0 | 1 | 0 | 0 | 0 | 1 | 0 | 0 | 0 | 1 | 0 | 0 | 1 | 0 | 0 | 0 | 1 | 1 | 0 |
| FREQ. | 0 | 2 | 0 | 2 | 0 | 0 | 0 | 2 | 0 | 0 | 0 | 2 | 0 | 0 | 2 | 0 | 0 | 0 | 2 | 2 | 0 |

FIG. 47

| POINT | ROW | ROW DISTANCE | NUMBER OF ROW MATCHES | ROW LENGTH |
|---|---|---|---|---|
| POINT 1 | 7 | 0 | 6 | 844 |
| POINT 2 | 8 | 0 | 6 | 844 |

FIG. 48

| POINT | ROW | NORMALIZED ROW DISTANCE | NORMALIZED NO. OF ROW MATCHES | NORMALIZED ROW LENGTH |
|---|---|---|---|---|
| POINT 1 | 7 | 0 | 0.5 | 0.5 |
| POINT 2 | 8 | 0 | 0.5 | 0.5 |
| CENTER 1 | N/A | 0 | 0.5 | 0.5 |
| CENTER 2 | N/A | 0 | 0.5 | 0.5 |

FIG. 49

| | CLUSTER CENTER DISTANCE TO CLUSTER 1 | CLUSTER CENTER DISTANCE TO CLUSTER 2 |
|---|---|---|
| POINT 1 | 0 | 0 |
| POINT 2 | 0 | 0 |
| AVERAGE | 0 | 0 |

FIG. 50

|  | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| M.R. | 1 | 0 | 0 | 0 | 1 | 0 | 0 | 0 | 0 | 0 | 0 | 0 | 0 | 0 | 0 | 0 | 0 | 1 | 0 | 0 | 1 |
| ROW 2 | 1 | 0 | 0 | 0 | 1 | 0 | 0 | 0 | 0 | 0 | 1 | 0 | 1 | 0 | 0 | 0 | 0 | 1 | 0 | 0 | 1 |
| ROW 3 | 1 | 0 | 0 | 0 | 1 | 0 | 0 | 0 | 0 | 0 | 1 | 0 | 1 | 0 | 0 | 0 | 0 | 1 | 0 | 0 | 1 |
| ROW 4 | 1 | 0 | 0 | 0 | 1 | 0 | 0 | 0 | 0 | 0 | 0 | 0 | 0 | 1 | 0 | 0 | 0 | 1 | 0 | 0 | 1 |
| ROW 5 | 1 | 0 | 0 | 0 | 1 | 0 | 0 | 0 | 0 | 1 | 0 | 0 | 0 | 0 | 0 | 0 | 0 | 1 | 0 | 0 | 1 |
| FREQ. | 4 | 0 | 0 | 0 | 4 | 0 | 0 | 0 | 0 | 1 | 2 | 0 | 2 | 1 | 0 | 0 | 0 | 4 | 0 | 0 | 4 |

FIG. 51

| POINT | ROW | ROW DISTANCE | NUMBER OF ROW MATCHES | ROW LENGTH |
|---|---|---|---|---|
| POINT 1 | 2 | 1 | 5 | 918 |
| POINT 2 | 3 | 1 | 5 | 918 |
| POINT 3 | 4 | 1 | 5 | 918 |
| POINT 4 | 5 | 3 | 5 | 918 |

FIG. 52

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 0.167 | 0.25 | 0.25 |
| POINT 2 | 3 | 0.167 | 0.25 | 0.25 |
| POINT 3 | 4 | 0.167 | 0.25 | 0.25 |
| POINT 4 | 5 | 0.5 | 0.25 | 0.25 |
| CENTER 1 | N/A | 0.5 | 0.25 | 0.25 |
| CENTER 2 | N/A | 0.167 | 0.25 | 0.25 |

| | CLUSTER CENTER DISTANCE TO CLUSTER 1 | CLUSTER CENTER DISTANCE TO CLUSTER 2 |
|---|---|---|
| POINT 1 | 0.333 | 0 |
| POINT 2 | 0.333 | 0 |
| POINT 3 | 0.333 | 0 |
| POINT 4 | 0 | 0.333 |
| AVERAGE | 0.25 | 0.0833 |

FIG. 55

| M.R. | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| ROW 1 | 0 | 1 | 0 | 1 | 0 | 0 | 0 | 1 | 0 | 0 | 0 | 1 | 0 | 0 | 0 | 0 | 1 | 0 | 0 | 1 | 0 |
| ROW 7 | 1 | 1 | 0 | 0 | 0 | 0 | 1 | 0 | 1 | 0 | 0 | 0 | 1 | 0 | 0 | 1 | 0 | 0 | 0 | 0 | 0 |
| ROW 8 | 0 | 1 | 0 | 1 | 0 | 0 | 1 | 0 | 1 | 0 | 0 | 0 | 1 | 0 | 0 | 1 | 0 | 0 | 0 | 1 | 0 |
| FREQ. | 1 | 2 | 0 | 2 | 0 | 0 | 2 | 1 | 2 | 0 | 0 | 1 | 2 | 0 | 0 | 2 | 1 | 0 | 0 | 2 | 0 |

FIG. 56

| POINT | ROW | ROW DISTANCE | NUMBER OF ROW MATCHES | ROW LENGTH |
|---|---|---|---|---|
| POINT 1 | 2 | 7 | 1 | 369 |
| POINT 2 | 7 | 0 | 6 | 844 |
| POINT 3 | 8 | 0 | 6 | 844 |

FIG. 57

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 1 | 0.0769 | 0.179 |
| POINT 2 | 3 | 0 | 0.462 | 0.41 |
| POINT 3 | 4 | 0 | 0.462 | 0.41 |
| CENTER 1 | N/A | 3.27E-61 | 0.462 | 0.41 |
| CENTER 2 | N/A | 1 | 0.0769 | 0.179 |

| | CLUSTER CENTER DISTANCE TO CLUSTER 1 | CLUSTER CENTER DISTANCE TO CLUSTER 2 |
|---|---|---|
| POINT 1 | 1.1 | 0 |
| POINT 2 | 3.27E-61 | 1.1 |
| POINT 3 | 3.27E-61 | 1.1 |
| AVERAGE | 0.365 | 0.731 |

FIG. 58

| M.R. | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| ROW 3 | 1 | 0 | 0 | 0 | 1 | 0 | 0 | 0 | 1 | 0 | 0 | 0 | 0 | 0 | 0 | 0 | 1 | 1 | 0 | 0 | 1 |
| ROW 5 | 1 | 0 | 0 | 0 | 1 | 0 | 0 | 0 | 1 | 0 | 1 | 0 | 1 | 1 | 0 | 0 | 1 | 1 | 0 | 0 | 1 |
| FREQ. | 2 | 0 | 0 | 0 | 2 | 0 | 0 | 0 | 2 | 0 | 1 | 0 | 1 | 1 | 0 | 0 | 2 | 2 | 0 | 0 | 2 |

FIG. 59

| POINT | ROW | ROW DISTANCE | NUMBER OF ROW MATCHES | ROW LENGTH |
|---|---|---|---|---|
| POINT 1 | 3 | 0 | 6 | 918 |
| POINT 2 | 5 | 2 | 6 | 918 |

FIG. 60

| POINT | ROW | NORMALIZED ROW DISTANCE | NORMALIZED NO. OF ROW MATCHES | NORMALIZED ROW LENGTH |
|---|---|---|---|---|
| POINT 1 | 3 | 0 | 0.5 | 0.5 |
| POINT 2 | 5 | 1 | 0.5 | 0.5 |
| CENTER 1 | N/A | 1 | 0.5 | 0.5 |
| CENTER 2 | N/A | 2.46E-20 | 0.5 | 0.5 |

FIG. 61

| | CLUSTER CENTER DISTANCE TO CLUSTER 1 | CLUSTER CENTER DISTANCE TO CLUSTER 2 |
|---|---|---|
| POINT 1 | 1 | 2.46E-20 |
| POINT 2 | 0 | 1 |
| AVERAGE | 0.5 | 0.5 |

FIG. 62

| M.R. | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| ROW 2 | 0 | 0 | 0 | 0 | 0 | 0 | 0 | 0 | 0 | 1 | 0 | 0 | 0 | 0 | 0 | 0 | 0 | 0 | 0 | 0 | 0 |
| ROW 5 | 1 | 0 | 0 | 0 | 1 | 0 | 0 | 0 | 0 | 0 | 0 | 1 | 1 | 0 | 0 | 0 | 0 | 0 | 0 | 0 | 1 |
| ROW 7 | 0 | 1 | 0 | 1 | 0 | 0 | 0 | 1 | 0 | 0 | 0 | 1 | 0 | 0 | 1 | 1 | 1 | 0 | 0 | 1 | 0 |
| ROW 8 | 0 | 1 | 0 | 1 | 0 | 0 | 0 | 1 | 0 | 0 | 0 | 1 | 0 | 0 | 1 | 1 | 0 | 0 | 0 | 1 | 0 |
| FREQ. | 2 | 2 | 0 | 2 | 2 | 0 | 0 | 2 | 0 | 1 | 0 | 4 | 1 | 0 | 2 | 2 | 2 | 0 | 0 | 2 | 2 |

FIG. 63

| POINT | ROW | ROW DISTANCE | NUMBER OF ROW MATCHES | ROW LENGTH |
|---|---|---|---|---|
| POINT 1 | 2 | 5 | 1 | 918 |
| POINT 2 | 5 | 7 | 1 | 918 |
| POINT 3 | 7 | 5 | 1 | 844 |
| POINT 4 | 8 | 5 | 1 | 844 |

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 0.227 | 0.25 | 0.26 |
| POINT 2 | 5 | 0.318 | 0.25 | 0.26 |
| POINT 3 | 7 | 0.227 | 0.25 | 0.24 |
| POINT 4 | 8 | 0.227 | 0.25 | 0.24 |
| CENTER 1 | N/A | 0.227 | 0.25 | 0.246 |
| CENTER 2 | N/A | 0.318 | 0.25 | 0.26 |

FIG. 66

| | CLUSTER CENTER DISTANCE TO CLUSTER 1 | CLUSTER CENTER DISTANCE TO CLUSTER 2 |
|---|---|---|
| POINT 1 | 0.0142 | 0.0909 |
| POINT 2 | 0.092 | 5.78E-05 |
| POINT 3 | 0.00682 | 0.9832 |
| POINT 4 | 0.00682 | 0.9832 |
| AVERAGE | 0.03 | 0.0694 |

FIG. 67

| M.R. | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| ROW 3 | 0 | 1 | 0 | 1 | 0 | 0 | 0 | 0 | 1 | 0 | 0 | 0 | 1 | 0 | 0 | 1 | 0 | 0 | 0 | 1 | 0 |
| ROW 5 | 0 | 1 | 0 | 1 | 0 | 0 | 0 | 0 | 1 | 0 | 0 | 0 | 1 | 0 | 0 | 1 | 0 | 0 | 0 | 1 | 0 |
| FREQ. | 0 | 2 | 0 | 2 | 0 | 0 | 0 | 0 | 2 | 0 | 0 | 0 | 2 | 0 | 0 | 2 | 0 | 0 | 0 | 2 | 0 |

FIG. 68

| POINT | ROW | ROW DISTANCE | NUMBER OF ROW MATCHES | ROW LENGTH |
|---|---|---|---|---|
| POINT 1 | 7 | 0 | 6 | 844 |
| POINT 2 | 8 | 0 | 6 | 844 |

| POINT | ROW | NORMALIZED ROW DISTANCE | NORMALIZED NO. OF ROW MATCHES | NORMALIZED ROW LENGTH |
|---|---|---|---|---|
| POINT 1 | 7 | 0 | 0.5 | 0.5 |
| POINT 2 | 8 | 0 | 0.5 | 0.5 |
| CENTER 1 | N/A | 0 | 0.5 | 0.5 |
| CENTER 2 | N/A | 0 | 0.5 | 0.5 |

FIG. 69

| | CLUSTER CENTER DISTANCE TO CLUSTER 1 | CLUSTER CENTER DISTANCE TO CLUSTER 2 |
|---|---|---|
| POINT 1 | 0 | 0 |
| POINT 2 | 0 | 0 |
| AVERAGE | 0 | 0 |

FIG. 70

| M.R. | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| ROW 2 | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 3 | 1 | 0 | 0 | 0 | 1 | 0 | 0 | 0 | 0 | 0 | 1 | 0 | 0 | 0 | 0 | 0 | 1 | 0 | 0 | 0 | 1 |
| ROW 4 | 1 | 0 | 0 | 0 | 1 | 0 | 0 | 0 | 0 | 0 | 0 | 0 | 1 | 1 | 0 | 0 | 1 | 0 | 0 | 0 | 1 |
| ROW 5 | 1 | 0 | 0 | 0 | 1 | 0 | 0 | 0 | 0 | 0 | 1 | 0 | 1 | 0 | 1 | 0 | 1 | 0 | 0 | 0 | 1 |
| FREQ. | 4 | 0 | 0 | 0 | 4 | 0 | 0 | 0 | 0 | 0 | 2 | 0 | 2 | 1 | 1 | 1 | 4 | 0 | 0 | 0 | 4 |

FIG. 71

| POINT | ROW | ROW DISTANCE | NUMBER OF ROW MATCHES | ROW LENGTH |
|---|---|---|---|---|
| POINT 1 | 2 | 1 | 5 | 918 |
| POINT 2 | 3 | 1 | 5 | 918 |
| POINT 3 | 4 | 1 | 5 | 918 |
| POINT 4 | 5 | 3 | 5 | 918 |

FIG. 72

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 0.167 | 0.25 | 0.25 |
| POINT 2 | 3 | 0.167 | 0.25 | 0.25 |
| POINT 3 | 4 | 0.167 | 0.25 | 0.25 |
| POINT 4 | 5 | 0.5 | 0.25 | 0.25 |
| CENTER 1 | N/A | 0.5 | 0.25 | 0.25 |
| CENTER 2 | N/A | 0.167 | 0.25 | 0.25 |

FIG. 73

| | CLUSTER CENTER DISTANCE TO CLUSTER 1 | CLUSTER CENTER DISTANCE TO CLUSTER 2 |
|---|---|---|
| POINT 1 | 0.333 | 0 |
| POINT 2 | 0.333 | 0 |
| POINT 3 | 0.333 | 0 |
| POINT 4 | 0 | 0.333 |
| AVERAGE | 0.25 | 0.0833 |

FIG. 74

| | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| M.R. | 1 | 0 | 0 | 0 | 1 | 0 | 0 | 0 | 0 | 0 | 0 | 0 | 0 | 0 | 0 | 0 | 1 | 1 | 0 | 0 | 1 |
| ROW 2 | 1 | 0 | 0 | 0 | 1 | 0 | 0 | 0 | 0 | 0 | 0 | 0 | 0 | 0 | 0 | 0 | 1 | 1 | 0 | 0 | 1 |
| ROW 3 | 1 | 0 | 0 | 0 | 1 | 0 | 0 | 0 | 0 | 0 | 1 | 0 | 0 | 0 | 0 | 0 | 1 | 1 | 0 | 0 | 1 |
| ROW 4 | 1 | 0 | 0 | 0 | 1 | 0 | 0 | 0 | 0 | 0 | 1 | 0 | 1 | 0 | 0 | 0 | 1 | 1 | 0 | 0 | 1 |
| ROW 5 | 1 | 0 | 0 | 0 | 1 | 0 | 0 | 0 | 0 | 1 | 0 | 0 | 1 | 1 | 0 | 0 | 1 | 1 | 0 | 0 | 1 |
| FREQ. | 4 | 0 | 0 | 0 | 4 | 0 | 0 | 0 | 0 | 1 | 2 | 0 | 2 | 1 | 0 | 0 | 4 | 4 | 0 | 0 | 4 |

FIG. 75

| POINT | ROW | ROW DISTANCE | NUMBER OF ROW MATCHES | ROW LENGTH |
|---|---|---|---|---|
| POINT 1 | 2 | 1 | 5 | 918 |
| POINT 2 | 3 | 1 | 5 | 918 |
| POINT 3 | 4 | 1 | 5 | 918 |
| POINT 4 | 5 | 3 | 5 | 918 |

FIG. 76

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 0.167 | 0.25 | 0.25 |
| POINT 2 | 3 | 0.167 | 0.25 | 0.25 |
| POINT 3 | 4 | 0.167 | 0.25 | 0.25 |
| POINT 4 | 5 | 0.5 | 0.25 | 0.25 |
| CENTER 1 | N/A | 0.5 | 0.25 | 0.25 |
| CENTER 2 | N/A | 0.167 | 0.25 | 0.25 |

FIG. 77

| | CLUSTER CENTER DISTANCE TO CLUSTER 1 | CLUSTER CENTER DISTANCE TO CLUSTER 2 |
|---|---|---|
| POINT 1 | 0.333 | 0 |
| POINT 2 | 0.333 | 0 |
| POINT 3 | 0.333 | 0 |
| POINT 4 | 0 | 0.333 |
| AVERAGE | 0.25 | 0.0833 |

FIG. 78

| | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| M.R. | 0 | 1 | 0 | 1 | 0 | 0 | 0 | 1 | 0 | 0 | 0 | 1 | 0 | 0 | 1 | 0 | 0 | 0 | 1 | 0 | 0 |
| ROW 7 | 0 | 1 | 0 | 1 | 0 | 0 | 0 | 1 | 0 | 0 | 0 | 1 | 0 | 0 | 1 | 0 | 0 | 0 | 1 | 0 | 0 |
| ROW 8 | 0 | 1 | 0 | 1 | 0 | 0 | 0 | 1 | 0 | 0 | 0 | 1 | 0 | 0 | 1 | 0 | 0 | 0 | 1 | 0 | 0 |
| FREQ. | 0 | 2 | 0 | 2 | 0 | 0 | 0 | 2 | 0 | 0 | 0 | 2 | 0 | 0 | 2 | 0 | 0 | 0 | 2 | 0 | 0 |

FIG. 79

| POINT | ROW | ROW DISTANCE | NUMBER OF ROW MATCHES | ROW LENGTH |
|---|---|---|---|---|
| POINT 1 | 7 | 0 | 6 | 844 |
| POINT 2 | 8 | 0 | 6 | 844 |

FIG. 80

| POINT | ROW | NORMALIZED ROW DISTANCE | NORMALIZED NO. OF ROW MATCHES | NORMALIZED ROW LENGTH |
|---|---|---|---|---|
| POINT 1 | 7 | 0 | 0.5 | 0.5 |
| POINT 2 | 8 | 0 | 0.5 | 0.5 |
| CENTER 1 | N/A | 0 | 0.5 | 0.5 |
| CENTER 2 | N/A | 0 | 0.5 | 0.5 |

FIG. 81

| | CLUSTER CENTER DISTANCE TO CLUSTER 1 | CLUSTER CENTER DISTANCE TO CLUSTER 2 |
|---|---|---|
| POINT 1 | 0 | 0 |
| POINT 2 | 0 | 0 |
| AVERAGE | 0 | 0 |

FIG. 82

| M.R. | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| ROW 2 | 1 | 0 | 0 | 0 | 1 | 0 | 0 | 0 | 0 | 0 | 0 | 0 | 0 | 0 | 0 | 0 | 1 | 1 | 0 | 0 | 1 |
| ROW 3 | 1 | 0 | 0 | 0 | 1 | 0 | 0 | 0 | 0 | 1 | 0 | 0 | 0 | 0 | 0 | 0 | 1 | 0 | 0 | 0 | 1 |
| ROW 4 | 1 | 0 | 0 | 0 | 1 | 0 | 0 | 0 | 0 | 0 | 0 | 0 | 0 | 0 | 1 | 0 | 1 | 0 | 0 | 0 | 1 |
| ROW 5 | 1 | 0 | 0 | 0 | 1 | 0 | 0 | 0 | 0 | 0 | 1 | 0 | 1 | 1 | 0 | 0 | 1 | 0 | 0 | 0 | 1 |
| FREQ. | 4 | 0 | 0 | 0 | 4 | 0 | 0 | 0 | 0 | 1 | 1 | 0 | 1 | 1 | 1 | 0 | 4 | 1 | 0 | 0 | 4 |

FIG. 83

| POINT | ROW | ROW DISTANCE | NUMBER OF ROW MATCHES | ROW LENGTH |
|---|---|---|---|---|
| POINT 1 | 2 | 1 | 5 | 918 |
| POINT 2 | 3 | 1 | 5 | 918 |
| POINT 3 | 4 | 1 | 5 | 918 |
| POINT 4 | 5 | 3 | 5 | 918 |

FIG. 84

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 0.167 | 0.25 | 0.25 |
| POINT 2 | 3 | 0.167 | 0.25 | 0.25 |
| POINT 3 | 4 | 0.167 | 0.25 | 0.25 |
| POINT 4 | 5 | 0.5 | 0.25 | 0.25 |
| CENTER 1 | N/A | 0.5 | 0.25 | 0.25 |
| CENTER 2 | N/A | 0.167 | 0.25 | 0.25 |

FIG. 85

| | CLUSTER CENTER DISTANCE TO CLUSTER 1 | CLUSTER CENTER DISTANCE TO CLUSTER 2 |
|---|---|---|
| POINT 1 | 0.333 | 0 |
| POINT 2 | 0.333 | 0 |
| POINT 3 | 0.333 | 0 |
| POINT 4 | 0 | 0.333 |
| AVERAGE | 0.25 | 0.0833 |

| COLUMN | FREQUENCY | NORMALIZED FREQUENCY | AVERAGE MASTER ROW MATCHES | MASTER ROW SIZE | AVERAGE MASTER ROW DISTANCE | CONFIDENCE |
|---|---|---|---|---|---|---|
| A | 4 | 0.5 | 5 | 5 | 1.5 | 1.67 |
| B | 2 | 0.25 | 6 | 6 | 0 | 1.00E+06 |
| D | 2 | 0.25 | 6 | 6 | 0 | 1.00E+06 |
| E | 3 | 0.375 | 5 | 5 | 1 | 1.88 |
| H | 2 | 0.25 | 6 | 6 | 0 | 1.00E+06 |
| J | 1 | 0.125 | 6 | 6 | 6 | 0.375 |
| L | 3 | 0.375 | 1 | 1 | 5 | 0.075 |
| O | 2 | 0.25 | 6 | 6 | 0 | 1.00E+06 |
| P | 3 | 0.375 | 5 | 5 | 1 | 1.88 |
| Q | 3 | 0.375 | 5 | 5 | 1 | 1.88 |
| T | 2 | 0.25 | 6 | 6 | 0 | 1.00E+06 |
| U | 3 | 0.375 | 5 | 5 | 1 | 1.88 |

FIG. 88

| ROW | CF | CF | CF | CF | CF | CF | CF | BEST CF |
|---|---|---|---|---|---|---|---|---|
| 1 | F=0 | | | | | | | 0 |
| 2 | A=1.67 | E=1.88 | L=0.075 | P=1.88 | Q=1.88 | U=1.88 | | 1.88 |
| 3 | A=1.67 | E=1.88 | L=1.88 | Q=1.88 | U=1.88 | | | 1.88 |
| 4 | A=1.67 | E=1.88 | I=0 | P=1.88 | Q=1.88 | | | 1.88 |
| 5 | A=1.67 | J=0 | M=0 | | | | | 1.67 |
| 6 | C=0 | G=0 | K=0 | N=0 | R=0 | S=0 | | 0 |
| 7 | B=1E+006 | D=1E+006 | H=0 | L=0.075 | O=1E+006 | T=1E+006 | | 1E+006 |
| 8 | B=1E+006 | D=1E+006 | H=0 | L=0.075 | O=1E+006 | T=1E+006 | | 1E+006 |

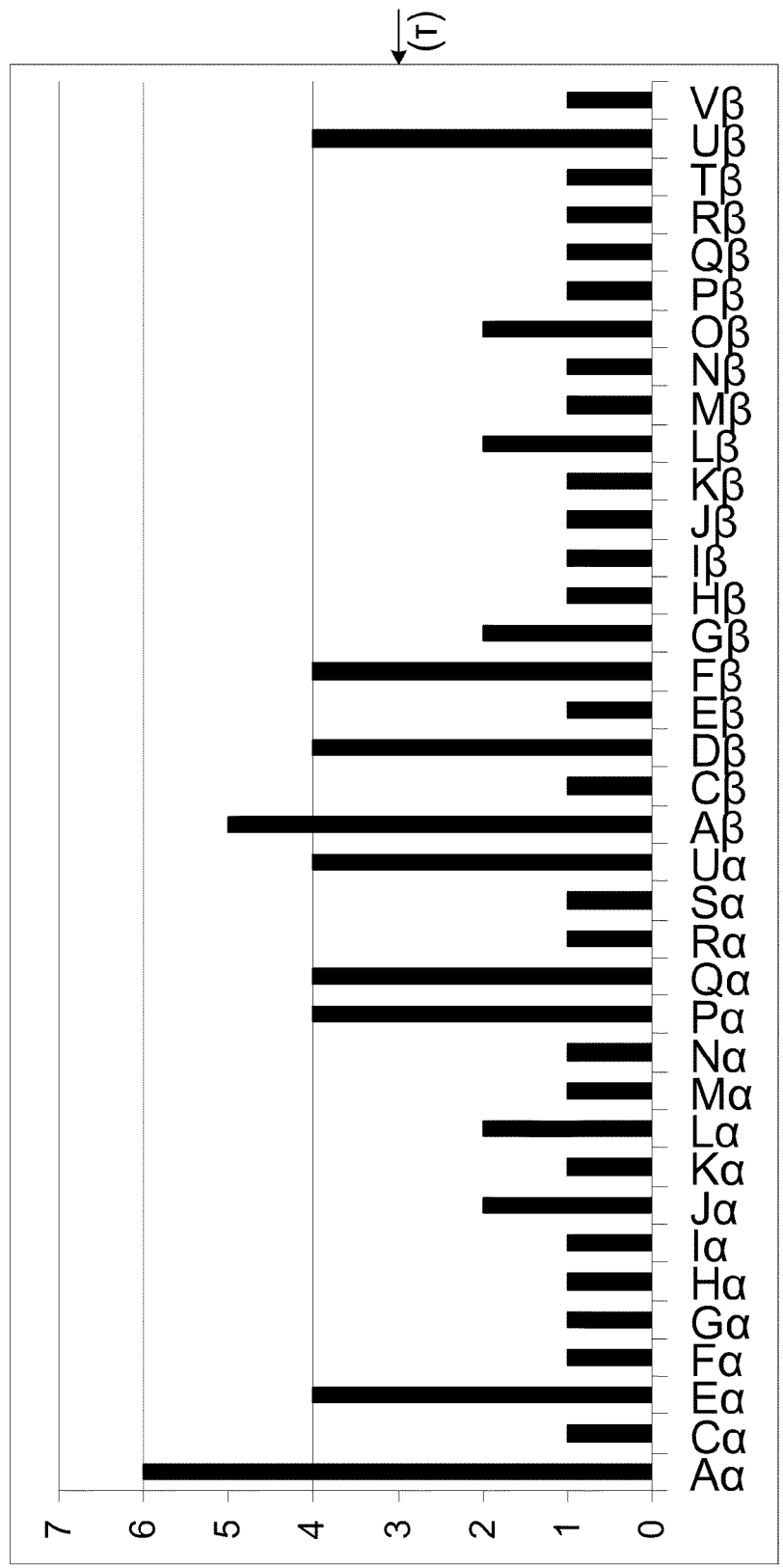

FIG. 94A

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 0 | 0 | 0 | 1 | 0 | 0 | 0 | 0 | 0 | 0 | 0 | 0 | 0 | 0 | 1 | 0 | 0 | 0 | 0 | 1 |
| ROW 1 | 1 | 0 | 0 | 0 | 0 | 1 | 1 | 0 | 0 | 0 | 0 | 0 | 0 | 0 | 0 | 0 | 0 | 0 | 0 | 0 | 0 |
| ROW 2 | 1 | 0 | 0 | 0 | 1 | 0 | 0 | 0 | 0 | 0 | 0 | 1 | 0 | 0 | 0 | 1 | 0 | 0 | 0 | 0 | 1 |
| ROW 3 | 1 | 0 | 0 | 0 | 1 | 0 | 0 | 0 | 0 | 1 | 0 | 0 | 0 | 0 | 0 | 1 | 0 | 0 | 0 | 0 | 1 |
| ROW 4 | 1 | 0 | 0 | 0 | 0 | 0 | 0 | 0 | 0 | 0 | 1 | 0 | 1 | 0 | 0 | 1 | 0 | 0 | 0 | 0 | 1 |
| ROW 5 | 1 | 0 | 0 | 1 | 0 | 0 | 0 | 1 | 0 | 0 | 0 | 0 | 0 | 1 | 1 | 0 | 0 | 1 | 1 | 0 | 0 |
| ROW 6 | 1 | 0 | 0 | 0 | 1 | 1 | 1 | 1 | 1 | 1 | 1 | 0 | 1 | 1 | 0 | 0 | 4 | 1 | 1 | 0 | 1 |
| FREQ. | 6 | 0 | 0 | 1 | 4 | 1 | 1 | 1 | 1 | 2 | 2 | 1 | 1 | 1 | 0 | 4 | 4 | 1 | 1 | 0 | 4 |

FIG. 94B

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | D(RI,MR) | T1 | T2 |
|---|---|---|---|---|---|---|---|---|---|---|---|---|---|---|---|---|---|---|---|---|---|---|---|---|---|---|
| M.R. | 1 | 0 | 0 | 1 | 0 | 1 | 0 | 0 | 0 | 0 | 0 | 0 | 1 | 0 | 0 | 0 | 0 | 0 | 0 | 0 | 1 | 0 | 0 | NA | 2.99 | 6.45 |
| ROW 1 | 1 | 0 | 0 | 1 | 0 | 1 | 0 | 0 | 0 | 0 | 0 | 0 | 0 | 0 | 0 | 0 | 0 | 0 | 0 | 1 | 0 | 0 | 0 | 10 | | |
| ROW 2 | 1 | 0 | 0 | 0 | 1 | 0 | 1 | 0 | 0 | 1 | 0 | 0 | 0 | 0 | 1 | 0 | 0 | 0 | 0 | 0 | 1 | 0 | 0 | 1 | | |
| ROW 3 | 1 | 0 | 0 | 1 | 0 | 1 | 0 | 1 | 0 | 0 | 0 | 0 | 0 | 0 | 0 | 0 | 0 | 0 | 0 | 0 | 1 | 0 | 0 | 1 | | |
| ROW 4 | 1 | 0 | 0 | 0 | 1 | 0 | 1 | 0 | 0 | 0 | 0 | 1 | 0 | 0 | 0 | 1 | 0 | 0 | 0 | 0 | 1 | 0 | 0 | 1 | | |
| ROW 5 | 1 | 0 | 0 | 0 | 1 | 0 | 1 | 1 | 1 | 0 | 0 | 0 | 0 | 0 | 1 | 0 | 1 | 0 | 0 | 0 | 0 | 1 | 0 | 3 | | |
| ROW 6 | 1 | 0 | 1 | 1 | 0 | 0 | 1 | 1 | 1 | 1 | 1 | 1 | 1 | 1 | 0 | 1 | 1 | 0 | 1 | 1 | 0 | 1 | 1 | 13 | | |
| FREQ. | 5 | 0 | 1 | 4 | 1 | 4 | 2 | 1 | 1 | 1 | 1 | 2 | 1 | 1 | 2 | 1 | 1 | 0 | 1 | 1 | 4 | 1 | 0 | NA | | |

FIG. 96A

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 0 | 1 | 0 | 1 | 0 | 0 | 0 | 1 | 0 | 0 | 0 | 1 | 0 | 0 | 1 | 0 | 0 | 0 | 0 | 1 | 0 |
| ROW 7 | 0 | 0 | 1 | 0 | 0 | 0 | 0 | 1 | 0 | 0 | 0 | 0 | 0 | 0 | 1 | 0 | 0 | 0 | 0 | 1 | 0 |
| ROW 8 | 0 | 1 | 0 | 0 | 0 | 0 | 0 | 0 | 0 | 0 | 0 | 1 | 0 | 0 | 1 | 0 | 0 | 0 | 0 | 1 | 0 |
| FREQ. | 0 | 2 | 0 | 0 | 0 | 0 | 0 | 2 | 0 | 0 | 0 | 2 | 0 | 0 | 2 | 0 | 0 | 0 | 0 | 2 | 0 |

FIG. 96B

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| M.R. | 0 | 1 | 0 | 1 | 0 | 0 | 0 | 1 | 0 | 0 | 0 | 1 | 0 | 0 | 1 | 0 | 0 | 0 | 0 | 1 | 0 | 0 | 1 | NA | -1 | -1 |
| ROW 7 | 0 | 0 | 1 | 0 | 0 | 0 | 0 | 1 | 0 | 0 | 0 | 0 | 0 | 0 | 1 | 0 | 0 | 0 | 0 | 1 | 0 | 0 | 1 | 0 | | |
| ROW 8 | 0 | 1 | 0 | 0 | 0 | 0 | 0 | 0 | 0 | 0 | 0 | 1 | 0 | 0 | 1 | 0 | 0 | 0 | 0 | 1 | 0 | 0 | 1 | 0 | | |
| FREQ. | 0 | 2 | 0 | 0 | 0 | 0 | 0 | 2 | 0 | 0 | 0 | 2 | 0 | 0 | 2 | 0 | 0 | 0 | 0 | 2 | 0 | 0 | 2 | NA | | |

FIG. 97A

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 0 | 1 | 0 | 1 | 0 | 0 | 0 | 1 | 0 | 0 | 0 | 1 | 0 | 0 | 1 | 0 | 0 | 0 | 0 | 1 | 0 |
| ROW 7 | 0 | 0 | 1 | 0 | 0 | 0 | 0 | 1 | 0 | 0 | 0 | 0 | 0 | 0 | 1 | 0 | 0 | 0 | 0 | 1 | 0 |
| ROW 8 | 0 | 1 | 0 | 0 | 0 | 0 | 0 | 0 | 0 | 0 | 0 | 1 | 0 | 0 | 1 | 0 | 0 | 0 | 0 | 1 | 0 |
| FREQ. | 0 | 2 | 0 | 0 | 0 | 0 | 0 | 2 | 0 | 0 | 0 | 2 | 0 | 0 | 2 | 0 | 0 | 0 | 0 | 2 | 0 |

FIG. 97B

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| M.R. | 0 | 1 | 0 | 1 | 0 | 0 | 0 | 1 | 0 | 0 | 0 | 1 | 0 | 0 | 1 | 0 | 0 | 0 | 0 | 1 | 0 | 0 | 1 | NA | -1 | -1 |
| ROW 7 | 0 | 0 | 1 | 0 | 0 | 0 | 0 | 1 | 0 | 0 | 0 | 0 | 0 | 0 | 1 | 0 | 0 | 0 | 0 | 1 | 0 | 0 | 1 | 0 | | |
| ROW 8 | 0 | 1 | 0 | 0 | 0 | 0 | 0 | 0 | 0 | 0 | 0 | 1 | 0 | 0 | 1 | 0 | 0 | 0 | 0 | 1 | 0 | 0 | 1 | 0 | | |
| FREQ. | 0 | 2 | 0 | 0 | 0 | 0 | 0 | 2 | 0 | 0 | 0 | 2 | 0 | 0 | 2 | 0 | 0 | 0 | 0 | 2 | 0 | 0 | 2 | NA | | |

FIG. 98A

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 2 | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 3 | 1 | 0 | 0 | 0 | 1 | 0 | 0 | 0 | 0 | 0 | 0 | 1 | 0 | 0 | 0 | 1 | 1 | 0 | 0 | 0 | 1 |
| ROW 4 | 1 | 0 | 0 | 0 | 1 | 0 | 0 | 0 | 0 | 1 | 0 | 0 | 1 | 1 | 0 | 1 | 1 | 0 | 0 | 0 | 1 |
| ROW 5 | 1 | 0 | 0 | 0 | 1 | 0 | 0 | 0 | 0 | 0 | 0 | 2 | 0 | 1 | 0 | 1 | 1 | 0 | 0 | 0 | 1 |
| FREQ. | 4 | 0 | 0 | 0 | 4 | 0 | 0 | 0 | 0 | 1 | 0 | 2 | 1 | 1 | 0 | 4 | 4 | 0 | 0 | 0 | 4 |

FIG. 98B

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(Rl, MR) | T1 | T2 |
|---|---|---|---|---|---|---|---|---|---|---|---|---|---|---|---|---|---|---|---|---|---|---|---|---|---|---|
| M.R. | 1 | 0 | 0 | 1 | 0 | 1 | 0 | 0 | 0 | 0 | 0 | 0 | 0 | 0 | 0 | 0 | 0 | 0 | 0 | 0 | 1 | 0 | 0 | NA | 2.99 | 1.99 |
| ROW 2 | 1 | 0 | 0 | 1 | 0 | 1 | 1 | 0 | 0 | 0 | 0 | 0 | 0 | 0 | 0 | 0 | 0 | 0 | 0 | 0 | 1 | 0 | 1 | 1 | | |
| ROW 3 | 1 | 0 | 0 | 1 | 0 | 1 | 0 | 0 | 0 | 1 | 0 | 0 | 0 | 0 | 0 | 1 | 0 | 0 | 0 | 0 | 1 | 1 | 0 | 1 | | |
| ROW 4 | 1 | 0 | 0 | 1 | 0 | 1 | 0 | 0 | 0 | 0 | 1 | 1 | 0 | 0 | 0 | 1 | 0 | 0 | 0 | 0 | 1 | 0 | 0 | 1 | | |
| ROW 5 | 1 | 0 | 0 | 1 | 0 | 1 | 1 | 1 | 1 | 0 | 0 | 2 | 1 | 0 | 0 | 2 | 1 | 0 | 1 | 0 | 4 | 0 | 3 | 3 | | |
| FREQ. | 4 | 0 | 0 | 4 | 0 | 4 | 2 | 1 | 1 | 1 | 1 | 2 | 1 | 0 | 0 | 2 | 1 | 0 | 1 | 0 | 4 | 0 | 4 | NA | | |

FIG. 99A

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 0 | 1 | 0 | 1 | 0 | 0 | 0 | 1 | 0 | 0 | 0 | 1 | 0 | 0 | 1 | 0 | 0 | 0 | 0 | 1 | 0 |
| ROW 1 | 1 | 1 | 0 | 0 | 0 | 1 | 0 | 0 | 0 | 0 | 0 | 0 | 0 | 0 | 0 | 0 | 0 | 0 | 0 | 0 | 0 |
| ROW 7 | 0 | 1 | 0 | 1 | 0 | 0 | 0 | 1 | 0 | 0 | 0 | 1 | 0 | 0 | 1 | 0 | 0 | 0 | 0 | 1 | 0 |
| ROW 8 | 0 | 0 | 0 | 1 | 0 | 0 | 0 | 1 | 0 | 0 | 0 | 1 | 0 | 0 | 1 | 0 | 0 | 0 | 0 | 1 | 0 |
| FREQ. | 1 | 2 | 0 | 2 | 0 | 1 | 0 | 3 | 0 | 0 | 0 | 2 | 0 | 0 | 2 | 0 | 0 | 0 | 0 | 2 | 0 |

FIG. 99B

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| M.R. | 0 | 1 | 0 | 1 | 0 | 0 | 0 | 0 | 0 | 0 | 0 | 1 | 0 | 0 | 1 | 0 | 0 | 0 | 1 | 0 | 0 | 0 | 1 | NA | 1.49 | 6.47 |
| ROW 1 | 0 | 0 | 0 | 0 | 1 | 0 | 0 | 0 | 0 | 0 | 0 | 0 | 0 | 0 | 0 | 0 | 0 | 0 | 0 | 1 | 0 | 0 | 0 | 13 | | |
| ROW 7 | 0 | 1 | 0 | 1 | 0 | 0 | 0 | 0 | 0 | 0 | 1 | 0 | 1 | 0 | 1 | 0 | 0 | 1 | 0 | 1 | 0 | 0 | 1 | 0 | | |
| ROW 8 | 0 | 0 | 1 | 0 | 0 | 0 | 0 | 0 | 0 | 0 | 0 | 0 | 0 | 1 | 0 | 1 | 0 | 0 | 1 | 0 | 0 | 0 | 1 | 0 | | |
| FREQ. | 0 | 2 | 1 | 2 | 1 | 0 | 0 | 0 | 0 | 0 | 1 | 1 | 1 | 1 | 2 | 1 | 0 | 1 | 2 | 2 | 0 | 0 | 2 | NA | | |

FIG. 100A

| M.R. | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 1 | 0 | 0 | 0 | 1 | 0 | 0 | 0 | 0 | 0 | 0 | 0 | 0 | 0 | 1 | 1 | 0 | 0 | 0 | 1 |
| ROW 3 | 1 | 0 | 1 | 0 | 1 | 0 | 0 | 0 | 1 | 0 | 0 | 0 | 1 | 0 | 1 | 0 | 1 | 0 | 0 | 0 | 1 |
| ROW 5 | 1 | 0 | 0 | 0 | 1 | 0 | 0 | 0 | 0 | 0 | 1 | 0 | 1 | 0 | 1 | 0 | 1 | 0 | 0 | 0 | 1 |
| FREQ. | 2 | 0 | 1 | 0 | 2 | 0 | 0 | 0 | 1 | 0 | 1 | 0 | 2 | 0 | 2 | 0 | 2 | 0 | 0 | 0 | 2 |

FIG. 100B

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| M.R. | 1 | 0 | 0 | 1 | 0 | 1 | 0 | 0 | 0 | 0 | 0 | 0 | 0 | 0 | 1 | 0 | 0 | 0 | 0 | 0 | 1 | 0 | 0 | NA | 1.49 | 0.996 |
| ROW 3 | 0 | 0 | 0 | 0 | 0 | 0 | 0 | 0 | 0 | 1 | 0 | 0 | 0 | 0 | 0 | 0 | 1 | 0 | 0 | 0 | 1 | 0 | 0 | 0 | | |
| ROW 5 | 0 | 0 | 0 | 0 | 0 | 0 | 0 | 1 | 0 | 0 | 1 | 1 | 0 | 0 | 1 | 0 | 1 | 0 | 0 | 1 | 1 | 0 | 2 | 2 | | |
| FREQ. | 1 | 0 | 0 | 1 | 0 | 1 | 0 | 1 | 0 | 1 | 1 | 1 | 0 | 0 | 2 | 0 | 2 | 0 | 0 | 1 | 2 | 0 | 2 | NA | | |

FIG. 101A

| M.R. | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 0 | 1 | 0 | 0 | 0 | 1 | 0 | 0 | 0 | 0 | 0 | 0 | 0 | 0 | 0 | 1 | 0 | 0 | 0 | 0 | 0 |
| ROW 2 | 1 | 0 | 1 | 0 | 1 | 0 | 0 | 0 | 1 | 0 | 0 | 0 | 1 | 0 | 1 | 0 | 1 | 0 | 0 | 0 | 1 |
| ROW 5 | 1 | 0 | 0 | 0 | 0 | 0 | 0 | 0 | 0 | 0 | 1 | 0 | 1 | 0 | 1 | 0 | 1 | 0 | 0 | 1 | 1 |
| ROW 7 | 0 | 1 | 0 | 1 | 0 | 0 | 0 | 1 | 0 | 0 | 0 | 0 | 0 | 1 | 0 | 1 | 0 | 1 | 0 | 0 | 0 |
| ROW 8 | 0 | 0 | 0 | 1 | 0 | 0 | 0 | 1 | 0 | 0 | 1 | 1 | 1 | 0 | 0 | 0 | 0 | 0 | 0 | 1 | 0 |
| FREQ. | 2 | 2 | 1 | 2 | 1 | 1 | 0 | 2 | 1 | 0 | 2 | 1 | 4 | 1 | 2 | 2 | 2 | 1 | 0 | 2 | 2 |

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
|  | 0 | 0 | 0 | 1 | 0 | 0 | 0 | 0 | 0 | 0 | 0 | 1 | 0 | 0 | 1 | 0 | 0 | 0 | 0 | 0 | 0 | 0 | 0 | NA | 2.49 | 5.98 |
| ROW 2 | 1 | 0 | 0 | 1 | 0 | 1 | 1 | 0 | 0 | 0 | 1 | 0 | 0 | 0 | 0 | 0 | 0 | 0 | 0 | 0 | 1 | 0 | 0 | 7 |  |  |
| ROW 5 | 1 | 0 | 0 | 1 | 0 | 1 | 1 | 0 | 0 | 0 | 1 | 1 | 0 | 0 | 1 | 0 | 0 | 0 | 0 | 0 | 1 | 0 | 0 | 7 |  |  |
| ROW 7 | 0 | 1 | 0 | 1 | 0 | 0 | 0 | 0 | 0 | 1 | 0 | 0 | 0 | 1 | 0 | 0 | 0 | 0 | 0 | 0 | 1 | 0 | 1 | 5 |  |  |
| ROW 8 | 0 | 1 | 0 | 1 | 0 | 0 | 0 | 0 | 0 | 1 | 0 | 0 | 0 | 1 | 0 | 0 | 0 | 0 | 0 | 0 | 1 | 0 | 1 | 5 |  |  |
| FREQ. | 2 | 2 | 0 | 4 | 0 | 2 | 2 | 0 | 0 | 2 | 3 | 2 | 0 | 2 | 3 | 0 | 0 | 0 | 0 | 0 | 2 | 0 | 2 | NA |  |  |

FIG. 101B

| M.R. | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
|  | 0 | 0 | 1 | 0 | 0 | 0 | 0 | 1 | 0 | 0 | 0 | 1 | 1 | 0 | 1 | 0 | 0 | 0 | 0 | 1 | 0 |
| ROW 7 | 1 | 1 | 0 | 1 | 0 | 0 | 0 | 0 | 0 | 0 | 0 | 0 | 0 | 0 | 1 | 0 | 0 | 0 | 0 | 1 | 0 |
| ROW 8 | 1 | 1 | 0 | 1 | 0 | 0 | 0 | 0 | 0 | 0 | 0 | 0 | 0 | 0 | 1 | 0 | 0 | 0 | 0 | 1 | 0 |
| FREQ. | 2 | 2 | 0 | 2 | 0 | 0 | 0 | 0 | 0 | 0 | 0 | 0 | 0 | 0 | 2 | 0 | 0 | 0 | 0 | 2 | 0 |

FIG. 102A

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
|  | 0 | 1 | 0 | 1 | 0 | 0 | 0 | 0 | 0 | 0 | 1 | 0 | 0 | 0 | 1 | 0 | 0 | 0 | 1 | 0 | 0 | 0 | 1 | NA | -1 | -1 |
| ROW 7 | 0 | 1 | 0 | 1 | 0 | 0 | 0 | 0 | 0 | 0 | 1 | 0 | 0 | 0 | 1 | 0 | 0 | 0 | 1 | 0 | 0 | 0 | 1 | 0 |  |  |
| ROW 8 | 0 | 1 | 0 | 1 | 0 | 0 | 0 | 0 | 0 | 0 | 1 | 0 | 0 | 0 | 1 | 0 | 0 | 0 | 1 | 0 | 0 | 0 | 1 | 0 |  |  |
| FREQ. | 0 | 2 | 0 | 2 | 0 | 0 | 0 | 0 | 0 | 0 | 2 | 0 | 0 | 0 | 2 | 0 | 0 | 0 | 2 | 0 | 0 | 0 | 2 | NA |  |  |

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 2 | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 3 | 1 | 0 | 0 | 0 | 1 | 0 | 0 | 0 | 1 | 0 | 0 | 1 | 0 | 0 | 0 | 1 | 1 | 0 | 0 | 0 | 1 |
| ROW 4 | 1 | 0 | 0 | 0 | 1 | 0 | 0 | 0 | 0 | 1 | 0 | 0 | 1 | 0 | 0 | 1 | 1 | 0 | 0 | 0 | 1 |
| ROW 5 | 1 | 0 | 0 | 0 | 1 | 0 | 0 | 0 | 0 | 0 | 1 | 1 | 1 | 0 | 0 | 1 | 1 | 0 | 0 | 0 | 1 |
| FREQ. | 4 | 0 | 0 | 0 | 4 | 0 | 0 | 0 | 1 | 1 | 1 | 2 | 2 | 0 | 0 | 4 | 4 | 0 | 0 | 0 | 4 |

FIG. 103B

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| M.R. | 0 | 1 | 0 | 1 | 0 | 1 | 1 | 0 | 0 | 0 | 0 | 0 | 0 | 0 | 0 | 0 | 0 | 0 | 0 | 0 | 1 | 0 | 0 | NA | 2.99 | 1.99 |
| ROW 2 | 0 | 1 | 0 | 1 | 0 | 1 | 1 | 0 | 0 | 0 | 0 | 0 | 0 | 0 | 0 | 0 | 0 | 0 | 0 | 0 | 1 | 0 | 1 | 1 | | |
| ROW 3 | 0 | 1 | 0 | 1 | 0 | 1 | 0 | 0 | 0 | 1 | 0 | 0 | 0 | 0 | 1 | 0 | 0 | 0 | 0 | 0 | 1 | 0 | 1 | 1 | | |
| ROW 4 | 0 | 1 | 0 | 1 | 0 | 1 | 0 | 0 | 1 | 0 | 0 | 0 | 1 | 0 | 0 | 1 | 0 | 0 | 0 | 0 | 1 | 0 | 1 | 1 | | |
| ROW 5 | 0 | 1 | 0 | 1 | 0 | 1 | 1 | 0 | 0 | 0 | 1 | 1 | 0 | 1 | 0 | 0 | 0 | 0 | 0 | 0 | 1 | 0 | 3 | 3 | | |
| FREQ. | 0 | 4 | 0 | 4 | 0 | 4 | 2 | 0 | 1 | 1 | 1 | 1 | 1 | 1 | 1 | 1 | 0 | 0 | 0 | 0 | 4 | 0 | 0 | NA | | |

FIG. 104A

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 2 | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 3 | 1 | 0 | 0 | 0 | 1 | 0 | 0 | 0 | 1 | 0 | 0 | 1 | 0 | 0 | 0 | 1 | 1 | 0 | 0 | 0 | 1 |
| ROW 4 | 1 | 0 | 0 | 0 | 1 | 0 | 0 | 0 | 0 | 1 | 0 | 0 | 1 | 0 | 0 | 1 | 1 | 0 | 0 | 0 | 1 |
| ROW 5 | 1 | 0 | 0 | 0 | 1 | 0 | 0 | 0 | 0 | 0 | 1 | 1 | 1 | 0 | 0 | 1 | 1 | 0 | 0 | 0 | 1 |
| FREQ. | 4 | 0 | 0 | 0 | 4 | 0 | 0 | 0 | 1 | 1 | 1 | 2 | 2 | 0 | 0 | 4 | 4 | 0 | 0 | 0 | 4 |

FIG. 104B

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| M.R. | 1 | 0 | 0 | 1 | 0 | 1 | 0 | 0 | 0 | 0 | 0 | 0 | 0 | 0 | 0 | 0 | 0 | 0 | 0 | 0 | 1 | 0 | 0 | NA | 2.99 | 1.99 |
| ROW 2 | 1 | 0 | 0 | 1 | 0 | 1 | 1 | 0 | 0 | 0 | 0 | 1 | 0 | 0 | 0 | 0 | 0 | 0 | 0 | 0 | 1 | 0 | 0 | 1 | | |
| ROW 3 | 1 | 0 | 0 | 1 | 0 | 1 | 0 | 0 | 0 | 0 | 1 | 0 | 0 | 0 | 1 | 0 | 0 | 0 | 0 | 0 | 1 | 0 | 0 | 1 | | |
| ROW 4 | 1 | 0 | 0 | 1 | 0 | 1 | 0 | 1 | 0 | 1 | 0 | 0 | 0 | 1 | 0 | 1 | 0 | 0 | 0 | 1 | 1 | 0 | 0 | 1 | | |
| ROW 5 | 1 | 0 | 0 | 1 | 0 | 1 | 1 | 0 | 1 | 1 | 1 | 0 | 2 | 0 | 0 | 1 | 0 | 0 | 0 | 1 | 0 | 0 | 0 | 3 | | |
| FREQ. | 4 | 0 | 0 | 4 | 0 | 4 | 2 | 1 | 1 | 2 | 2 | 1 | 2 | 1 | 1 | 2 | 0 | 0 | 0 | 1 | 4 | 0 | 0 | NA | | |

FIG. 105A

| M.R. | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 0 | 1 | 0 | 1 | 0 | 0 | 0 | 1 | 0 | 0 | 0 | 0 | 1 | 0 | 1 | 0 | 0 | 0 | 0 | 1 | 0 |
| ROW 7 | 0 | 1 | 0 | 1 | 0 | 0 | 0 | 1 | 0 | 0 | 0 | 0 | 1 | 0 | 1 | 0 | 0 | 0 | 0 | 1 | 0 |
| ROW 8 | 0 | 1 | 0 | 1 | 0 | 0 | 0 | 1 | 0 | 0 | 0 | 0 | 1 | 0 | 1 | 0 | 0 | 0 | 0 | 1 | 0 |
| FREQ. | 0 | 2 | 0 | 2 | 0 | 0 | 0 | 2 | 0 | 0 | 0 | 0 | 2 | 0 | 2 | 0 | 0 | 0 | 0 | 2 | 0 |

FIG. 105B

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| M.R. | 0 | 1 | 0 | 1 | 0 | 0 | 0 | 1 | 0 | 0 | 0 | 0 | 1 | 0 | 1 | 0 | 0 | 0 | 0 | 1 | 0 | 0 | 1 | NA | -1 | -1 |
| ROW 7 | 0 | 1 | 0 | 1 | 0 | 0 | 0 | 1 | 0 | 0 | 0 | 0 | 1 | 0 | 1 | 0 | 0 | 0 | 0 | 1 | 0 | 0 | 1 | 0 | | |
| ROW 8 | 0 | 1 | 0 | 1 | 0 | 0 | 0 | 1 | 0 | 0 | 0 | 0 | 1 | 0 | 1 | 0 | 0 | 0 | 0 | 1 | 0 | 0 | 1 | 0 | | |
| FREQ. | 0 | 2 | 0 | 2 | 0 | 0 | 0 | 2 | 0 | 0 | 0 | 0 | 2 | 0 | 2 | 0 | 0 | 0 | 0 | 2 | 0 | 0 | 2 | NA | | |

FIG. 106A

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 2 | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 3 | 1 | 0 | 0 | 0 | 1 | 0 | 0 | 0 | 0 | 0 | 0 | 1 | 0 | 0 | 0 | 1 | 1 | 0 | 0 | 0 | 1 |
| ROW 4 | 1 | 0 | 0 | 0 | 1 | 0 | 0 | 0 | 0 | 1 | 0 | 0 | 1 | 0 | 0 | 1 | 1 | 0 | 0 | 0 | 1 |
| ROW 5 | 1 | 0 | 0 | 0 | 0 | 0 | 0 | 0 | 1 | 0 | 1 | 0 | 0 | 0 | 0 | 1 | 1 | 0 | 0 | 0 | 1 |
| FREQ. | 4 | 0 | 0 | 0 | 4 | 0 | 0 | 0 | 1 | 2 | 1 | 2 | 1 | 0 | 0 | 4 | 4 | 0 | 0 | 0 | 4 |

FIG. 106B

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| M.R. | 1 | 0 | 0 | 1 | 0 | 1 | 1 | 0 | 0 | 0 | 0 | 0 | 0 | 0 | 0 | 0 | 0 | 0 | 0 | 0 | 1 | 0 | 0 | NA | 2.99 | 1.99 |
| ROW 2 | 1 | 0 | 0 | 1 | 0 | 1 | 1 | 0 | 0 | 0 | 0 | 0 | 0 | 0 | 0 | 0 | 0 | 0 | 0 | 0 | 1 | 0 | 1 | 1 | | |
| ROW 3 | 1 | 0 | 0 | 1 | 0 | 1 | 0 | 0 | 1 | 1 | 0 | 0 | 0 | 0 | 1 | 0 | 1 | 0 | 0 | 0 | 1 | 0 | 1 | 1 | | |
| ROW 4 | 1 | 0 | 0 | 0 | 0 | 0 | 1 | 1 | 0 | 0 | 0 | 0 | 0 | 0 | 0 | 1 | 0 | 0 | 0 | 0 | 1 | 0 | 0 | 1 | | |
| ROW 5 | 1 | 0 | 0 | 0 | 1 | 1 | 0 | 0 | 1 | 0 | 1 | 0 | 0 | 0 | 0 | 0 | 0 | 0 | 0 | 0 | 1 | 0 | 0 | 3 | | |
| FREQ. | 4 | 0 | 0 | 2 | 1 | 3 | 2 | 1 | 1 | 1 | 1 | 0 | 0 | 0 | 1 | 1 | 1 | 0 | 0 | 0 | 4 | 0 | 2 | NA | | |

FIG. 107A

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 2 | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 3 | 1 | 0 | 0 | 0 | 1 | 0 | 0 | 0 | 0 | 0 | 0 | 1 | 0 | 0 | 0 | 1 | 1 | 0 | 0 | 0 | 1 |
| ROW 4 | 1 | 0 | 0 | 0 | 1 | 0 | 0 | 0 | 0 | 1 | 0 | 0 | 1 | 0 | 0 | 1 | 1 | 0 | 0 | 0 | 1 |
| ROW 5 | 1 | 0 | 0 | 0 | 0 | 0 | 0 | 0 | 1 | 0 | 1 | 0 | 0 | 0 | 0 | 1 | 1 | 0 | 0 | 0 | 1 |
| ROW 6 | 1 | 0 | 1 | 0 | 0 | 0 | 1 | 0 | 0 | 1 | 0 | 0 | 0 | 1 | 0 | 0 | 0 | 1 | 1 | 0 | 0 |
| FREQ. | 5 | 0 | 1 | 0 | 4 | 0 | 1 | 0 | 1 | 2 | 1 | 1 | 1 | 1 | 0 | 4 | 4 | 1 | 1 | 0 | 4 |

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| ROW 2 | 1 | 0 | 0 | 1 | 0 | 1 | 1 | 0 | 0 | 0 | 0 | 0 | 0 | 0 | 0 | 0 | 0 | 0 | 0 | 0 | 1 | 0 | 0 | NA | 2.99 | 7.95 |
| ROW 3 | 1 | 0 | 0 | 1 | 0 | 1 | 1 | 0 | 0 | 0 | 1 | 0 | 0 | 0 | 0 | 0 | 0 | 0 | 0 | 0 | 1 | 0 | 0 | 1 | | |
| ROW 4 | 1 | 0 | 0 | 1 | 0 | 1 | 1 | 0 | 1 | 0 | 0 | 0 | 0 | 1 | 0 | 0 | 0 | 0 | 0 | 0 | 1 | 0 | 0 | 1 | | |
| ROW 5 | 1 | 0 | 0 | 1 | 0 | 1 | 1 | 0 | 0 | 0 | 1 | 0 | 1 | 0 | 0 | 0 | 0 | 0 | 0 | 0 | 1 | 0 | 0 | 3 | | |
| ROW 6 | 1 | 0 | 1 | 0 | 0 | 0 | 0 | 0 | 0 | 0 | 0 | 0 | 0 | 0 | 1 | 1 | 0 | 0 | 0 | 0 | 0 | 1 | 0 | 13 | | |
| FREQ. | 5 | 0 | 1 | 4 | 1 | 4 | 4 | 0 | 1 | 1 | 1 | 1 | 2 | 0 | 1 | 1 | 0 | 0 | 0 | 0 | 4 | 1 | 0 | NA | | |

FIG. 107B

| M.R. | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| ROW 7 | 0 | 1 | 0 | 1 | 0 | 0 | 0 | 0 | 1 | 0 | 0 | 0 | 1 | 0 | 1 | 0 | 0 | 0 | 0 | 0 | 1 | 0 |
| ROW 8 | 0 | 1 | 0 | 1 | 0 | 0 | 0 | 0 | 1 | 0 | 0 | 0 | 1 | 0 | 1 | 0 | 0 | 0 | 0 | 0 | 1 | 0 |
| FREQ. | 0 | 2 | 0 | 2 | 0 | 0 | 0 | 0 | 2 | 0 | 0 | 0 | 2 | 0 | 2 | 0 | 0 | 0 | 0 | 0 | 2 | 0 |

FIG. 108A

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| ROW 7 | 0 | 1 | 0 | 1 | 0 | 0 | 0 | 0 | 0 | 0 | 0 | 0 | 0 | 0 | 1 | 0 | 0 | 0 | 1 | 0 | 0 | 0 | 1 | NA | -1 | -1 |
| ROW 8 | 0 | 1 | 0 | 1 | 0 | 0 | 0 | 0 | 0 | 0 | 0 | 0 | 0 | 0 | 1 | 0 | 0 | 0 | 1 | 0 | 0 | 0 | 1 | 0 | | |
| FREQ. | 0 | 2 | 0 | 2 | 0 | 0 | 0 | 0 | 0 | 0 | 0 | 0 | 0 | 0 | 2 | 0 | 0 | 0 | 2 | 0 | 0 | 0 | 2 | NA | | |

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 2 | 1 | 0 | 0 | 0 | 1 | 0 | 0 | 0 | 0 | 0 | 0 | 1 | 0 | 0 | 0 | 1 | 1 | 0 | 0 | 0 | 1 |
| ROW 3 | 1 | 0 | 0 | 0 | 1 | 0 | 0 | 0 | 0 | 1 | 0 | 1 | 0 | 0 | 0 | 1 | 1 | 0 | 0 | 0 | 1 |
| ROW 4 | 1 | 0 | 0 | 0 | 1 | 0 | 0 | 0 | 1 | 0 | 0 | 0 | 0 | 0 | 0 | 1 | 1 | 0 | 0 | 0 | 1 |
| ROW 5 | 1 | 0 | 0 | 0 | 1 | 0 | 0 | 0 | 0 | 1 | 0 | 0 | 1 | 0 | 0 | 1 | 1 | 0 | 0 | 0 | 1 |
| ROW 7 | 0 | 1 | 0 | 1 | 0 | 0 | 0 | 1 | 1 | 0 | 0 | 1 | 0 | 1 | 1 | 0 | 0 | 0 | 0 | 1 | 0 |
| ROW 8 | 0 | 1 | 0 | 1 | 0 | 0 | 0 | 1 | 0 | 0 | 0 | 1 | 0 | 1 | 1 | 0 | 0 | 0 | 0 | 1 | 0 |
| FREQ. | 4 | 2 | 0 | 2 | 4 | 0 | 0 | 2 | 2 | 2 | 0 | 4 | 1 | 2 | 2 | 4 | 4 | 0 | 0 | 2 | 4 |

FIG. 109B

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| M.R. | 0 | 0 | 1 | 0 | 0 | 1 | 0 | 0 | 0 | 0 | 0 | 0 | 0 | 0 | 0 | 0 | 0 | 0 | 0 | 0 | 1 | 0 | 0 | NA | 3.48 | 7.95 |
| ROW 2 | 1 | 0 | 1 | 0 | 1 | 1 | 1 | 0 | 0 | 0 | 0 | 0 | 0 | 0 | 0 | 0 | 0 | 0 | 0 | 0 | 1 | 0 | 0 | 1 | | |
| ROW 3 | 1 | 0 | 1 | 0 | 1 | 0 | 0 | 0 | 0 | 0 | 1 | 0 | 0 | 0 | 1 | 0 | 0 | 0 | 0 | 0 | 1 | 0 | 0 | 2 | | |
| ROW 4 | 0 | 0 | 1 | 0 | 1 | 1 | 0 | 1 | 0 | 0 | 0 | 0 | 0 | 0 | 0 | 0 | 0 | 0 | 0 | 0 | 1 | 0 | 0 | 3 | | |
| ROW 5 | 1 | 0 | 1 | 0 | 0 | 1 | 0 | 0 | 1 | 0 | 1 | 0 | 0 | 0 | 0 | 0 | 0 | 0 | 0 | 1 | 0 | 0 | 0 | 2 | | |
| ROW 7 | 0 | 1 | 0 | 1 | 0 | 0 | 0 | 0 | 0 | 0 | 1 | 1 | 1 | 1 | 0 | 0 | 1 | 0 | 1 | 0 | 0 | 0 | 1 | 13 | | |
| ROW 8 | 1 | 1 | 0 | 1 | 0 | 0 | 0 | 0 | 0 | 1 | 1 | 0 | 0 | 0 | 0 | 0 | 0 | 1 | 1 | 0 | 0 | 0 | 1 | 13 | | |
| FREQ. | 4 | 2 | 6 | 2 | 2 | 4 | 2 | 2 | 0 | 1 | 3 | 2 | 2 | 0 | 2 | 0 | 1 | 2 | 4 | 0 | 4 | 0 | 2 | NA | | |

FIG. 110A

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 2 | 1 | 0 | 0 | 0 | 1 | 0 | 0 | 0 | 0 | 0 | 0 | 1 | 0 | 0 | 0 | 1 | 1 | 0 | 0 | 0 | 1 |
| ROW 3 | 1 | 0 | 0 | 0 | 1 | 0 | 0 | 0 | 0 | 1 | 0 | 1 | 0 | 0 | 0 | 1 | 1 | 0 | 0 | 0 | 1 |
| ROW 4 | 1 | 0 | 0 | 0 | 1 | 0 | 0 | 0 | 1 | 0 | 0 | 0 | 0 | 0 | 0 | 1 | 1 | 0 | 0 | 0 | 1 |
| ROW 5 | 1 | 0 | 0 | 0 | 1 | 0 | 0 | 0 | 0 | 1 | 0 | 0 | 1 | 0 | 0 | 1 | 1 | 0 | 0 | 0 | 1 |
| FREQ. | 4 | 0 | 0 | 0 | 4 | 0 | 0 | 0 | 1 | 2 | 0 | 2 | 1 | 0 | 0 | 4 | 4 | 0 | 0 | 0 | 4 |

|  | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| M.R. | 1 | 0 | 0 | 1 | 0 | 1 | 1 | 0 | 0 | 0 | 0 | 0 | 0 | 0 | 0 | 0 | 0 | 0 | 0 | 0 | 1 | 0 | 0 | NA | 2.99 | 1.99 |
| ROW 2 | 1 | 0 | 0 | 0 | 0 | 1 | 1 | 0 | 0 | 0 | 0 | 1 | 0 | 0 | 1 | 0 | 0 | 0 | 0 | 0 | 1 | 1 | 0 | 1 |  |  |
| ROW 3 | 1 | 0 | 0 | 1 | 0 | 1 | 0 | 0 | 1 | 0 | 0 | 0 | 0 | 1 | 0 | 0 | 0 | 0 | 0 | 0 | 1 | 0 | 0 | 1 |  |  |
| ROW 4 | 1 | 0 | 0 | 1 | 0 | 0 | 1 | 0 | 0 | 1 | 0 | 0 | 0 | 0 | 0 | 1 | 0 | 0 | 0 | 0 | 1 | 0 | 0 | 1 |  |  |
| ROW 5 | 1 | 0 | 0 | 0 | 1 | 1 | 1 | 0 | 0 | 0 | 1 | 1 | 0 | 0 | 1 | 0 | 0 | 0 | 0 | 1 | 2 | 0 | 3 | 3 |  |  |
| FREQ. | 4 | 0 | 0 | 2 | 1 | 3 | 3 | 0 | 1 | 1 | 1 | 2 | 0 | 1 | 2 | 1 | 0 | 0 | 0 | 0 | 4 | 1 | 0 | NA |  |  |

FIG. 110B

|  | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 0 | 0 | 0 | 1 | 0 | 0 | 0 | 0 | 0 | 0 | 1 | 0 | 0 | 0 | 1 | 1 | 0 | 0 | 0 | 1 |
| ROW 2 | 1 | 0 | 0 | 0 | 1 | 0 | 1 | 0 | 0 | 0 | 0 | 0 | 0 | 0 | 1 | 1 | 1 | 0 | 0 | 0 | 1 |
| ROW 5 | 1 | 0 | 0 | 0 | 1 | 0 | 0 | 0 | 0 | 0 | 1 | 1 | 1 | 0 | 0 | 1 | 2 | 0 | 0 | 0 | 2 |
| FREQ. | 2 | 0 | 0 | 0 | 2 | 0 | 1 | 0 | 0 | 0 | 1 | 2 | 1 | 0 | 1 | 2 | 2 | 0 | 0 | 0 | 2 |

FIG. 111A

|  | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| M.R. | 1 | 0 | 0 | 0 | 0 | 1 | 1 | 0 | 0 | 0 | 0 | 1 | 0 | 0 | 0 | 0 | 0 | 0 | 0 | 0 | 1 | 0 | 0 | NA | 1.49 | 0.996 |
| ROW 2 | 1 | 0 | 0 | 1 | 0 | 1 | 1 | 0 | 0 | 0 | 0 | 0 | 0 | 1 | 0 | 1 | 0 | 0 | 0 | 0 | 1 | 0 | 0 | 0 |  |  |
| ROW 5 | 1 | 0 | 0 | 0 | 0 | 1 | 1 | 0 | 0 | 0 | 0 | 1 | 0 | 0 | 1 | 0 | 0 | 0 | 0 | 0 | 2 | 0 | 0 | 2 |  |  |
| FREQ. | 2 | 0 | 0 | 1 | 0 | 2 | 2 | 0 | 0 | 0 | 0 | 1 | 0 | 1 | 1 | 1 | 0 | 0 | 0 | 0 | 2 | 0 | 0 | NA |  |  |

FIG. 111B

|  | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 0 | 1 | 0 | 1 | 0 | 0 | 0 | 0 | 1 | 0 | 0 | 1 | 1 | 0 | 1 | 0 | 0 | 0 | 0 | 1 | 0 |
| ROW 5 | 1 | 0 | 0 | 0 | 0 | 0 | 0 | 0 | 0 | 0 | 0 | 1 | 0 | 0 | 0 | 1 | 1 | 0 | 0 | 0 | 1 |
| ROW 7 | 0 | 1 | 0 | 1 | 1 | 0 | 1 | 0 | 0 | 0 | 0 | 0 | 0 | 0 | 1 | 0 | 0 | 0 | 0 | 1 | 0 |
| ROW 8 | 0 | 0 | 1 | 0 | 0 | 0 | 1 | 0 | 0 | 1 | 0 | 0 | 0 | 0 | 1 | 0 | 1 | 0 | 0 | 1 | 0 |
| FREQ. | 1 | 2 | 1 | 2 | 1 | 0 | 2 | 0 | 1 | 1 | 0 | 2 | 1 | 0 | 3 | 1 | 2 | 0 | 0 | 2 | 1 |

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(Rl, MR) | T1 | T2 |
|---|---|---|---|---|---|---|---|---|---|---|---|---|---|---|---|---|---|---|---|---|---|---|---|---|---|---|
| M.R. | 0 | 1 | 0 | 1 | 0 | 0 | 0 | 0 | 0 | 0 | 1 | 0 | 0 | 0 | 1 | 0 | 0 | 0 | 1 | 0 | 0 | 0 | 1 | NA | 1.49 | 7.47 |
| ROW 5 | 1 | 0 | 0 | 1 | 0 | 1 | 1 | 0 | 0 | 0 | 1 | 1 | 0 | 0 | 1 | 0 | 0 | 0 | 0 | 0 | 1 | 0 | 0 | 15 | | |
| ROW 7 | 0 | 1 | 0 | 1 | 0 | 0 | 0 | 0 | 0 | 0 | 1 | 0 | 0 | 0 | 1 | 0 | 0 | 1 | 0 | 0 | 0 | 1 | 0 | 0 | | |
| ROW 8 | 0 | 1 | 0 | 0 | 1 | 0 | 0 | 0 | 0 | 0 | 0 | 0 | 0 | 0 | 0 | 0 | 0 | 0 | 0 | 1 | 0 | 1 | 0 | NA | | |
| FREQ. | 1 | 2 | 0 | 3 | 0 | 1 | 1 | 0 | 0 | 0 | 3 | 1 | 0 | 0 | 3 | 0 | 0 | 1 | 1 | 1 | 1 | 2 | 1 | NA | | |

FIG. 113A

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 0 | 0 | 0 | 1 | 0 | 0 | 0 | 0 | 0 | 0 | 0 | 1 | 0 | 0 | 1 | 1 | 0 | 0 | 0 | 1 |
| ROW 2 | 1 | 1 | 0 | 0 | 0 | 1 | 0 | 0 | 0 | 0 | 0 | 0 | 0 | 0 | 0 | 0 | 1 | 0 | 0 | 0 | 1 |
| ROW 5 | 1 | 0 | 0 | 0 | 1 | 0 | 0 | 0 | 0 | 0 | 0 | 0 | 1 | 0 | 0 | 1 | 1 | 0 | 0 | 0 | 1 |
| FREQ. | 2 | 0 | 0 | 2 | 0 | 1 | 0 | 0 | 0 | 0 | 0 | 0 | 2 | 1 | 0 | 2 | 2 | 0 | 0 | 0 | 2 |

FIG. 113B

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(Rl, MR) | T1 | T2 |
|---|---|---|---|---|---|---|---|---|---|---|---|---|---|---|---|---|---|---|---|---|---|---|---|---|---|---|
| M.R. | 1 | 0 | 0 | 1 | 0 | 0 | 1 | 0 | 0 | 0 | 0 | 1 | 0 | 0 | 0 | 0 | 0 | 0 | 0 | 0 | 1 | 0 | 0 | NA | 1.49 | 0.996 |
| ROW 2 | 1 | 0 | 0 | 0 | 0 | 0 | 1 | 0 | 0 | 0 | 0 | 1 | 0 | 0 | 0 | 0 | 0 | 0 | 0 | 0 | 1 | 0 | 0 | 0 | | |
| ROW 5 | 1 | 0 | 0 | 1 | 0 | 0 | 1 | 0 | 0 | 0 | 0 | 1 | 0 | 0 | 1 | 0 | 0 | 0 | 0 | 0 | 1 | 0 | 0 | 2 | | |
| FREQ. | 2 | 0 | 0 | 2 | 0 | 0 | 2 | 0 | 0 | 0 | 0 | 2 | 0 | 0 | 1 | 0 | 0 | 0 | 0 | 0 | 2 | 0 | 0 | NA | | |

FIG. 114A

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 0 | 0 | 0 | 0 | 0 | 0 | 0 | 0 | 0 | 0 | 0 | 1 | 0 | 0 | 0 | 0 | 0 | 0 | 0 | 0 | 0 |
| ROW 3 | 1 | 0 | 0 | 0 | 0 | 0 | 0 | 0 | 0 | 0 | 0 | 0 | 0 | 0 | 0 | 1 | 1 | 0 | 0 | 0 | 1 |
| ROW 5 | 1 | 0 | 0 | 0 | 0 | 0 | 0 | 0 | 0 | 0 | 0 | 1 | 0 | 0 | 0 | 0 | 1 | 0 | 0 | 0 | 0 |
| ROW 7 | 0 | 1 | 0 | 1 | 0 | 0 | 0 | 0 | 0 | 0 | 0 | 0 | 1 | 0 | 1 | 0 | 0 | 0 | 1 | 1 | 1 |
| ROW 8 | 0 | 1 | 0 | 0 | 0 | 1 | 0 | 0 | 0 | 1 | 0 | 0 | 0 | 0 | 0 | 0 | 0 | 0 | 0 | 0 | 0 |
| FREQ. | 2 | 2 | 0 | 2 | 0 | 2 | 0 | 0 | 0 | 1 | 0 | 3 | 1 | 0 | 2 | 2 | 2 | 0 | 2 | 2 | 2 |

FIG. 114B

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| M.R. | 0 | 0 | 0 | 1 | 0 | 0 | 0 | 0 | 0 | 0 | 1 | 0 | 0 | 0 | 1 | 0 | 0 | 0 | 0 | 0 | 0 | 0 | 0 | NA | 2.49 | 5.98 |
| ROW 3 | 1 | 0 | 0 | 1 | 0 | 1 | 0 | 0 | 0 | 1 | 0 | 0 | 1 | 0 | 1 | 0 | 0 | 0 | 0 | 0 | 1 | 0 | 0 | 8 | | |
| ROW 5 | 1 | 0 | 0 | 1 | 1 | 1 | 0 | 0 | 0 | 0 | 1 | 1 | 0 | 0 | 1 | 0 | 0 | 0 | 0 | 1 | 0 | 0 | 0 | 7 | | |
| ROW 7 | 0 | 1 | 0 | 1 | 0 | 0 | 1 | 0 | 0 | 0 | 1 | 0 | 0 | 1 | 0 | 0 | 0 | 0 | 0 | 0 | 0 | 1 | 0 | 5 | | |
| ROW 8 | 0 | 1 | 0 | 1 | 1 | 0 | 0 | 0 | 0 | 0 | 0 | 0 | 0 | 0 | 0 | 0 | 0 | 0 | 1 | 0 | 0 | 0 | 1 | 5 | | |
| FREQ. | 2 | 2 | 0 | 4 | 2 | 2 | 1 | 0 | 0 | 1 | 3 | 1 | 1 | 1 | 3 | 0 | 0 | 0 | 1 | 1 | 1 | 1 | 1 | 2 | NA | |

FIG. 115A

| M.R. | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 0 | 1 | 0 | 1 | 0 | 0 | 0 | 1 | 0 | 0 | 0 | 1 | 0 | 0 | 1 | 1 | 0 | 0 | 0 | 1 | 0 |
| ROW 7 | 0 | 0 | 0 | 0 | 0 | 0 | 0 | 0 | 0 | 0 | 0 | 0 | 0 | 0 | 1 | 0 | 0 | 0 | 0 | 1 | 0 |
| ROW 8 | 0 | 0 | 0 | 0 | 0 | 0 | 0 | 0 | 0 | 0 | 0 | 1 | 0 | 0 | 0 | 0 | 0 | 0 | 1 | 0 | 0 |
| FREQ. | 0 | 2 | 0 | 2 | 0 | 0 | 0 | 2 | 0 | 0 | 0 | 2 | 0 | 0 | 2 | 2 | 0 | 0 | 2 | 2 | 0 |

FIG. 115B

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| M.R. | 0 | 0 | 0 | 0 | 0 | 0 | 0 | 0 | 0 | 0 | 1 | 0 | 0 | 0 | 1 | 0 | 0 | 0 | 0 | 1 | 0 | 0 | 1 | NA | -1 | -1 |
| ROW 7 | 0 | 0 | 0 | 0 | 0 | 0 | 0 | 0 | 0 | 0 | 0 | 0 | 0 | 0 | 1 | 0 | 0 | 0 | 0 | 1 | 0 | 0 | 1 | 0 | | |
| ROW 8 | 0 | 0 | 0 | 0 | 0 | 0 | 0 | 0 | 0 | 0 | 0 | 0 | 0 | 0 | 1 | 0 | 0 | 0 | 0 | 1 | 0 | 0 | 1 | 0 | | |
| FREQ. | 0 | 0 | 0 | 0 | 0 | 0 | 0 | 0 | 0 | 0 | 2 | 0 | 0 | 0 | 2 | 0 | 0 | 0 | 0 | 2 | 0 | 0 | 2 | NA | | |

FIG. 116A

| M.R. | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 0 | 1 | 0 | 1 | 0 | 0 | 0 | 0 | 0 | 0 | 0 | 0 | 0 | 0 | 1 | 1 | 0 | 0 | 0 | 1 |
| ROW 2 | 1 | 0 | 0 | 0 | 1 | 0 | 0 | 0 | 0 | 0 | 0 | 1 | 0 | 0 | 0 | 1 | 1 | 0 | 0 | 0 | 1 |
| ROW 3 | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 4 | 0 | 0 | 0 | 0 | 1 | 0 | 0 | 0 | 1 | 0 | 0 | 1 | 0 | 0 | 0 | 1 | 1 | 0 | 0 | 0 | 1 |
| ROW 5 | 1 | 0 | 1 | 0 | 0 | 0 | 0 | 0 | 0 | 0 | 0 | 0 | 1 | 0 | 0 | 1 | 1 | 0 | 0 | 0 | 1 |
| FREQ. | 4 | 0 | 2 | 0 | 4 | 0 | 0 | 0 | 1 | 0 | 0 | 2 | 1 | 0 | 0 | 4 | 4 | 0 | 0 | 0 | 4 |

FIG. 116B

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| ROW 2 | 1 | 0 | 0 | 1 | 0 | 1 | 0 | 0 | 0 | 0 | 0 | 0 | 0 | 0 | 0 | 0 | 0 | 0 | 0 | 0 | 1 | 0 | 0 | NA | 2.99 | 1.99 |
| ROW 3 | 1 | 0 | 0 | 0 | 0 | 1 | 1 | 0 | 0 | 0 | 1 | 0 | 1 | 0 | 0 | 1 | 0 | 0 | 0 | 0 | 1 | 0 | 0 | 1 | | |
| ROW 4 | 1 | 0 | 0 | 0 | 0 | 1 | 0 | 1 | 0 | 0 | 0 | 0 | 0 | 0 | 0 | 0 | 0 | 0 | 0 | 0 | 1 | 0 | 0 | 1 | | |
| ROW 5 | 1 | 0 | 0 | 0 | 0 | 1 | 1 | 0 | 0 | 0 | 0 | 1 | 0 | 1 | 0 | 0 | 0 | 0 | 0 | 0 | 1 | 0 | 3 | 1 | | |
| FREQ. | 4 | 0 | 0 | 0 | 0 | 4 | 2 | 1 | 0 | 0 | 1 | 1 | 2 | 1 | 0 | 1 | 0 | 0 | 0 | 0 | 4 | 0 | 3 | NA | | |

FIG. 117A

| M.R. | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| ROW 7 | 0 | 0 | 1 | 0 | 0 | 0 | 1 | 1 | 0 | 0 | 0 | 1 | 1 | 1 | 1 | 0 | 0 | 0 | 0 | 1 | 0 |
| ROW 8 | 0 | 0 | 1 | 0 | 0 | 0 | 1 | 1 | 0 | 0 | 0 | 1 | 1 | 1 | 1 | 0 | 0 | 0 | 0 | 1 | 0 |
| FREQ. | 0 | 0 | 2 | 0 | 0 | 0 | 2 | 2 | 0 | 0 | 0 | 2 | 2 | 2 | 2 | 0 | 0 | 0 | 0 | 2 | 0 |

FIG. 117B

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ | CD(RI, MR) | T1 | T2 |
|---|---|---|---|---|---|---|---|---|---|---|---|---|---|---|---|---|---|---|---|---|---|---|---|---|---|---|
| ROW 7 | 0 | 0 | 1 | 0 | 0 | 0 | 0 | 0 | 0 | 0 | 0 | 0 | 0 | 0 | 1 | 0 | 0 | 0 | 1 | 0 | 0 | 0 | 1 | NA | -1 | -1 |
| ROW 8 | 0 | 0 | 1 | 0 | 0 | 0 | 0 | 0 | 0 | 0 | 0 | 0 | 0 | 0 | 1 | 0 | 0 | 0 | 1 | 0 | 0 | 0 | 1 | 0 | | |
| FREQ. | 0 | 0 | 2 | 0 | 0 | 0 | 0 | 0 | 0 | 0 | 0 | 0 | 0 | 0 | 2 | 0 | 0 | 0 | 2 | 0 | 0 | 0 | 2 | NA | | |

| COLUMN | FREQUENCY | AVERAGE DISTANCE | SIGMA | MASTER ROW LENGTH | CONFIDENCE FACTOR |
|---|---|---|---|---|---|
| Aα | 4 | 1.5 | 1 | 9 | 230.4 |
| Bα | 2 | 0 | 1 | 12 | 96 |
| Dα | 2 | 0 | 1 | 12 | 96 |
| Eα | 3 | 1 | 1 | 9 | 121.5 |
| Hα | 2 | 0 | 1 | 12 | 96 |
| Jα | 1 | 0 | 1 | 11 | 11 |
| Lα | 2 | 5 | 1 | 4 | 5.33333 |
| Oα | 2 | 0 | 1 | 12 | 96 |
| Pα | 3 | 1 | 1 | 9 | 121.5 |
| Qα | 3 | 1 | 1 | 9 | 121.5 |
| Tα | 2 | 0 | 1 | 12 | 96 |
| Uα | 3 | 1 | 1 | 9 | 121.5 |
| Aβ | 4 | 1.5 | 1 | 9 | 230.4 |
| Bβ | 2 | 0 | 1 | 12 | 96 |
| Dβ | 4 | 2 | 0.666667 | 11 | 301.714 |
| Fβ | 3 | 1 | 1 | 9 | 121.5 |
| G | 1 | 0 | 1 | 12 | 12 |
| Kβ | 2 | 0 | 1 | 12 | 96 |
| Lβ | 1 | 0 | 1 | 12 | 12 |
| Oβ | 2 | 5 | 1 | 4 | 5.33333 |
| Sβ | 2 | 0 | 1 | 12 | 96 |
| Uβ | 3 | 1 | 1 | 9 | 121.5 |
| Wβ | 2 | 0 | 1 | 12 | 96 |

FIG. 118

| ROW | CF | CF | CF | CF | CF | CF | CF | CF | CF | BEST CF |
|---|---|---|---|---|---|---|---|---|---|---|
| 1 | Fα=0 | Mβ=0 | Qβ=0 | Tβ=0 | | | | | | 0 |
| 2 | Aα=230.4 | Eα=121.5 | Pα=121.5 | Qα=121.5 | Uα=121.5 | Aβ=230.4 | Dβ=301.7 | Fβ=121.5 | Uβ=121.5 | 301.7 |
| 3 | Aα=230.4 | Eα=121.5 | Jα=0 | Pα=121.5 | Qα=121.5 | Uα=121.5 | Aβ=230.4 | Dβ=301.7 | Uβ=121.5 | 301.7 |
| 4 | Aα=230.4 | Eα=121.5 | Iα=0 | Pα=121.5 | Qα=121.5 | | Aβ=230.4 | Dβ=301.7 | Fβ=121.5 | 301.7 |
| 5 | Aα=230.4 | Mα=0 | Aβ=230.4 | Dβ=301.7 | | | | | | 301.7 |
| 6 | Cα=Gα=Kα=Nα=Rα=Sα=Cβ=Eβ=Iβ=Nβ=Rβ=Vβ=0 | | | | | | | | | 0 |
| 7 | Bα=96 | Dα=96 | Hα=96 | Lα=5.3 | Oα=96 | Tα=96 | Bβ=96 | Kβ=96 | Oβ=5.3 | Sβ=96 | Wβ=96 96 |
| 8 | Bα=96 | Dα=96 | Hα=96 | Lα=5.3 | Oα=96 | Tα=96 | Bβ=96 | Kβ=96 | Oβ=5.3 | Sβ=96 | Wβ=96 96 |

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 0 | 0 | 0 | 0 | 0 | 0 | 0 | 0 | 0 | 0 | 0 | 0 | 0 | 0 | 1 | 1 | 0 | 0 | 0 | 1 |
| ROW 1 | 1 | 0 | 0 | 0 | 0 | 0 | 0 | 0 | 0 | 0 | 0 | 0 | 0 | 0 | 0 | 0 | 1 | 0 | 0 | 0 | 0 |
| ROW 2 | 1 | 0 | 0 | 0 | 0 | 1 | 0 | 1 | 0 | 0 | 0 | 0 | 0 | 0 | 0 | 1 | 0 | 0 | 0 | 0 | 1 |
| ROW 3 | 1 | 0 | 0 | 0 | 1 | 0 | 0 | 0 | 0 | 1 | 0 | 0 | 0 | 0 | 0 | 0 | 1 | 0 | 0 | 0 | 1 |
| ROW 4 | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 5 | 1 | 0 | 0 | 1 | 0 | 0 | 0 | 0 | 1 | 0 | 0 | 1 | 1 | 1 | 0 | 1 | 1 | 1 | 1 | 0 | 1 |
| ROW 6 | 1 | 0 | 0 | 0 | 0 | 0 | 0 | 0 | 0 | 0 | 1 | 0 | 0 | 0 | 0 | 0 | 0 | 0 | 1 | 1 | 0 |
| FREQ. | 6 | 0 | 0 | 1 | 4 | 1 | 0 | 1 | 1 | 2 | 1 | 2 | 1 | 1 | 0 | 4 | 4 | 1 | 1 | 0 | 4 |

FIG. 120B

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| M.R. | 1 | 0 | 0 | 1 | 0 | 1 | 0 | 0 | 0 | 0 | 0 | 0 | 0 | 0 | 0 | 0 | 0 | 0 | 0 | 0 | 1 | 0 | 0 |
| ROW 1 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| ROW 2 | 1 | 0 | 0 | 0 | 0 | 1 | 1 | 0 | 0 | 0 | 0 | 0 | 0 | 0 | 0 | 0 | 0 | 0 | 0 | 0 | 1 | 0 | 0 |
| ROW 3 | 1 | 0 | 0 | 0 | 1 | 0 | 0 | 0 | 1 | 0 | 0 | 0 | 0 | 0 | 0 | 0 | 0 | 0 | 0 | 0 | 1 | 0 | 0 |
| ROW 4 | 1 | 0 | 0 | 0 | 1 | 0 | 0 | 1 | 0 | 1 | 0 | 0 | 0 | 0 | 1 | 0 | 0 | 0 | 0 | 0 | 1 | 0 | 0 |
| ROW 5 | 1 | 0 | 0 | 1 | 0 | 0 | 0 | 0 | 0 | 0 | 1 | 1 | 1 | 0 | 0 | 0 | 0 | 0 | 0 | 0 | 1 | 0 | 0 |
| ROW 6 | 1 | 0 | 1 | 0 | 0 | 1 | 0 | 0 | 0 | 0 | 0 | 0 | 0 | 1 | 0 | 0 | 1 | 1 | 1 | 1 | 0 | 1 | 0 |
| FREQ. | 5 | 0 | 1 | 1 | 2 | 2 | 1 | 1 | 1 | 1 | 1 | 1 | 1 | 1 | 1 | 1 | 1 | 1 | 1 | 1 | 4 | 1 | 0 |

FIG. 121

| POINT | ROW | ROW DISTANCE | NUMBER OF ROW MATCHES | ROW LENGTH |
|---|---|---|---|---|
| POINT 1 | 1 | 10 | 1 | 369 |
| POINT 2 | 2 | 1 | 9 | 918 |
| POINT 3 | 3 | 1 | 9 | 918 |
| POINT 4 | 4 | 1 | 9 | 918 |
| POINT 5 | 5 | 3 | 9 | 918 |
| POINT 6 | 6 | 13 | 2 | 918 |

| POINT | ROW | NORMALIZED ROW DISTANCE | NORMALIZED NO. OF ROW MATCHES | NORMALIZED ROW LENGTH |
|---|---|---|---|---|
| POINT 1 | 1 | 0.345 | 0.0256 | 0.0744 |
| POINT 2 | 2 | 0.0345 | 0.231 | 0.185 |
| POINT 3 | 3 | 0.0345 | 0.231 | 0.185 |
| POINT 4 | 4 | 0.0345 | 0.231 | 0.185 |
| POINT 5 | 5 | 0.103 | 0.231 | 0.185 |
| POINT 6 | 6 | 0.448 | 0.0513 | 0.185 |
| CENTER 1 | N/A | 0.0514 | 0.231 | 0.185 |
| CENTER 2 | N/A | 0.397 | 0.0386 | 0.13 |

FIG. 124

|  | DISTANCE TO CLUSTER 1 CENTER | DISTANCE TO CLUSTER 2 CENTER |
|---|---|---|
| POINT 1 | 0.375 | 0.0776 |
| POINT 2 | 0.017 | 0.414 |
| POINT 3 | 0.017 | 0.414 |
| POINT 4 | 0.017 | 0.414 |
| POINT 5 | 0.052 | 0.355 |
| POINT 6 | 0.435 | 0.076 |
| AVERAGE | 0.152 | 0.292 |

FIG. 125A

| M.R. | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| ROW 7 | 0 | 0 | 0 | 1 | 0 | 0 | 0 | 1 | 0 | 0 | 0 | 1 | 0 | 0 | 1 | 0 | 0 | 0 | 0 | 1 | 0 |
| ROW 8 | 0 | 0 | 0 | 1 | 0 | 0 | 0 | 1 | 0 | 0 | 0 | 1 | 0 | 0 | 1 | 0 | 0 | 0 | 0 | 1 | 0 |
| FREQ. | 0 | 0 | 0 | 2 | 0 | 0 | 0 | 2 | 0 | 0 | 0 | 2 | 0 | 0 | 2 | 0 | 0 | 0 | 0 | 2 | 0 |

FIG. 125B

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| ROW 7 | 0 | 1 | 0 | 1 | 0 | 0 | 0 | 0 | 0 | 1 | 0 | 0 | 0 | 1 | 0 | 0 | 0 | 1 | 0 | 0 | 0 | 0 | 1 |
| ROW 8 | 0 | 1 | 0 | 1 | 0 | 0 | 0 | 0 | 0 | 1 | 0 | 0 | 0 | 1 | 0 | 0 | 0 | 1 | 0 | 0 | 0 | 0 | 1 |
| FREQ. | 0 | 2 | 0 | 2 | 0 | 0 | 0 | 0 | 0 | 2 | 0 | 0 | 0 | 2 | 0 | 0 | 0 | 2 | 0 | 0 | 0 | 0 | 2 |

FIG. 126

| POINT | ROW | ROW DISTANCE | NUMBER OF ROW MATCHES | ROW LENGTH |
|---|---|---|---|---|
| POINT 1 | 7 | 0 | 12 | 844 |
| POINT 2 | 8 | 0 | 12 | 844 |

FIG. 127

| POINT | ROW | NORMALIZED ROW DISTANCE | NORMALIZED NO. OF ROW MATCHES | NORMALIZED ROW LENGTH |
|---|---|---|---|---|
| POINT 1 | 7 | 0 | 0.5 | 0.5 |
| POINT 2 | 8 | 0 | 0.5 | 0.5 |
| CENTER 1 | N/A | 0 | 0.5 | 0.5 |
| CENTER 2 | N/A | 0 | 0.5 | 0.5 |

FIG. 128

| | DISTANCE TO CLUSTER 1 CENTER | DISTANCE TO CLUSTER 2 CENTER |
|---|---|---|
| POINT 1 | 0 | 0 |
| POINT 2 | 0 | 0 |
| AVERAGE | 0 | 0 |

FIG. 129A

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 0 | 1 | 0 | 1 | 0 | 0 | 0 | 1 | 0 | 0 | 0 | 1 | 0 | 0 | 1 | 0 | 0 | 0 | 0 | 1 | 0 |
| ROW 7 | 0 | 1 | 0 | 1 | 0 | 0 | 0 | 1 | 0 | 0 | 0 | 1 | 0 | 0 | 1 | 0 | 0 | 0 | 0 | 1 | 0 |
| ROW 8 | 0 | 1 | 0 | 1 | 0 | 0 | 0 | 1 | 0 | 0 | 0 | 1 | 0 | 0 | 1 | 0 | 0 | 0 | 0 | 1 | 0 |
| FREQ. | 0 | 2 | 0 | 2 | 0 | 0 | 0 | 2 | 0 | 0 | 0 | 2 | 0 | 0 | 2 | 0 | 0 | 0 | 0 | 2 | 0 |

FIG. 129B

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| M.R. | 0 | 1 | 0 | 1 | 0 | 0 | 0 | 1 | 0 | 0 | 0 | 1 | 0 | 0 | 1 | 0 | 0 | 0 | 0 | 0 | 0 | 0 | 1 |
| ROW 7 | 0 | 1 | 0 | 1 | 0 | 0 | 0 | 1 | 0 | 0 | 0 | 1 | 0 | 0 | 1 | 0 | 0 | 0 | 0 | 0 | 0 | 0 | 1 |
| ROW 8 | 0 | 1 | 0 | 1 | 0 | 0 | 0 | 1 | 0 | 0 | 0 | 1 | 0 | 0 | 1 | 0 | 0 | 0 | 0 | 0 | 0 | 0 | 1 |
| FREQ. | 0 | 2 | 0 | 2 | 0 | 0 | 0 | 2 | 0 | 0 | 0 | 2 | 0 | 0 | 2 | 0 | 0 | 0 | 0 | 0 | 0 | 0 | 2 |

| POINT | ROW | ROW DISTANCE | NUMBER OF ROW MATCHES | ROW LENGTH |
|---|---|---|---|---|
| POINT 1 | 7 | 0 | 12 | 844 |
| POINT 2 | 8 | 0 | 12 | 844 |

FIG. 130

| POINT | ROW | NORMALIZED ROW DISTANCE | NORMALIZED NO. OF ROW MATCHES | NORMALIZED ROW LENGTH |
|---|---|---|---|---|
| POINT 1 | 7 | 0 | 0.5 | 0.5 |
| POINT 2 | 8 | 0 | 0.5 | 0.5 |
| CENTER 1 | N/A | 0 | 0.5 | 0.5 |
| CENTER 2 | N/A | 0 | 0.5 | 0.5 |

FIG. 131

| | CLUSTER CENTER DISTANCE TO CLUSTER 1 | CLUSTER CENTER DISTANCE TO CLUSTER 2 |
|---|---|---|
| POINT 1 | 0 | 0 |
| POINT 2 | 0 | 0 |
| AVERAGE | 0 | 0 |

FIG. 132

| M.R. | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| ROW 2 | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 3 | 1 | 0 | 0 | 0 | 1 | 0 | 0 | 0 | 0 | 0 | 0 | 1 | 0 | 0 | 0 | 1 | 1 | 0 | 0 | 0 | 1 |
| ROW 4 | 1 | 0 | 0 | 0 | 1 | 0 | 0 | 0 | 0 | 1 | 0 | 0 | 0 | 0 | 0 | 1 | 1 | 0 | 0 | 0 | 1 |
| ROW 5 | 1 | 0 | 0 | 0 | 1 | 0 | 0 | 0 | 1 | 0 | 0 | 1 | 1 | 0 | 0 | 1 | 1 | 0 | 0 | 0 | 1 |
| ROW 5 | 1 | 0 | 0 | 0 | 1 | 0 | 0 | 0 | 0 | 1 | 0 | 0 | 1 | 0 | 0 | 1 | 1 | 0 | 0 | 0 | 1 |
| FREQ. | 4 | 0 | 0 | 0 | 4 | 0 | 0 | 0 | 1 | 2 | 0 | 2 | 1 | 0 | 0 | 4 | 4 | 0 | 0 | 0 | 4 |

FIG. 133A

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| ROW 2 | 1 | 0 | 0 | 1 | 0 | 1 | 1 | 0 | 0 | 0 | 0 | 0 | 0 | 0 | 0 | 0 | 0 | 0 | 0 | 0 | 1 | 0 | 0 |
| ROW 3 | 1 | 0 | 0 | 1 | 0 | 1 | 0 | 1 | 0 | 0 | 0 | 1 | 0 | 0 | 0 | 0 | 0 | 0 | 0 | 0 | 1 | 0 | 0 |
| ROW 4 | 1 | 0 | 0 | 1 | 0 | 1 | 0 | 0 | 1 | 0 | 0 | 0 | 0 | 0 | 1 | 0 | 1 | 0 | 0 | 0 | 1 | 0 | 0 |
| ROW 5 | 1 | 0 | 0 | 1 | 0 | 1 | 0 | 0 | 0 | 1 | 1 | 0 | 1 | 1 | 0 | 1 | 0 | 0 | 0 | 0 | 1 | 0 | 0 |
| FREQ. | 4 | 0 | 0 | 4 | 0 | 4 | 2 | 1 | 1 | 1 | 1 | 1 | 1 | 1 | 1 | 1 | 1 | 0 | 0 | 0 | 4 | 0 | 0 |

FIG. 133B

| POINT | ROW | ROW DISTANCE | NUMBER OF ROW MATCHES | ROW LENGTH |
|---|---|---|---|---|
| POINT 1 | 2 | 1 | 9 | 918 |
| POINT 2 | 3 | 1 | 9 | 918 |
| POINT 3 | 4 | 1 | 9 | 918 |
| POINT 4 | 5 | 3 | 9 | 918 |

FIG. 134

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 0.167 | 0.25 | 0.25 |
| POINT 2 | 3 | 0.167 | 0.25 | 0.25 |
| POINT 3 | 4 | 0.167 | 0.25 | 0.25 |
| POINT 4 | 5 | 0.5 | 0.25 | 0.25 |
| CENTER 1 | N/A | 0.5 | 0.25 | 0.25 |
| CENTER 2 | N/A | 0.167 | 0.25 | 0.25 |

FIG. 135

| | CLUSTER CENTER DISTANCE TO CLUSTER 1 | CLUSTER CENTER DISTANCE TO CLUSTER 2 |
|---|---|---|
| POINT 1 | 0.333 | 0 |
| POINT 2 | 0.333 | 0 |
| POINT 3 | 0.333 | 0 |
| POINT 4 | 0 | 0.333 |
| AVERAGE | 0.25 | 0.0833 |

FIG. 136

| | $A\alpha$ | $B\alpha$ | $C\alpha$ | $D\alpha$ | $E\alpha$ | $F\alpha$ | $G\alpha$ | $H\alpha$ | $I\alpha$ | $J\alpha$ | $K\alpha$ | $L\alpha$ | $M\alpha$ | $N\alpha$ | $O\alpha$ | $P\alpha$ | $Q\alpha$ | $R\alpha$ | $S\alpha$ | $T\alpha$ | $U\alpha$ |
|---|---|---|---|---|---|---|---|---|---|---|---|---|---|---|---|---|---|---|---|---|---|
| M.R. | 0 | 1 | 0 | 1 | 0 | 0 | 0 | 0 | 1 | 0 | 0 | 1 | 0 | 0 | 1 | 0 | 0 | 0 | 0 | 1 | 0 |
| ROW 1 | 1 | 0 | 0 | 0 | 0 | 1 | 0 | 1 | 1 | 0 | 0 | 0 | 0 | 0 | 0 | 0 | 0 | 0 | 0 | 0 | 0 |
| ROW 7 | 0 | 1 | 0 | 1 | 0 | 0 | 0 | 1 | 0 | 0 | 0 | 1 | 0 | 1 | 0 | 1 | 0 | 0 | 0 | 0 | 1 |
| ROW 8 | 0 | 0 | 0 | 1 | 0 | 0 | 0 | 1 | 0 | 0 | 0 | 0 | 0 | 0 | 1 | 0 | 0 | 0 | 0 | 1 | 0 |
| FREQ. | 1 | 2 | 0 | 2 | 0 | 1 | 0 | 3 | 1 | 0 | 0 | 2 | 0 | 1 | 1 | 1 | 0 | 0 | 0 | 1 | 2 |

FIG. 137A

| | $A\beta$ | $B\beta$ | $C\beta$ | $D\beta$ | $E\beta$ | $F\beta$ | $G\beta$ | $H\beta$ | $I\beta$ | $J\beta$ | $K\beta$ | $L\beta$ | $M\beta$ | $N\beta$ | $O\beta$ | $P\beta$ | $Q\beta$ | $R\beta$ | $S\beta$ | $T\beta$ | $U\beta$ | $V\beta$ | $W\beta$ |
|---|---|---|---|---|---|---|---|---|---|---|---|---|---|---|---|---|---|---|---|---|---|---|---|
| M.R. | 0 | 1 | 0 | 1 | 0 | 0 | 0 | 0 | 0 | 1 | 0 | 0 | 0 | 0 | 0 | 0 | 0 | 1 | 0 | 0 | 0 | 0 | 1 |
| ROW 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| ROW 7 | 0 | 1 | 0 | 1 | 0 | 0 | 0 | 0 | 0 | 0 | 1 | 0 | 1 | 0 | 1 | 0 | 1 | 0 | 1 | 0 | 0 | 0 | 1 |
| ROW 8 | 0 | 0 | 0 | 1 | 0 | 0 | 0 | 0 | 0 | 0 | 0 | 0 | 0 | 0 | 0 | 0 | 0 | 1 | 0 | 0 | 0 | 0 | 1 |
| FREQ. | 0 | 2 | 0 | 2 | 0 | 0 | 0 | 0 | 0 | 1 | 1 | 0 | 1 | 0 | 1 | 0 | 1 | 2 | 1 | 0 | 0 | 0 | 2 |

FIG. 137B

| POINT | ROW | ROW DISTANCE | NUMBER OF ROW MATCHES | ROW LENGTH |
|---|---|---|---|---|
| POINT 1 | 1 | 13 | 1 | 369 |
| POINT 2 | 7 | 0 | 12 | 844 |
| POINT 3 | 8 | 0 | 12 | 844 |

FIG. 138

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 1 | 0.04 | 0.179 |
| POINT 2 | 3 | 0 | 0.48 | 0.41 |
| POINT 3 | 4 | 0 | 0.48 | 0.41 |
| CENTER 1 | N/A | 1.13E-22 | 0.48 | 0.41 |
| CENTER 2 | N/A | 1 | 0.04 | 0.179 |

FIG. 139

| | CLUSTER CENTER DISTANCE TO CLUSTER 1 | CLUSTER CENTER DISTANCE TO CLUSTER 2 |
|---|---|---|
| POINT 1 | 1.12 | 0 |
| POINT 2 | 1.13E-22 | 1.12 |
| POINT 3 | 1.13E-22 | 1.12 |
| AVERAGE | 0.372 | 0.744 |

FIG. 140

| | $A\alpha$ | $B\alpha$ | $C\alpha$ | $D\alpha$ | $E\alpha$ | $F\alpha$ | $G\alpha$ | $H\alpha$ | $I\alpha$ | $J\alpha$ | $K\alpha$ | $L\alpha$ | $M\alpha$ | $N\alpha$ | $O\alpha$ | $P\alpha$ | $Q\alpha$ | $R\alpha$ | $S\alpha$ | $T\alpha$ | $U\alpha$ |
|---|---|---|---|---|---|---|---|---|---|---|---|---|---|---|---|---|---|---|---|---|---|
| M.R. | 1 | 0 | 0 | 0 | 1 | 0 | 0 | 0 | 0 | 1 | 0 | 0 | 0 | 0 | 1 | 1 | 1 | 0 | 0 | 0 | 1 |
| ROW 3 | 1 | 0 | 0 | 0 | 0 | 1 | 0 | 0 | 0 | 0 | 0 | 1 | 1 | 0 | 0 | 1 | 1 | 1 | 0 | 0 | 1 |
| ROW 5 | 1 | 0 | 0 | 0 | 1 | 0 | 0 | 0 | 0 | 1 | 0 | 0 | 1 | 0 | 0 | 1 | 1 | 1 | 0 | 0 | 1 |
| FREQ. | 2 | 0 | 0 | 0 | 2 | 1 | 0 | 0 | 0 | 2 | 0 | 1 | 2 | 0 | 0 | 2 | 2 | 2 | 0 | 0 | 2 |

FIG. 141A

| | $A\beta$ | $B\beta$ | $C\beta$ | $D\beta$ | $E\beta$ | $F\beta$ | $G\beta$ | $H\beta$ | $I\beta$ | $J\beta$ | $K\beta$ | $L\beta$ | $M\beta$ | $N\beta$ | $O\beta$ | $P\beta$ | $Q\beta$ | $R\beta$ | $S\beta$ | $T\beta$ | $U\beta$ | $V\beta$ | $W\beta$ |
|---|---|---|---|---|---|---|---|---|---|---|---|---|---|---|---|---|---|---|---|---|---|---|---|
| M.R. | 1 | 0 | 0 | 0 | 1 | 0 | 0 | 0 | 0 | 1 | 0 | 0 | 0 | 0 | 1 | 0 | 0 | 0 | 0 | 0 | 0 | 0 | 0 |
| ROW 3 | 1 | 0 | 0 | 0 | 0 | 1 | 0 | 0 | 0 | 0 | 0 | 1 | 1 | 0 | 0 | 0 | 0 | 0 | 1 | 0 | 0 | 0 | 0 |
| ROW 5 | 1 | 0 | 0 | 0 | 1 | 0 | 0 | 0 | 0 | 1 | 0 | 0 | 1 | 0 | 0 | 0 | 0 | 0 | 1 | 0 | 0 | 0 | 0 |
| FREQ. | 2 | 0 | 0 | 0 | 2 | 1 | 0 | 0 | 0 | 2 | 0 | 1 | 2 | 0 | 0 | 0 | 0 | 0 | 2 | 0 | 0 | 0 | 0 |

FIG. 141B

| POINT | ROW | ROW DISTANCE | NUMBER OF ROW MATCHES | ROW LENGTH |
|---|---|---|---|---|
| POINT 1 | 3 | 0 | 11 | 918 |
| POINT 2 | 5 | 2 | 11 | 918 |

FIG. 142

| POINT | ROW | NORMALIZED ROW DISTANCE | NORMALIZED NO. OF ROW MATCHES | NORMALIZED ROW LENGTH |
|---|---|---|---|---|
| POINT 1 | 3 | 0 | 0.5 | 0.5 |
| POINT 2 | 5 | 1 | 0.5 | 0.5 |
| CENTER 1 | N/A | 1.21E-53 | 0.5 | 0.5 |
| CENTER 2 | N/A | 1 | 0.5 | 0.5 |

FIG. 143

| | CLUSTER CENTER DISTANCE TO CLUSTER 1 | CLUSTER CENTER DISTANCE TO CLUSTER 2 |
|---|---|---|
| POINT 1 | 1.21E-53 | 1 |
| POINT 2 | 1 | 0 |
| AVERAGE | 0.5 | 0.5 |

FIG. 144

| M.R. | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| ROW 2 | 0 | 1 | 0 | 0 | 0 | 0 | 0 | 0 | 0 | 0 | 0 | 0 | 1 | 0 | 0 | 1 | 1 | 0 | 0 | 0 | 0 |
| ROW 5 | 1 | 0 | 0 | 0 | 1 | 0 | 0 | 0 | 0 | 0 | 0 | 1 | 1 | 0 | 0 | 1 | 1 | 0 | 0 | 0 | 1 |
| ROW 7 | 0 | 0 | 1 | 0 | 0 | 0 | 0 | 1 | 1 | 0 | 0 | 1 | 0 | 1 | 1 | 0 | 0 | 0 | 0 | 1 | 1 |
| ROW 8 | 0 | 1 | 0 | 1 | 0 | 0 | 0 | 1 | 0 | 0 | 0 | 1 | 0 | 1 | 1 | 0 | 0 | 0 | 0 | 1 | 0 |
| FREQ. | 2 | 2 | 0 | 2 | 0 | 0 | 0 | 2 | 1 | 0 | 0 | 4 | 2 | 2 | 2 | 2 | 2 | 0 | 0 | 2 | 2 |

FIG. 145A

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| ROW 2 | 1 | 0 | 0 | 1 | 0 | 1 | 1 | 0 | 0 | 0 | 1 | 0 | 0 | 0 | 1 | 0 | 0 | 0 | 0 | 0 | 0 | 0 | 0 |
| ROW 3 | 1 | 0 | 0 | 1 | 0 | 1 | 1 | 0 | 0 | 0 | 0 | 0 | 0 | 1 | 0 | 0 | 0 | 0 | 0 | 0 | 1 | 0 | 0 |
| ROW 7 | 0 | 1 | 0 | 1 | 0 | 0 | 0 | 0 | 0 | 0 | 1 | 0 | 1 | 0 | 1 | 0 | 0 | 0 | 1 | 0 | 0 | 0 | 1 |
| ROW 8 | 0 | 1 | 0 | 1 | 0 | 0 | 0 | 0 | 0 | 1 | 1 | 0 | 0 | 1 | 1 | 0 | 0 | 0 | 1 | 0 | 1 | 0 | 1 |
| FREQ. | 2 | 2 | 0 | 4 | 0 | 2 | 2 | 0 | 0 | 1 | 3 | 0 | 1 | 2 | 3 | 0 | 0 | 0 | 2 | 0 | 2 | 0 | 2 |

FIG. 145B

| POINT | ROW | ROW DISTANCE | NUMBER OF ROW MATCHES | ROW LENGTH |
|---|---|---|---|---|
| POINT 1 | 2 | 7 | 2 | 918 |
| POINT 2 | 5 | 7 | 4 | 918 |
| POINT 3 | 7 | 5 | 4 | 844 |
| POINT 4 | 8 | 5 | 4 | 844 |

FIG. 146

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 0.292 | 0.143 | 0.26 |
| POINT 2 | 5 | 0.292 | 0.286 | 0.26 |
| POINT 3 | 7 | 0.208 | 0.286 | 0.24 |
| POINT 4 | 8 | 0.208 | 0.286 | 0.24 |
| CENTER 1 | N/A | 0.23 | 0.286 | 0.245 |
| CENTER 2 | N/A | 0.292 | 0.147 | 0.26 |

|  | CLUSTER CENTER DISTANCE TO CLUSTER 1 | CLUSTER CENTER DISTANCE TO CLUSTER 2 |
|---|---|---|
| POINT 1 | 0.156 | 0.0042 |
| POINT 2 | 0.0633 | 0.139 |
| POINT 3 | 0.0226 | 0.163 |
| POINT 4 | 0.0226 | 0.163 |
| AVERAGE | 0.0662 | 0.117 |

FIG. 149A

|  | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 0 | 1 | 0 | 1 | 0 | 0 | 0 | 1 | 0 | 0 | 0 | 1 | 0 | 0 | 1 | 0 | 0 | 0 | 0 | 1 | 0 |
| ROW 7 | 0 | 1 | 0 | 1 | 0 | 0 | 0 | 1 | 0 | 0 | 0 | 1 | 0 | 0 | 1 | 0 | 0 | 0 | 0 | 1 | 0 |
| ROW 8 | 0 | 1 | 0 | 1 | 0 | 0 | 0 | 1 | 0 | 0 | 0 | 1 | 0 | 0 | 1 | 0 | 0 | 0 | 0 | 1 | 0 |
| FREQ. | 0 | 2 | 0 | 2 | 0 | 0 | 0 | 2 | 0 | 0 | 0 | 2 | 0 | 0 | 2 | 0 | 0 | 0 | 0 | 2 | 0 |

FIG. 149B

|  | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| M.R. | 0 | 1 | 0 | 1 | 0 | 0 | 0 | 0 | 0 | 0 | 0 | 1 | 0 | 0 | 1 | 0 | 0 | 1 | 0 | 0 | 0 | 0 | 1 |
| ROW 7 | 0 | 1 | 0 | 1 | 0 | 0 | 0 | 0 | 0 | 0 | 0 | 1 | 0 | 0 | 1 | 0 | 0 | 1 | 0 | 0 | 0 | 0 | 1 |
| ROW 8 | 0 | 1 | 0 | 1 | 0 | 0 | 0 | 0 | 0 | 0 | 0 | 1 | 0 | 0 | 1 | 0 | 0 | 1 | 0 | 0 | 0 | 0 | 1 |
| FREQ. | 0 | 2 | 0 | 2 | 0 | 0 | 0 | 0 | 0 | 0 | 0 | 2 | 0 | 0 | 2 | 0 | 0 | 2 | 0 | 0 | 0 | 0 | 2 |

FIG. 150

| POINT | ROW | ROW DISTANCE | NUMBER OF ROW MATCHES | ROW LENGTH |
|---|---|---|---|---|
| POINT 1 | 7 | 0 | 12 | 844 |
| POINT 2 | 8 | 0 | 12 | 844 |

| POINT | ROW | NORMALIZED ROW DISTANCE | NORMALIZED NO. OF ROW MATCHES | NORMALIZED ROW LENGTH |
|---|---|---|---|---|
| POINT 1 | 7 | 0 | 0.5 | 0.5 |
| POINT 2 | 8 | 0 | 0.5 | 0.5 |
| CENTER 1 | N/A | 0 | 0.5 | 0.5 |
| CENTER 2 | N/A | 0 | 0.5 | 0.5 |

FIG. 151

| | CLUSTER CENTER DISTANCE TO CLUSTER 1 | CLUSTER CENTER DISTANCE TO CLUSTER 2 |
|---|---|---|
| POINT 1 | 0 | 0 |
| POINT 2 | 0 | 0 |
| AVERAGE | 0 | 0 |

FIG. 152

| M.R. | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| ROW 2 | 1 | 1 | 0 | 0 | 1 | 0 | 0 | 0 | 0 | 0 | 0 | 0 | 0 | 0 | 0 | 1 | 1 | 0 | 0 | 0 | 1 |
| ROW 3 | 1 | 1 | 0 | 0 | 1 | 0 | 0 | 0 | 0 | 1 | 0 | 0 | 0 | 0 | 0 | 1 | 1 | 0 | 0 | 0 | 1 |
| ROW 4 | 1 | 1 | 0 | 0 | 1 | 0 | 0 | 0 | 1 | 0 | 0 | 0 | 1 | 0 | 0 | 1 | 1 | 0 | 0 | 0 | 1 |
| ROW 5 | 1 | 1 | 0 | 0 | 1 | 0 | 0 | 0 | 0 | 1 | 0 | 2 | 1 | 1 | 0 | 1 | 1 | 0 | 0 | 0 | 1 |
| FREQ. | 4 | 4 | 0 | 0 | 4 | 0 | 0 | 0 | 1 | 2 | 0 | 2 | 2 | 1 | 0 | 4 | 4 | 0 | 0 | 0 | 4 |

FIG. 153A

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| ROW 2 | 1 | 0 | 0 | 1 | 0 | 0 | 1 | 0 | 0 | 0 | 0 | 0 | 1 | 0 | 0 | 0 | 0 | 0 | 0 | 0 | 0 | 0 | 0 |
| ROW 3 | 1 | 0 | 0 | 1 | 0 | 1 | 1 | 0 | 0 | 0 | 1 | 1 | 0 | 0 | 1 | 0 | 0 | 0 | 0 | 1 | 0 | 0 | 0 |
| ROW 4 | 0 | 1 | 0 | 0 | 0 | 0 | 0 | 0 | 0 | 0 | 0 | 1 | 0 | 1 | 0 | 1 | 0 | 0 | 0 | 0 | 0 | 0 | 1 |
| ROW 5 | 0 | 1 | 0 | 1 | 0 | 0 | 0 | 0 | 0 | 0 | 1 | 1 | 0 | 1 | 1 | 1 | 0 | 1 | 1 | 1 | 0 | 0 | 1 |
| FREQ. | 2 | 2 | 0 | 4 | 0 | 2 | 2 | 0 | 0 | 0 | 3 | 2 | 0 | 3 | 0 | 3 | 0 | 2 | 2 | 2 | 0 | 0 | 2 |

FIG. 153B

| POINT | ROW | ROW DISTANCE | NUMBER OF ROW MATCHES | ROW LENGTH |
|---|---|---|---|---|
| POINT 1 | 2 | 1 | 9 | 918 |
| POINT 2 | 3 | 1 | 9 | 918 |
| POINT 3 | 4 | 1 | 9 | 918 |
| POINT 4 | 5 | 3 | 9 | 918 |

FIG. 154

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 0.167 | 0.25 | 0.25 |
| POINT 2 | 3 | 0.167 | 0.25 | 0.25 |
| POINT 3 | 4 | 0.167 | 0.25 | 0.25 |
| POINT 4 | 5 | 0.5 | 0.25 | 0.25 |
| CENTER 1 | N/A | 0.5 | 0.25 | 0.25 |
| CENTER 2 | N/A | 0.167 | 0.25 | 0.25 |

|  | CLUSTER CENTER DISTANCE TO CLUSTER 1 | CLUSTER CENTER DISTANCE TO CLUSTER 2 |
|---|---|---|
| POINT 1 | 0.333 | 0 |
| POINT 2 | 0.333 | 0 |
| POINT 3 | 0.333 | 0 |
| POINT 4 | 0 | 0.333 |
| AVERAGE | 0.25 | 0.0833 |

FIG. 157A

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R.  | 1 | 1 | 0 | 0 | 1 | 0 | 0 | 0 | 0 | 0 | 0 | 0 | 0 | 0 | 1 | 1 | 1 | 0 | 0 | 0 | 1 |
| ROW 2 | 1 | 0 | 0 | 0 | 1 | 0 | 0 | 0 | 0 | 0 | 0 | 0 | 0 | 0 | 1 | 1 | 1 | 0 | 0 | 0 | 1 |
| ROW 3 | 1 | 0 | 0 | 0 | 1 | 0 | 0 | 0 | 0 | 1 | 0 | 1 | 0 | 0 | 1 | 1 | 1 | 0 | 0 | 0 | 1 |
| ROW 4 | 1 | 0 | 0 | 0 | 1 | 0 | 0 | 0 | 1 | 0 | 0 | 0 | 0 | 0 | 1 | 1 | 1 | 0 | 0 | 0 | 1 |
| ROW 5 | 1 | 0 | 0 | 0 | 1 | 0 | 0 | 0 | 0 | 1 | 0 | 1 | 1 | 1 | 1 | 1 | 1 | 0 | 0 | 0 | 1 |
| FREQ. | 4 | 0 | 0 | 0 | 4 | 0 | 0 | 0 | 1 | 2 | 0 | 2 | 1 | 1 | 4 | 4 | 4 | 0 | 0 | 0 | 4 |

FIG. 157B

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| M.R.  | 1 | 0 | 0 | 0 | 0 | 1 | 1 | 0 | 0 | 0 | 0 | 0 | 0 | 0 | 0 | 0 | 0 | 0 | 0 | 0 | 0 | 0 | 0 |
| ROW 2 | 1 | 0 | 0 | 0 | 0 | 1 | 1 | 0 | 0 | 0 | 0 | 0 | 0 | 0 | 0 | 0 | 0 | 0 | 1 | 0 | 0 | 0 | 0 |
| ROW 3 | 1 | 0 | 0 | 0 | 0 | 1 | 0 | 1 | 0 | 0 | 1 | 0 | 0 | 1 | 0 | 0 | 0 | 0 | 1 | 0 | 0 | 0 | 0 |
| ROW 4 | 1 | 0 | 0 | 0 | 0 | 1 | 1 | 0 | 0 | 1 | 1 | 0 | 0 | 0 | 0 | 0 | 0 | 0 | 1 | 0 | 0 | 0 | 0 |
| ROW 5 | 1 | 0 | 0 | 0 | 0 | 1 | 0 | 1 | 1 | 1 | 0 | 1 | 0 | 0 | 2 | 0 | 0 | 0 | 1 | 0 | 0 | 0 | 0 |
| FREQ. | 4 | 0 | 0 | 0 | 0 | 4 | 2 | 2 | 1 | 2 | 2 | 1 | 0 | 1 | 2 | 0 | 0 | 0 | 4 | 0 | 0 | 0 | 0 |

| POINT | ROW | ROW DISTANCE | NUMBER OF ROW MATCHES | ROW LENGTH |
|---|---|---|---|---|
| POINT 1 | 2 | 1 | 9 | 918 |
| POINT 2 | 3 | 1 | 9 | 918 |
| POINT 3 | 4 | 1 | 9 | 918 |
| POINT 4 | 5 | 3 | 9 | 918 |

FIG. 158

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 0.167 | 0.25 | 0.25 |
| POINT 2 | 3 | 0.167 | 0.25 | 0.25 |
| POINT 3 | 4 | 0.167 | 0.25 | 0.25 |
| POINT 4 | 5 | 0.5 | 0.25 | 0.25 |
| CENTER 1 | N/A | 0.5 | 0.25 | 0.25 |
| CENTER 2 | N/A | 0.167 | 0.25 | 0.25 |

FIG. 159

| | CLUSTER CENTER DISTANCE TO CLUSTER 1 | CLUSTER CENTER DISTANCE TO CLUSTER 2 |
|---|---|---|
| POINT 1 | 0.333 | 0 |
| POINT 2 | 0.333 | 0 |
| POINT 3 | 0.333 | 0 |
| POINT 4 | 0 | 0.333 |
| AVERAGE | 0.25 | 0.0833 |

FIG. 160

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 0 | 1 | 0 | 1 | 0 | 0 | 0 | 1 | 0 | 0 | 0 | 1 | 0 | 0 | 1 | 0 | 0 | 0 | 0 | 1 | 0 |
| ROW 7 | 0 | 1 | 0 | 1 | 0 | 0 | 0 | 1 | 0 | 0 | 0 | 1 | 0 | 0 | 1 | 0 | 0 | 0 | 0 | 1 | 0 |
| ROW 8 | 0 | 1 | 0 | 1 | 0 | 0 | 0 | 1 | 0 | 0 | 0 | 1 | 0 | 0 | 1 | 0 | 0 | 0 | 0 | 1 | 0 |
| FREQ. | 0 | 2 | 0 | 2 | 0 | 0 | 0 | 2 | 0 | 0 | 0 | 2 | 0 | 0 | 2 | 0 | 0 | 0 | 0 | 2 | 0 |

FIG. 161A

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| M.R. | 0 | 1 | 0 | 1 | 0 | 0 | 0 | 0 | 0 | 1 | 0 | 1 | 0 | 0 | 1 | 0 | 0 | 1 | 0 | 0 | 0 | 0 | 1 |
| ROW 7 | 0 | 1 | 0 | 1 | 0 | 0 | 0 | 0 | 0 | 1 | 0 | 1 | 0 | 0 | 1 | 0 | 0 | 1 | 0 | 0 | 0 | 0 | 1 |
| ROW 8 | 0 | 1 | 0 | 1 | 0 | 0 | 0 | 0 | 0 | 1 | 0 | 1 | 0 | 0 | 1 | 0 | 0 | 1 | 0 | 0 | 0 | 0 | 1 |
| FREQ. | 0 | 2 | 0 | 2 | 0 | 0 | 0 | 0 | 0 | 2 | 0 | 2 | 0 | 0 | 2 | 0 | 0 | 2 | 0 | 0 | 0 | 0 | 2 |

FIG. 161B

| POINT | ROW | ROW DISTANCE | NUMBER OF ROW MATCHES | ROW LENGTH |
|---|---|---|---|---|
| POINT 1 | 7 | 0 | 12 | 844 |
| POINT 2 | 8 | 0 | 12 | 844 |

FIG. 162

| POINT | ROW | NORMALIZED ROW DISTANCE | NORMALIZED NO. OF ROW MATCHES | NORMALIZED ROW LENGTH |
|---|---|---|---|---|
| POINT 1 | 7 | 0 | 0.5 | 0.5 |
| POINT 2 | 8 | 0 | 0.5 | 0.5 |
| CENTER 1 | N/A | 0 | 0.5 | 0.5 |
| CENTER 2 | N/A | 0 | 0.5 | 0.5 |

FIG. 163

| | CLUSTER CENTER DISTANCE TO CLUSTER 1 | CLUSTER CENTER DISTANCE TO CLUSTER 2 |
|---|---|---|
| POINT 1 | 0 | 0 |
| POINT 2 | 0 | 0 |
| AVERAGE | 0 | 0 |

FIG. 164

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 2 | 1 | 0 | 0 | 0 | 1 | 0 | 0 | 0 | 0 | 1 | 0 | 0 | 0 | 0 | 0 | 1 | 1 | 0 | 0 | 0 | 1 |
| ROW 3 | 1 | 0 | 0 | 0 | 1 | 1 | 0 | 0 | 1 | 0 | 0 | 0 | 0 | 0 | 0 | 1 | 1 | 0 | 0 | 0 | 1 |
| ROW 4 | 1 | 0 | 0 | 0 | 1 | 0 | 0 | 0 | 0 | 1 | 0 | 1 | 1 | 0 | 0 | 1 | 1 | 0 | 0 | 0 | 1 |
| ROW 5 | 1 | 0 | 0 | 0 | 0 | 1 | 0 | 0 | 0 | 0 | 0 | 1 | 1 | 1 | 0 | 1 | 1 | 0 | 0 | 0 | 1 |
| FREQ. | 4 | 0 | 0 | 0 | 4 | 2 | 0 | 0 | 1 | 2 | 0 | 2 | 2 | 1 | 0 | 4 | 4 | 0 | 0 | 0 | 4 |

FIG. 165A

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| M.R. | 1 | 0 | 0 | 1 | 0 | 1 | 0 | 0 | 0 | 0 | 0 | 0 | 0 | 0 | 0 | 0 | 0 | 0 | 0 | 1 | 0 | 0 | 0 |
| ROW 2 | 1 | 0 | 0 | 1 | 0 | 1 | 0 | 1 | 0 | 0 | 0 | 0 | 0 | 0 | 0 | 0 | 0 | 0 | 0 | 1 | 0 | 0 | 0 |
| ROW 3 | 1 | 0 | 0 | 1 | 0 | 0 | 1 | 0 | 0 | 0 | 1 | 0 | 0 | 0 | 0 | 0 | 0 | 0 | 0 | 1 | 0 | 0 | 0 |
| ROW 4 | 1 | 0 | 0 | 1 | 0 | 1 | 0 | 0 | 1 | 1 | 0 | 0 | 0 | 1 | 0 | 1 | 0 | 0 | 0 | 1 | 0 | 0 | 0 |
| ROW 5 | 1 | 0 | 0 | 0 | 0 | 1 | 1 | 0 | 1 | 1 | 1 | 1 | 2 | 0 | 1 | 0 | 0 | 0 | 0 | 1 | 0 | 0 | 0 |
| FREQ. | 4 | 0 | 0 | 4 | 0 | 4 | 2 | 1 | 2 | 2 | 2 | 1 | 2 | 1 | 1 | 1 | 0 | 0 | 0 | 4 | 0 | 0 | 0 |

FIG. 165B

| POINT | ROW | ROW DISTANCE | NUMBER OF ROW MATCHES | ROW LENGTH |
|---|---|---|---|---|
| POINT 1 | 2 | 1 | 9 | 918 |
| POINT 2 | 3 | 1 | 9 | 918 |
| POINT 3 | 4 | 1 | 9 | 918 |
| POINT 4 | 5 | 3 | 9 | 918 |

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 0.167 | 0.25 | 0.25 |
| POINT 2 | 3 | 0.167 | 0.25 | 0.25 |
| POINT 3 | 4 | 0.167 | 0.25 | 0.25 |
| POINT 4 | 5 | 0.5 | 0.25 | 0.25 |
| CENTER 1 | N/A | 0.5 | 0.25 | 0.25 |
| CENTER 2 | N/A | 0.167 | 0.25 | 0.25 |

FIG. 168

|  | CLUSTER CENTER DISTANCE TO CLUSTER 1 | CLUSTER CENTER DISTANCE TO CLUSTER 2 |
|---|---|---|
| POINT 1 | 0.333 | 0 |
| POINT 2 | 0.333 | 0 |
| POINT 3 | 0.333 | 0 |
| POINT 4 | 0 | 0.333 |
| AVERAGE | 0.25 | 0.0833 |

FIG. 169A

| M.R. | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| ROW 2 | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 3 | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 4 | 1 | 0 | 0 | 0 | 1 | 0 | 0 | 0 | 0 | 1 | 0 | 0 | 0 | 0 | 0 | 1 | 1 | 0 | 0 | 0 | 1 |
| ROW 5 | 1 | 0 | 0 | 0 | 1 | 0 | 0 | 0 | 0 | 0 | 0 | 1 | 1 | 1 | 0 | 1 | 1 | 1 | 0 | 0 | 1 |
| ROW 6 | 1 | 0 | 1 | 1 | 0 | 0 | 1 | 1 | 1 | 0 | 1 | 0 | 1 | 1 | 1 | 0 | 0 | 1 | 1 | 1 | 0 |
| FREQ. | 5 | 0 | 1 | 1 | 4 | 0 | 1 | 1 | 1 | 1 | 1 | 1 | 2 | 2 | 1 | 4 | 4 | 2 | 1 | 1 | 4 |

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| M.R. | 1 | 0 | 0 | 1 | 0 | 1 | 0 | 0 | 0 | 0 | 0 | 0 | 0 | 0 | 0 | 0 | 0 | 0 | 0 | 0 | 0 | 0 | 0 |
| ROW 2 | 1 | 0 | 0 | 0 | 0 | 1 | 0 | 0 | 0 | 1 | 0 | 0 | 0 | 0 | 0 | 0 | 0 | 0 | 0 | 0 | 1 | 0 | 0 |
| ROW 3 | 1 | 0 | 0 | 0 | 0 | 1 | 0 | 1 | 0 | 0 | 0 | 0 | 0 | 1 | 0 | 1 | 0 | 0 | 0 | 0 | 1 | 0 | 0 |
| ROW 4 | 1 | 0 | 0 | 0 | 0 | 1 | 1 | 0 | 1 | 0 | 0 | 0 | 1 | 0 | 0 | 0 | 1 | 0 | 0 | 0 | 1 | 0 | 0 |
| ROW 5 | 1 | 0 | 0 | 0 | 1 | 0 | 0 | 0 | 1 | 0 | 1 | 1 | 0 | 0 | 1 | 0 | 0 | 0 | 0 | 1 | 0 | 1 | 0 |
| ROW 6 | 1 | 0 | 0 | 0 | 0 | 0 | 1 | 0 | 1 | 1 | 1 | 0 | 0 | 0 | 1 | 0 | 0 | 1 | 0 | 0 | 0 | 0 | 1 |
| FREQ. | 5 | 0 | 0 | 1 | 1 | 4 | 2 | 1 | 4 | 2 | 2 | 1 | 1 | 1 | 2 | 1 | 1 | 1 | 0 | 1 | 4 | 1 | 1 |

FIG. 169B

| POINT | ROW | ROW DISTANCE | NUMBER OF ROW MATCHES | ROW LENGTH |
|---|---|---|---|---|
| POINT 1 | 2 | 1 | 9 | 918 |
| POINT 2 | 3 | 1 | 9 | 918 |
| POINT 3 | 4 | 1 | 9 | 918 |
| POINT 4 | 5 | 3 | 9 | 918 |
| POINT 5 | 6 | 13 | 2 | 918 |

FIG. 170

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 0.0526 | 0.237 | 0.2 |
| POINT 2 | 3 | 0.0526 | 0.237 | 0.2 |
| POINT 3 | 4 | 0.0526 | 0.237 | 0.2 |
| POINT 4 | 5 | 0.158 | 0.237 | 0.2 |
| POINT 5 | 6 | 0.684 | 0.0526 | 0.2 |
| CENTER 1 | N/A | 0.684 | 0.0527 | 0.2 |
| CENTER 2 | N/A | 0.0782 | 0.237 | 0.2 |

FIG. 171

| | CLUSTER CENTER DISTANCE TO CLUSTER 1 | CLUSTER CENTER DISTANCE TO CLUSTER 2 |
|---|---|---|
| POINT 1 | 0.658 | 0.0256 |
| POINT 2 | 0.658 | 0.0256 |
| POINT 3 | 0.658 | 0.0256 |
| POINT 4 | 0.557 | 0.0797 |
| POINT 5 | 0.000225 | 0.633 |
| AVERAGE | 0.506 | 0.158 |

FIG. 172

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 0 | 0 | 1 | 0 | 0 | 0 | 0 | 0 | 0 | 0 | 0 | 1 | 0 | 0 | 1 | 0 | 0 | 0 | 0 | 0 | 0 |
| ROW 7 | 0 | 1 | 0 | 1 | 0 | 0 | 0 | 0 | 1 | 0 | 0 | 1 | 0 | 0 | 1 | 0 | 0 | 0 | 0 | 1 | 0 |
| ROW 8 | 0 | 1 | 0 | 1 | 0 | 0 | 0 | 0 | 1 | 0 | 0 | 1 | 0 | 0 | 1 | 0 | 0 | 0 | 0 | 1 | 0 |
| FREQ. | 0 | 2 | 0 | 2 | 0 | 0 | 0 | 0 | 2 | 0 | 0 | 2 | 0 | 0 | 2 | 0 | 0 | 0 | 0 | 2 | 0 |

FIG. 173A

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| M.R. | 0 | 1 | 0 | 1 | 0 | 0 | 0 | 0 | 0 | 0 | 0 | 0 | 0 | 0 | 0 | 0 | 0 | 0 | 0 | 0 | 0 | 0 | 1 |
| ROW 7 | 0 | 1 | 0 | 1 | 0 | 0 | 0 | 0 | 0 | 0 | 0 | 0 | 0 | 1 | 0 | 0 | 0 | 1 | 0 | 0 | 0 | 0 | 1 |
| ROW 8 | 0 | 1 | 0 | 1 | 0 | 0 | 0 | 0 | 0 | 0 | 0 | 0 | 0 | 1 | 0 | 0 | 0 | 1 | 0 | 0 | 0 | 0 | 1 |
| FREQ. | 0 | 2 | 0 | 2 | 0 | 0 | 0 | 0 | 0 | 0 | 0 | 0 | 0 | 2 | 0 | 0 | 0 | 2 | 0 | 0 | 0 | 0 | 2 |

FIG. 173B

| POINT | ROW | ROW DISTANCE | NUMBER OF ROW MATCHES | ROW LENGTH |
|---|---|---|---|---|
| POINT 1 | 7 | 0 | 12 | 844 |
| POINT 2 | 8 | 0 | 12 | 844 |

| POINT | ROW | NORMALIZED ROW DISTANCE | NORMALIZED NO. OF ROW MATCHES | NORMALIZED ROW LENGTH |
|---|---|---|---|---|
| POINT 1 | 7 | 0 | 0.5 | 0.5 |
| POINT 2 | 8 | 0 | 0.5 | 0.5 |
| CENTER 1 | N/A | 0 | 0.5 | 0.5 |
| CENTER 2 | N/A | 0 | 0.5 | 0.5 |

FIG. 176

| | CLUSTER CENTER DISTANCE TO CLUSTER 1 | CLUSTER CENTER DISTANCE TO CLUSTER 2 |
|---|---|---|
| POINT 1 | 0 | 0 |
| POINT 2 | 0 | 0 |
| AVERAGE | 0 | 0 |

FIG. 177A

| M.R. | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| ROW 2 | 1 | 0 | 0 | 0 | 1 | 0 | 0 | 0 | 0 | 0 | 0 | 0 | 1 | 0 | 0 | 1 | 1 | 0 | 0 | 0 | 1 |
| ROW 3 | 1 | 0 | 0 | 0 | 1 | 0 | 0 | 0 | 0 | 1 | 0 | 0 | 0 | 0 | 0 | 1 | 1 | 0 | 0 | 0 | 1 |
| ROW 4 | 1 | 0 | 0 | 0 | 1 | 0 | 0 | 0 | 1 | 0 | 0 | 0 | 0 | 0 | 0 | 1 | 1 | 0 | 0 | 0 | 1 |
| ROW 5 | 1 | 0 | 0 | 0 | 1 | 0 | 0 | 0 | 0 | 1 | 0 | 1 | 0 | 1 | 0 | 1 | 1 | 0 | 0 | 0 | 1 |
| ROW 7 | 0 | 1 | 0 | 1 | 0 | 0 | 0 | 1 | 0 | 0 | 1 | 0 | 1 | 0 | 1 | 0 | 0 | 0 | 0 | 1 | 0 |
| ROW 8 | 0 | 1 | 0 | 1 | 0 | 0 | 0 | 1 | 0 | 0 | 1 | 0 | 0 | 0 | 1 | 0 | 0 | 0 | 0 | 1 | 0 |
| FREQ. | 4 | 2 | 0 | 2 | 4 | 0 | 0 | 2 | 1 | 2 | 2 | 1 | 2 | 1 | 2 | 4 | 4 | 0 | 0 | 2 | 4 |

FIG. 177B

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| M.R. | 1 | 0 | 0 | 1 | 0 | 1 | 0 | 0 | 0 | 0 | 0 | 0 | 0 | 0 | 0 | 0 | 0 | 0 | 0 | 0 | 1 | 0 | 0 |
| ROW 2 | 1 | 0 | 0 | 0 | 1 | 1 | 1 | 0 | 0 | 0 | 0 | 1 | 0 | 0 | 0 | 0 | 0 | 0 | 0 | 0 | 1 | 0 | 0 |
| ROW 3 | 1 | 0 | 0 | 0 | 0 | 0 | 0 | 1 | 0 | 0 | 0 | 0 | 0 | 0 | 1 | 1 | 0 | 0 | 0 | 0 | 1 | 0 | 0 |
| ROW 4 | 1 | 0 | 0 | 0 | 1 | 1 | 1 | 0 | 1 | 0 | 1 | 0 | 0 | 0 | 0 | 0 | 0 | 0 | 0 | 1 | 1 | 0 | 0 |
| ROW 5 | 1 | 0 | 0 | 0 | 0 | 0 | 1 | 0 | 0 | 0 | 0 | 0 | 0 | 0 | 0 | 0 | 0 | 0 | 0 | 0 | 1 | 0 | 0 |
| ROW 7 | 0 | 1 | 0 | 1 | 0 | 0 | 1 | 0 | 0 | 0 | 0 | 0 | 0 | 1 | 1 | 0 | 0 | 1 | 0 | 0 | 0 | 0 | 1 |
| ROW 8 | 0 | 1 | 0 | 0 | 0 | 0 | 0 | 0 | 0 | 1 | 1 | 0 | 1 | 0 | 1 | 0 | 0 | 1 | 1 | 0 | 0 | 0 | 1 |
| FREQ. | 4 | 2 | 0 | 2 | 1 | 2 | 4 | 1 | 1 | 1 | 2 | 1 | 1 | 1 | 3 | 1 | 0 | 2 | 1 | 1 | 4 | 0 | 2 |

FIG. 178

| POINT | ROW | ROW DISTANCE | NUMBER OF ROW MATCHES | ROW LENGTH |
|---|---|---|---|---|
| POINT 1 | 2 | 1 | 10 | 918 |
| POINT 2 | 3 | 2 | 10 | 918 |
| POINT 3 | 4 | 3 | 9 | 918 |
| POINT 4 | 5 | 2 | 11 | 918 |
| POINT 5 | 7 | 13 | 3 | 844 |
| POINT 6 | 8 | 13 | 3 | 844 |

FIG. 179

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 0.0294 | 0.217 | 0.171 |
| POINT 2 | 3 | 0.0588 | 0.217 | 0.171 |
| POINT 3 | 4 | 0.0882 | 0.196 | 0.171 |
| POINT 4 | 5 | 0.0588 | 0.239 | 0.171 |
| POINT 5 | 7 | 0.382 | 0.0652 | 0.157 |
| POINT 6 | 8 | 0.382 | 0.0652 | 0.157 |
| CENTER 1 | N/A | 0.382 | 0.0652 | 0.157 |
| CENTER 2 | N/A | 0.0587 | 0.217 | 0.171 |

| | CLUSTER CENTER DISTANCE TO CLUSTER 1 | CLUSTER CENTER DISTANCE TO CLUSTER 2 |
|---|---|---|
| POINT 1 | 0.385 | 0.0293 |
| POINT 2 | 0.358 | 0.000145 |
| POINT 3 | 0.322 | 0.367 |
| POINT 4 | 0.368 | 0.0216 |
| POINT 5 | 3.50E-05 | 0.358 |
| POINT 6 | 3.50E-05 | 0.358 |
| AVERAGE | 0.239 | 0.134 |

FIG. 180

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 2 | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 3 | 1 | 0 | 0 | 0 | 1 | 0 | 0 | 0 | 1 | 0 | 0 | 1 | 0 | 0 | 0 | 1 | 1 | 0 | 0 | 0 | 1 |
| ROW 4 | 1 | 0 | 0 | 0 | 1 | 0 | 0 | 0 | 0 | 1 | 0 | 0 | 1 | 0 | 0 | 1 | 1 | 0 | 0 | 0 | 1 |
| ROW 5 | 1 | 0 | 0 | 0 | 1 | 0 | 0 | 0 | 0 | 1 | 1 | 1 | 1 | 0 | 0 | 1 | 1 | 0 | 0 | 0 | 1 |
| FREQ. | 4 | 0 | 0 | 0 | 4 | 0 | 0 | 0 | 1 | 2 | 1 | 2 | 2 | 0 | 0 | 4 | 4 | 0 | 0 | 0 | 4 |

FIG. 181A

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| M.R. | 1 | 0 | 0 | 0 | 0 | 1 | 1 | 0 | 0 | 0 | 0 | 0 | 0 | 0 | 0 | 0 | 0 | 0 | 0 | 1 | 0 | 0 | 0 |
| ROW 2 | 1 | 0 | 0 | 0 | 0 | 1 | 1 | 0 | 0 | 0 | 0 | 0 | 0 | 0 | 0 | 0 | 0 | 0 | 0 | 1 | 0 | 0 | 0 |
| ROW 3 | 1 | 0 | 0 | 0 | 0 | 1 | 0 | 1 | 0 | 0 | 1 | 0 | 0 | 1 | 0 | 1 | 0 | 0 | 0 | 1 | 0 | 0 | 0 |
| ROW 4 | 1 | 0 | 0 | 0 | 0 | 1 | 1 | 0 | 1 | 0 | 0 | 1 | 0 | 0 | 1 | 0 | 0 | 0 | 0 | 1 | 0 | 0 | 0 |
| ROW 5 | 1 | 0 | 0 | 0 | 0 | 1 | 1 | 0 | 0 | 1 | 0 | 1 | 0 | 1 | 0 | 1 | 0 | 0 | 0 | 1 | 0 | 0 | 0 |
| FREQ. | 4 | 0 | 0 | 0 | 0 | 4 | 2 | 1 | 1 | 1 | 1 | 2 | 0 | 2 | 1 | 2 | 0 | 0 | 0 | 4 | 0 | 0 | 0 |

FIG. 181B

| POINT | ROW | ROW DISTANCE | NUMBER OF ROW MATCHES | ROW LENGTH |
|---|---|---|---|---|
| POINT 1 | 2 | 1 | 9 | 918 |
| POINT 2 | 3 | 1 | 9 | 918 |
| POINT 3 | 4 | 1 | 9 | 918 |
| POINT 4 | 5 | 3 | 9 | 918 |

FIG. 182

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 0.167 | 0.25 | 0.25 |
| POINT 2 | 3 | 0.167 | 0.25 | 0.25 |
| POINT 3 | 4 | 0.167 | 0.25 | 0.25 |
| POINT 4 | 5 | 0.5 | 0.25 | 0.25 |
| CENTER 1 | N/A | 0.167 | 0.25 | 0.25 |
| CENTER 2 | N/A | 0.5 | 0.25 | 0.25 |

FIG. 183

|  | CLUSTER CENTER DISTANCE TO CLUSTER 1 | CLUSTER CENTER DISTANCE TO CLUSTER 2 |
|---|---|---|
| POINT 1 | 0.333 | 0 |
| POINT 2 | 0.333 | 0 |
| POINT 3 | 0.333 | 0 |
| POINT 4 | 0 | 0333 |
| AVERAGE | 0.25 | 0.0833 |

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 2 | 1 | 0 | 0 | 0 | 1 | 0 | 0 | 0 | 0 | 0 | 0 | 1 | 0 | 0 | 0 | 1 | 1 | 0 | 0 | 0 | 1 |
| ROW 5 | 1 | 0 | 0 | 0 | 1 | 0 | 0 | 0 | 0 | 0 | 1 | 1 | 1 | 0 | 0 | 1 | 1 | 0 | 0 | 0 | 1 |
| FREQ. | 2 | 0 | 0 | 0 | 2 | 0 | 0 | 0 | 0 | 0 | 1 | 2 | 1 | 0 | 0 | 2 | 2 | 0 | 0 | 0 | 2 |

FIG. 185B

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| M.R. | 1 | 0 | 0 | 1 | 0 | 1 | 1 | 1 | 0 | 0 | 0 | 1 | 0 | 0 | 0 | 0 | 0 | 0 | 0 | 1 | 0 | 0 | 0 |
| ROW 2 | 1 | 0 | 0 | 1 | 0 | 1 | 1 | 0 | 0 | 0 | 0 | 1 | 1 | 0 | 1 | 0 | 0 | 0 | 0 | 0 | 1 | 0 | 0 |
| ROW 5 | 1 | 0 | 0 | 1 | 0 | 1 | 1 | 0 | 0 | 0 | 1 | 1 | 1 | 0 | 1 | 0 | 0 | 0 | 0 | 0 | 1 | 0 | 0 |
| FREQ. | 2 | 0 | 0 | 2 | 0 | 2 | 2 | 0 | 0 | 0 | 1 | 2 | 2 | 0 | 2 | 0 | 0 | 0 | 0 | 0 | 2 | 0 | 0 |

FIG. 186

| POINT | ROW | ROW DISTANCE | NUMBER OF ROW MATCHES | ROW LENGTH |
|---|---|---|---|---|
| POINT 1 | 2 | 0 | 12 | 918 |
| POINT 2 | 5 | 2 | 12 | 918 |

FIG. 187

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 0 | 0.5 | 0.5 |
| POINT 2 | 5 | 1 | 0.5 | 0.5 |
| CENTER 1 | N/A | 1.21E-53 | 0.5 | 0.5 |
| CENTER 2 | N/A | 1 | 0.5 | 0.5 |

FIG. 188

| | CLUSTER CENTER DISTANCE TO CLUSTER 1 | CLUSTER CENTER DISTANCE TO CLUSTER 2 |
|---|---|---|
| POINT 1 | 1.21E-53 | 1 |
| POINT 2 | 1 | 0 |
| AVERAGE | 0.5 | 0.5 |

FIG. 189A

| | $A\alpha$ | $B\alpha$ | $C\alpha$ | $D\alpha$ | $E\alpha$ | $F\alpha$ | $G\alpha$ | $H\alpha$ | $I\alpha$ | $J\alpha$ | $K\alpha$ | $L\alpha$ | $M\alpha$ | $N\alpha$ | $O\alpha$ | $P\alpha$ | $Q\alpha$ | $R\alpha$ | $S\alpha$ | $T\alpha$ | $U\alpha$ |
|---|---|---|---|---|---|---|---|---|---|---|---|---|---|---|---|---|---|---|---|---|---|
| M.R. | 0 | 1 | 0 | 0 | 1 | 0 | 0 | 1 | 0 | 0 | 0 | 1 | 1 | 0 | 1 | 0 | 0 | 0 | 0 | 1 | 0 |
| ROW 5 | 1 | 0 | 0 | 1 | 0 | 0 | 0 | 0 | 1 | 1 | 1 | 1 | 0 | 0 | 0 | 1 | 1 | 0 | 0 | 0 | 1 |
| ROW 7 | 0 | 1 | 0 | 0 | 0 | 0 | 0 | 1 | 0 | 0 | 0 | 1 | 0 | 0 | 1 | 0 | 0 | 0 | 1 | 1 | 0 |
| ROW 8 | 0 | 0 | 0 | 0 | 1 | 0 | 0 | 0 | 0 | 0 | 0 | 0 | 0 | 1 | 0 | 0 | 0 | 0 | 0 | 0 | 0 |
| FREQ. | 1 | 2 | 0 | 1 | 2 | 0 | 0 | 2 | 1 | 1 | 1 | 3 | 1 | 1 | 2 | 1 | 1 | 0 | 1 | 2 | 1 |

FIG. 189B

| | $A\beta$ | $B\beta$ | $C\beta$ | $D\beta$ | $E\beta$ | $F\beta$ | $G\beta$ | $H\beta$ | $I\beta$ | $J\beta$ | $K\beta$ | $L\beta$ | $M\beta$ | $N\beta$ | $O\beta$ | $P\beta$ | $Q\beta$ | $R\beta$ | $S\beta$ | $T\beta$ | $U\beta$ | $V\beta$ | $W\beta$ |
|---|---|---|---|---|---|---|---|---|---|---|---|---|---|---|---|---|---|---|---|---|---|---|---|
| M.R. | 0 | 1 | 0 | 1 | 0 | 1 | 0 | 0 | 0 | 0 | 1 | 1 | 0 | 0 | 1 | 0 | 0 | 1 | 0 | 0 | 0 | 0 | 1 |
| ROW 5 | 1 | 0 | 1 | 0 | 0 | 1 | 1 | 0 | 0 | 0 | 1 | 1 | 0 | 1 | 0 | 0 | 0 | 0 | 0 | 1 | 1 | 0 | 0 |
| ROW 7 | 0 | 1 | 0 | 1 | 0 | 0 | 0 | 0 | 1 | 0 | 0 | 1 | 0 | 1 | 1 | 0 | 0 | 1 | 0 | 0 | 0 | 0 | 1 |
| ROW 8 | 0 | 1 | 0 | 1 | 0 | 0 | 0 | 0 | 1 | 0 | 0 | 0 | 0 | 1 | 0 | 0 | 0 | 0 | 1 | 0 | 0 | 0 | 0 |
| FREQ. | 1 | 2 | 0 | 3 | 0 | 1 | 1 | 0 | 3 | 1 | 0 | 3 | 0 | 3 | 1 | 0 | 0 | 2 | 1 | 0 | 1 | 0 | 2 |

FIG. 190

| POINT | ROW | ROW DISTANCE | NUMBER OF ROW MATCHES | ROW LENGTH |
|---|---|---|---|---|
| POINT 1 | 5 | 15 | 4 | 918 |
| POINT 2 | 7 | 0 | 12 | 844 |
| POINT 3 | 8 | 0 | 12 | 844 |

FIG. 191

| POINT | ROW | NORMALIZED ROW DISTANCE | NORMALIZED NO. OF ROW MATCHES | NORMALIZED ROW LENGTH |
|---|---|---|---|---|
| POINT 1 | 5 | 1 | 0.143 | 0.352 |
| POINT 2 | 7 | 0 | 0.429 | 0.324 |
| POINT 3 | 8 | 0 | 0.429 | 0.324 |
| CENTER 1 | N/A | 1.13E-22 | 0.429 | 0.324 |
| CENTER 2 | N/A | 1 | 0.143 | 0.352 |

FIG. 192

|  | CLUSTER CENTER DISTANCE TO CLUSTER 1 | CLUSTER CENTER DISTANCE TO CLUSTER 2 |
|---|---|---|
| POINT 1 | 1.04 | 0 |
| POINT 2 | 1.13E-22 | 1.04 |
| POINT 3 | 1.13E-22 | 1.04 |
| AVERAGE | 0.347 | 0.694 |

FIG. 193A

|  | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 0 | 0 | 1 | 0 | 1 | 1 | 0 | 0 | 0 | 0 | 1 | 0 | 0 | 0 | 1 | 0 | 0 | 0 | 0 | 1 |
| ROW 2 | 1 | 0 | 0 | 0 | 0 | 1 | 0 | 0 | 0 | 0 | 0 | 1 | 0 | 0 | 0 | 1 | 0 | 0 | 0 | 0 | 1 |
| ROW 5 | 1 | 0 | 0 | 0 | 0 | 1 | 0 | 0 | 1 | 1 | 0 | 1 | 1 | 1 | 0 | 1 | 1 | 0 | 0 | 0 | 1 |
| FREQ. | 2 | 0 | 0 | 0 | 0 | 2 | 0 | 0 | 1 | 1 | 0 | 2 | 1 | 1 | 0 | 2 | 1 | 0 | 0 | 0 | 2 |

FIG. 193B

|  | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| M.R. | 1 | 0 | 0 | 1 | 0 | 1 | 1 | 0 | 0 | 0 | 0 | 1 | 0 | 0 | 0 | 0 | 0 | 0 | 0 | 1 | 0 | 0 | 0 |
| ROW 2 | 1 | 0 | 0 | 0 | 0 | 1 | 0 | 0 | 0 | 0 | 0 | 1 | 0 | 0 | 0 | 0 | 0 | 0 | 0 | 1 | 0 | 0 | 0 |
| ROW 5 | 1 | 0 | 0 | 0 | 0 | 1 | 0 | 0 | 0 | 0 | 0 | 1 | 0 | 1 | 1 | 0 | 0 | 0 | 0 | 1 | 2 | 0 | 0 |
| FREQ. | 2 | 0 | 0 | 0 | 0 | 2 | 0 | 0 | 0 | 0 | 0 | 2 | 0 | 1 | 1 | 0 | 0 | 0 | 0 | 2 | 2 | 0 | 0 |

| POINT | ROW | ROW DISTANCE | NUMBER OF ROW MATCHES | ROW LENGTH |
|---|---|---|---|---|
| POINT 1 | 2 | 0 | 12 | 918 |
| POINT 2 | 5 | 2 | 12 | 918 |

FIG. 194

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 0 | 0.5 | 0.5 |
| POINT 2 | 5 | 1 | 0.5 | 0.5 |
| CENTER 1 | N/A | 1.21E-53 | 0.5 | 0.5 |
| CENTER 2 | N/A | 1 | 0.5 | 0.5 |

FIG. 195

| | CLUSTER CENTER DISTANCE TO CLUSTER 1 | CLUSTER CENTER DISTANCE TO CLUSTER 2 |
|---|---|---|
| POINT 1 | 1.21E-53 | 1 |
| POINT 2 | 1 | 0 |
| AVERAGE | 0.5 | 0.5 |

FIG. 196

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 0 | 1 | 1 | 0 | 0 | 0 | 0 | 0 | 0 | 0 | 0 | 1 | 0 | 0 | 0 | 0 | 0 | 0 | 0 | 0 | 0 |
| ROW 3 | 1 | 0 | 0 | 0 | 1 | 0 | 0 | 0 | 0 | 1 | 0 | 0 | 0 | 0 | 0 | 1 | 1 | 0 | 0 | 0 | 1 |
| ROW 5 | 1 | 0 | 0 | 0 | 1 | 0 | 0 | 0 | 0 | 1 | 0 | 1 | 1 | 0 | 0 | 1 | 1 | 0 | 0 | 0 | 1 |
| ROW 7 | 0 | 1 | 0 | 1 | 0 | 0 | 0 | 1 | 0 | 0 | 0 | 0 | 0 | 1 | 1 | 0 | 0 | 0 | 0 | 1 | 0 |
| ROW 8 | 0 | 1 | 0 | 1 | 0 | 0 | 0 | 1 | 0 | 0 | 0 | 0 | 0 | 0 | 1 | 0 | 0 | 0 | 0 | 1 | 0 |
| FREQ. | 2 | 2 | 0 | 2 | 2 | 0 | 0 | 2 | 0 | 2 | 0 | 2 | 1 | 1 | 2 | 2 | 2 | 0 | 0 | 2 | 2 |

FIG. 197A

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| ROW 3 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| ROW 5 | 1 | 0 | 0 | 0 | 1 | 0 | 1 | 1 | 0 | 0 | 1 | 0 | 0 | 0 | 1 | 0 | 0 | 0 | 0 | 0 | 0 | 0 | 0 |
| ROW 7 | 1 | 0 | 0 | 0 | 0 | 1 | 1 | 0 | 0 | 1 | 0 | 1 | 0 | 0 | 1 | 0 | 0 | 0 | 0 | 0 | 1 | 0 | 0 |
| ROW 8 | 0 | 1 | 0 | 1 | 0 | 0 | 0 | 0 | 0 | 0 | 1 | 0 | 0 | 1 | 1 | 0 | 0 | 0 | 1 | 1 | 0 | 0 | 1 |
| FREQ. | 2 | 2 | 0 | 4 | 0 | 2 | 1 | 0 | 0 | 1 | 3 | 1 | 0 | 4 | 0 | 0 | 0 | 0 | 2 | 0 | 2 | 0 | 2 |

FIG. 197B

| POINT | ROW | ROW DISTANCE | NUMBER OF ROW MATCHES | ROW LENGTH |
|---|---|---|---|---|
| POINT 1 | 3 | 8 | 2 | 918 |
| POINT 2 | 5 | 7 | 4 | 918 |
| POINT 3 | 7 | 5 | 4 | 844 |
| POINT 4 | 8 | 5 | 4 | 844 |

FIG. 198

| POINT | ROW | NORMALIZED ROW DISTANCE | NORMALIZED NO. OF ROW MATCHES | NORMALIZED ROW LENGTH |
|---|---|---|---|---|
| POINT 1 | 3 | 0.32 | 0.143 | 0.26 |
| POINT 2 | 5 | 0.28 | 0.286 | 0.26 |
| POINT 3 | 7 | 0.2 | 0.286 | 0.24 |
| POINT 4 | 8 | 0.2 | 0.286 | 0.24 |
| CENTER 1 | N/A | 0.222 | 0.286 | 0.245 |
| CENTER 2 | N/A | 0.319 | 0.146 | 0.26 |

|  | CLUSTER CENTER DISTANCE TO CLUSTER 1 | CLUSTER CENTER DISTANCE TO CLUSTER 2 |
|---|---|---|
| POINT 1 | 0.174 | 0.00316 |
| POINT 2 | 0.0601 | 0.145 |
| POINT 3 | 0.0226 | 0.185 |
| POINT 4 | 0.0226 | 0.185 |
| AVERAGE | 0.0698 | 0.13 |

FIG. 201A

| M.R. | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| ROW 7 | 0 | 1 | 0 | 1 | 0 | 0 | 0 | 1 | 0 | 0 | 0 | 1 | 0 | 0 | 1 | 0 | 0 | 0 | 0 | 1 | 0 |
| ROW 8 | 0 | 1 | 0 | 1 | 0 | 0 | 0 | 1 | 0 | 0 | 0 | 1 | 0 | 0 | 1 | 0 | 0 | 0 | 0 | 1 | 0 |
| FREQ. | 0 | 2 | 0 | 2 | 0 | 0 | 0 | 2 | 0 | 0 | 0 | 2 | 0 | 0 | 2 | 0 | 0 | 0 | 0 | 2 | 0 |

FIG. 201B

| M.R. | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| ROW 7 | 0 | 1 | 0 | 1 | 0 | 0 | 0 | 0 | 0 | 0 | 1 | 0 | 0 | 0 | 1 | 0 | 0 | 1 | 0 | 0 | 0 | 0 | 1 |
| ROW 8 | 0 | 1 | 0 | 1 | 0 | 0 | 0 | 0 | 0 | 0 | 1 | 0 | 0 | 0 | 1 | 0 | 0 | 1 | 0 | 0 | 0 | 0 | 1 |
| FREQ. | 0 | 2 | 0 | 2 | 0 | 0 | 0 | 0 | 0 | 0 | 2 | 0 | 0 | 0 | 2 | 0 | 0 | 2 | 0 | 0 | 0 | 0 | 2 |

FIG. 202

| POINT | ROW | ROW DISTANCE | NUMBER OF ROW MATCHES | ROW LENGTH |
|---|---|---|---|---|
| POINT 1 | 7 | 0 | 12 | 844 |
| POINT 2 | 8 | 0 | 12 | 844 |

| POINT | ROW | NORMALIZED ROW DISTANCE | NORMALIZED NO. OF ROW MATCHES | NORMALIZED ROW LENGTH |
|---|---|---|---|---|
| POINT 1 | 7 | 0 | 0.5 | 0.5 |
| POINT 2 | 8 | 0 | 0.5 | 0.5 |
| CENTER 1 | N/A | 0 | 0.5 | 0.5 |
| CENTER 2 | N/A | 0 | 0.5 | 0.5 |

FIG. 203

| | CLUSTER CENTER DISTANCE TO CLUSTER 1 | CLUSTER CENTER DISTANCE TO CLUSTER 2 |
|---|---|---|
| POINT 1 | 0 | 0 |
| POINT 2 | 0 | 0 |
| AVERAGE | 0 | 0 |

FIG. 204

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 1 | 1 | 1 | 1 | 1 | 0 | 0 | 0 | 0 | 0 | 0 | 0 | 0 | 0 | 0 | 1 | 1 | 0 | 0 | 0 | 1 |
| ROW 2 | 1 | 0 | 0 | 0 | 1 | 0 | 0 | 0 | 0 | 0 | 0 | 0 | 0 | 0 | 0 | 1 | 1 | 0 | 0 | 0 | 1 |
| ROW 3 | 1 | 0 | 0 | 0 | 1 | 0 | 0 | 0 | 1 | 0 | 0 | 1 | 0 | 0 | 0 | 1 | 1 | 0 | 0 | 0 | 1 |
| ROW 4 | 1 | 0 | 0 | 0 | 1 | 0 | 0 | 0 | 0 | 1 | 0 | 0 | 1 | 0 | 0 | 1 | 1 | 0 | 0 | 0 | 1 |
| ROW 5 | 1 | 0 | 0 | 0 | 1 | 0 | 0 | 0 | 0 | 0 | 0 | 1 | 1 | 0 | 0 | 1 | 1 | 0 | 0 | 0 | 1 |
| FREQ. | 4 | 0 | 0 | 0 | 4 | 0 | 0 | 0 | 1 | 2 | 0 | 2 | 2 | 0 | 0 | 4 | 4 | 0 | 0 | 0 | 4 |

FIG. 205A

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| M.R. | 1 | 0 | 0 | 1 | 0 | 1 | 0 | 0 | 0 | 0 | 0 | 0 | 0 | 0 | 0 | 0 | 0 | 0 | 0 | 1 | 0 | 0 | 0 |
| ROW 2 | 1 | 0 | 0 | 1 | 0 | 1 | 1 | 0 | 0 | 0 | 1 | 0 | 0 | 0 | 0 | 0 | 0 | 0 | 0 | 1 | 0 | 0 | 0 |
| ROW 3 | 1 | 0 | 0 | 1 | 0 | 1 | 0 | 0 | 0 | 0 | 0 | 0 | 0 | 1 | 0 | 0 | 0 | 0 | 0 | 1 | 0 | 0 | 0 |
| ROW 4 | 1 | 0 | 0 | 1 | 0 | 1 | 0 | 1 | 0 | 1 | 0 | 0 | 0 | 0 | 1 | 0 | 0 | 0 | 0 | 1 | 0 | 0 | 0 |
| ROW 5 | 1 | 0 | 0 | 1 | 0 | 1 | 1 | 0 | 1 | 0 | 1 | 1 | 2 | 0 | 0 | 1 | 0 | 0 | 0 | 0 | 0 | 0 | 0 |
| FREQ. | 4 | 0 | 0 | 4 | 0 | 4 | 2 | 1 | 1 | 1 | 2 | 1 | 2 | 1 | 1 | 1 | 0 | 0 | 0 | 4 | 0 | 0 | 0 |

FIG. 205B

| POINT | ROW | ROW DISTANCE | NUMBER OF ROW MATCHES | ROW LENGTH |
|---|---|---|---|---|
| POINT 1 | 2 | 1 | 9 | 918 |
| POINT 2 | 3 | 1 | 9 | 918 |
| POINT 3 | 4 | 1 | 9 | 918 |
| POINT 4 | 5 | 3 | 9 | 918 |

FIG. 206

| POINT | ROW | NORMALIZED ROW DISTANCE | NORMALIZED NO. OF ROW MATCHES | NORMALIZED ROW LENGTH |
|---|---|---|---|---|
| POINT 1 | 2 | 0.167 | 0.25 | 0.25 |
| POINT 2 | 3 | 0.167 | 0.25 | 0.25 |
| POINT 3 | 4 | 0.167 | 0.25 | 0.25 |
| POINT 4 | 5 | 0.5 | 0.25 | 0.25 |
| CENTER 1 | N/A | 0.5 | 0.25 | 0.25 |
| CENTER 2 | N/A | 0.167 | 0.25 | 0.25 |

FIG. 207

| | Cluster Center Distance to Cluster 1 | Cluster Center Distance to Cluster 2 |
|---|---|---|
| POINT 1 | 0.333 | 0 |
| POINT 2 | 0.333 | 0 |
| POINT 3 | 0.333 | 0 |
| POINT 4 | 0 | 0.333 |
| AVERAGE | 0.25 | 0.0833 |

FIG. 208

| | Aα | Bα | Cα | Dα | Eα | Fα | Gα | Hα | Iα | Jα | Kα | Lα | Mα | Nα | Oα | Pα | Qα | Rα | Sα | Tα | Uα |
|---|---|---|---|---|---|---|---|---|---|---|---|---|---|---|---|---|---|---|---|---|---|
| M.R. | 0 | 1 | 0 | 1 | 0 | 0 | 0 | 0 | 0 | 0 | 0 | 1 | 0 | 0 | 0 | 1 | 0 | 0 | 0 | 1 | 0 |
| ROW 7 | 0 | 1 | 0 | 1 | 0 | 0 | 0 | 1 | 0 | 0 | 0 | 0 | 1 | 0 | 1 | 0 | 0 | 0 | 0 | 1 | 0 |
| ROW 8 | 0 | 1 | 0 | 1 | 0 | 0 | 0 | 0 | 0 | 0 | 0 | 1 | 0 | 0 | 1 | 0 | 0 | 0 | 0 | 1 | 0 |
| FREQ. | 0 | 2 | 0 | 2 | 0 | 0 | 0 | 1 | 0 | 0 | 0 | 2 | 1 | 0 | 2 | 1 | 0 | 0 | 0 | 2 | 0 |

FIG. 209A

| | Aβ | Bβ | Cβ | Dβ | Eβ | Fβ | Gβ | Hβ | Iβ | Jβ | Kβ | Lβ | Mβ | Nβ | Oβ | Pβ | Qβ | Rβ | Sβ | Tβ | Uβ | Vβ | Wβ |
|---|---|---|---|---|---|---|---|---|---|---|---|---|---|---|---|---|---|---|---|---|---|---|---|
| M.R. | 0 | 1 | 0 | 1 | 0 | 0 | 0 | 0 | 0 | 0 | 0 | 1 | 0 | 0 | 0 | 1 | 0 | 0 | 0 | 0 | 0 | 0 | 1 |
| ROW 7 | 0 | 1 | 0 | 1 | 0 | 0 | 0 | 0 | 0 | 0 | 0 | 0 | 1 | 0 | 1 | 0 | 0 | 1 | 0 | 1 | 0 | 0 | 1 |
| ROW 8 | 0 | 1 | 0 | 1 | 0 | 0 | 0 | 0 | 0 | 0 | 0 | 1 | 0 | 0 | 1 | 0 | 0 | 0 | 0 | 1 | 0 | 0 | 1 |
| FREQ. | 0 | 2 | 0 | 2 | 0 | 0 | 0 | 0 | 0 | 0 | 0 | 2 | 1 | 0 | 2 | 1 | 0 | 1 | 0 | 2 | 0 | 0 | 2 |

FIG. 209B

| POINT | ROW | ROW DISTANCE | NUMBER OF ROW MATCHES | ROW LENGTH |
|---|---|---|---|---|
| POINT 1 | 7 | 0 | 12 | 844 |
| POINT 2 | 8 | 0 | 12 | 844 |

FIG. 210

| POINT | ROW | NORMALIZED ROW DISTANCE | NORMALIZED NO. OF ROW MATCHES | NORMALIZED ROW LENGTH |
|---|---|---|---|---|
| POINT 1 | 7 | 0 | 0.5 | 0.5 |
| POINT 2 | 8 | 0 | 0.5 | 0.5 |
| CENTER 1 | N/A | 0 | 0.5 | 0.5 |
| CENTER 2 | N/A | 0 | 0.5 | 0.5 |

FIG. 211

| | CLUSTER CENTER DISTANCE TO CLUSTER 1 | CLUSTER CENTER DISTANCE TO CLUSTER 2 |
|---|---|---|
| POINT 1 | 0 | 0 |
| POINT 2 | 0 | 0 |
| AVERAGE | 0 | 0 |

FIG. 212

| COLUMN | FREQUENCY | NORMALIZED FREQUENCY | AVERAGE MATCHES | MASTER ROW LENGTH | AVERAGE DISTANCE | CONFIDENCE FACTOR |
|---|---|---|---|---|---|---|
| Aα-1/Aα-2 | 4 | 0.5 | 9 | 9 | 1.5 | 3 |
| Bα-1/Bα-2 | 2 | 0.25 | 12 | 12 | 0 | 1.00E+06 |
| Dα-1/Dα-2 | 2 | 0.25 | 12 | 12 | 0 | 1.00E+06 |
| Eα-1/Eα-2 | 3 | 0.375 | 9 | 9 | 1 | 3.38 |
| Hα-1/Hα-2 | 2 | 0.25 | 12 | 12 | 0 | 1.00E+06 |
| Jα-1/Jα-2 | 1 | 0.125 | 11 | 11 | 0 | 1.00E+06 |
| Lα-1/Lα-2 | 3 | 0.375 | 4 | 4 | 5.67 | 0.265 |
| Oα-1/Oα-2 | 2 | 0.25 | 12 | 12 | 0 | 1.00E+06 |
| Pα-1/Pα-2 | 3 | 0.375 | 9 | 9 | 1 | 3.38 |
| Qα-1/Qα-2 | 3 | 0.375 | 9 | 9 | 1 | 3.38 |
| Tα-1/Tα-2 | 2 | 0.25 | 12 | 12 | 0 | 1.00E+06 |
| Uα-1/Uα-1 | 3 | 0.375 | 9 | 9 | 1 | 3.38 |
| Aβ-1Aβ-2 | 4 | 0.5 | 9 | 9 | 1.5 | 3 |
| Bβ-1/Bβ-2 | 2 | 0.25 | 12 | 12 | 0 | 1.00E+06 |
| Dβ-1/Dβ-2 | 4 | 0.5 | 10 | 11 | 2 | 2.5 |
| Fβ-1/Fβ-2 | 3 | 0.375 | 9 | 9 | 1 | 3.38 |
| Gβ-1/Gβ-2 | 1 | 0.125 | 12 | 12 | 0 | 1.00E+06 |
| Kβ-1/Kβ-2 | 2 | 0.25 | 12 | 12 | 0 | 1.00E+06 |
| Lβ-1/Lβ-2 | 1 | 0.125 | 12 | 12 | 0 | 1.00E+06 |
| Oβ-1/Oβ-2 | 3 | 0.375 | 4 | 4 | 5.67 | 0.265 |
| Sβ-1/Sβ-2 | 2 | 0.25 | 12 | 12 | 0 | 1.00E+06 |
| Uβ-1/Uβ-2 | 3 | 0.375 | 9 | 9 | 1 | 3.38 |
| Wβ-1/Wβ-2 | 2 | 0.25 | 12 | 12 | 0 | 1.00E+06 |

FIG. 213

| ROW | CF | CF | CF | CF | CF | CF | CF | CF | CF | BEST CF |
|---|---|---|---|---|---|---|---|---|---|---|
| 1 | Fα=0 | Mβ=0 | Qβ=0 | Tβ=0 | | | | | | 0 |
| 2 | Aα=3 | Eα=3.38 | Pα=3.38 | Qα=3.38 | Uα=3.38 | Aβ=3 | Dβ=2.5 | Fβ=3.38 | Uβ=3.38 | 3.38 |
| 3 | Aα=3 | Eα=3.38 | Jα=0 | Pα=3.38 | Qα=3.38 | Uα=3.38 | Aβ=3 | Dβ=2.5 | Fβ=3.38 | Uβ=3.38 | 3.38 |
| 4 | Aα=3 | Eα=3.38 | Iα=0 | Pα=3.38 | Qα=3.38 | Uα=3.38 | Aβ=3 | Dβ=2.5 | Fβ=3.38 | Uβ=3.38 | 3.38 |
| 5 | Aα=3 | Mα=0 | Aβ=3 | Dβ=2.5 | Oβ=.265 | | | | | 3 |
| 6 | Cα=Gα=Kα=Nα=Rα=Sα=Cβ=Eβ=Iβ=Nβ=Rβ=Vβ=0 | | | | | | | | | 0 |
| 7 | Bα=1E+6 | Dα=1E+6 | Hα=1E+6 | Lα=.265 | Oα=1E+6 | Tα=1E+6 | Bβ=1E+6 | Kβ=1E+6 | Oβ=.265 | Sβ=1E+6 | Wβ=1E+6 | 1E+6 |
| 8 | Bα=1E+6 | Dα=1E+6 | Hα=1E+6 | Lα=.265 | Oα=1E+6 | Tα=1E+6 | Bβ=1E+6 | Kβ=1E+6 | Oβ=.265 | Sβ=1E+6 | Wβ=1E+6 | 1E+6 |

AUTOMATIC FORMS PROCESSING SYSTEMS AND METHODS

RELATED APPLICATIONS

This application is a continuation of U.S. patent application Ser. No. 12/431,528, entitled Automatic Forms Processing Systems and Methods, filed on Apr. 28, 2009, and is related to co-pending, co-owned U.S. patent application Ser. No. 12/431,536, entitled Automatic Forms Processing Systems and Methods, filed on Apr. 28, 2009, U.S. patent application Ser. No. 12/500,477, entitled Automatic Forms Processing Systems and Methods, filed on Jul. 9, 2009, and U.S. patent application Ser. No. 12/625,338, entitled Automatic Forms Processing Systems and Methods, filed on Nov. 24, 2009, the entire contents of which are incorporated herein by reference.

FEDERALLY SPONSORED RESEARCH OR DEVELOPMENT

Not Applicable.

COMPACT DISK APPENDIX

Not Applicable.

BACKGROUND

Many different types of forms are used in businesses and governmental entities, including educational institutions. Forms include transcripts, invoices, business forms, and other types of forms. Forms generally are classified by their content, including structured forms, semi-structured forms, and non-structured forms. For each classification, forms can be further divided into groups, including frame-based forms, white space-based forms, and forms having a mix of frames and white space. The forms include characters, such as alphabetic characters, numbers, symbols, punctuation marks, words, graphic characters or graphics, and/or other characters. Text is one example of one or more characters.

Automated processes attempt to identify the type of form and/or to identify the form's content. For example, one conventional process performs an optical character recognition (OCR) on an entire page of a document and attempts to identify text on the page. However, this process, when used alone, is time consuming and processor intensive. In another conventional approach, image registration compares the actual images from two forms. In this approach, the process starts with a blank document and compares it to a document having text to identify the differences between the two documents. Image registration requires a significant amount of storage and processing power since the images typically are stored in large files.

These approaches are ineffective when used alone, are time consuming, and require a large amount of processing power. Moreover, some of the processes require knowing the location of data prior to processing documents. Therefore, improved systems and methods are needed to automatically process documents.

SUMMARY

Systems and methods analyze the physical structure of text rows in a document image, including the positions of one or more alignments of one or more character blocks in one or more text rows of the document image. The systems and methods determine one or more groups of text rows that are placed into a class based on the structures of the text rows, such as the positions of the one or more alignments of the one or more character blocks in each text row.

In one aspect, a system processes at least one document image comprising a plurality of text rows and a plurality of characters. Each text row has at least one character. The system includes a processor and a plurality of modules to execute on the processor. The modules include a character block creator and a classification system. The character block creator creates character blocks for the characters in the text rows and determines positions of alignments of the character blocks. The classification system includes a subsets module, an optimum set module, a division module, and a classifier module.

The subsets module determines columns for the alignments of the character blocks at the positions of the alignments, where each text row has a physical structure defined by the columns of the alignments of the character blocks in that text row. The subsets module also determines an initial subset of rows for each column. The optimum set module determines an optimum set of columns for each initial subset of rows.

The division module determines a final subset of rows for each initial subset of rows. Each final subset of rows includes at least one text row of a corresponding initial subset of rows having physical structures most similar to a corresponding optimum set when compared to physical structures of all text rows in the corresponding initial subset of rows. The division module also determines a confidence factor for each final subset of rows and determines a best confidence factor for each particular text row in the at least one document image. The classifier module creates at least one class of text rows, the at least one class including at least one particular text row having a same best confidence factor.

In another aspect, a system processes at least one document image comprising a plurality of text rows and a plurality of characters. Each text row has at least one character. The system includes a processor and plurality of modules to execute on the processor. The modules include a character block creator and a classification system. The character block creator creates character blocks for the characters in the text rows and determines positions of alignments for the character blocks. The classification system includes a subsets module, an optimum set module, a division module, and a classifier module.

The subsets module determines columns for the alignments of the character blocks at the positions of the alignments, where each text row has a physical structure defined by the columns of the alignments of the character blocks in that text row. The subsets module also determines an initial subset of rows for each column. Each initial subset of rows includes one or more of the text rows of the at least one document image having at least one alignment of at least one character block in a selected column. Each initial subset of rows also has a set of columns that includes the selected column and other columns in the one or more text rows of a corresponding initial subset of rows in which the selected column is present.

The optimum set module determines an optimum set of columns for each initial subset of rows by generating a histogram of column frequencies of the set of columns in the corresponding initial subset of rows, determining a threshold of the column frequencies for the corresponding initial subset of rows, and selecting particular columns having the column frequency above the threshold to be included in a corresponding optimum set. Each column frequency includes a number of times a particular column occurs in the corresponding initial subset of rows.

The division module determines a final subset of rows for each initial subset of rows. Each final subset of rows includes at least one text row of the corresponding initial subset of rows having physical structures most similar to the corresponding optimum set when compared to physical structures of all text rows in the corresponding initial subset of rows. The division module also determines a confidence factor for each final subset of rows and determines a best confidence factor for each particular text row in the at least one document image. The classifier module creates at least one class of text rows, the at least one class including at least one particular text row having a same best confidence factor.

In yet another aspect, a computer readable medium is encoded with a system to process at least one document image comprising a plurality of text rows and a plurality of characters. Each text row has at least one character. The system comprises a plurality of modules to execute on at least one processor. The modules include a character block creator and a classification system. The character block creator creates character blocks for the characters in the text rows and determines positions of alignments for the character blocks. The classification system includes a subsets module, an optimum set module, a division module, and a classifier module.

The subsets module determines columns for the alignments of the character blocks at the positions of the alignments. Each text row has a physical structure defined by the columns of the alignments of the character blocks in that text row. The subsets module also determines an initial subset of rows for each column. The optimum set module determines an optimum set of columns for each initial subset of rows.

The division module determines a final subset of rows for each initial subset of rows. Each final subset of rows includes at least one text row of a corresponding initial subset of rows having physical structures most similar to a corresponding optimum set when compared to physical structures of all text rows in the corresponding initial subset of rows. The division module also determines a confidence factor for each final subset of rows and determines a best confidence factor for each particular text row in the at least one document image. The classifier module creates at least one class of text rows, the at least one class including at least one particular text row having a same best confidence factor.

In one aspect, a computer readable medium is encoded with a system to process at least one document image comprising a plurality of text rows and a plurality of characters. Each text row has at least one character. The system comprises a plurality of modules to execute on at least one processor. The modules include a character block creator and a classification system. The modules include a character block creator and a classification system. The character block creator creates character blocks for the characters in the text rows and determines positions of alignments for the character blocks. The classification system includes a subsets module, an optimum set module, a division module, and a classifier module.

The subsets module determines columns for the alignments of the character blocks at the positions of the alignments. Each text row has a physical structure defined by the columns of the alignments of the character blocks in that text row. The subsets module also determines an initial subset of rows for each column. Each initial subset of rows includes one or more of the text rows of the at least one document image having at least one alignment of at least one character block in a selected column. Each initial subset of rows also has a set of columns that includes the selected column and other columns in the one or more text rows of a corresponding initial subset of rows in which the selected column is present.

The optimum set module determines an optimum set of columns for each initial subset of rows by generating a histogram of column frequencies of the set of columns in the corresponding initial subset of rows, determining a threshold of the column frequencies for the corresponding initial subset of rows, and selecting particular columns having the column frequency above the threshold to be included in a corresponding optimum set. Each column frequency includes a number of times a particular column occurs in the corresponding initial subset of row.

The division module determines a final subset of rows for each initial subset of rows. Each final subset of rows includes at least one text row of the corresponding initial subset of rows having physical structures most similar to the corresponding optimum set when compared to physical structures of all text rows in the corresponding initial subset of rows. The division module determines a confidence factor for each final subset of rows and determines a best confidence factor for each particular text row in the at least one document image. The classifier module creates at least one class of text rows, the at least one class including at least one particular text row having a same best confidence factor.

In another aspect, a computer readable medium is encoded with instructions that, when executed by at least one processor, process at least one document image. The at least one document image includes a plurality of text rows and a plurality of characters. Each text row has at least one character. The instructions perform operations that include creating character blocks for the characters in the text rows and determining positions of alignments of the character blocks.

The operations include determining columns for the alignments of the character blocks at the positions of the alignment and determining an initial subset of rows for each column. Each text row has a physical structure defined by the columns of the alignments of the character blocks in that text row. The operations also include determining an optimum set of columns for each initial subset of rows and determining a final subset of rows for each initial subset of rows. Each final subset of rows includes at least one text row of a corresponding initial subset of rows having physical structures most similar to a corresponding optimum set when compared to physical structures of all text rows in the corresponding initial subset of rows.

The operations further include determining a confidence factor for each final subset of rows, determining a best confidence factor for each particular text row in the at least one document image, and creating at least one class of text rows. The at least one class includes at least one particular text row having a same best confidence factor.

In yet another aspect, a computer readable medium is encoded with instructions that, when executed by at least one processor, process at least one document image. The at least one document image includes a plurality of text rows and a plurality of characters. Each text row has at least one character. The instructions perform operations that include creating character blocks for the characters in the text rows and determining positions of alignments of the character blocks The operations also include determining columns for the alignments of the character blocks at the positions of the alignments, each text row having a physical structure defined by the columns of the alignments of the character blocks in that text row. The operations include determining an initial subset of rows for each column, each initial subset of rows including one or more of the text rows of the at least document image having at least one alignment of at least one character block in a selected column. Each initial subset of rows has a set of columns that includes the selected column and other columns in the one or more text rows of a corresponding initial subset of rows in which the selected column is present.

The operations further include determining an optimum set of columns for each initial subset of rows by generating a histogram of column frequencies of the set of columns in the corresponding initial subset of rows, determining a threshold of the column frequencies for the corresponding initial subset of rows, and selecting particular columns having the column frequency above the threshold to be included in a corresponding optimum set. Each column frequency includes a number of times a particular column occurs in the corresponding initial subset of rows.

The operations include determining a final subset of rows for each initial subset of rows. Each final subset of rows includes at least one text row of the corresponding initial subset of rows having physical structures most similar to the corresponding optimum set when compared to physical structures of all text rows in the corresponding initial subset of rows. The operations also include determining a confidence factor for each final subset of rows, determining a best confidence factor for each particular text row in the at least one document image, and creating at least one class of text rows. The at least one class includes at least one particular text row having a same best confidence factor.

BRIEF DESCRIPTION OF THE DRAWINGS

FIG. 1A is a diagram of a document image with character groups and text rows.

FIG. 7 is a diagram of a line detection module determining line positions in accordance with an embodiment of the present invention.

FIG. 8 is a diagram of a document block module splitting a document into document blocks in accordance with an embodiment of the present invention.

FIGS. 8A-8D are diagrams of documents.

FIG. 9A is a diagram of a line distribution sample.

FIG. 9B is an array for the line distribution sample of FIG. 9A.

FIG. 20 is a histogram of column frequencies for an initial subset of rows in column A of the document of FIG. 17.

FIG. 21 is a table depicting a Hamming distance determination.

FIGS. 24-34 are tables of the initial subsets of rows for columns B, D, E, H, J, L, O, P, Q, T, and U, respectively, of the document of FIG. 17.

FIG. 35 is a table of confidence factors for the columns of the document of FIG. 17.

FIG. 36 is a table of confidence factors for the text rows of the document of FIG. 17.

FIG. 37 is a table depicting row matches.

FIG. 38 is a table of columns for an initial subset of rows for column A of the document of FIG. 17.

FIG. 39 is a table of row distances, row matches, and row lengths for row points for the initial subset of rows for column A in the document of FIG. 17.

FIG. 40 is a table of row points with normalized row distances, normalized row matches, and normalized row lengths for the initial subset of rows for column A of FIG. 17.

FIG. 41 is a plot of the row points and cluster centers for the initial subset of rows for column A of the document of FIG. 17.

FIG. 42 is a table of cluster center distances.

FIGS. 43-46 are tables of the initial subset of rows for column B of the document of FIG. 17.

FIGS. 47-50 are tables of the initial subset of rows for column D of the document of FIG. 17.

FIGS. 51-54 are tables of the initial subset of rows for column E of the document of FIG. 17.

FIGS. 55-58 are tables of the initial subset of rows for column H of the document of FIG. 17.

FIGS. 59-62 are tables of the initial subset of rows for column J of the document of FIG. 17.

FIGS. 63-66 are tables of the initial subset of rows for column L of the document of FIG. 17.

FIGS. 67-70 are tables of the initial subset of rows for column O of the document of FIG. 17.

FIGS. 71-74 are tables of the initial subset of rows for column P of the document of FIG. 17.

FIGS. 75-78 are tables of the initial subset of rows for column Q of the document of FIG. 17.

FIGS. 79-82 are tables of the initial subset of rows for column T of the document of FIG. 17.

FIGS. 83-86 are tables of the initial subset of rows for column U of the document of FIG. 17.

FIG. 87 is a table of confidence factors for the columns of the document of FIG. 17.

FIG. 88 is a table of confidence factors for text rows of the document of FIG. 17.

FIG. 92 is a histogram of column frequencies for an initial subset of rows for column Aα of the document of FIG. 89.

FIG. 93 is a table depicting a weighted distance determination.

FIGS. 94A-94B are tables of the initial subset of rows for column Aα of the document of FIG. 89.

FIGS. 96A-117B are tables of the initial subsets of rows for columns Bα, Dα, Eα, Hα, Jα, Lα, Oα, Pα, Qα, Tα, Uα, Aβ, Bβ, Dβ, Fβ, Gβ, Kβ, Lβ, Oβ, Sβ, Uβ, and Wβ, respectively, of the document of FIG. 89.

FIG. 118 is a table of confidence factors for the initial subset of rows of the document of FIG. 89.

FIG. 119 is a table of the confidence factors for the text rows of the document of FIG. 89.

FIGS. 120A-120B are tables of the initial subset of rows for column Aα of the document of FIG. 89.

FIG. 121 is a table of row distances, row matches, and row lengths for the row points of the initial subset of rows for column Aα of the document of FIG. 89.

FIG. 124 is a table of the cluster center distances for the clusters of the initial subset of rows for column Aα of the document of FIG. 89.

FIGS. 125A-128 are tables of the initial subset of rows for column Bα of the document of FIG. 89.

FIGS. 129A-132 are tables of the initial subset of rows for column Dα of the document of FIG. 89.

FIGS. 133A-136 are tables of the initial subset of rows for column Eα of the document of FIG. 89.

FIGS. 137A-140 are tables of the initial subset of rows for column Hα of the document of FIG. 89.

FIGS. 141A-144 are tables of the initial subset of rows for column Jα of the document of FIG. 89.

FIGS. 145A-148 are tables of the initial subset of rows for column Lα of the document of FIG. 89.

FIGS. 149A-152 are tables of the initial subset of rows for column Oα of the document of FIG. 89.

FIGS. 153A-156 are tables of the initial subset of rows for column Pα of the document of FIG. 89.

FIGS. 157A-160 are tables of the initial subset of rows for column Qα of the document of FIG. 89.

FIGS. 161A-164 are tables of the initial subset of rows for column Tα of the document of FIG. 89.

FIGS. 165A-168 are tables of the initial subset of rows for column Uα of the document of FIG. 89.

FIGS. 169A-172 are tables of the initial subset of rows for column Aβ of the document of FIG. 89.

FIGS. 173A-176 are tables of the initial subset of rows for column Bβ of the document of FIG. 89.

FIGS. 177A-180 are tables of the initial subset of rows for column Dβ of the document of FIG. 89.

FIGS. 181A-184 are tables of the initial subset of rows for column Fβ of the document of FIG. 89.

FIGS. 185A-188 are tables of the initial subset of rows for column Gβ of the document of FIG. 89.

FIGS. 189A-192 are tables of the initial subset of rows for column Kβ of the document of FIG. 89.

FIGS. 193A-196 are tables of the initial subset of rows for column Lβ of the document of FIG. 89.

FIGS. 197A-200 are tables of the initial subset of rows for column Oβ of the document of FIG. 89.

FIGS. 201A-204 are tables of the initial subset of rows for column Sβ of the document of FIG. 89.

FIGS. 205A-208 are tables of the initial subset of rows for column Uβ of the document of FIG. 89.

FIGS. 209A-212 are tables of the initial subset of rows for column Wβ of the document of FIG. 89.

FIG. 213 is a table of the confidence factors for the columns of the document of FIG. 89.

FIG. 214 is a table of the confidence factors for the text rows of the document of FIG. 89.

FIG. 215 is a document image of a transcript with classes determined according to an embodiment of the present invention.

FIG. 217 is a document image of an explanation of benefits with classes determined according to an embodiment of the present invention.

DETAILED DESCRIPTION

Figure 1:
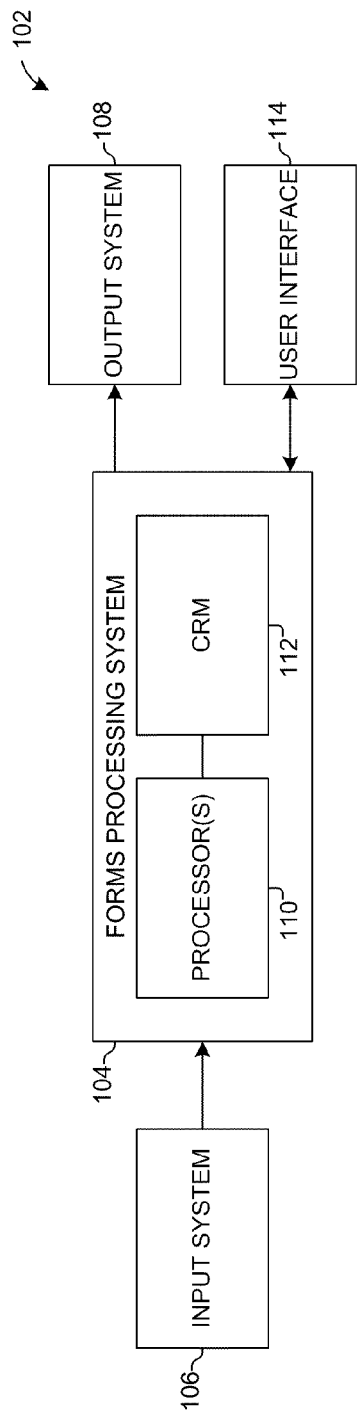
FIG. 1 is a block diagram of a document processing system in accordance with an embodiment of the present invention.

Systems and methods of the present invention analyze the physical structure of text rows in a document and one or more alignments of one or more character blocks in one or more text rows of the document. The systems and methods determine one or more groups of text rows that are placed into a class based on the character blocks and/or one or more alignments. For example, the systems and methods determine one or more rows of character blocks that are placed into a class based on the structure of the rows of character blocks and one or more alignments of one or more character blocks in each row of the document.

A text row (also referred to as a row) is one or more characters arranged along a horizontal line or with respect to a horizontal. A character includes an alphabetic character, a number, a symbol, a punctuation mark, a graphic character or a graphic, including stamps and handwritten text, and/or another character. The one or more characters of the text row may be arranged in one or more groups (character groups), with each character group having one or more alphabetic characters, one or more numbers, one or more symbols, one or more punctuation marks, one or more words, including one or more blocks of words (word blocks), one or more graphic characters or graphics, and/or one or more other characters.

A character block is one or more alphabetic characters, one or more numbers, one or more symbols, one or more punctuation marks, one or more words, including one or more blocks of words (word blocks), one or more graphic characters or graphics, and/or one or more other characters that are combined or arranged into a block. One character block often is separated from another character block by space or a vertical line. For representation purposes, the lengths of the character blocks are considered by analyzing the starting points and ending points for the character blocks, such as the ends or sides of the character blocks. In one embodiment, character blocks are created from character groups in the text row.

A horizontal component identifies a horizontal location or position of a character block on a text row (row). A column is one representation of a horizontal component that identifies a horizontal location or position of one or more character blocks arranged along a vertical line or with respect to a vertical. In one embodiment, there is a column at each end of each character block. Therefore, each end of each character block has a column or is located at a column. In another example, a character block has one column, such as for one side of the character block. In one example, a column is a horizontal component that identifies a horizontal position and that extends vertically, such as along a vertical line or with respect to a vertical.

In another example, a column corresponds to a coordinate of a set of coordinates for a point in a character block, such as the starting point of a character block, the ending point of the character block, or another point in the character block. For example, the character block has a column at the coordinate of the starting point and another column at the coordinate of the ending point.

In another example, each character block has a starting point or spatial position and an ending point or spatial position along a horizontal line, with the starting point and ending point each having coordinates along the horizontal line. In this example, a character block has four coordinates identifying the corners of a rectangle representing the character block. Two coordinates on one end of the character block have the same, common horizontal coordinate or component, and two coordinates on the other end of the character block have another same, common horizontal coordinate or component. In this example, the character block has one column at the horizontal coordinate of one end of the character block and another column at the horizontal coordinate of the other end of the character block. The column in this example can be the horizontal coordinate of a horizontal-vertical coordinate pair, such as the X coordinate in an X-Y coordinate pair, or another coordinate or ordinate type. Other coordinate or ordinate systems or spatial positions may be used instead of an X-Y coordinate, including other systems and methods for a spatial domain. Spatial positions are positions in a spatial domain, and the X coordinate and Y-Y coordinate pair are examples of spatial positions.

In one embodiment, the coordinates are coordinates of pixels. A pixel is the smallest unit of information found in an image. For binary images, where they don't represent multiple colors but instead can have two states (such as "on" and "off"), pixels can be used as a metric of measurement for image processing. The pixels alternately may be representative of a display in one example since the document is an electronic image processed in this example with a processor and need not be displayed. Coordinates are expressed in pixels in this example. Coordinates may be expressed using other methods in other examples.

Other character sets or blocks may be identified by one or more vertical components identifying the starting point and ending point of the character block. A vertical component identifies a vertical location of a character block. For example, the vertical location or locations of one or more character blocks or groups of character blocks may be considered. This may include one or more vertical coordinates, sides, or other components. A row of pixels is one example of a vertical component because the row of pixels is located above or below another row of pixels. As used herein, a "row of pixels" is different than a text row or row as described above.

An alignment is a position of or on a character block, such as an end or a side. For example, an alignment may be at the left sides of character blocks, the right sides of character blocks, or the left and right sides of character blocks. A center alignment at the center of a character block is another example. Another alignment for the character blocks or groups of character blocks may be used.

In one embodiment, one or more character blocks are aligned in a column, which is a horizontal component that extends vertically. For example, sides of two character blocks are aligned in the same column, which in this example is a vertical having a horizontal position. In another embodiment, one side of one or more character blocks are aligned in a column, another side of the same or other character blocks is aligned in another column, and both columns extend vertically. For example, the left sides of two character blocks are aligned in one column, the right sides of the two character blocks are aligned in another column, and both columns in this example are verticals having a different horizontal position. As used with respect to a "column" in these examples, a vertical or a vertical line is a metric for image processing and is not depicted or displayed on the document image.

In another embodiment, when multiple character blocks are aligned vertically in a straight line or a semi-straight line, they are considered to be aligned in a single column. For example, one or more character blocks may be aligned within a selected distance, such as a selected number of pixels, to be considered aligned within an approximately straight line and, therefore, in the same column. In one example, if the same side of two character blocks are within a selected number of pixels, they are considered to be aligned within an approximately straight line and, therefore, in the same column. In another example, the left side of one character block is aligned within the selected number of pixels to the left of the left side of a second character block and the selected number of pixels to the right of the left side of a third character block. The three character blocks in this example are considered to be aligned in an approximately straight line (also referred to as a semi-straight line), and, therefore, in the same column. In still another example, a selected side of each of six character blocks is aligned in a straight line, and, therefore, in the same column. In another example, character blocks within a selected distance, such as a selected number of pixels, are aligned in a straight line before or during processing.

A left alignment is the alignment at the left side of a character block or a group of character blocks, such as in a column. A right alignment is the alignment at the right side of a character block or a group of character blocks, such as in a column. A left and right alignment is the alignment at the left side and right side of a character block or a group of character blocks, such as in one or more columns. The left alignment and/or right alignment are examples of horizontal alignments, which are alignments along a horizontal. A top alignment is the alignment at the top side of a character block or a group of character blocks. A bottom alignment is the alignment at the bottom side of a character block or a group of character blocks. A top and bottom alignment is the alignment at the top side and bottom side of a character block or a group of character blocks. The top alignment and/or bottom alignment are examples of vertical alignments, which are alignments along a vertical. Other examples exist.

As used herein, "alignment" means "horizontal alignment" when used without a modifier (i.e. without the term "vertical" or the term "horizontal"). Therefore, an "alignment" includes a left alignment, a right alignment, a left and right alignment, or another horizontal alignment and does not include a top alignment, a bottom alignment, a top and bottom alignment, or another vertical alignment. Thus, "alignment" does not mean or include "vertical alignment." The term "vertical alignment" will be expressly used herein when a vertical alignment is intended.

One alignment, two alignments, or other numbers of alignments may be used. In one embodiment, the document processing system considers the alignment of one coordinate or component of one side of the character block, the alignment of another coordinate or component of another side of a character block, or the alignment of two coordinates or components of two sides of the character block. For example, the document processing system considers the alignment of one side of a character block in a column, the alignment of another side of the character block in another column, or the alignment of both sides of the character block in two columns (the alignment of each of the two sides in separate columns). In another example, the alignment options include a left alignment of left sides of character blocks, a right alignment of right sides of character blocks, or both left alignments of left sides of character blocks and right alignments of right sides of character blocks. In another example, the alignment options include a center alignment of centers of character blocks. Other examples exist.

In an example of other numbers of alignments, multiple character blocks may be considered for a multi-character block group, and the alignments of the individual character blocks and/or the alignments of the multi-character block group may be used. In this example, more than two alignments may be considered.

In another example, vertical alignments are considered for a multi-character block group, and the vertical alignments of the individual character blocks and/or the vertical alignments of the multi-character block group may be used.

In one embodiment, one alignment is considered when analyzing a document's physical structure. For example, the left alignment or the right alignment is considered. To do so, the left most coordinates of one or more character blocks are evaluated for one or more columns. Alternately, the right most coordinates of one or more character blocks are evaluated for one or more columns. In another embodiment, two alignments are considered, such as for left and right alignments. In another embodiment, center coordinates of one or more character blocks are evaluated.

The text row has a physical structure defined by one or more alignments of one or more character blocks in one or more columns in the text row. Once the columns are identified for the alignments of the character blocks in a document, it is possible to represent a text row having one or more character blocks (character block row) as a binary vector of the alignments of the character blocks contained in the row in the associated columns. In this example, the text row has a physical structure defined by the binary vector representing the text row.

The binary vector may be based on one or more alignments, such as a left alignment, a right alignment, or a left and right alignment. The binary vector may include one or more column positions representing columns in the document image, where each column position of the binary vector may represent the existence or not (by a binary 1 or 0) of an alignment in a specific corresponding column in the document image.

In one embodiment of a binary vector for a text row, a "1" in the binary vector identifies one or more alignments of one or more character blocks in one or more columns of the text row. Thus, each column position in the binary vector for the text row (text row binary vector) represents a column in the document image. For example, a binary "1" identifies an alignment of a character block in a column of a text row and a binary "0" is included in one or more columns of the document image not having an alignment of a character block for the text row. In another example, the binary vector for the text row includes an element or a column position for each column in a set of columns for an initial subset of rows, with a "1" identifying column positions where the text row has an alignment of a character block and a "0" identifying each other column position where the text row does not have an alignment of a character block. Each initial subset of rows in this example includes one or more text rows each having an alignment of a character block in a selected column and a set of columns that includes the selected column and zero or more other columns that are in the one or more text rows with the selected column. Thus, in this example, each column position in the binary vector for the text row (text row binary vector) represents a column in the set of columns for the initial subset of rows, where each column position has a "1" if the text row has an alignment of a character block in that column. Alternately, only "1"s are included in a vector identifying an alignment of a character block in a column of a text row. Other examples exist.

In one aspect, a document processing system analyzes text rows in a document and the alignments of one or more character blocks in each text row to determine the physical structure of the document. For example, the document may be a semi-structured form, such as a transcript, an invoice, a business form, and/or another type of form. In one example, the transcript includes text rows identifying data for a semester and year heading (term row), particular courses taken during the semester or term (course row), a summary of the particular courses taken during the semester or term (course summary row), a summary of all courses for all semesters (curriculum summary row), and personal data, such as a student name, social security number, date of birth, student number, and other information. The document processing system determines the physical structure of the transcript and classifies each text row into a class with other similar text rows based on the physical structure of character blocks in each text row. The document processing system then stores the text row data and/or structures, stores the class structure of the document, further processes the document, transmits the processed document to another process, module, or system, and/or extracts data from one or more text rows based on their assigned classes.

In one example, each term row in the transcript is grouped in a class, each course row in the transcript is grouped in a class, and each course summary row is grouped in a class. The document processing system extracts data from one or more of the classes, such as detailed course information from the course rows or semester or year data from the term rows.

In another aspect, one or more regions of interest (ROI) are identified for each text row once the text row is assigned to a class. For example, the text rows in a document are assigned to one or more classes. Based on the structures of each class and all classes in the document, which form a physical structure for the document (document physical structure), the identification of the document is determined. For example, a transcript from one school has a different structure than a transcript from another school. In this example, the term rows, course rows, and course summary rows form a physical structure for the document that is used to identify the transcript as being a particular type of transcript or being from a particular school. In another example, other graphic elements can also define a document's physical structure, such as lines, white spaces, headers, logos, and other graphic elements. In this example, the system analyzes the physical structures of the classes or a combination of the physical structures of the classes and the physical structures of graphic elements, such as lines, white space, logos, headers, and other graphic elements.

In one example, document model data identifying one or more regions of interest for a particular document or type of document is stored in a database as a document model. The document model data also may include the document physical structures for each document model. Based on the physical structure of the analyzed document, regions of interest in the analyzed document are determined by comparing the physical structure of the analyzed document to the physical structures of the document models and identifying regions of interest in a matching document model, and data is extracted from the corresponding regions of interest from the analyzed document. For example, a region of interest may be a particular course number, course name, grade point average (GPA), course hours, or other information in a particular class. Because the text row is assigned to a class, and the structure of the class is known, such as where regions of interest in the class exist, data for the selected regions of interest can be extracted automatically.

In another aspect, the document processing system analyzes other types of documents, such as invoices, benefits forms, healthcare forms, patient information forms, healthcare provider forms, insurance forms, other business documents, and other forms. The document processing system determines the physical structure of the document by analyzing the physical structure of its text rows and grouping text rows with similar physical structures into classes. The document processing system determines the type of document, such as the type of form, based on the physical structure of the document, such as the structure of the particular classes identified for the document. The document processing system then stores the text row data and/or structures, stores the class structure of the document, further processes the document, transmits the document to another process, module, or system, and/or extracts data from one or more text rows based on the class to which they are assigned. In one example, the forms processing system extracts data from one or more regions of interest. With the document processing systems and methods, it is the structure of the data, i.e. the physical structure of the character blocks in the text rows and the structure of the document itself, that results in the identification of the document and data that is extracted from the document.

FIG. 1 depicts an exemplary embodiment of a document processing system 102. The document processing system 102 processes one or more types of documents, including forms. Forms may include transcripts, invoices, medical forms, benefits forms, patient information forms, healthcare provider forms, insurance forms, business forms, and other types of forms.

The documents include one or more character blocks, including text, arranged in a text row. The documents also may contain other characters not arranged in text rows, including graphic elements, such as stamps, designs, business names, handwritten text, marks, and/or other graphic elements. The documents also may include vertical lines and/or horizontal lines and/or one or more white spaces that define structures for the documents. A white space is an area of the document that does not contain lines, characters, handwritten text, stamps, or other types of marks (such as from staple marks, stains, paper tears, etc.). The white spaces contain off pixels, whereas the lines, characters, handwritten text, stamps, or other types of marks have on pixels. The white spaces may be rectangular shaped areas or irregular shaped areas.

The document processing system 102 determines the document structure of the analyzed document based on the physical structure of the character blocks in the rows. The document processing system 102 compares the structure of each row in the document to each other row in the document to identify similar or same row structures. The document processing system 102 then assigns each row having a similar or same physical structure to a class, identifies the class based on the structures of the rows in the class, and stores the text row data and/or structures, stores the class structure of the document, further processes the document, transmits the document to another process, module, or system, and/or extracts data from regions of the rows assigned to one or more classes. The document processing system 102 includes a forms processing system 104, an input system 106, and an output system 108.

The forms processing system 104 analyzes a document, such as a form, to identify its physical structure. The forms processing system 104 determines the start and end of each character block in each row. In one example, the starting and ending points of a character block are separated from another character block by space, such as a selected number of pixels. A white space value may be selected to delineate the separation of character blocks, which may be a selected number of pixels, a selected distance, or another selected white space value. In another example, the starting and ending points of a character block are separated from another character block by a vertical line.

The forms processing system 104 identifies the structure of the rows based on the structure of the character blocks in the rows and groups rows having the same or similar physical structure into a class. A document may have one or more classes.

In one embodiment, the forms processing system 104 transmits the analyzed document, data in its text rows, and/or its structure of text rows and/or classes to another process or module for further processing. Alternately, the forms processing system 104 stores the analyzed document, data in its text rows, and/or its structure of text rows and/or classes in a database. The analyzed document, the data in its text rows, and/or its structure of text rows and/or classes then may be processed further by another process or module at a further time and/or place. The forms processing system 104 also may store the class structure of the analyzed document in the database as a document model.

Alternately, the forms processing system 104 extracts data from one or more regions of one or more rows assigned to one or more classes in the document. The data is extracted based on the class to which the row is assigned and the region of interest in the row. In one example, the forms processing system 104 includes document model data in a database identifying the structures of classes, rows in classes, and regions of interest within rows assigned to classes for existing known documents.

The forms processing system 104 compares the physical structure of the analyzed document to the existing document model data. If a match is found between the analyzed document and the existing document model data, the regions of interest within the rows of the corresponding classes of the analyzed document will be known, and the data can be extracted from those regions of interest automatically. The document information identifying the physical structures of the classes and the rows assigned to the classes also may be saved in a database of the forms processing system 104 as document models and/or document model data.

The forms processing system 104 assigns labels to the classes, rows within the classes, and regions of interest in the rows assigned to classes of the document model so that future analyzed documents may be automatically processed and data automatically extracted from the regions of interest. For example, an analyzed document may be identified as a transcript from a specific school, a class and its assigned text rows may be identified as a course summary by the physical structure of the text rows assigned to the class, and the course summary may be automatically extracted based on a region of interest designated in the course summary class. In another example, an analyzed document is determined to be an invoice from a particular business based on the physical structures of its text rows, the regions of interest are known because a document model identifying the regions of interest matches the analyzed document, and data from the regions of interest are automatically extracted. This data may be, for example, product identifiers, product descriptions, quantities, prices, customer names or numbers, or other information.

The forms processing system 104 includes one or more processors 110 and volatile and/or nonvolatile memory and can be embodied by or in one or more distributed or integrated components or systems. The forms processing system 104 may include computer readable media (CRM) 112 on which one or more algorithms, software, modules, data, and/or firmware is loaded and/or operates and/or which operates on the one or more processors 110 to implement the systems and methods identified herein. The computer readable media may include volatile media, nonvolatile media, removable media, non-removable media, and/or other media or mediums that can be accessed by a general purpose or special purpose computing device. For example, computer readable media may include computer storage media and communication media, including computer readable mediums. Computer storage media further may include volatile, nonvolatile, removable, and/or non-removable media implemented in a method or technology for storage of information, such as computer readable instructions, data structures, program modules, and/or other data. Communication media may, for example, embody computer readable instructions, data structures, program modules, algorithms, and/or other data, including as or in a modulated data signal. The communication media may be embodied in a carrier wave or other transport mechanism and include an information delivery method. The communication media may include wired and wireless connections and technologies and be used to transmit and/or receive wired or wireless communications. Combinations and/or sub-combinations of the above and systems, components, modules, and methods and processes described herein may be made.

The input system 106 includes one or more devices or systems used to generate or transfer an electronic version of one or more documents and/or other inputs and data to the forms processing system 104. The input system 106 may include, for example, a scanner that scans paper documents to an electronic form of the documents. The input system 106 also may include a storage system that stores electronic data, such as electronic documents, document models, or document model data identifying one or more classes and/or one or more regions of interest for one or more document models. The electronic documents can be documents to be processed by the forms processing system 104, existing document models or document model data for document models used by the forms processing system while processing and analyzing a new document, new document models or document model data for document models identified by the forms processing system while processing a new document, and/or other data. The input system 106 also may be one or more processing systems and/or a communication systems that transmits and/or receives electronic documents and/or other electronic document information or data through wireless or wire line communication systems, existing document model data or existing document models, new document model data, and/or other data to the forms processing system 104. The input system 106 further may include one or more processors, a computer, volatile and/or nonvolatile memory, computer readable media, a mouse, a trackball, touch pad, or other pointer, a key board, another data entry device or system, another input device or system, a user interface for entering data or instructions, and/or a combination of the foregoing. The input system 106 may be embodied by or in or operate using one or more processors or processing systems, one or more distributed or integrated systems, and/or computer readable media. The input system 106 is optional for some embodiments.

The output system 108 includes one or more systems or devices that receive, display, and/or store data. The output system 108 may include a communication system that communicates data with another system or component. The output system 108 may be a storage system that temporarily and/or permanently stores data, such as document model data, images of documents, document models, extracted data, and/or other data. The output system 108 also may include a computer, one or more processors, one or more processing systems, or one or more processes that further process extracted data, document model data, document models, images of documents, and/or other data. The output system 108 may otherwise include a monitor or other display device, one or more processors, a computer, a printer, another data output device, volatile and/or nonvolatile memory, other output devices, computer readable media, a user interface for displaying data, and/or a combination of the foregoing. The output system 108 may receive and/or transmit data through a wireless or wire line communication system. The output system 108 may be embodied by or in or operate using one or more processors or processing systems, one or more distributed or integrated systems, and/or computer readable media. The output system 108 is optional for some embodiments.

In one embodiment, the output system 108 includes an input system 106. In this embodiment, a combination input and output system includes a user interface 114 for providing data and/or instructions to the forms processing system 104 and for receiving data and/or instructions from the forms processing system. The user interface 114 displays the data and enables a user to enter data and/or instructions.

In one example, the extracted data is generated for display to one or more displays, such as to a user interface 114. The user interface 114 may be generated by the forms processing system 104 or an output system. The user interface 114 displays the extracted data and/or other data, including an image of the analyzed document, document model data, document model images, and/or other documents, images, and/or other data. In another example, the extracted data is stored in a database of the forms processing system 104, processed by another process or module of the forms processing system, and/or generated to the output system 108. The user interface 114 may be embodied by or in or operate using one or more processors or processing systems, one or more distributed or integrated systems, and/or computer readable media. The user interface 114 is optional for some embodiments.

Figure 1B:
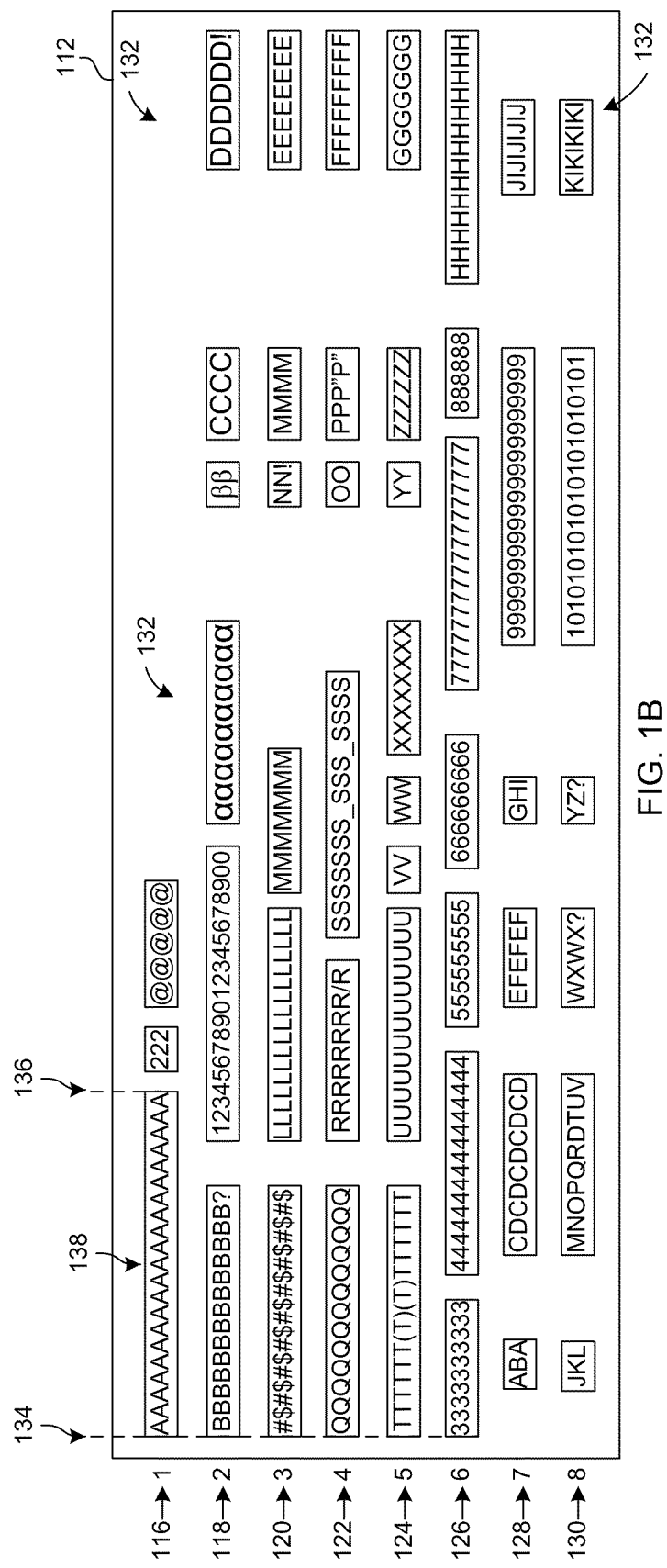
FIG. 1B is a diagram of a document image with character blocks, text rows, and alignments.

Referring to FIGS. 1, 1A, and 1B, the document processing system 102 processes an electronic document image 112 having multiple character groups 114 in eight text rows 116-130. The document processing system 102 creates character blocks 132 from the character groups 114, processes a left alignment 134 and/or a right alignment 136, for example, for one of the character blocks 138, and also processes a left alignment and/or a right alignment for each other character block.

Figure 2:
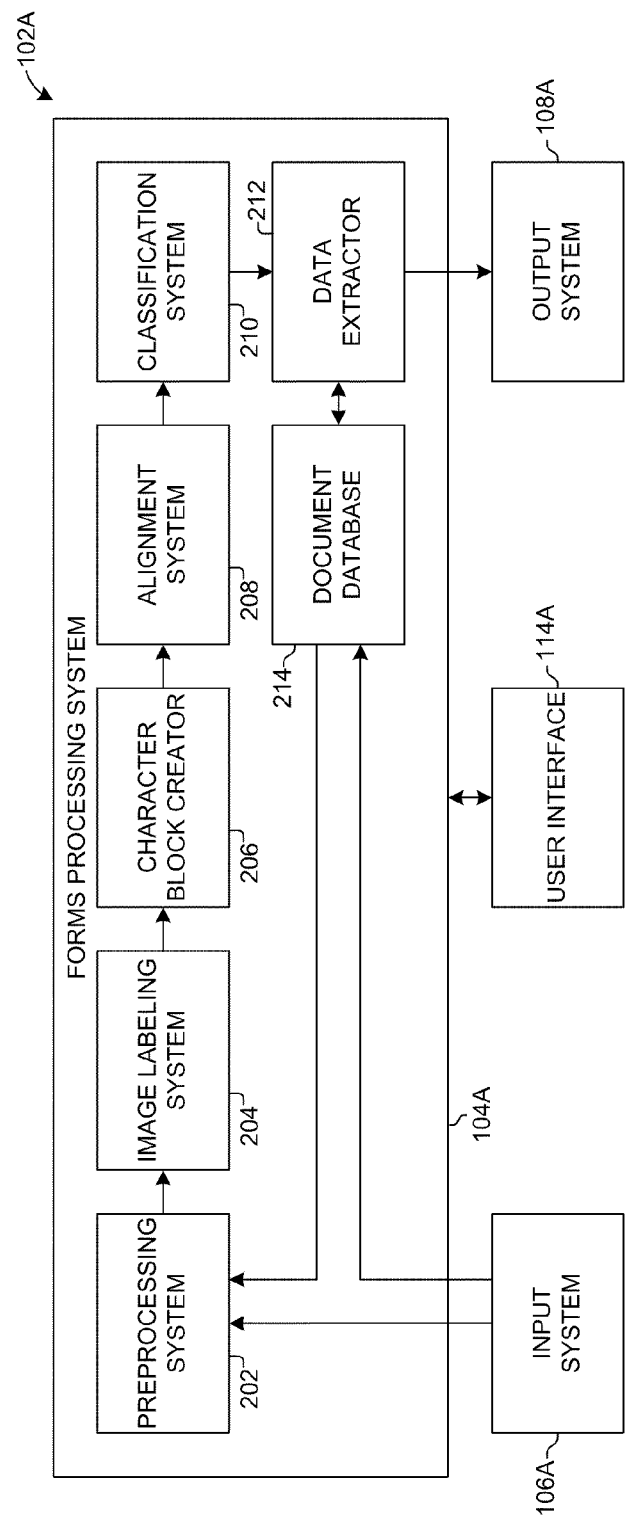
FIG. 2 is a block diagram of a forms processing system in accordance with an embodiment of the present invention.

FIG. 2 depicts an exemplary embodiment of a forms processing system 104A. The forms processing system 104A determines the structure of a document according to the physical structure of one or more character blocks in one or more text rows and classifies one or more text rows together in a class based on the text rows having the same or similar text row structure. A text row structure is the physical structure of one or more alignments of one or more character blocks in the text row.

The forms processing system 104A includes a pre-processing system 202 that receives an electronic document, such as a document image. In one embodiment, the preprocessing system 202 includes a pre-treat document image process that enables a user to select a character or portion of a document image for deletion, such as a graphic element. Alternatively, the pre-treat document image process enables a user to draw a box or other shape around an area to be deleted or excluded or included for a selected processing, such as a despeckle or denoise process.

The pre-processing system 202 initially processes the document image to enable other components of the forms processing system 104A to determine the document structure. Examples of pre-processing systems and methods include deskew, binarization, despeckle, denoise, and/or dots removal.

The binarization process changes a color or gray scaled image to black and white. The deskew process corrects a skew angle from the document image. A skew angle results in an image being tilted clockwise or counter clockwise from the X-Y axis. The deskew process corrects the skew angle so that the document image aligns more closely to the X-Y axis. The denoise process removes noise from the document image. The despeckle process removes speckles from the document image.

The dots removal process removes periods from the document image. Dots are removed optionally in some instances because blank spaces of some documents are filled with periods instead of white space.

In one example, the pre-processing system 202 labels each character in the document image. A height and width are assigned to the label from which the area of the label is determined. If the area of the labeled character is greater than 0.65 of the label area, the character is determined to be a period and is deleted. In this example, the mean of the center part of the character is determined, and characters smaller than the mean or average are removed. In one embodiment, the pre-processing system 202 removes labeled characters having a width to height ratio less than 1.3 and an area greater than 0.75.

The image labeling system 204 labels each character in the document image and determines the average size of characters in the document image. In one embodiment, the image labeling system 204 labels every character in the document image, determines the height and the width of each character, and then determines the average size of the characters in the document image. In one example, the image labeling system 204 separately determines the average height and the average width of the characters. In another example, the image labeling system 204 only determines the average size of the characters, which accounts for both the height and the width. In another example, only the height or the width of the characters is measured and used for the average character size determination.

In one embodiment, characters having an extremely large size or an extremely small size are eliminated from the calculation of the average character size, including graphics. Thus, the image labeling system 204 measures only the average characters (that is, the characters remaining after the large and small characters have been eliminated) to determine the average character size. An upper character size threshold and a lower character size threshold may be selected to identify those characters that are to be eliminated from the average character size measurement. For example, if the average size of characters generally is 15×12 pixels, the lower character threshold may be set at 4 pixels for the height and/or width, and the upper character threshold may be set at between 24 and 48 pixels for the height and/or width. Other examples exist. Any characters having a character size below the lower character threshold or above the upper character threshold will be eliminated and not used to calculate the average size of the average characters. The upper and lower character thresholds may be set for height, width, or height and width. The upper and lower character thresholds may be pre-selected or selected based on an initial calculation made of character size in an image. For example, if a selected percentage of characters are approximately 15×12 pixels, the lower and upper character thresholds can be selected based on that initial calculation, such as a percentage or factor of the initial character size calculation.

In another embodiment, the image labeling system 204 measures all elements of the document image to determine their size, including graphics, graphic elements, alphabetic characters, and other characters, lines, and other document image elements, applies a variable threshold for the upper and lower character thresholds, and eliminates the characters having a size above and below the upper and lower variable thresholds, respectively. The upper variable threshold may be a selected percentage of the largest sizes of document image elements, such as between fifteen and twenty-five percent. The lower variable threshold may be a selected percentage of the smallest sizes of document image elements, such as between fifteen and twenty-five percent. In one example, the image labeling system 204 determines sizes of all document image elements, eliminates characters having the top twenty percent of sizes, and eliminates characters having the bottom twenty percent of sizes. In this example, the characters having the smallest and largest extremes in sizes are trimmed.

The image labeling system 204 uses one or more structuring elements to perform mathematical morphology operations, such as an opening, a local area opening, or a dilation. The structuring elements also may be used by other components of the forms processing system 104A, such as the character block creator 206. The term "structuring element" refers to a mathematical morphology structuring element.

Horizontal and vertical structuring elements are selected based on the average size of characters. In one example, a 1×3 ninety-degree (vertical) structuring element and a 1×3 zero-degree (horizontal) structuring element are used for mathematical morphology operations. In another example, the image labeling system 204 selects the size of the structuring elements based on the average size of characters or the average size of average characters (average character size) determined by the image labeling system. If the structuring elements are too small, text required for later processes will be eliminated. If the size of the structuring elements is too large, characters or lines in the document image may not be located and/or removed.

The size of the structuring elements may be based on the average height of characters, the average width of characters, or the average character size. In one example, the sizes of the structuring elements are the same size as the average character size. In another example, the sizes of the structuring elements are smaller or larger than the average character size.

In another example, the ninety-degree structuring element is between approximately one and four times the size of the average character height. In another example, the zero-degree structuring element is between approximately one and four times the size of the average character width. In other examples, the ninety-degree structuring element and/or the zero-degree structuring element are between one and six times the average character size. However, the structuring elements can be larger or smaller in some instances. Other examples exist.

The image labeling system 204 removes borders on one or more sides of the document image. In one example, the image labeling system 204 creates a copy of the document image and performs the actual border removal on the document image copy. The image labeling system 204 may first store the document image copy or the original document image before removing the border.

To help detect borders in one embodiment, the image labeling system 204 performs a mathematical morphology dilation on the document image copy by one or more structuring elements. The dilation closes most gaps in the border of the document image copy. In one example, the dilation uses a 6×3 structuring element. Other examples exist.

Along each edge of the document image copy, the image labeling system 204 scans inward from a selected edge of the document image copy toward its center for between 3 and 8% of the width of the page of the document image copy (border percentage) in the dimension of the orientation of the page (i.e., length or width and/or portrait and landscape) and counts the number of pixels that are "on" and the number of pixels that are "off." For example, the image labeling system 204 may scan inward from the edge toward the center for a border percentage of 5% of the page's width. Pixels may be on or off, such as black or white. In one example, black pixels are on and white pixels are off.

When the number of on pixels exceeds the number of off pixels that are counted within the selected border percentage, an outer edge of the border is located. The image labeling system 204 continues scanning the document image copy in the same direction until it encounters a line where the number of on pixels does not exceed the number of off pixels. This point of the document image copy is considered to be the inner edge of the border. The image labeling system 204 performs the same process on each edge of the document image copy.

In one embodiment, if the image labeling system 204 does not first find a line having more on pixels that off pixels within the selected border percentage and does not next find a line having fewer on pixels than off pixels within the selected border percentage, there is no border on that edge of the document image copy.

After the image labeling system 204 determines whether or not a border exists for each edge of the document image copy and the locations of any borders, the image labeling system 204 processes the original document image, which does not have the mathematical morphology dilation processing. The image labeling system 204 turns off all pixels between the edge of the document image and the border locations for those borders that were located.

The image labeling system 204 re-labels the document image and searches the collection of labels for any label that is near the left or right edges, such as within the selected border percentage. If any label near the left or right edges of the document image has a width of less than 75% of the page, such that the label does not span the page, and the label is more than 10 times the average character height, such that the label is likely a large graphic element and not likely to be a letter, number, punctuation, or other similar character in a text row, the label is removed from the image.

Other examples of border detection exist. Border detection is optional in some embodiments.

The image labeling system 204 detects the positions of vertical and horizontal lines that exist in the document image and saves the vertical line positions, such as in a vertical line position array. In one example, the image labeling system 204 detects the vertical and horizontal lines using a morphological opening with ninety-degree and zero-degree structuring elements.

Character extenders, such as portions of a lower case g or y, are split from the horizontal lines by the image labeling system 204. Other characters or portions of characters touching a horizontal or vertical line also are split from the lines.

The image labeling system 204 removes the vertical and horizontal lines and then cleans the document image through an opening. In one example, the opening is a local area opening, which is an opening at or within a selected area, such as a selected distance on either side of the horizontal and/or vertical lines. For example, the local area opening may include an opening within a selected number of pixels on both sides of a line. The local area opening uses the zero-degree and ninety-degree structuring elements and selects the size of the structuring elements based on the average character size in one example.

The character block creator 206 creates character blocks from one or more characters so that one or more alignments of the character blocks may be determined. In one example, the character block creator 206 creates character blocks by performing a mathematical morphology closing operation on the document image. A morphological closing includes one or more morphological dilations of an image by the structuring element followed by one or more morphological erosions of the dilated image by the structuring element to result in a closed image. In one embodiment, the character block creator 206 uses a zero-degree structuring element for the morphological closing. In one example, the structuring element is a 1×(1.3*the average character width) structuring element. As used herein, morphological means mathematical morphology.

In another example, a run length smoothing method (RLSM) is used by the character block creator 206 to create the character blocks. Other examples exist.

Other processes may be used to create character blocks from character groups or otherwise enable the forms processing system 104A to locate one or more alignments for the character blocks and/or character groups.

The character block creator 206 labels each character block to determine the spatial positions of one or more alignments of each character block. Each character block label identifies the start and end points of the character blocks in the document image. For example, the label identifies the horizontal location or alignment of the left and right sides of each character block. In one example, the labeling process assigns an X and Y coordinate to each corner of the character block, assigns an X coordinate to each end (left and right side) of each character block, and/or assigns a Y coordinate for each top and bottom side of each character block. Thus, the character block creator 206 determines the horizontal location or spatial position of each side or end of each character block. In another example, the label identifies the horizontal location or spatial position of a center of each character block. The alignments for each character block and the columns having an alignment of a character block are determined from the character block label. Other coordinate or ordinate systems or other spatial positions may be used instead of an X-Y coordinate.

In one embodiment, the character block creator 206 draws a bounding box around each character block. With the bounding box, the character block is a rectangle. In one aspect, character blocks on the same text row will have a bounding box as high as the highest character on that text row. In another aspect, each bounding box for each character block is as high as the highest character in that character block. The rectangle bounding box allows the alignment system 208 to more easily find one or more alignments of the character blocks for one or more columns. The bounding box is optional in some embodiments.

The alignment system 208 determines the margins of the document image to identify the starting and ending points of the text rows in the document image. The lengths of the text rows are determined between the starting and ending points of the text rows. In one example, the text row length is the number of pixels in the text row.

The document image also may contain one or more document blocks that the alignment system 208 identifies and splits. A document block is a portion of the document image containing a single occurrence of the layout or physical structures of text rows when the document is analyzed horizontally. For example, a form document image may have a left side and a right side. Different text rows exist on the left side and the right side, but the text rows may be classified in the same class when processed. The document blocks may be separated by vertical lines, such as in a frame-based form (see FIG. 8B), or a white space divider, such as in a white space-based form (see FIG. 8D). The alignment system 208 splits the document into the document blocks and vertically aligns the document blocks. The document block split and alignment is optional for some embodiments. In other embodiments, the document image is processed with the document blocks in their original alignment.

If the document image is split into two or more document blocks, the alignment system 208 determines the margins for the start and end of the document blocks. In one embodiment, the left and right margins of a document block are identified by determining the left most column label for the left most character block of the document block and the right most column label for the right most character block of the document block. In another embodiment, the margins of the document blocks are identified by determining the borders of each text row and/or each document block through projection profiling. In one example, projection profiles indicate the start and end of one or more text rows. In this example, a histogram is generated for the on and off pixels of the document image. The histogram identifies the beginning and end of the on pixels for a text row (including a text row of a document block), which identifies the beginning and end of the text row. The alignment system 208 aligns the character blocks of the text rows based on the margins.

The classification system 210 determines the columns for the one or more alignments of the character blocks, which are the columns in which one or more alignments of the character blocks are located. In one example, the classification system 210 determines the columns for the character blocks based on the character block labels.

The classification system 210 determines the physical structures of the text rows and groups text rows having the same or similar physical structure into a class. The classification system 210 creates one or more classes based on the structures of the text rows.

In one embodiment, the classification system 210 assigns a column label to one or more alignments of each character block in the document image. The classification system 210 determines an initial subset of text rows having a character block alignment in a selected column and determines initial subsets of rows for each column in the document image for a selected alignment. In one example, the selected alignment is one alignment or two alignments. Each initial subset of rows includes one or more text rows having an alignment of a character block in a selected column.

The selected column and other columns in the one or more text rows of the initial subset of rows define a set of columns for the initial subset of rows. Each text row in the initial subset of rows is represented by a binary vector that includes an element or a position for each column (a column element or column position) in the set of columns for an initial subset of rows, with a "1" identifying column positions where the text row has an alignment of a character block and a "0" identifying each other column position where the text row does not have an alignment of a character block. Thus, each position in the text row binary vector is a column position representing a column in the document image and, in one embodiment, a column in the set of columns for the initial subset of rows, where each column position has a "1" if the text row has an alignment of a character block in that column.

The classification system 210 then determines an optimum set for each initial subset of rows. The optimum set is a set of horizontal components, such as columns, having a most represented number of instances (i.e. the most common columns) in the initial subset of rows. In one example, the optimum set is a subset of the set of columns for the initial subset of rows. In another example, the optimum set includes one or more of the columns in the set of columns for the initial subset of rows, and the columns in the optimum set are the most common columns in the set of columns for the initial subset of rows. The optimum set has a physical structure defined by its columns.

The classification system 210 determines the rows that are the most similar to the optimum set based on the physical structures of the character blocks in the rows, such as the alignments of the character blocks in the columns, and the physical structure of the optimum set, such as the columns that make up the optimum set. The classification system 210 groups one or more text rows into a class based on the similarity of the text rows to the optimum set and to each other. In one example, multiple text rows are grouped in a class. In another example, a single text row is placed in a class.

The data extractor 212 extracts data from one or more text rows. In one example, the data extractor 212 extracts data based on a region of interest in a text row assigned to a class. In this example, the text rows have been classified based on their physical structures. The data extractor 212 queries a document database 214 to identify a match between the physical structures of classes in the document image and the physical structures of classes of document models in the document database. The document model data in the document database 214 identifies regions of interest for classes of document models. Therefore, if a match is found between the physical structures of the analyzed document as determined by its classes and the physical structures of a document model as determined by its classes, regions of interest in the analyzed document may be determined and extracted automatically. In one embodiment, the document database 214 contains document model data identifying the physical structures of classes of document models and the regions of interest in those classes.

In another example, the data extractor 212 does not compare the physical structures of the analyzed document to the document model data in the document database 214. Instead, the data extractor 212 extracts data from similar regions of interest in each class. For example, a particular class may have four character block areas in common. The data extractor 212 extracts the first character block area from each text row. Then the data extractor 212 extracts the data in the second character block area.

In another example, the data extractor 212 compares the physical structures of the classes of an analyzed document to the document model data in the document database 214 and does not locate a match. In this example, the data extractor 212 stores the physical structures of the classes of the analyzed document in the document database 214 as a new document model. In this example, the data extractor 212 also may be configured to store data from the analyzed document with the new document model data, such as one or more characters including graphic elements from a selected portion of the analyzed document.

The data extractor 212 generates extracted data to the output system 108A. For example, extracted data may be generated to a display or a user interface or transmitted to another module, processing system, or process for further processing. In another example, the extracted data is transmitted to the output system 108A for storage. Other examples exist.

In another example, the data extractor 212 does not extract data from the analyzed document but stores the classes and/or data from the analyzed document in the document database 214. Alternately, the data extractor 212 does not extract data from the analyzed document but transmits the analyzed document, its data, and its classes to another process, module, or system for further processing and/or storage, such as the output system 108A.

The document database 214 stores documents, document data, document models, document model data, images, and/or other data used by the document processing system 102A. The document database 214 has memory in which documents and data are stored. In some instances, document images are stored in the document database 214 before being processed by the preprocessing system 202. In other instances, the document database 214 receives documents, document images, document data, document models, document model data, and/or other data from the input system 106A and stores the documents, document images, document data, document models, document model data, and/or other data. In other instances, the document database 214 generates documents, document images, document data, document models, document model data, and/or other data to the output system 108A. The document database 214 may be queried by one or more components of the document processing system 102A, including the data extractor 212 and the preprocessing system 202, and the document database responds to the queries with data and/or images.

The components of the forms processing system 104A may be embodied in and/or stored on one or more CRMs and operate on one or more processors. The components may be integrated or distributed in one or more systems.

Figure 3:
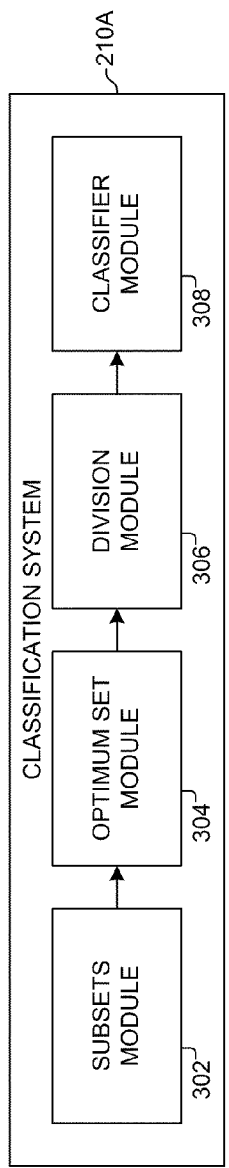
FIG. 3 is a block diagram of a classification system in accordance with an embodiment of the present invention.

FIG. 3 depicts an exemplary embodiment of a classification system 210A. The classification system 210A includes a subsets module 302, an optimum set module 304, a division module 306, and a classifier module 308.

The subsets module 302 analyzes the character block labels for the selected alignments and determines the columns in which the selected alignments of the character blocks are located. The subsets module 302 creates one or more initial subsets of rows by placing each text row containing an alignment for a character block in a selected column in a subset for that column. The subsets module 302 creates initial subsets of rows for each column. As indicated above, the columns may be labeled, such as by their horizontal location, an X coordinate, another coordinate or ordinate, a sequential number between the first and last columns, a character, or in another manner.

The optimum set module 304 determines an optimum set for each initial subset of rows. In one example, the optimum set is determined by identifying the horizontal components, such as columns, in the initial subset of rows with a most representative number of instances. The optimum set for a selected subset of rows includes a maximum number of columns being part of a maximum number of text rows of the initial subset of rows at the same time.

In one example, the optimum set module 304 determines the optimum set by generating a histogram of the number of instances of each column in the initial subset of rows. The result is a bimodal plot with one peak produced by the most represented columns and the other peak being the columns occurring the least. The optimum set module 304 uses a thresholding algorithm to determine a threshold of the column frequencies and splits the columns into two separate sets according to the threshold. The columns having a column frequency at or above the column frequencies threshold are the elements of the optimum set. In one aspect, the optimum set module 304 determines the master row from the optimum set. In this aspect, the optimum set module 304 generates the master row from the optimum set.

The division module 306 compares the columns of each text row in the initial subset of rows to the optimum set and determines the text rows that are the most similar to the optimum set. The division module 306 divides the text rows into a group that is the most similar to the optimum set and a group that is the least similar to the optimum set. The group of text rows that are most similar to the optimum set are determined to be in the final subset of rows and processed further, while the text rows in the least similar group are eliminated from further processing.

The division module 306 determines a confidence factor for each final subset of rows based on the text rows that are elements of the final subset of rows. The confidence factor is a measure of the homogeneity of the final subset of rows, i.e. how similar the physical structure of each text row in the final subset of rows is to the physical structure of each other text row in the final subset of rows. The confidence factor considers one or more factors representing how similar one text row is to other rows in the document. For example, the confidence factor may consider one or more of a rows frequency, variance, mean of elements, number of elements in the optimum set, and/or other variables for factors.

Because the confidence factor is determined for each final subset of rows, and each text row may be included as an element in one or more final subsets of rows, each text row may have one or more confidence factors for one or more corresponding final subsets of rows in which the text row is an element. The division module 306 analyzes the confidence factors for each text row and selects the best confidence factor for each text row.

The classifier module 308 places text rows having the same best confidence factor in a class. In one example, the best confidence factor is the highest confidence factor. Portions of the division module 306, such as the confidence factor calculation and best confidence factor determination, may be included in the classifier module 308 instead of the division module.

Figure 4:
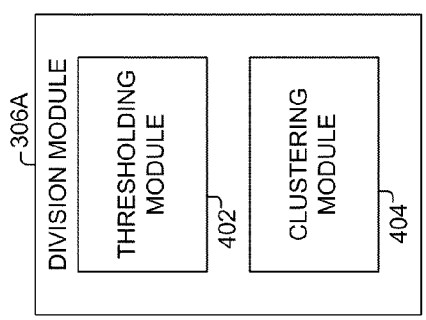
FIG. 4 is a block diagram of a division module in accordance with an embodiment of the present invention.

FIG. 4 depicts an exemplary embodiment of a division module 306A. The division module 306A determines a number of elements, such as text rows, of the initial subset of rows that are most similar to each other based on the columns from the optimum set, and those most similar elements or text rows are in, or correspond to, the final subset of rows. The division module 306A includes a thresholding module 402 and/or a clustering module 404. In one embodiment, the division module 306A includes only a thresholding module 402. In another embodiment, the division module 306A includes only a clustering module 404. In another embodiment, the division module includes an unsupervised learning module to deal with unsupervised learning problems or another algorithm that can split peaks of data into one or more groups.

The thresholding module 402 uses a thresholding algorithm to determine each final subset of rows from each corresponding initial subset of rows. The thresholding module 402 determines the elements, such as text rows, in the initial subset of rows that are the closest to the optimum set by determining the elements having the smallest differences from the optimum set. The master row is a binary vector whose elements identify the horizontal components, such as the columns, in the optimum set. For example, in the master row, "1"s identify the elements in the optimum set and "0"s identify all other columns in the set of columns for the initial subset of rows. Thus, the master row has either a "1" or a "0" for each column (i.e. component) in the set of columns for the initial subset of rows. The master row has a length equal to the number of columns in the initial subset of rows with a "1" on every column that is a part of the optimum set. Therefore, the length of the master row is equal to the number of elements in the optimum set in one example.

The thresholding module 402 determines an initial distances vector, which includes a distance from each text row in initial subset of rows to its master row. The elements in the initial distances vector correspond to the text rows in the initial subset of rows, and the initial distances vector is a measure of the differences between each text row and its master row. In one example, the distance is a Hamming distance. The selected elements of the initial distances vector having the smallest differences correspond to the text rows selected to be in the final subset of rows.

In one embodiment, the thresholding module 402 determines a threshold for the elements of the initial distances vector. The elements that are less than (or alternatively less than or equal to) the threshold are in a final distances vector for the selected initial subset of rows. In one example, the threshold is determined as an Otsu threshold using an Otsu thresholding algorithm.

The elements in the final subset of rows correspond to the elements in the final distances vector. That is, if the distance for a text row is the final distances vector, that text row is in the final subset of rows.

The thresholding module 402 then determines one or more factors to be used in a confidence factor calculation. One factor is the mean of the elements in the final distances vector. Another factor is the statistical variance of the distances of each row in a final subset of rows to its master row. Another factor is a row's absolute frequency, which is the number of text rows in a selected final subset of rows. Another factor may be the length of the master row.

In one example, the confidence factor for a selected final subset of rows having an alignment of a character block in a selected column is given by a form of a confidence factor ratio where the rows frequency is in the numerator of the confidence factor ratio and the variance is in the denominator of the confidence factor ratio. In another example, the confidence factor is given by a confidence factor ratio, where the rows frequency and the master row length are in the numerator and the variance and the mean of the elements in the final distances vector are in the denominator. In one embodiment, the confidence factor equals the quantity of the rows frequency cubed (i.e. to the power of three) multiplied by the length of the master row divided by the quantity of the variance multiplied by the mean of the elements in the final distances vector plus one ((rows frequency cubed*master row length)/((variance*final distances vector mean)+1)).

The thresholding module 402 determines a confidence factor for each final subset of rows. The confidence factor is a measure of homogeneity of the final subset of rows. In one embodiment, if a column for a selected final subset of rows occurs in only one text row, and therefore has only a single instance, the confidence factor for that text row is zero.

Because each final subset of rows has one or more text rows as its elements, each text row may have one or more confidence factors for the final subsets of rows having that text row as an element. Thus, each text row may have one or more confidence factors for one or more corresponding final subsets of rows in which the text row is an element. The thresholding module 402 selects the best confidence factor for each text row. In one example, the best confidence factor is the highest confidence factor.

Once each text row has one or more confidence factors attributed to it, based on the text row being an element in the final subset of rows, each text row is assigned to a class based on the best confidence factor for that text row. As discussed above, the classifier module 308 then determines one or more classes for the document image. In one example, the classifier module 308 places each text row having the same best confidence factor into the same class. The classifier module 308 may determine one or more classes for a document image, and each class may contain one or more text rows.

The clustering module 404 determines a final subset of rows from each initial subset of rows, and multiple final subsets of rows may be determined. The clustering module 404 determines the elements in the initial subset of rows that are the closest to the optimum set.

The clustering module 404 divides the initial subset of rows into a selected number of clusters so that the text rows in each cluster form a homogeneous set based on the columns they have in common. The most uniform set will be selected as the final subset of rows since it contains the elements closest to the optimum set.

In one embodiment, the clustering module 404 evaluates multiple row points representing the initial subsets of rows. Each row point represents a text row in a subset of rows, and each row point has data representing the text row and/or the closeness of the text row to the optimum set, as embodied by the master row. The clusters then are determined from the row points. Each cluster has a center, and each row point is in a cluster based on the distance to the center of the cluster (cluster center distance).

In one example, one or more features may be used as row data for the row points representing the rows, including a distance of a text row to its master row (row distance), a number of matches between a text row and the "1"s of its master row (row matches), and a text row length. Other features or different features may be used in other examples. In one example, the row points are three dimensional points. In other examples, two dimensional row points or other row points are used.

In one embodiment, the row distances, row matches, and row lengths are normalized for each row point. The row distances are normalized by dividing each row distance in the subset by the sum of the row distances for the subset. The row matches are normalized by dividing each row match in the subset by the sum of the row matches for the subset. The row lengths are normalized by dividing each row length in the subset by the sum of the row lengths for the subset. Other methods may be used to normalize the data.

The clustering module 404 splits the row points for each initial subset of rows into a selected number of clusters, such as two clusters. Though, other numbers of clusters may be used. The row points are assigned to each cluster based on their distance to the cluster center. A point is assigned to a cluster if the distance between the row point and the cluster center is smaller than the distance between the row point and another cluster.

Once the row points are assigned to the clusters, the clustering module 404 selects one cluster as a final cluster and eliminates the other cluster. In one embodiment, the average of the row distances (row distances average) and the average of the row matches (row matches average) of each row point in each cluster are determined. For each cluster, the row matches average is subtracted from the row distances average to determine a cluster closeness value between the selected cluster and the optimum set, as identified by the master row. The cluster having the smallest cluster closeness value is selected as the final cluster, and the text rows associated with the row points in the final cluster are selected to be included in the final subset of rows. Alternately, the averages of the normalized row distance and normalized row matches may be used. Other examples exist.

The elements in the final subset of rows correspond to elements in a final distances vector. That is, each text row in the final subset of rows has a distance between that text row and its master row in the final distances vector. For example, each element in the initial distances vector corresponded to an element in the initial subset of rows. The initial subset of rows contains text rows as its elements, and the initial distances vector contains distances between the corresponding text rows and their master row. Similarly, the final distances vector includes the distances between the text rows in the final subset of rows and their master row.

The clustering module 404 determines a mean (average) of the elements in the final distances vector. The clustering module 404 also determines a final matches vector, which is a vector of matches between "1"s in the columns of each text row in the final subset of rows and the "1"s in the corresponding columns of its master row. A row matches average is the average of the elements in the final matches vector, which is the average number of row matches between the text rows in the final subset of rows and their master row.

To determine the final set of rows to be classified into a class of rows based on columns, a confidence factor is determined for each final subset of rows by the clustering module 404. The confidence factor is a measure of the homogeneity of the final subset of rows. In one example, the clustering module 404 determines a confidence factor based on a confidence factor ratio including a normalized frequency and the average number of matches between the text rows in the final subset of rows and their master row in the numerator and the mean of the distances between the text rows in the final subset of rows and their master row in the denominator. The normalized frequency in this example is the number of text rows in the final subset of rows divided by the number of text rows in the document image. In one embodiment, if a column for a selected final subset of rows occurs in only one text row, and therefore has only a single instance, the confidence factor for that text row is zero.

Because each final subset of rows has one or more text rows as its elements, each text row may have one or more confidence factors for a final subset of rows having that text row as an element. Thus, each text row may have one or more confidence factors for one or more corresponding final subsets of rows in which the text row is an element. The clustering module 404 selects the best confidence factor for each text row. In one example, the best confidence factor is the highest confidence factor.

In one embodiment, the clustering module 404 uses a Fuzzy C-Means (FCM) clustering algorithm to divide the initial subsets of rows into two clusters. Other clustering algorithms may be used.

Once each text row has one or more confidence factors attributed to it, based on the text row being an element in the final subset of rows, each text row is assigned to a class based on the best confidence factor for that text row. As discussed above, the classifier module 308 then determines one or more classes for the document image. In one example, the classifier module 308 places each text row having the same best confidence factor into the same class. The classifier module 308 may determine one or more classes for a document image, and each class may contain one or more text rows.

Figure 5:
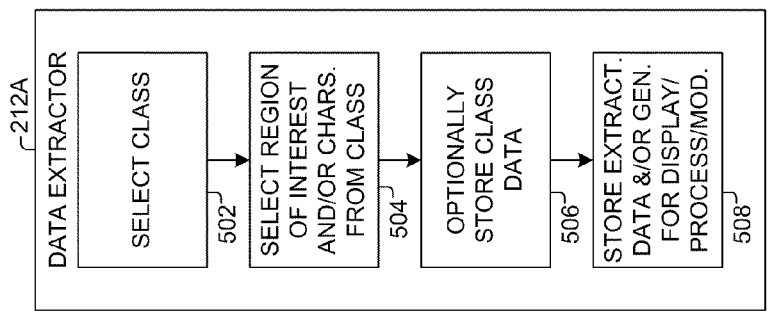
FIG. 5 is a block diagram of a data extractor in accordance with an embodiment of the present invention.

FIG. 5 depicts an exemplary embodiment of a data extractor 212A. The data extractor 212A extracts data from one or more regions of interest of one or more text rows based on the classification of the text row. The data extractor selects a class 502 and selects a region of interest and/or characters from the class 504.

Alternately, the data extractor 212A selects one or more regions of interest from a text row based on the class to which the text row is assigned. Alternately, the data extractor 212A transmits the physical structures of the classes in the document image being analyzed to the document database 214 at step 506, such as to be stored as a new document model. At 508, the data extractor 212A alternately generates the document image, document data, document model, document model data, and/or extracted data for display, for storage, for or to another process, module, system, or algorithm for further processing, or otherwise to an output system 108A or to a user interface 114A.

In one instance, the data extractor 212A receives instructions for retrieving data from an input system 106A or the user interface 114A. The input system 106A and/or the user interface 114A may be another process, module, or algorithm in the forms processing system 102A. Other examples exist.

Figure 6:
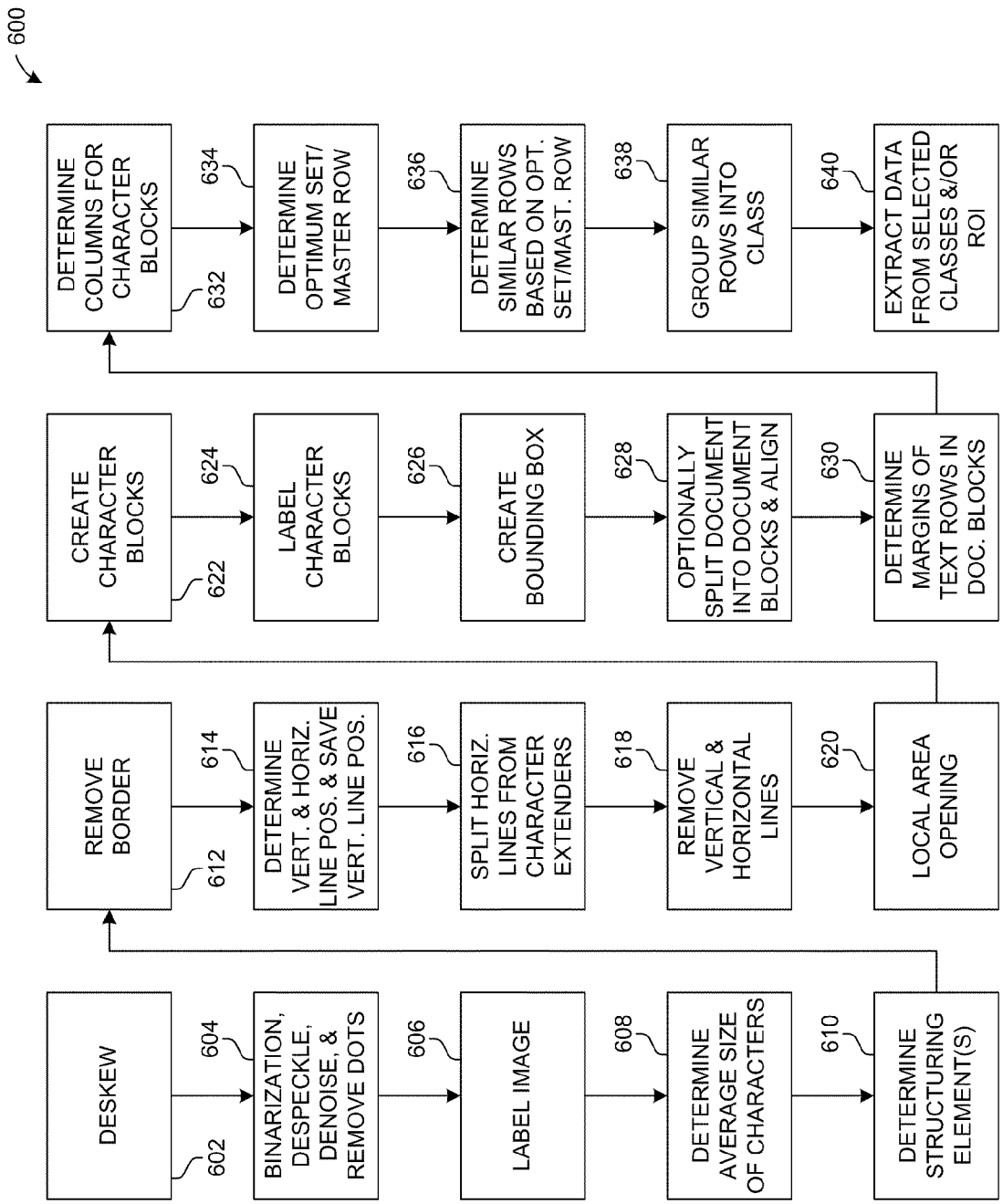
FIG. 6 is a flow diagram of a text row classification and data extraction in accordance with an embodiment of the present invention.

FIG. 6 depicts an exemplary embodiment of an automatic document processing 600 by the document processing system 102A. Referring to FIGS. 2 and 6, the pre-processing system 202 deskews the document image at 602. The pre-processing system 202 then processes the document image for binarization, despeckle, denoise, and dots removal at 604.

The image labeling system 204 labels the image at 606 and determines the average size of characters in the document image at 608. In one example, the average size of average characters is determined. The image labeling system 204 determines one or more structuring elements at 610, including the size of the structuring elements based on the average size of characters determined at step 608.

The image labeling system 204 removes the border from the document image at 612 and then determines the locations of horizontal and vertical lines, such as through a morphological opening, and saves the vertical line positions at 614. The image labeling system 204 splits the horizontal lines from character extenders at 616 and removes the vertical and horizontal lines at 618. Finally, the image labeling system 204 performs a local area opening with the horizontal and vertical structuring elements to clean the image at 620.

The character block creator 206 creates the character blocks at 622, such as through a morphological closing, a run length smoothing method, or another process. In one embodiment, the character block creator 206 uses a zero-degree structuring element to perform the morphological closing to create the character blocks. In one example, the structuring element is a 1×(1.3*the average character width) structuring element. In another embodiment, multiple structuring elements may be used, including a zero-degree and ninety-degree structuring elements.

At 624, the character block creator 206 also draws a bounding box around each character block, which typically is a rectangle. The rectangle bounding box allows the alignment system to more easily find one or more alignments of the character blocks for one or more columns. The bounding box is optional in some embodiments.

The alignment system 208 labels each character block at 626 to determine one or more alignments of the character blocks. The alignment system 208 optionally splits the document into document blocks and aligns the document blocks at 628. In one example, the document blocks are aligned vertically.

The alignment system 208 then determines the margins of the text rows at 630, which includes determining the starting point and ending point of each text row and each document block. The length of each text row optionally is determined between the starting point of the first character block on the text row and the ending point of the last character block on the text row.

The classification system 210 determines the columns for the character blocks using the character block label at 632. The classification system 210 determines the optimum set, which may include creating the master row from the optimum set elements at 634. The classification system 210 determines similar text rows in the document image based on the optimum set, as indicated by the master row at 636. The classification system 210 then groups the similar rows into classes at 638. In one example, the classification system 210 assigns a label to each row that is part of the same class.

The data extractor 212 extracts data from one or more areas of the document image, one or more selected regions of interest, or one or more classes at step 640.

FIG. 7 depicts an exemplary embodiment of a line detector module 702 of an image labeling system 204A. At 704, the line detector module 702 detects vertical and horizontal line positions for the document image, such as through a morphological opening process. The line detector module 702 generates a line distribution sample (LDS) array/vertical line positions array for the vertical line positions at 706 and saves the vertical line positions array at 708.

FIG. 8 depicts an exemplary embodiment of a document block module 802 of an alignment system 208A. The document block module 802 splits a document into one or more document blocks when one or more document blocks are present in a document image.

For example, the document block module 802 analyzes one or more types of document images, such as the document images 804-810 of FIGS. 8A-8D. The document image 804 of FIG. 8A includes multiple text rows 812 but no vertical or horizontal lines. The document image 806 of FIG. 8B includes multiple vertical lines 814 and horizontal lines 816 for two document blocks 818 and 820 and a center vertical line 822 between the two document blocks. A leading line 824 and the center line 822 define the beginning of the two document blocks 818 and 820, respectively. The document image 808 of FIG. 8C includes multiple vertical lines but no horizontal lines. The document images of 806-808 of FIGS. 8B-8C also may include text rows (not shown). The document image 810 of FIG. 8D includes two document blocks 826 and 828 separated by a white space divider 830. The document image 810 also includes multiple text rows 830 and 832 in the document blocks 826 and 828, respectively, and multiple text rows 834 above a horizontal white space 836 located above the document blocks 826 and 828. The last text row 838 located vertically above the white space 836 is referred to as a top stop point 840 because it is the last continuous text row extending horizontally above and across both document blocks 826 and 828 and/or a percentage of the page and, therefore, is not within either of the document blocks.

Referring again to FIG. 8, the document block module 802 determines if a line pattern in the document image identifies two or more document blocks at 842 and splits the document image when a line pattern is determined that identifies two or more document blocks at step 844. The document block module 802 determines if one or more white spaces divide the document image into two or more document blocks at 846 and splits the document image when one or more white space dividers are determined that split the document image into two or more document blocks at 848. If a split is determined, the document block module 802 determines the start and end of each document block at 850 and optionally shifts and aligns the document blocks at 852. For example, the document block module 802 may shift the document blocks so they are vertically aligned and so that the margins of the document blocks are vertically aligned.

Figure 9:
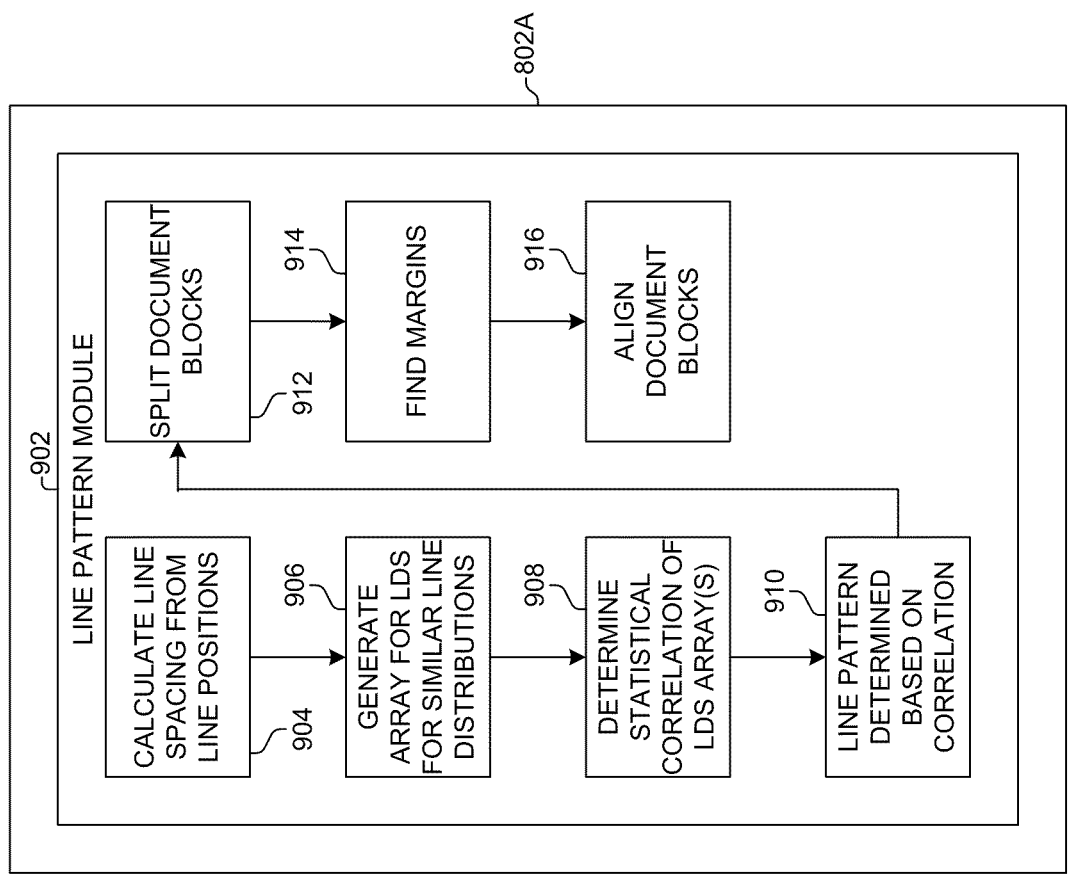
FIG. 9 is a diagram of a line pattern module determining line patterns in accordance with an embodiment of the present invention.

FIG. 9 depicts a line pattern module 902 of a document block module 802A. The line pattern module 902 also may be included in an alignment system 208A without a document block module. For example, the line pattern module 902 determines if a line pattern identifies two or more document blocks, such as at step 842 of FIG. 8.

The line pattern module 902 calculates the line spacings between the vertical lines of the document from the line positions saved in the vertical line positions array at 904. For example, the line detector 702 of FIG. 7 optionally generates and saves a vertical line positions array. The line pattern module 902 uses that vertical line positions array to determine the spacings between each vertical line. In one example, the line pattern module 902 determines the number of pixels that exist between each line.

The line pattern module 902 generates one or more line spacing arrays for the line distribution sample (LDS) in the vertical line positions array by determining one or more patterns of the same or similar line spacings at step 906. The line pattern module 902 may generate two or more arrays, a multi row array, or another array that enables a comparison of two or more groups of numbers. For example, the line pattern module 902 tries to establish a pattern between the first and second line spacings (which correspond to spaces between the first and second line and the second and third line, respectively) in one portion of the document and the same or similar line spacings in another portion of the document. The line spacing module 902 shifts the line spacings back and forth to identify a pattern.

The line pattern module 902 determines a statistical correlation between the rows of a line spacing array or between multiple line spacing arrays (or the groups of numbers in another manner) to determine how similar the line spacings are for the line spacing array(s). The line pattern module 902 compares all of the line spacing numbers and continuously shifts the line spacing numbers in the line spacing arrays back and forth to find the best statistical correlation.

At step 910, a line pattern is determined and/or confirmed based on the statistical correlation. If the statistical correlation between the rows in one line spacing array or between two or more line spacing arrays is greater than the selected high correlation factor, the rows in the single array or the multiple arrays are highly correlated and are a match. For example, if the statistical correlation between two rows of a line spacing array is greater than 0.8, the rows of the line spacing array are highly correlated and are considered a match. In another example, the high correlation factor is 0.9. If a match is found because the statistical correlation for the groups of line spacings is greater than the high correlation factor, a line pattern is determined for the groups of line spacings, and the lines between the line spacings of the groups form a corresponding document block. If no statistical correlation between two or more line spacing arrays is greater than a selected high correlation factor, a match is not found, and a single document block exists in the document image.

In one example, the line pattern module 902 compares the first line spacing number to each remaining line spacing number in the sample to identify a corresponding line spacing number that is the same or similar to the first line spacing number. This second line spacing number that is the same or similar is considered a match. The line pattern module 902 then tries to identify matches for the additional line spacing numbers in the line distribution sample. When a match is located, the first line spacing number is placed in a first line spacing array, and the second, matching line spacing number is placed in a second line spacing array. Alternately, the numbers are placed in separate rows of a single array.

The line spacing numbers are continuously shifted back and forth to find the best statistical correlation. Therefore, after a first set of line spacing arrays are determined, and the statistical correlation is determined between the set of line spacing arrays, the line pattern module 902 may determine a new set of line spacing arrays and determine the statistical correlation between the new set of line spacing arrays. The line spacing module 902 continues to determine new line spacing arrays by shifting the line spacing numbers back and forth and determining the statistical correlation between the arrays. In one example, the line pattern module 902 then determines the best statistical correlation that is greater than the high correlation factor. In another example, the line pattern module 902 stops determining line spacing arrays and statistical correlations after the line pattern module identifies line spacing arrays having a statistical correlation greater than the high correlation factor.

The document blocks correspond to the portions of the document image having the line spacing numbers in the line spacing arrays that match and are deemed to be highly correlated. For example, if two line spacing arrays have a statistical correlation greater than the high correlation factor, the line spacing arrays match, and the lines separated by the line spacings of each array are in corresponding document blocks. For example, if lines 1-4 correspond to line spacings 1-3 of a first array, and lines 5-9 correspond to line spacings 4-6 of the second array, then lines 1-4 are in document block 1, and lines 5-9 are in document block 2.

The line pattern module 902 splits the document image 806 into the document blocks 818 and 820 at step 912. The line pattern module 902 determines the left and right margins of the document blocks 818 and 820 at step 914. In one embodiment, the left and right margins of a document block are identified by determining the left most column label for the left most character block of the document block and the right most column label for the right most character block of the document block. In another embodiment, projection profiling is used to generate a histogram of on and off pixels. In this example, a selected number of off pixels from each side of the document block 818 and 820 followed by on pixels indicates a margin. At step 916, the line pattern module 902 vertically aligns the document blocks 818 and 820. For example, the line pattern module 902 aligns the document blocks 818 and 820 so that the starting points 824 and 822, respectively, of the document blocks are in the same column or other horizontal component. In another example, the starting points 822 and 824 are determined as the vertical lines immediately preceding the first line spacing number of each row 920 and 922 of the line spacing array 924.

FIGS. 9A-9B depict an example of a line pattern determination by the line pattern module 902. FIG. 9A depicts vertical lines 918 corresponding to the frame-based document image of FIG. 8B. In this example, the document image includes vertical lines at line positions 0, 20, 75, 90, 150, 160, 180, 232, 245, 261, and 271. The line positions in this example refer to pixel positions. However, the positions may be a horizontal coordinate, such as an X coordinate, another coordinate or ordinate, or another spatial position.

The line pattern module 902 determines the spacing between each of the lines 918. For example, the line pattern module 902 determines the line spacing between each line position since the line positions are known. In the example of FIG. 9A, the line spacing numbers include 20, 55, 15, 60, 10, 20, 52, 17, 56, and 10 and are saved in a line spacing number array. In this example, the line spacing numbers identify a number of pixels between each line. However, other line spacing numbers may be used.

The line pattern module 902 compares the first line spacing number of 20 to the other line spacing numbers to identify a same or similar number. In this example, the line pattern module 902 identifies another line spacing number of 20 after the line spacing number of 10. The line pattern module 902 places the first line spacing number of 20 in a first row 920 and the second line spacing number of 20 in a second row 922 of a line spacing array 924. The line pattern module 902 places the two line spacing numbers in an M×N array, where M is a number of columns determined by the line pattern module 902 through the line pattern determination process and N is the number of rows in the array determined through the line pattern determination process. In this example, N=2. Alternately, the line pattern module 902 places the line spacing numbers in two separate arrays.

The line pattern module 902 identifies the second line spacing of 55 and compares it to the other line spacing numbers for the document image to identify a match. The line pattern module 902 identifies the line spacing of 52 as being close to the line spacing of 55. Therefore, the line spacing of 55 is placed in the first row 920 of the line spacing array 924 and the line spacing of 52 is placed in the second row 922 of the array. Alternately, the line pattern module may place the numbers in two separate arrays. The line pattern module 902 continues to compare each of the line spacing numbers in the document image and assigns the line spacings 15, 60, and 10 to the first row 920 of the line spacing array 924 and assigns the line spacing numbers 17, 56, and 10 to the second row 922 of the array. In this example, a high correlation is found between the line spacings of the two rows 920 and 922 of the array 924. Thus, two document blocks 926 and 928 are identified by the line pattern module 902, and these document blocks correspond to the document blocks 818 and 820 of FIG. 8B.

Referring to FIGS. 8B and 9, if the line pattern module 902 identifies a vertical line 820 in the center of the document image 806, the line pattern module 902 splits the document image into the two document blocks 818 and 820. This embodiment is optional in some examples.

Referring to FIGS. 8B and 9, in one embodiment, the line pattern module 902 splits the document image 806 into two document blocks 818 and 820 when it detects the center line 822. For example, the line pattern module 902 may be configured to analyze a center area of the document image to determine if a center line 822 exists. In one example, the center area is a selected number of pixels in one or more directions or on one or more sides from the center of the document image 806. In another embodiment, the line pattern module 902 analyzes thirds, quarters, or other percentages of the document image to determine if a central line splits the document image into multiple document blocks.

Figure 10:
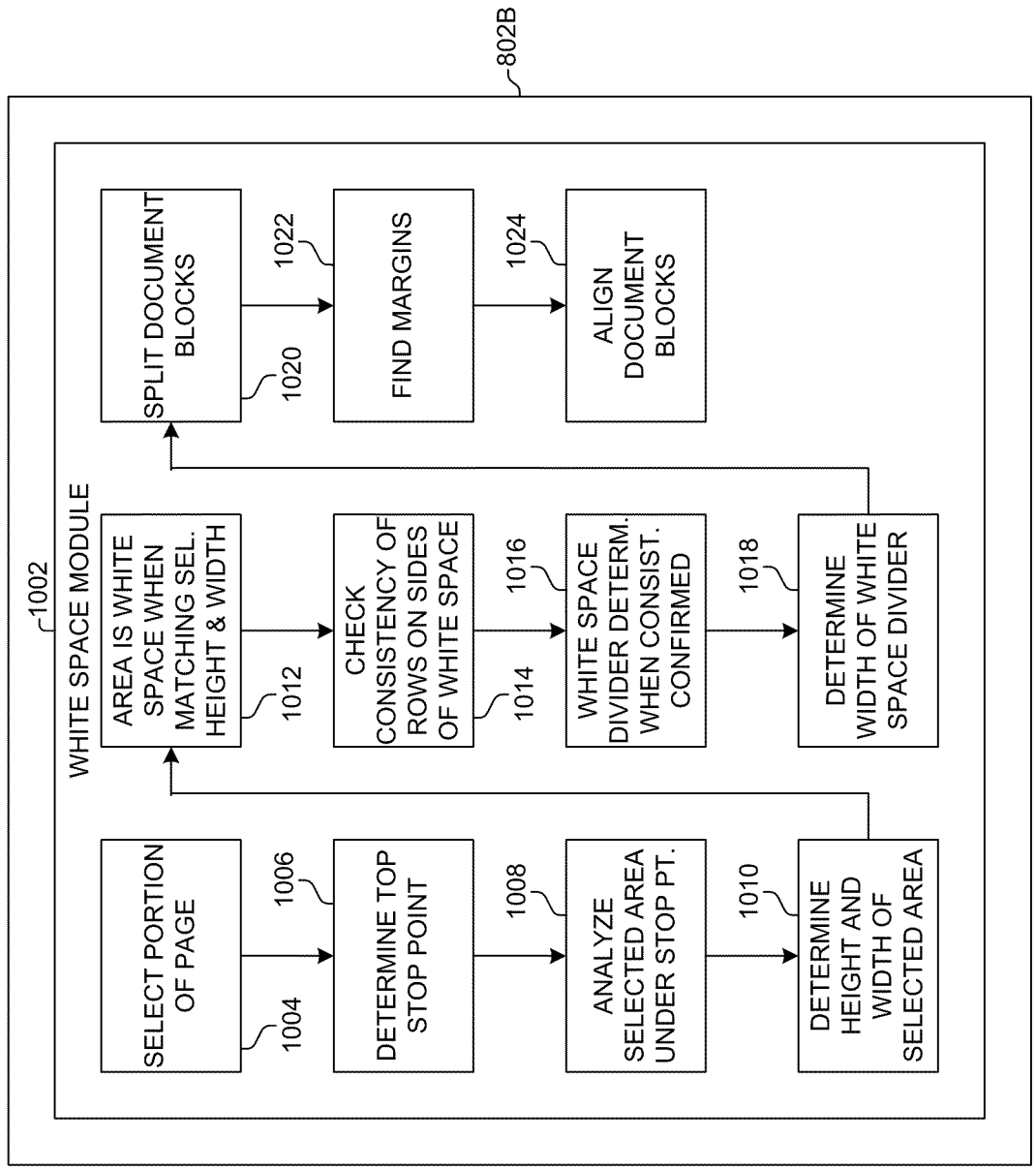
FIG. 10 is a diagram of a white space module determining a white space divider in accordance with an embodiment of the present invention.

FIG. 10 depicts an exemplary embodiment of a white space module 1002 of a document block module 802B. The white space module 1002 also may be included in an alignment system 208A without a document block module. The white space module 1002 analyzes the document image and makes a white space determination.

Referring to FIGS. 8D and 10, the white space module 1002 selects a portion of the page of the document image 810 at step 1004. For example, the white space module 1002 may select the center of the page or an area at the center of the page to begin its analysis. Alternately, the white space module 1002 may select one or more other portions of the page, such as areas at a left edge 854 or a right edge 856 of the document image 810, successive areas between the edges of the document image, areas at each one-third or one-fourth of the page, or other areas.

The white space module 1002 determines the top stop point of the document image 810 at step 1006. In the example of FIG. 8D the top stop point 838 is the second line of the text rows 834.

At step 1008, the white space module 1002 examines a selected area or number of pixels from a selected white space area 830 under the top stop point 838 at the selected portion of the page. At 1010, the white space module 1002 determines the height and width of the selected area to determine if the height and width are greater than, or alternately greater than or equal to, (i.e. match) a selected white space height and a white space selected width at 1012. In one example, the selected area 830 is white space when the area has a white space height that includes contiguous vertical off pixels greater than sixty-five percent of the page height and a white space width of contiguous off pixels greater than or equal to ten pixels wide. Other heights and widths may be used. For example, the selected height may be sixty-five percent of the height under the top stop point (between the top stop point and a bottom border or a bottom edge of the page), fifty percent of the page height, a selected number of pixels, or another value. In another example, the white space width may be another selected width, such as greater than between 5 and 20 pixels or another value.

At step 1014, the white space module 1002 checks the consistency of the rows on each side of the white space determined at step 1012. In one embodiment, the consistency is determined by counting the number of pixels in each row (i.e. the row length). In one example, if the total row length of the text rows in a first potential document block is greater than 90% of the total row length of the text rows in a second potential document block, a row length match is found, and the two potential document blocks are document blocks. In another example, the white space module 1002 determines the row length of each text row in each potential document block. If a selected percentage of the text rows in a first potential document block are greater than 90% of corresponding text rows in the second potential document block, a row length match is determined, and the potential document blocks are document blocks. Other percentages or measurements may be used, such as greater than 80%. The document block consistency is used to confirm the white space area is actually a white space divider of two document blocks and not simply a white space in a single document block. The white space area 830 is determined to be a white space divider at step 1016 when the consistency of the text rows in each potential document block is confirmed.

When the white space area 830 is determined to be a white space divider, the white space module 1002 determines the width of the white space divider at step 1018. In one example, the width of the white space area 830 is determined using projection profiling. The projection profiling effectively determines the width of the white space area 830 and the end of the first document block 826 and the beginning of the second document block 828.

The projection profiling generates a histogram of on and off pixels of the white space area and a distance on one, two, or more sides of the white space area. In this example, off pixels indicate white space, and on pixels on each side of the white space divider indicate the end of the white space divider and the right and left or other margins of the document blocks 826 and 828, respectively.

In one example, the projection profiling is performed only for the portions of the document image under the top stop point 838. In another example, the portions of the document image 810 under the top stop point 838 are copied and pasted into a new document, and the projection profiling is performed on that portion of the document image. Other examples exist.

The white space module 1002 splits the document blocks at step 1020 when the white space divider is confirmed. The white space module 1002 determines the margins of each document block 826 and 828 at step 1022. In one embodiment, the left and right margins of a document block are identified by determining the left most column label for the left most character block of the document block and the right most column label for the right most character block of the document block. In another embodiment, the left and right margins are determined by using projection profiling in one embodiment by generating a histogram of on and off pixels. In this example, a selected number of off pixels from each side of the document block 826 or 828 followed by on pixels indicates a margin. In another example, a selected number of off pixels from each edge 854 or 856 of the document image 810 followed by on pixels indicates a margin. In another example, a selected number of off pixels from a border for each edge 854 or 856 of the document image 810 followed by on pixels indicates a margin. The projection profiling determines where the document blocks start and end. In another example, the left margin of the first document block 826 is determined, and the right margin 828 of the second document block is determined, such as through projection profiling. The right margin of the first document block 826 and the left margin of the second document block 828 share a border with the left and right borders of the white space area 830, which previously were determined at step 1018 using projection profiling in one example.

After the margins are determined at step 1020, the white space module 1002 aligns the document blocks at step 1024. In this embodiment, the document blocks 826 and 828 are aligned so that their starting points 858 and 860, respectively, are in the same column or other horizontal component. The ending points 862 and 864 of the document blocks 826 and 828 may not be in the same column or other horizontal component.

Referring to FIGS. 8C and 10, the white space module 1002 does not split a document image 808 into two or more document blocks if the document image has vertical lines 854 covering a selected horizontal page distance percentage of the document image. For example, the document image 808 has a horizontal page distance between the left edge 856 and the right edge 858 of the document image. The horizontal page distance percentage is a selected percent of that horizontal page distance, such as between 60 and 90%. In one embodiment, if the vertical lines 854 cover a total horizontal area between the beginning line 860 and the ending line 862 that is greater than 90% of the horizontal page distance, the white space module 1002 does not split the document image 808 into two or more document blocks. In another embodiment, if the vertical lines 854 cover a total horizontal area from the beginning line 860 to the ending line 862 that is greater than a selected horizontal page distance percentage between 60 and 80% of the horizontal distance of the page, the white space module will not split the document image 808 into two or more document blocks even if a white space area is located.

Figure 11:
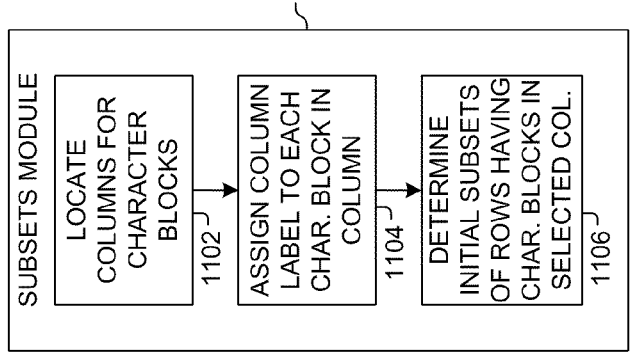
FIG. 11 is a diagram of a subsets module determining columns for character blocks in accordance with an embodiment of the present invention.

FIG. 11 depicts an exemplary embodiment of a subsets module 302A for determining columns for one or more alignments of the character blocks of a document image. The subsets module 302A uses the label assigned to each character block by the character block creator 206. The character block label identifies the corners and/or sides of each character block, such as an X-Y coordinate for each corner and/or an X coordinate for each left and right side and/or a Y coordinate for each top and bottom side. Other coordinate or ordinate systems may be used instead of an X or X-Y coordinate. In one example, each character block label identifies each individual character block and distinguishes each character block from each other character block, such as by their assigned coordinates or ordinates.

The subsets module 302A locates the columns for one or more alignments of the character blocks in the document image at step 1102. In one example, the subsets module 302A generates one or more histograms of one or more coordinates or ordinates of each character block, such as a horizontal coordinate for each side of each character block. In another example, where each pixel in the document image has an X-Y coordinate and the X coordinate identifies the horizontal component for the pixel, the subsets module 302A generates a histogram having the X coordinate for each alignment of each character block.

In one example, one histogram is generated for the X coordinates of the left sides and right sides of the character blocks. In another embodiment, the subsets module 302A generates a separate histogram for each alignment of the character blocks in the document image. For example, one histogram identifies X coordinates of the left sides of the character blocks, and another histogram identifies X coordinates of the right sides of the character blocks.

The histogram has pixel peaks at the locations of one or more alignments of the character blocks, and those locations are the horizontal locations of one or more corresponding columns. In one example, an alignment of a character block exists at a location in the histogram having 1 or more pixels.

In one embodiment, a single column is assigned to a pixel peak being more than 1 pixel wide. The pixel peak may be a selected pixel width, such as a selected number or a selected range of numbers. For example, the subsets module 302A may analyze the edges or centers of the pixel peaks within a 1-5 pixel range and consider each alignment within that pixel range to be in the same column, which will result in each of those alignments having the same column label.

The subsets module 302A assigns a column label to each alignment of each character block in each column at step 1104. The column label identifies the columns in which one or more alignments of one or more character blocks exist. For example, a column label may be a sequential number series, such as 0, 1, 2, 3, etc., an alphanumeric label series, a series of characters, or other label types. Other examples exist.

The subsets module 302A determines the initial subsets of rows having an alignment for character blocks in a selected column at step 1106. In one example, the subsets module 302A uses the column label assigned to one or more alignments of each character block to determine each initial subset of rows.

Figure 12:
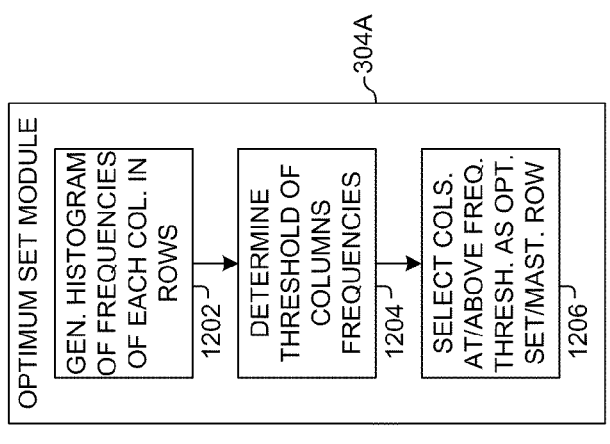
FIG. 12 is a diagram of an optimum sets module determining an optimum set in accordance with an embodiment of the present invention.

FIG. 12 depicts an exemplary embodiment of an optimum set module 304A. The optimum set module 304A generates a histogram of frequencies of each column in a selected initial subset of rows (columns frequencies) at step 1202. The optimum set module 304A then determines the threshold of columns frequencies at step 1204. In one example, the optimum set module 304A uses an Otsu thresholding algorithm to determine the threshold. The optimum set module 304A selects the columns at or above the columns frequencies threshold as the optimum set at step 1206. In one example, each column in the optimum set has a column frequency greater than the columns frequencies threshold. In another example, each column in the optimum set has a column frequency greater than or equal to the columns frequencies threshold.

The optimum set module 304A determines a binary master row. The columns in the optimum set are identified in the binary master row as "1"s in one example. Columns not in the optimum set are identified as "0"s in this example of the binary master row.

Figure 13:
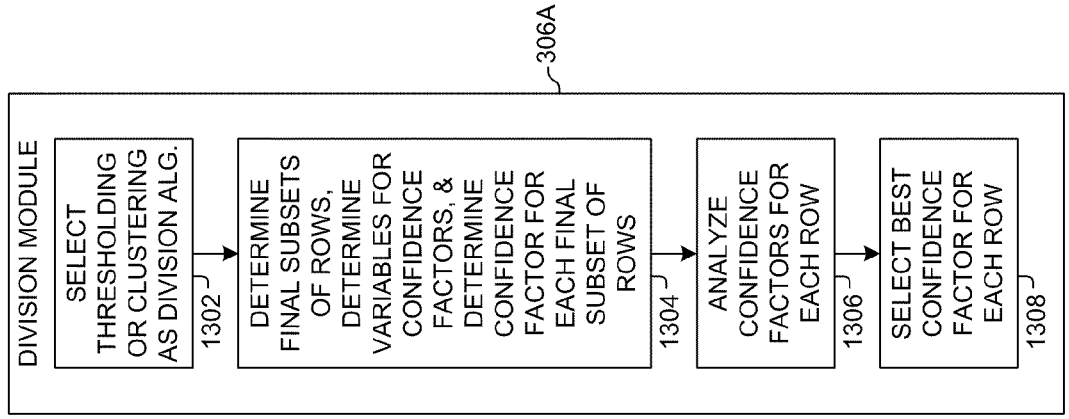
FIG. 13 is a diagram of a division module determining similar rows based on a master row in accordance with an embodiment of the present invention.

FIG. 13 depicts an exemplary embodiment of a division module 306A determining similar rows 634A. At step 1302, the division module 306A selects a thresholding algorithm or a clustering algorithm as a division algorithm. In another embodiment, only a thresholding algorithm or only a clustering algorithm is available as the division algorithm. At step 1304, the division algorithm 306A determines the final subsets of rows, determines the variables for the confidence factor calculations, and determines a confidence factor for each final subset of rows. The division module 306A analyzes the confidence factors for each text row at step 1306 and selects the best confidence factor for each row at 1308. In one example, the best confidence factor for each text row is the highest confidence factor for each text row.

Figure 14:
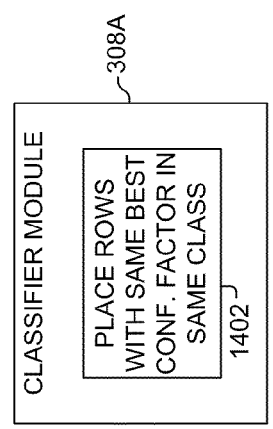
FIG. 14 is a diagram of a classifier module classifying similar rows into a class in accordance with an embodiment of the present invention.

FIG. 14 depicts an exemplary embodiment of a classifier module 308A for grouping similar rows into a class 636A. The classifier module 308A places the text rows with the same best confidence factor in the same class at step 1402.

Figure 15:
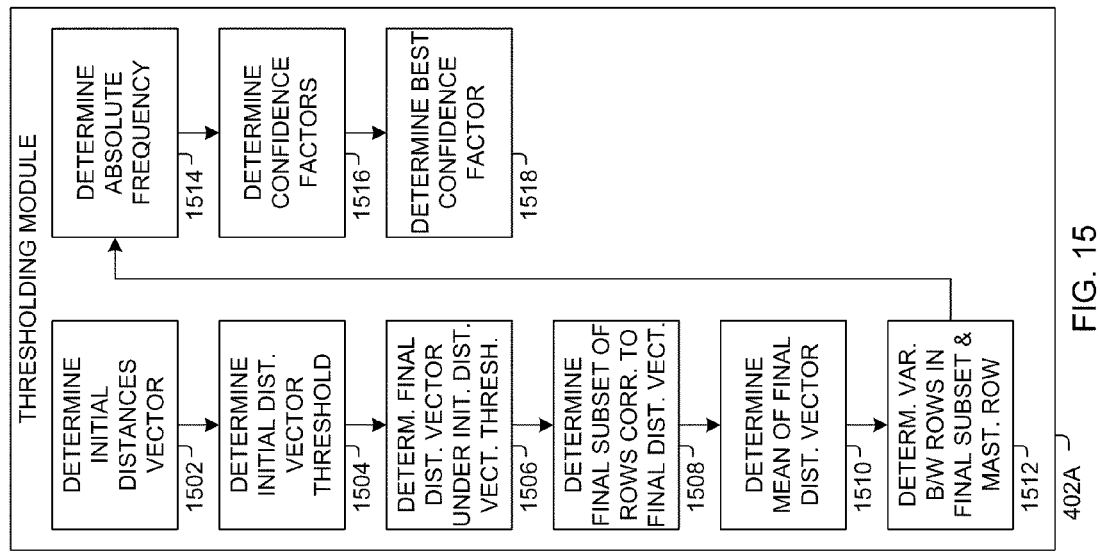
FIG. 15 is a diagram for a thresholding module for a thresholding division in accordance with an embodiment of the present invention.

FIG. 15 depicts an exemplary embodiment of a thresholding module 402A for performing a division algorithm. At step 1502, the thresholding module 402A determines an initial distances vector between each text row in an initial subset of rows and the master row for the initial subset of rows. At step 1504, the thresholding module 402A determines an initial distances vector threshold, such as with an Otsu thresholding algorithm. At 1506, the thresholding module 402A determines a final distances vector under the initial distances vector threshold. A final subset of rows corresponding to the final distances vector is determined at 1508, and the mean of the final distances vector is determined at 1510. The thresholding module 402A determines the variance between each text row in the final subset of rows and the master row at 1512. The absolute frequency is determined at 1514, and the thresholding module 402A determines the confidence factors for the final subsets of rows at 1516. In one example, the confidence factor is given by ((rows frequency cubed*master row length)/((variance*final distances vector mean)+1)). The thresholding module 402A determines the best confidence factor for each text row at 1518.

Figure 16:
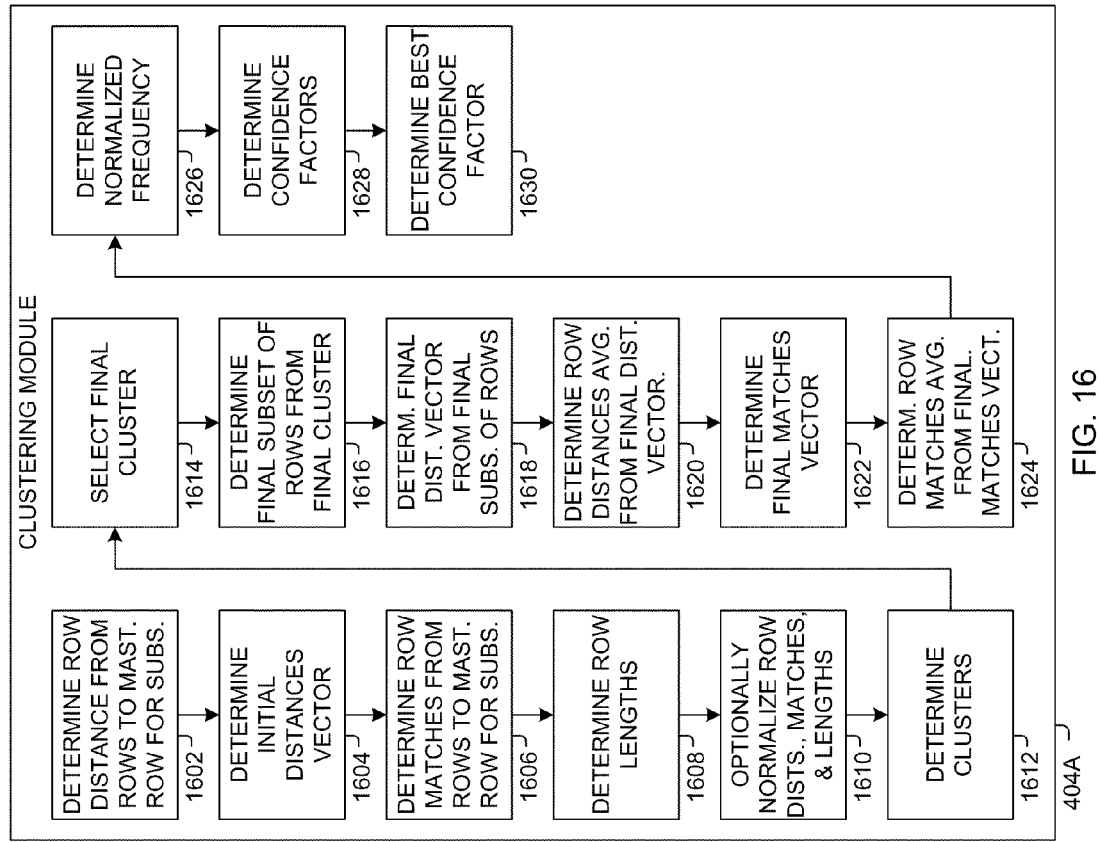
FIG. 16 is a diagram of a clustering module for a clustering division in accordance with an embodiment of the present invention.

FIG. 16 depicts an exemplary embodiment of a clustering module 404A for performing a division algorithm. The clustering module 404A determines a row distance from each text row in the initial subset of rows to the master row for the initial subset of rows at 1602. The row distances are the initial distances vector at 1604. The clustering module 404A determines the row matches from each text row in the initial subset of rows to the "1"s of the master row for the initial subset of rows at step 1606. The clustering module 404A then determines the row length for each text row at 1608. At 1610, the clustering module 404A optionally normalizes the row distances, row matches, and row lengths. The clusters then are determined at step 1612 for the selected number of clusters. In one example, the clustering module 404A determines two clusters using a Fuzzy C-Means (FCM) clustering algorithm.

The clustering module 404A selects the final cluster at 1614. In one example, the final cluster is determined by analyzing the closeness of each cluster to the master row. For example, the clustering module 404 subtracts the average row matches from the average row distance for each cluster to determine the cluster closeness value for each cluster and selects the cluster having the lowest cluster closeness value as the final cluster.

At 1616, the clustering module 404A determines the final subset of rows from the final cluster. For example, the final cluster includes row points for one or more text rows, and the final subset of rows includes the text rows corresponding to the row points in the final cluster.

The final distances vector is determined from the final subset of rows at step 1618. The row distance for each text row in the final subset of rows is in the final distances vector.

At 1620, the clustering module 404A determines the row distances average from the final distances vector. The final matches vector is determined at step 1622, which includes a row match for each text row in the final subset of rows. The row matches average is determined from the final matches vector at step 1624.

The clustering module 404A determines a normalized frequency of rows at 1626, which corresponds to the number of text rows in the final subset of rows divided by the number of text rows in the document image. The clustering module 404A then determines the confidence factors for each final subset of rows at step 1628. In one example, the confidence factor is given by the normalized rows frequency for the selected final subset of rows multiplied by the average number of matches between the text rows and the master row in the final subset of rows and divided by the average of the distances between the text rows and the master row in the final subset of rows. The clustering module 404A determines the best confidence factor for each text row at 1630.

Figure 17:
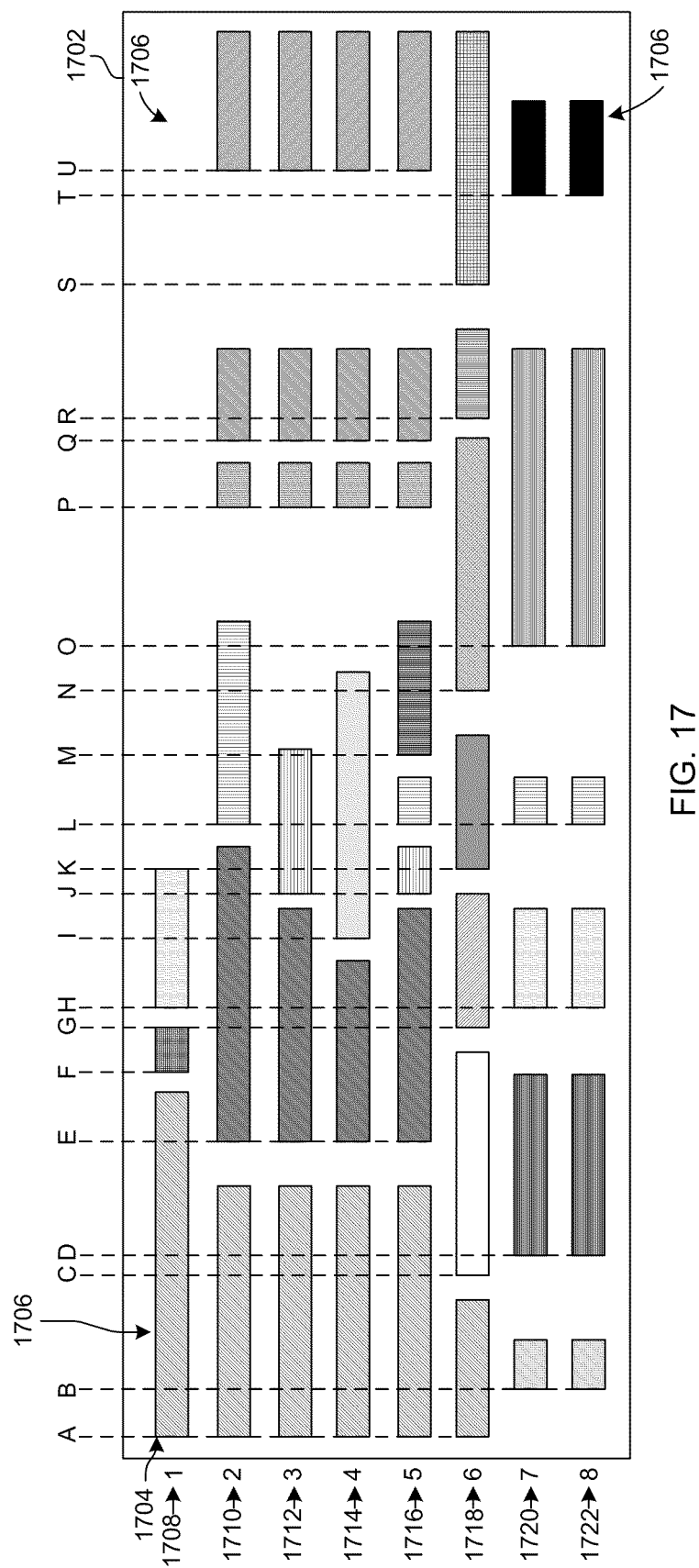
FIG. 17 is a diagram of a document with one alignment.

FIG. 17 depicts an example of a document 1702 processed by a classification system 210A of the forms processing system 104A for one alignment, such as the left alignment of character blocks in one or more columns. The left alignment in this example is the alignment of columns A-U at the left sides 1704 of the character blocks 1706. In this example, the document 1702 has eight text rows 1708-1722 (corresponding to text rows 1-8), and the character blocks 1706 in the document have left alignments for columns A-U.

The character blocks 1706 in each column A-U are designated with a different pattern to more readily visually identify the character blocks associated with the columns in this example. The patterns and the designations are not needed for the processing. The designation of the columns is for exemplary purposes in this example. Columns may be designated in other ways for other examples, such as with one or more coordinates or through labeling. Designations are not used in other instances. Alternately, character blocks are labeled, the labeling process identifies the horizontal component, and columns are not separately identified or designated.

For representation purposes, upper case omega ($\Omega$) is the set of rows in the document 1702, where each row has one or more alignments of character blocks in one or more columns, and upper case X prime (X') is the set of columns having character blocks in the document. $\omega_X^i$ (lower case omega, superscript i, subscript x or X) represents an initial subset of text rows (rows) having an alignment of a character block in a selected column x (lower case x or upper case X). For example, the document 1702 of FIG. 17 has eight text rows. Text rows 1, 2, 3, 4, 5, and 6 each have an alignment of a character block in column "A;" that is, each of text rows 1-6 have an alignment of a character block at a horizontal location labeled in this example as column A, and the column has a coordinate or other horizontal component. Therefore, the initial subset of rows in column "A" is $\omega_A^i = \{1, 2, 3, 4, 5, 6\}$.

The classification system 210A determines whether each row in the initial subset of rows ($\omega_X^i$) belongs with a final subset of rows ($\omega_X$) for the selected column. While a column may be present in a particular text row (row), that particular row may not ultimately be placed into the final subset of rows for the column. Therefore, a final subset of rows is determined from the initial subset of rows.

The final subsets of rows are used to determine the classes of rows. One or more text rows are placed into a class of rows, and one or more classes of rows may be determined. The initial subsets of rows, final subsets of rows, and classes of rows all refer to text rows. Thus, the initial subset of rows is an initial subset of text rows, the final subset of rows is a final subset of text rows, and the class of rows is a class of text rows.

The subsets module 302 creates each initial subset of rows $\omega_X^i$ by placing each text row containing an alignment of a character block in a selected column (X) in the subset. The text rows having topographical content that is incompatible to the majority of the other rows in the subset are discarded. To do so, a set of columns able to establish a homogeneity or resemblance among the text rows in the selected initial subset of rows is identified and the text rows containing character blocks (i.e. an alignment of character blocks) in those columns are verified. This verification can be performed by identifying an optimum set of columns in the initial subset of rows.

Figure 18:
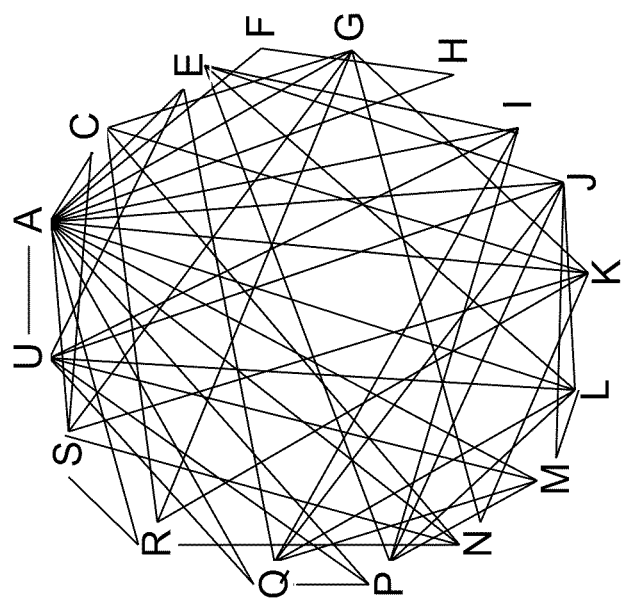
FIG. 18 is a graph of columns associated with column A in the document of FIG. 17.

FIG. 18 depicts an example of a graph with column A and columns associated with column A. Text rows 1-6 each have a character block in column A, and each other column present in text rows 1-6 is associated with column A. Column A and its associated columns form a set of columns for the initial subset of rows for column A. The columns are depicted as nodes, and the lines between each of the nodes are arcs that represent the coexistence between column A and its associated columns and between each associated column and other associated columns. Thus, for each column in the initial subset of rows for column A ($\omega_A^i$), an arc exists between each column and all other columns appearing on the same rows where that column appears.

From the graph, some nodes have more arcs connected to other nodes, and some nodes have fewer arcs connected to other nodes. The nodes with more arcs are more representative, and the nodes with fewer arcs are less representative. For example, column F appears only in conjunction with columns A and H. In this instance, the small number of connections to column F implies that it is not a crucial column for $\omega_A^i$.

Figure 19:
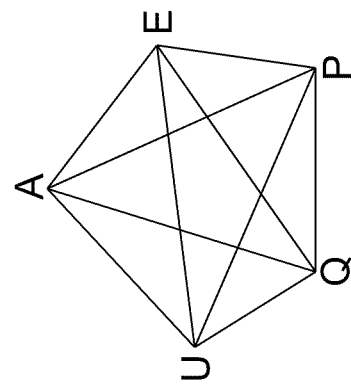
FIG. 19 is a graph of an optimum set for the graph of FIG. 18.

FIG. 19 depicts an example of a graph with an optimum set for column A composed of a maximum number of columns being a part of a maximum number of text rows of the initial subset of rows for column A at the same time. The nodes depict the columns, and the arcs represent the coexistence between the columns. FIGS. 18 and 19 are presented for exemplary purposes and are not used in processing.

Referring again to FIG. 17, an optimum set is a set of horizontal components, such as columns, having a most representative number of instances in the initial subset of text rows. In one example, the optimum set for a selected subset of rows includes a maximum number of columns being a part of a maximum number of text rows of the initial subset of rows at the same time. In another example, the optimum set is a set of columns having a large number of instances in the initial subset of text rows, the large number of instances includes a number of instances a column occurs in the text rows at or above a threshold number of instances, and the optimum set is a set of columns with each column having a number of instances occurring in the text rows at or above the threshold. An example of a threshold is discussed below. In another example, the large number of instances includes a number of instances occurring in the text rows at or above an average, and the optimum set is a set of columns with each column having a number of instances occurring in the text rows at or above the average number of instances of columns appearing in the text rows.

The optimum set module 304 determines the optimum set by identifying the horizontal components, such as columns, in the initial subset of rows with a large number of instances. For example, columns having a number of instances at or above a threshold or average are determined in one example. Other examples exist.

The optimum set can be represented as a master row, which is a binary vector whose elements identify the horizontal components, such as the columns, in the optimum set. For example, in the master row, "1"s identify the elements in the optimum set and "0"s identify all other columns in the initial subset of rows. The master row has a length equal to the number of columns in the initial subset of rows $\omega_X^i$ with a "1" on every column that is a part of the optimum set. Therefore, the length of the master row is equal to the number of elements in the optimum set in one example. In another example, positive elements identify the elements in the optimum set, such as "1"s, and zero, negative, or other elements identify all other columns in the initial subset of rows. In this example, the master row has a length equal to the number of columns in the initial subset of rows $\omega_X^i$ having a positive element in the optimum set. The length of the master row also is equal to the number of elements in the optimum set in this example. In another example, other selected elements can identify the components of the master row, such as other positive elements, flags, or characters, with non-selected elements identified by zeros, negative elements, other non-positive elements, or other flags or characters.

In one example, the optimum set is determined by generating a histogram of the number of instances of each column in the initial subset of rows $\omega_X^i$. The result is a bimodal plot with one peak produced by the most popular columns and the other peak being represented by the ensemble of columns occurring the least. A thresholding algorithm determines a threshold and splits the columns into two separate sets according to the threshold.

FIG. 20 depicts an example of such a histogram for the initial subset of rows in column A ($\omega_A^i$). The histogram is generated by the optimum set module 304 and identifies the frequency of each column in the set of columns for the selected initial subset of rows (referred to as the column frequency or column frequencies herein). A column frequency for a selected column therefore is the number of times the selected column is present in an initial subset of rows of the document. Columns not present in the selected initial subset of rows are not present in the histogram of the initial subset of rows in one example. Here, column A is present in six of the rows, column C is present in 1 row, column E is present in four rows, etc.

In one embodiment, the optimum set module 304 determines a threshold (T or $\tau$) from the histogram of column frequencies using a thresholding algorithm. In one example, the threshold is determined as an Otsu threshold according to the Otsu method using an Otsu thresholding algorithm. The Otsu threshold originally was used to deal with binarization of gray level images. The Otsu method is a discriminant analysis based thresholding technique, which is used to separate groups of points according to their similarity. The discriminant analysis is meant to partition the image into classes, such as two classes $C_0$ and $C_1$ at gray level t, such that $C_0=\{0, 1, 2, \ldots, t\}$ and $C_1=\{t+1, t+2, \ldots, L-1\}$, where L is the total number of gray levels in the image. Let $\sigma^2_B$ and $\sigma^2_T$ be the between-class variance and total variance respectively. A threshold ($\tau$) can be obtained by maximizing the between-class variance.

$$\tau = \underset{a<i<L-1}{\mathrm{Argmax}}\left(\frac{\sigma_B^2}{\sigma_T^2}\right) \tag{1}$$

where the number in the parenthetical denotes the equation number and $$\sigma_B^2 = \omega_0\omega_1(\mu_0 - \mu_1)^2 \tag{2}$$

$$\sigma_T^2 = \sum_{i=0}^{L-1}(i-\mu_T)^2\frac{n_i}{M} \tag{3}$$

where $n_i$ is the number of pixels at the $i_{th}$ gray level, M is the total number of pixels in the image, $\omega_0$ and $\omega_1$ are the respective weights for the within-class variance, and $\mu_0$ and $\mu_1$ are the class means for $C_0$ and $C_1$, respectively, and are calculated as follows.

$$\mu_0 = \frac{\mu_t}{\omega_0} \tag{4}$$

$$\mu_1 = \frac{\mu_T - \mu_t}{1-\omega_0} \tag{5}$$

where $$\mu_t = \sum_{i=0}^{t} i\frac{n_i}{M} \tag{6}$$

$$\mu_T = \sum_{i=0}^{L-1} i \frac{n_i}{M}. \quad (7)$$

The threshold is calculated over the column frequencies (column frequencies threshold), such as over the histogram of the column frequencies. The columns having a column frequency greater than the threshold are the elements in the optimum set, which are indicated in the master row. The master row in this example has "1"s identifying the elements (i.e. columns) in the optimum set and "0"s for the remaining columns.

In the example of FIG. 20, the column frequencies threshold (T1) is 2.99. Therefore, any columns having a frequency greater than 2.99 are the elements of the optimum set and are identified in the master row by the optimum set module 304. In this example, columns A, E, P, Q, and U have a frequency greater than the threshold, are the elements of the optimum set, and are identified in the master row as "1"s. In other examples, columns having a frequency greater than an average are in the optimum set and, therefore, are identified in the master row. In other examples, a column frequency greater than or equal to a threshold or statistical average may be determined by the optimum set module 304, and the columns having a column frequency greater than (or greater than or equal to) the threshold or statistical average are the elements in the optimum set.

Division Module

The division module 306 uses a division algorithm to determine the final subset of rows ($\omega_X$) from the initial subset of rows ($\omega_X^i$). The division algorithm determines a number of elements, such as text rows, of the initial subset of rows that are most similar to each other based on the columns from the optimum set, and those elements or text rows are in, or correspond to, the final subset of rows. For example, each text row has a physical structure defined by the columns (i.e. one or more alignments of one or more character blocks in one or more columns) in the text row, and the division module determines a final subset of rows with one or more text rows having physical structures that are most similar to the set of columns of the optimum set when compared to all physical structures of all of the text rows in the initial subset of rows.

In one embodiment, the division algorithm includes a thresholding algorithm, a clustering algorithm, another unsupervised learning algorithm to deal with unsupervised learning problems, or another algorithm that can split peaks of data into one or more groups. In one example, the division algorithm determines a number of elements, such as text rows, in the initial subset of rows having physical structures of columns that are the closest to the optimum set, which can include the smallest differences and/or the highest similarities (such as the smallest distances and/or the highest matches) to the master row or optimum set, when compared to all elements in the initial subset of rows. The resulting selected text rows are the most similar to each other based on the columns from the master row or elements in the optimum set. In another example, the division algorithm splits the text rows of the initial subset of rows into two groups and determines the group having physical structures of columns that are the closest to the optimum set, which can include the smallest differences and/or the highest similarities (such as the smallest distances and/or the highest matches) to the optimum set as embodied by the master row, when compared to the other group, which is farther from the optimum set, which can include higher differences and/or smaller similarities (such as larger distances and/or lower matches) to the optimum set as embodied by the master row.

Thresholding Module

In one embodiment, the division module 306 is a thresholding module 402 that uses a thresholding algorithm to determine the final subset of rows ($\omega_X$) from the initial subset of rows ($\omega_X^i$). The thresholding algorithm determines the elements, such as text rows, in the initial subset of rows that are the closest to the optimum set by determining the elements having the smallest differences from the optimum set. For example, the elements in the initial distances vector correspond to the text rows in the initial subset of rows, and the distances vector is a measure of the differences between each text row and the optimum set. The selected elements having the smallest differences correspond to text rows selected to be in the final subset of rows.

One or more features are used to compare each text row in the initial subset of rows to the optimum set, as indicated by the elements in the master row. The values of the features may be in a features vector. In one example, a distance is a feature used to compare each row to the optimum set, and the distances are included in a distances vector, such as an initial distances vector or a final distances vector. Other features or feature vectors may be used.

The thresholding module 402 determines an initial distances vector ($v_{\omega_X}^i$) as a vector of the distances from each text row in the selected initial subset of rows ($\omega_X^i$) to its master row. The distance of each text row to the master row (the row distance) is given by:

$$d_x = d(r_i, MR) = \sum_{i=1}^{N} (|r_i - MR_i|), \quad (8)$$

where $r_i$ is the binary vector for the text row, $MR_i$ is the binary vector for the master row, and each binary vector has one or more coordinates or components. Thus, the row distance is the distance of each text row to the master row and is determined by calculating the number of differences between the "1"s and "0"s in the columns of the master row and the "1"s and "0"s in the corresponding columns in the selected text row. In one example, the row distance equals the sum of the absolute values of each column of the selected row subtracted from the corresponding column of the master row. In another example, the row distance is a Hamming distance, which is the sum of different coordinates between the text row vector and the master row vector.

Figures 22, 23:
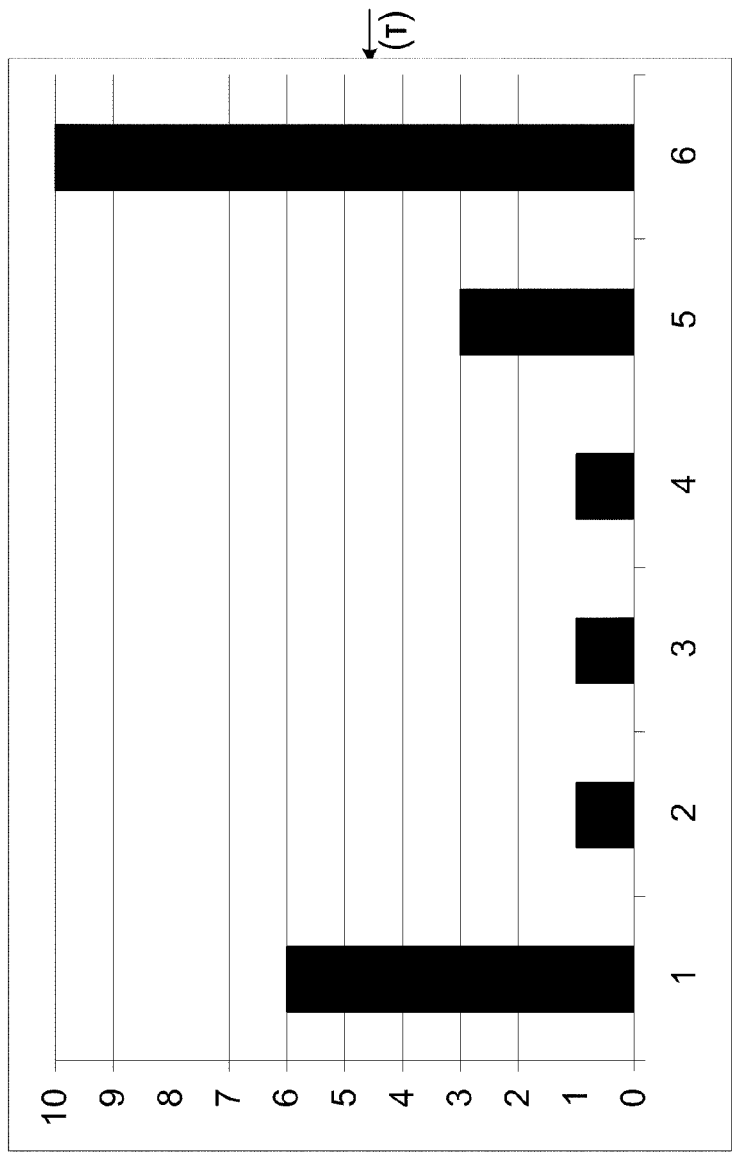
FIG. 22 is a table identifying text rows, column frequencies, and row distances for an initial subset of rows for column A of FIG. 17.
FIG. 23 is a histogram of an initial distances vector for the initial subset of rows for column A of FIG. 17.

For example, FIG. 21 depicts the determination of a Hamming distance from row 1 to the master row 2102 for the initial subset of rows $\omega_A^i = \{1, 2, 3, 4, 5, 6\}$. FIG. 21 also depicts the length of the master row 2102 as equal to five, which is the number of "1"s in the master row and the number of elements in the optimum set. FIG. 22 depicts the row distances determined by the thresholding module 402 for text rows 1-6 of the initial subset of rows $\omega_A^i$ and the column frequencies for $\omega_A^i$. In FIG. 22, the row distance of row 1 from the master row is $d_1 = d(r_1, MR) = 6$, the row distance of row 2 from the master row is $d_2 = d(r_2, MR) = 1$, the row distance of row 3 from the master row is $d_3 = d(r_3, MR) = 1$, the row distance of row 4 from the master row is $d_4 = d(r_4, MR) = 1$, the row distance of row 5 from the master row is $d_5 = d(r_5, MR) = 3$, and the row distance of row 6 from the master row is $d_6 = d(r_6, MR) = 10$. Therefore, the initial distances vector for the initial subset of rows $\omega_A^i$ is $v_{\omega_A}^i$ [6 1 1 1 3 10].

The threshold algorithm is used to determine a threshold for the elements of the initial distances vector $(v_{\omega_X}{}^i)$(initial distances vector threshold). The elements that are less than the threshold are in the final distances vector $v_{\omega_X}$ for the selected initial subset of rows $\omega_X{}^i$. In one example of this embodiment, the threshold is determined as the Otsu threshold using an Otsu thresholding algorithm.

In the example of the initial subset of rows for column A, the initial distances vector for $\omega_A{}^i$ is $v_{\omega_A}{}^i=[6\ 1\ 1\ 1\ 3\ 10]$, as shown in FIG. 22. A thresholding algorithm generates a threshold over an initial distances vector, such as over a histogram of the initial distances vector for $\omega_A{}^i$, as depicted in FIG. 23. When the Otsu thresholding algorithm is applied to the histogram in one example, the initial distances vector threshold (T2) is 4.47. In this example, any elements under the threshold are selected to be in the final distances vector. Therefore, any elements less than 4.47 are in the final distances vector $v_{\omega_A}$ for the initial subset of rows for column A ($\omega_A{}^i$). In the case of the initial subset of rows for column A ($\omega_A{}^i$), the final distances vector is $v_{\omega_A}=[1\ 1\ 1\ 3]$.

The final subset of rows $\omega_A$ corresponds to the elements in the final distances vector $v_{\omega_X}$. In one example, if the distance for a text row (e.g. the distance between the selected text row and the master row) is present in the final distances vector, that text row is present in the final subset of rows. In the example of the initial subset of rows for column A, $\omega_A{}^i=\{1, 2, 3, 4, 5, 6\}$, the initial distances vector is $v_{\omega_A}{}^i=[6\ 1\ 1\ 1\ 3\ 10]$, and the final distances vector is $v_{\omega_A}=[1\ 1\ 1\ 3]$. In this example, the row distances for text rows 1 and 6 were eliminated through the second thresholding algorithm. Therefore, text rows 1 and 6 are eliminated, and text rows 2-5 are retained, from the initial subset of rows to result in the final subset of rows for column A ($\omega_A$). In this example, the final subset of rows has text row elements corresponding to the distance elements in the final distances vector, and $\omega_A=\{2, 3, 4, 5\}$.

In another example, elements of the initial distances vector that are less than or equal to the threshold are in the final distances vector. In still another example, elements of the initial distances vector that are less than or alternately less than or equal to an average of the elements in the initial distances vector are in the final distances vector.

Because the initial distances vector and the final distances vector have elements that are measures of distance between the optimum set, as identified by the master row, and the corresponding text row, the elements under the threshold (either less than or less than or equal to) have the smallest distances to the master row. Each distance measurement in this case is a measurement of how similar a corresponding text row is to the optimum set, as identified by the master row. Therefore, the text rows corresponding to the elements under the threshold are the most similar to the optimum set or master row.

In this example, the Otsu thresholding algorithm determines a threshold of a distances vector to establish the groupings. In this example, the thresholding algorithm uses one feature/one dimension to determine the groupings of text rows, which is the row distance.

The mean of the elements in the final distances vector $(\mu^{v_{\omega_X}}\ or\ \mu^v)$ then is determined by the thresholding module 402. In the case of final distances vector for column A ($v_{\omega_A}$), the mean of the elements in the final distances vector is $$\mu^{v_{\omega_A}} = 1.5.$$

The variance (var or $\sigma_{\omega_X}$) is the statistical variance of the distances of each row in the final subset of rows $\omega_X$ to its master row, which also is determined by the thresholding module 402. In one example, $\sigma_{\omega_X}$ is given by $$\sigma_{\omega_X} = \sigma(v_{\omega_X}) = \frac{1}{n-1}\sum_{i=1}^{n}(v_i - \mu^v)^2, \quad (9)$$

where $v_{\omega_X}$ is the final distances vector for the distances of each row in the final subset of rows to the master row, $\mu^v$ is the mean of the final distances vector $v_{\omega_X}$, and n is the number of elements in the final distances vector. Therefore, the variance for the subset of rows for column A is given by:

$$\sigma_{\omega_A} = \sigma(v_{\omega_A}) = \frac{1}{n-1}\sum_{i=1}^{n}(v_i - \mu^{v_{\omega_A}})^2 = \frac{1}{3}\sum_{i=1}^{4}(v_i - 1.5)^2 = 1. \quad (10)$$

The rows frequency ($F_{\omega_X}$) compares the rows for a selected subset of rows to the document. In one embodiment, the rows frequency is the number of text rows in a selected final subset of rows ($\omega_X$). This frequency sometimes is referred to as the absolute rows frequency (AF) herein. In the example of FIG. 17, the final subset of rows for column A is $\omega_A=\{2, 3, 4, 5\}$. Here, the absolute rows frequency is $F_{\omega_A}=AF_{\omega_A}=4$.

In another example, the rows frequency is the ratio of the number of text rows in a selected final subset $\omega_X$ to the total number of text rows in the document. In this embodiment, $F_{\omega_X}$=No. of rows in $\omega_X$/No. of rows in the document. This frequency sometimes is referred to as the normalized rows frequency (NF) herein. In the example of FIG. 17, since there are eight text rows in the document, the normalized rows frequency is $F_{\omega_A}=NF_{\omega_A}=4/8=0.5$.

In other embodiments, other frequency values may be used. For example, the frequency may consider all of the text rows in the initial subset of rows instead of, or in addition to, the text rows in the final subset of rows.

To determine the final set of rows to be classified into a class of rows based on the columns, the thresholding module 402 determines a confidence factor (CF) for each final subset of rows ($\omega_X$). The confidence factor is a measure of the homogeneity of the final subset of rows. Once each text row has a confidence factor attributed to it, each text row is assigned to a class based on the highest attributed confidence factor. The confidence factor considers one or more features representing how similar one text row is to other rows in the document. For example, the confidence factor may consider one or more of the rows frequency (the absolute frequency, the normalized frequency, or another frequency value), the variance, the mean of the elements under the threshold, the mean of the elements less than or equal to the threshold, the threshold value, the number of elements in the optimum set, the length of the master row (i.e. the number of non-zero columns in the master row), and/or other variables. In one example, the confidence factor for a selected final subset of rows having a character block in a selected column ($\omega_X$) is given by a form of the confidence factor ratio $$CF_{\omega_X} = \frac{F_{\omega_X}}{\sigma_{\omega_X}}, \quad (11)$$

where the rows frequency is in the numerator and the variance is in the denominator of the confidence factor ratio. Additional or other variables or features may be considered in the numerator or denominator of the confidence factor ratio. For example, the confidence factor may include a frequency and master row length in the numerator and a variance and average row distance in the denominator of the confidence factor ratio. Alternately, the confidence factor may use one or more variables identified above, but not in a ratio or in a different ratio.

In another example, the confidence factor for a selected final subset of rows ($CF_{\omega_X}$) is given by:

$$CF_{\omega_X} = \frac{AF_{\omega_X}^3 \cdot L_{MR}}{\sigma_{\omega_X} \cdot \mu^{\nu_{\omega_X}} + 1}, \quad (12)$$

where $AF_{\omega_X}$ is the absolute rows frequency, $L_{MR}$ is the length of the master row (i.e. the number of non-zero columns in the master row), $\sigma_{\omega_X}$ is the variance, and $\mu^\nu$ or $$\mu^{\nu_{\omega_X}}$$

is the mean (average) of the elements in the final distances vector, which are the same as the elements at and/or under a threshold of the final distances vector. The normalized frequency may be used in place of the absolute frequency in other examples.

In one embodiment, if there is only one instance of a column in the text rows of the document, the confidence factor for the subset of rows for that column is zero. For example, since column C of the document 1702 has only a single instance, the confidence factor for the final subset of rows for column C is zero. In other examples, a confidence factor may be calculated for a single occurring column.

In the above example for the final subset of rows in column A, $L_{MR}=5$, which is the number of positive or non-zero elements in the master row. Therefore, the confidence factor for $\omega_A$ in this example is given by:

$$CF_{\omega_A} = \frac{AF_{\omega_A}^3 \cdot L_{MR}}{\sigma_{\omega_A} \cdot \mu^{\nu_{\omega_A}} + 1} = \frac{(4)^3 * 5}{1 * 1.5 + 1} = 128. \quad (13)$$

The thresholding module 402 determines a confidence factor for each final subset of rows in the document 1702. FIGS. 24-34 depict examples of the subsets of rows for columns B, D, E, H, J, L, O, P, Q, T, and U with the associated frequencies, initial distances vectors, and the thresholds. FIG. 24 depicts an example of the subset of rows for column B. FIG. 25 depicts an example of the subset of rows for column D. FIG. 26 depicts an example of the subset of rows for column E. FIG. 27 depicts an example of the subset of rows for column H. FIG. 28 depicts an example of the subset of rows for column J. FIG. 29 depicts an example of the subset of rows for column L. FIG. 30 depicts an example of the subset of rows for column O. FIG. 31 depicts an example of the subset of rows for column P. FIG. 32 depicts an example of the subset of rows for column Q. FIG. 33 depicts an example of the subset of rows for column T. FIG. 34 depicts an example of the subset of rows for column U. The thresholds are determined for each initial distances vector for each subset of rows to determine the corresponding final distances vector and the corresponding final subset of rows.

In one embodiment, if there is only one instance of a column in the text rows of a final subset of rows in a document, the subset for that column is not evaluated and is considered to be a zero subset. Non-zero subsets, which are subsets of rows for columns having more than one instance in a document, are evaluated in this embodiment.

In the example of FIG. 24 for column B, both text rows 7 and 8 are the same. All columns present in the subset have the same frequency of 2. In this instance, the threshold algorithm does not render two non-zero sets of elements based on the columns frequencies. In this instance, the columns frequencies threshold is set at negative one (−1). Another selected low threshold value may be used. The single group of elements from both text rows is the optimum set or master row. Additionally, the distances vector is comprised of all zero elements. Therefore, the threshold algorithm similarly does not render two non-zero sets of elements based on the initial distances vector. In this instance, the initial distances vector threshold is set at negative one (−1). Another selected low threshold value may be used. Each of the text rows is in the final subset of rows for $\omega_B$.

In the examples of FIGS. 24-34, $\omega_B=\{7, 8\}$, $\omega_D=\{7, 8\}$, $\omega_E=\{2, 3, 4\}$, $\omega_H=\{7, 8\}$, $\omega_J=\{3\}$, $\omega_L=\{2, 7, 8\}$, $\omega_O=\{7, 8\}$, $\omega_P=\{2, 3, 4\}$, $\omega_Q=\{2, 3, 4\}$, $\omega_T=\{7, 8\}$, and $\omega_U=\{2, 3, 4\}$. Where $$CF_{\omega_X} = \frac{F_{\omega_X}^3 \cdot L_{MR}}{\sigma_{\omega_X} \cdot \mu^{\nu_{\omega_X}} + 1},$$

the confidence factors for the other subsets are as follows. $CF_{\omega_B}=48$; $CF_{\omega_C}=0$; $CF_{\omega_D}=48$; $CF_{\omega_E}=67.5$; $CF_{\omega_F}=0$; $CF_{\omega_G}=0$; $CF_{\omega_H}=48$; $CF_{\omega_I}=0$; $CF_{\omega_J}=6$; $CF_{\omega_K}=0$; $CF_{\omega_L}=4.5$; $CF_{\omega_M}=0$; $CF_{\omega_N}=0$; $CF_{\omega_O}=48$; $CF_{\omega_P}=67.5$; $CF_{\omega_Q}=67.5$; $CF_{\omega_R}=0$; $CF_{\omega_S}=0$; $CF_{\omega_T}=48$; and $CF_{\omega_U}=67.5$. The confidence factors and the features used in the determination are depicted in FIG. 35.

As described above, each text row has one or more columns identifying an alignment for one or more character blocks, and a final subset of rows is identified for each column in which an alignment for a character block exists for that column. That is, a first final subset of rows having one or more alignments for one or more character blocks in a first column is determined, a second final subset of rows having one or more alignments for one or more character blocks in the second column is determined, etc. The confidence factors are then determined for each final subset of rows.

Each text row 1-8 in the document 1702 may have one or more confidence factors corresponding to the final subsets of rows having that text row as an element. The thresholding module 402 determines the best confidence factor from the confidence factors corresponding to the final subsets of rows having that text row as an element. That is, if a text row is an element in a particular final subset of rows, the confidence factor for that subset of rows is considered for the text row. The confidence factors for each final subset of rows in which the particular row is an element are compared for the particular row, and the best confidence factor is determined from those confidence factors and selected for the particular row.

For example, text row 1 has no non-zero confidence factors because $\omega_A$ does not include row 1, $\omega_H$ does not include row 1, and the confidence factor for column F is zero because there is only one instance of column F in the document. Text row 2 is an element in each of the final subsets of rows $\omega_A$, $\omega_E$, $\omega_L$, $\omega_P$, $\omega_Q$, and $\omega_U$. Therefore, for text row 2, the confidence factors for the final subsets of rows $\omega_A$, $\omega_E$, $\omega_L$, $\omega_P$, $\omega_Q$, and $\omega_U$ are compared to each other to determine the best confidence factor from that group of confidence factors. The same process then is completed for each of text rows 3-8, comparing the confidence factors corresponding to each final subset of rows in which that text row is an element.

In one embodiment, if a subset of rows has only one column or each column in a text row has only a single instance in the document, or one or more columns in the text row are not in the final subset of rows for the text row and the remaining confidence factors for the text row are zero, such that the confidence factors for the text row all are zero, the text row is placed in its own class. However, other examples exist.

Referring again to the final subsets of rows, $\omega_A = \{2, 3, 4, 5\}$, $\omega_B = \{7, 8\}$, $\omega_D = \{7, 8\}$, $\omega_E = \{2, 3, 4\}$, $\omega_H = \{7, 8\}$, $\omega_J = \{3\}$, $\omega_L = \{2, 7, 8\}$, $\omega_O = \{7, 8\}$, $\omega_P = \{2, 3, 4\}$, $\omega_Q = \{2, 3, 4\}$, $\omega_T = \{7, 8\}$, and $\omega_U = \{2, 3, 4\}$. In this example, text row 1 has no non-zero subsets being evaluated. Text row 1 includes columns A, F, and H. However, $\omega_A$ does not include text row 1, $\omega_H$ does not include text row 1, and the confidence factor for column F is zero because there is only one instance of column F in the document. Text row 6 has no non-zero subsets being evaluated because $\omega_A$ does not include row 6, and the confidence factors for all other columns in row 6 are zero because each other column in the row has only one instance. Therefore, text rows 1 and 6 each are in their own class. The confidence factors for each of the text rows are depicted in FIG. 36.

In one example, the best confidence factor is the highest confidence factor. For example, text row 2 is an element of final subsets of rows $\omega_A$, $\omega_E$, $\omega_L$, $\omega_P$, $CO_Q$, and $\omega_U$. Therefore, the confidence factors for row 2 include $CF_{\omega_A}=128$, $CF_{\omega_E}=67.5$, $CF_{\omega_L}=4.5$, $CF_{\omega_P}=67.5$, $CF_{\omega_Q}=67.5$, and $CF_{\omega_U}=67.5$. In text row 2, the best confidence factor is 128 for $CF_{\omega_A}$. The system sequentially determines the best confidence factor for each row. Therefore, the best confidence factor for text row 3 is 128 for $CF_{\omega_A}$. The best confidence factor for text row 4 is 128 for $CF_{\omega_A}$. The best confidence factor for text row 5 is 128 for $CF_{\omega_A}$. The confidence factor for text row 6 is 0. The best confidence factor for text row 7 is 48 for each of $CF_{\omega_B}$, $CF_{\omega_D}$, $CF_{\omega_H}$, $CF_{\omega_O}$ and $CF_{\omega_T}$. The best confidence factor for text row 8 is 48 for each of $CF_{\omega_B}$, $CF_{\omega_D}$, $CF_{\omega_H}$, $CF_{\omega_O}$, and $CF_{\omega_T}$. The confidence factor for text row 1 is 0.

One or more text rows having the same best confidence factor are classified together as a class by the classifier module 308. In the example of FIG. 17, text row 1 does not have a best confidence factor that is the same as the best confidence factor for any other text row, and its confidence factor is zero. Therefore, it is in a class by itself. Text rows 2-5 have the same best confidence factor and, therefore, are classified as being in the same class. Text row 6 does not have a best confidence factor that is the same as the best confidence factor for any other text row, its confidence factor is zero, and it is in a class by itself. Text rows 7-8 have the same best confidence factor and, therefore, are classified in the same class. In one optional embodiment, each class then is labeled with a class label.

Clustering Module

In another embodiment, the division module 306 is a clustering module 404 that uses a clustering algorithm to determine the final subset of rows ($\omega_x$) from the initial subset of rows ($\omega_x^i$). The clustering algorithm determines the elements in the initial subset of rows that are the closest to the optimum set. The clustering algorithm splits the initial subset of rows into a selected number of sets (or clusters), such as two clusters, so that the text rows in each set form a homogenous set based on the columns they share in common. The most uniform set will be selected as the final subset of rows since it contains the elements closest to the optimum set. In one instance, this is accomplished by determining the elements having smallest differences from, and/or highest matches to, the optimum set as embodied by the master row. The elements in the initial subset of rows correspond to the text rows in the initial subset of rows, and the selected elements having the smallest differences and/or the highest matches to the optimum set correspond to text rows selected to be in the final subset of rows.

A clustering algorithm classifies or partitions objects or data sets into different groups or subsets referred to as clusters. The data in each subset shares a common trait, such as proximity according to a distance measure. Classifying the data set into k clusters is often referred to as k-clustering. Examples of clustering algorithms include a k-means clustering algorithm, a fuzzy c-means clustering algorithm, or another clustering algorithm.

The k-means clustering algorithm assigns each data point or element of a data set to a cluster whose center is nearest the element. The center of the cluster is the average of all elements in the cluster. That is, the center of the cluster is the arithmetic mean for each dimension separately over all the elements in the cluster. A k-means clustering algorithm is based on an objective function that tries to minimize total intra-cluster variance, or the squared error function, as follows:

$$J_m = \sum_{k=1}^{n} \sum_{i=1}^{c} \|x_k - v_i\|^2, \tag{14}$$

where n is the number of data elements, c is the number of clusters, $x_k$ is the $k^{th}$ measured object or element, $v_i$ is the center of the cluster i, and $\|x_k - v_i\|^2$ is a distance measure (square of the norm) between element $x_k$ and cluster center $v_i$.

In operation, the number of clusters (c) is selected. In one example, 2 clusters are selected. Next, either c clusters are randomly generated and the cluster centers are determined or c random points are directly generated as cluster centers. Each element is assigned to the nearest cluster center, and each cluster center is determined. The process iterates, and new cluster centers are determined until the centers of the clusters do not change (i.e. the assignment of elements to the clusters does not change, referred to herein as a convergence criterion or alternately as a termination criterion).

In a fuzzy c-means (FCM) clustering algorithm, each data point or element has a degree of belonging to one or more clusters, rather than belonging completely to just one cluster. For example, an element that is close to the center of a cluster has a higher degree of belonging or membership to that cluster, and another element that is far away from the center of a cluster has a lower degree of belonging or membership to that cluster. For each element $x_k$, a degree of membership coefficient gives the degree of belonging to the $i^{th}$ cluster ($u_{ix}$).

Fuzzy c-means clustering is an iterative clustering algorithm that produces an optimal partition between clusters of elements, where the center of a cluster is the mean of all elements, weighted by their degree of belonging to the cluster. The FCM clustering algorithm is based on the objective function $J_m$:

$$J_m = \sum_{k=1}^{n} \sum_{i=1}^{c} u_{ik}^m \|x_k - v_i\|^2, \quad (15)$$

where n is the number of data elements in a membership matrix $U=u_{ik}$ having i rows and k columns, c is the number of clusters, m is a weighting factor on each fuzzy membership and is a real number greater than 1, $u_{ik}$ is the degree of membership of $x_k$ being in the $i^{th}$ cluster, $x_k$ is the $k^{th}$ measured object or element, $v_i$ is the center of the cluster i, and $\|x_k-v_i\|^2$ is a distance measure (square of the norm) between element $x_k$ and cluster center $v_i$.

The cluster centers $v_i$ are calculated with the membership coefficient ($u_{ik}$), j iteration steps, and a weighting factor (m) as:

$$u_{ik} = \frac{1}{\sum_{j=1}^{C} \left( \frac{\|x_k - v_i\|}{\|x_k - v_i\|} \right)^{\frac{2}{m-1}}} \quad \text{and} \quad (16)$$

$$v_i = \frac{\sum_{k=1}^{n} u_{ik}^m * x_k}{\sum_{k=1}^{n} u_{ik}^m}. \quad (17)$$

In operation, a termination criterion $\epsilon$ (also referred to as a convergence criterion), the number of clusters c, and the weighting factor m are selected, where $0<\epsilon<1$, and the algorithm iteratively continues calculating the cluster centers until the following is satisfied:

$$Arg\|u_{ik}^{(j+1)} - u_{ik}^{(j)}\| < \epsilon. \quad (18)$$

In one embodiment, the number of clusters is set to 2, the termination criterion is 100 iterations or having an objective function difference less than 1e−7, and the weighting factor is 2. However, other termination criterion, cluster numbers, and weighting factors may be used. In the embodiment where two clusters are determined, the FCM clustering algorithm places the data points (points) in up to two clusters based on the closeness of each point to the center of one of the clusters.

In one embodiment, the clustering module 404 includes an FCM clustering algorithm that evaluates points representing the subsets of rows. Each point represents a text row in a subset of rows, and each point has data representing the text row and/or the closeness of the text row to the optimum set or master row (row data). The clusters then are determined from the points. Each cluster has a center, and each point is in a cluster based on the distance to the center of the cluster (cluster center distance). Thus, the degree of belonging is based on the cluster center distance.

In one example, the points are three dimensional points. The clusters then are determined in the three dimensional space, where each cluster has a center. In one example, the points are represented in three dimensional space by X, Y, and Z coordinates. Other coordinate or ordinate representations may be used. In other examples, two dimensional points are used, such as with X and Y coordinates or other coordinate or ordinate representations.

In one embodiment, one or more features may be used by the clustering module 404 as row data for the points representing the rows, including a distance of a text row to the master row (row distance), a number of matches between a text row and the master row (row matches), a text row length, and/or other features. The values of the features for each row in a subset are used as the values of a corresponding point by the FCM clustering algorithm of the clustering module 404. Values for a feature may be in a features vector.

The row distance is the distance of each text row to the master row and is the number of different components between the columns in the master row and corresponding columns in the selected text row. In one example, the row distance is the number of differences between the "1"s and "0"s in the columns of the master row and the "1"s and "0"s in the corresponding columns in the selected text row. In one example, this row distance is a Hamming distance, where the number of different coordinates or components is determined.

The number of row matches is the number of same selected components in the columns of the master row and corresponding columns of the selected text row, such as the number of same positive components. In one example, the number of row matches is the number of times a "1" in a column of the text row matches a "1" in a corresponding column of the master row. The "0"s are not counted in the number of row matches in one example. The number of row matches may be referred to simply as a number of matches or as row matches herein.

FIG. 37 depicts one example of row matches. In the example of FIG. 37, both the master row and text row 1 have a character block in column A. Text row 1 does not, however, have a character block in columns E, P, Q, or U. Therefore, text row 1 has one row match. Other examples of row matches exist.

The text row length is the distance between the beginning of a text row and the end of the text row. In one example, a text row length is the distance between the first pixel of a text row and the last pixel of the text row.

The row distance, row matches, and row length are features used for one or more coordinates of a row point, including two or three dimensional points. In one example of the FCM clustering algorithm using three dimensional row points, each three dimensional row point has row data values for a text row in a subset, such as a row distance for an X coordinate, a number of row matches for a Y coordinate, and a row length for a Z coordinate. In another example, each row point includes a normalized row distance for an X coordinate, a normalized number of matches for a Y coordinate, and a normalized length of the row for a Z coordinate. In another example, each row point includes an average row distance for an X coordinate, an average number of matches for a Y coordinate, and an average length of the row for a Z coordinate. The row distances in these examples may be a Hamming distance, a normalized Hamming distance, and an average Hamming distance, respectively. In another example, two of the features are used for X and Y coordinates.

Absolute data (raw data), normalized data, or averaged data can be used. Data may be normalized to a value or a range so that one feature is not dominant over one or more other features or so that one feature is not under-represented by one or more other features. For example, the row length may be 1600, while the number of matches is 5. In their raw state, the row length may have a more dominant effect or representation than the number of row matches. If each of the features is normalized to a selected value or range, such as from zero to one, zero to ten, negative one to one, or another selected range, each of the features has a more equal representation in the clustering algorithm.

In one embodiment of normalizing data, a row distance is normalized for each row point by adding all row distances for all row points for a subset to determine a sum of the row distances for the subset (row distances sum) and dividing each row distance by the row distances sum. Similarly, all row matches for all row points for a subset are added to determine a sum of the number of row matches for the subset (row matches sum) and the number of row matches for each row point is divided by the row matches sum, and all row lengths for all row points for a subset are added to determine a sum of the row lengths for the subset (row lengths sum) and the row length for each row point is divided by the row lengths sum.

Other methods may be used to normalize the data. For example, a data element may be normalized using a standard deviation of all elements in the group, such as the standard deviation of all distances for a subset. In another example, the minimum and/or maximum values of elements in a group are used to define a range, such as from zero to one, zero to ten, negative one to one, or another selected range, and a particular data element is normalized by the minimum and/or maximum values. In another example, each data element is normalized according to the maximum value in the group of data elements by dividing each data element by the maximum value. Other examples exist.

In one example, the clustering module 404 uses three features for a three dimensional row point to determine the groupings of text rows, which are the row distance, the number of row matches, and the row length. In other examples, the clustering module 404 uses two features for a two dimensional row point to determine the groupings of text rows, which are the row distance and the number of row matches. In another example, the clustering module 404 uses three features for a three dimensional row point to determine the groupings of text rows, which include at least the row distance and the number of row matches.

FIGS. 38-42 depict an example of text rows, raw row data, normalized row data, row points for row data that has been normalized, centers for two clusters, and cluster center distances for each row point to each cluster center for the initial subset of rows for column A ($\omega_A^i$) of FIG. 17. FIG. 38 depicts an example of the text rows and master row for the initial subset of rows for column A, along with the frequency of text blocks in each column of the initial subset of rows. The initial subset of rows for column A has six text rows.

FIG. 39 depicts row points with raw row data for the text rows in $\omega_A^i$. The row points are three dimensional row points with row distance, number of row matches, and row length as features or coordinates for each point. In this example, point 1 corresponds to text row 1. Point 2 corresponds to text row 2, etc.

Point 1 includes a row distance from text row 1 to the master row for $\omega_A^i$, a number of row matches between text row 1 and the master row for $\omega_A^i$, and the row length of text row 1. Similarly, point 2 includes a row distance from text row 2 to the master row for $\omega_A^i$, a number of row matches between text row 2 and the master row for $\omega_A^i$, and the row length of text row 2. Points 3-6 similarly are determined as the corresponding row distances, number of row matches, and row lengths for the corresponding text rows. In this example, the row distances are Hamming distances. In FIG. 39, the row length is significantly larger than the row distance or the row matches.

FIG. 40 depicts an example of row data for the row points (row point data) that has been normalized (normalized row point data) and the centers of the row points (row point centers). In the example of FIG. 40, the row distance is normalized by adding all row distances for the initial subset of rows for column A to determine a row distances sum and dividing each row distance by the row distances sum to determine the normalized row distances. Similarly, the number of row matches for each row point is divided by the row matches sum to determine the normalized numbers of row matches (normalized row matches), and the row length for each row point is divided by the row lengths sum to determine the normalized row lengths.

Two clusters are determined in the example of FIG. 40 using the FCM clustering algorithm. The cluster centers are determined from the normalized row point data, and the cluster centers are depicted in the example of FIG. 40. However, in other examples, the row data is not normalized, and the centers are determined from the row data, whether the row data is raw data, averaged data, or otherwise.

FIG. 41 depicts a plot with the row points and cluster centers for the two clusters. The row points are assigned in the plot to one of the two clusters, and the distances are determined between each row point and the center of the cluster to which it is assigned. The center for cluster 1 is identified by the circle, and the points assigned to cluster 1 are identified by a diamond, with the diamond and square combination representing three points. The center of cluster 2 is identified by the shaded square, and the points assigned to cluster 2 are identified by triangles.

FIG. 42 depicts an example of the distances from each row point to each cluster center (cluster center distances, cluster distances, or center distances). The cluster center distance is a numerical interpretation of the degree of belonging of a particular row point to one of the clusters. Since there are two clusters, the cluster center distances are a numerical interpretation of the degree of belonging of each row point to each of the two clusters.

For example, row point 1 is a distance of 0.295 from cluster center 1 and a distance of 0.116 from cluster center 2. Therefore, text row 1 belongs to the first cluster with a degree of belonging equal to 0.295 and belongs to the second cluster with a degree of belonging equal to 0.116.

The row point for a text row is classified in or assigned to a cluster by the clustering module 404 based on the cluster center distance, which identifies the degree of belonging. In one example, a row point is classified in or assigned to a cluster with the smallest cluster center distance between the row point and a selected cluster. Where there are two clusters, the row point is assigned to the cluster corresponding to the smallest cluster center distance between the row point and that cluster. For example, if a row point is closer to one cluster, it is assigned to that cluster. Since the cluster center distance is a measure of the row point to the center of the cluster, the cluster center distance is a measure of the closeness of a row point to a particular cluster. Therefore, in this instance, the smallest cluster center distance corresponds to a largest degree of belonging, and the largest degree of belonging places a row point in a particular cluster.

In one example of FIG. 42, the cluster center distances are compared for each row point. The row point is assigned to the cluster with the smaller cluster center distance.

The cluster center distance for row point 1 is smaller for cluster 2, the cluster center distance for row point 2 is smaller for cluster 1, the cluster center distance for row point 3 is smaller for cluster 1, the cluster center distance for row point 4 is smaller for cluster 1, the cluster center distance for row point 5 is smaller for cluster 1, and the cluster center distance for row point 6 is smaller for cluster 2. Therefore, row point 1 is assigned to cluster 2, row point 2 is assigned to cluster 1, row point 3 is assigned to cluster 1, row point 4 is assigned to cluster 1, row point 5 is assigned to cluster 1, and row point 6 is assigned to cluster 2.

After the clusters are determined (i.e. the row points corresponding to the text rows have been assigned to a particular cluster), one cluster and its associated row points and text rows is determined by the clustering module 404 to be the closest to the optimum set or master row and is selected as a final, included cluster (also referred to as the closest cluster). The other cluster is eliminated from the analysis. The final subset of rows includes the text rows corresponding to the row points of the selected final cluster, and the text rows associated with the row points in the selected final cluster are selected to be included in the final subset of rows.

In one example, the average of the cluster center distances is determined between each row point in the subset of rows and each cluster center (average cluster center distance). The cluster having the smallest average cluster center distance is selected as the final cluster, and the text rows associated with the row points in the selected final cluster are selected to be included in the final subset of rows. In the example of FIG. 42, the distances are determined between each row point in the subset of rows and cluster center 1 and then averaged for cluster 1. The distances also are determined between each row point in the subset of rows and cluster center 2 and then averaged for cluster 2. The average cluster center distance between the row points and cluster 1 is 0.143. The average cluster center distance between the row points and cluster 2 is 0.274. Therefore, cluster 1 is selected as the final cluster since it has the smallest average cluster center distance.

In another embodiment, the average of the row distances (row distances average) of each row point in each cluster is determined. The cluster having the smallest row distances average is selected as the final cluster, and the text rows associated with the row points in the final cluster are selected to be included in the final subset of rows. In the above example, the row distances average for cluster 1 is 1.5, and the row distances average for cluster 2 is 8. Therefore, cluster 1 is selected as the final cluster. Alternately, the average of the normalized row distance may be used. Other examples exist.

In another embodiment, the average of the number of row matches (row matches average) of each row point in each cluster is determined. The cluster having the largest row matches average is selected as the final cluster, and the text rows associated with the row points in the final cluster are selected to be included in the final subset of rows. In the above example, the row matches average for cluster 1 is 5, and the row matches average for cluster 2 is 1. Therefore, cluster 1 is selected as the final cluster. Alternately, the average of the normalized row matches may be used. In another embodiment, a combination of the average row distance and average row matches, or their normalized values, may be used. Other examples exist.

In still another embodiment, the average of the row distances (row distances average) and the average of the number of row matches (row matches average) of each row point in each cluster are determined. For each cluster, the row matches average is subtracted from the row distances average to determine a cluster closeness value between the selected cluster and the optimum set, as identified by the master row. The cluster having the smallest cluster closeness value is selected as the final cluster, and the text rows associated with the row points in the final cluster are selected to be included in the final subset of rows. In the above example, the row distances average for cluster 1 is 1.5, and the row matches average for cluster 1 is 5. Therefore, the cluster closeness value for cluster 1 is 1.5−5=−3.5. The row distances average for cluster 2 is 8, and the row matches average for cluster 2 is 1. Therefore, the cluster closeness value for cluster 2 is 8−1=7. Therefore, cluster 1 has the lower cluster closeness value and is selected as the final cluster. Alternately, the average of the normalized row distance and row matches may be used. Other examples exist.

In this example, cluster 1 includes row points 2, 3, 4, and 5, which correspond to text rows 2, 3, 4, and 5. Therefore, the final subset of rows for column A is $\omega_A = \{2, 3, 4, 5\}$.

The elements in the final distances vector correspond to the elements in the final subset of rows, which for $\omega_A$ is $v_{\omega_A} = [1\ 1\ 1\ 3]$. The row distances average in the final subset, which is the mean of the elements in the final distances vector, is $$\mu^{v_{\omega_A}} = 1.5.$$

A final matches vector ($M_{\omega_X}$) is determined by the clustering module 404 as a vector of the matches between each text row in the selected final subset of rows $\omega_X$ and its master row. For $\omega_A$, $M_{\omega_A} = [5\ 5\ 5\ 5]$. A row matches average $$(\mu_{M_{\omega_X}})$$

is the average number of row matches between the text rows and the master row for the elements in a selected final subset of rows. The average number of row matches between the text rows and the master row for the elements in the final subset of rows for column A is $$\mu_{M_{\omega_A}} = 5.$$

To determine the final set of rows to be classified into a class of rows based on the columns, the clustering module 404 determines a confidence factor (CF) for each final subset of rows. The confidence factor is a measure of the homogeneity of the final subset of rows. Once each text row has one or more confidence factors attributed to it, each text row is assigned to a class based on the highest attributed confidence factor. The confidence factor considers one or more features representing how similar one text row is to other text rows in the document. In this example, the confidence factor includes a normalized rows frequency for the final subset of rows, an average number of row matches for the final subset of rows, and an average distance between the text rows in the final subset of rows and the master row. However, other features may be used, such as the master row size, the absolute rows frequency, or other features.

In one example, the confidence factor for a selected final subset of rows ($CF_{\omega_X}$) is given by:

$$CF_{\omega_X} = NF_{\omega_X} * \left(\frac{AM_{\omega_X}}{\mu^{v_{\omega_X}}}\right) = NF_{\omega_X} * \left(\frac{\mu_{M_{\omega_X}}}{\mu^{v_{\omega_X}}}\right), \quad (19)$$

where $NF_{\omega_X}$ is the normalized rows frequency for the selected final subset of rows, $AM_{\omega_X}$ or $$\mu_{M_{\omega_X}}$$

is the average number of matches between the text rows and the master row in the final subset of rows, and $$\mu^{\nu_{\omega_X}}$$

is the average or mean of the distances between the text rows and the master row in the final subset of rows. In this example, the average number of matches between the text rows and the master row in the final subset of rows is in the numerator of the confidence factor ratio, the average or mean of the distances between the text rows and the master row in the final subset of rows is in the denominator of the confidence factor ratio, and the ratio is multiplied by the normalized frequency for the selected subset of rows. Alternately, the normalized frequency may be considered to be in the numerator of the confidence factor ratio. Other forms of the confidence factor ratio may be used, including powers of one or more features, and another form of the frequency may be used, such as the absolute frequency.

Therefore, the confidence factor for $\omega_A$ in this example is given by:

$$CF_{\omega_X} = NF_{\omega_X} * \left(\frac{AM_{\omega_X}}{\mu^{\nu_{\omega_X}}}\right) = NF_{\omega_A} * \left(\frac{\mu_{M_{\omega_A}}}{\mu^{\nu_{\omega_A}}}\right) = 0.5 * \frac{5}{1.5} = 1.67. \quad (20)$$

The clustering module 404 determines a confidence factor for each final subset of rows in the document 1702. FIGS. 43-85 depict examples of the subsets of rows for columns B, D, E, H, J, L, O, P, Q, T, and U with the associated row data, row points, clusters, cluster centers, and cluster center distances. The clusters are determined for each initial subset of rows to determine the corresponding final subset of rows.

FIGS. 43-46 depict examples of the subset of rows with the associated row data, row points, clusters, cluster centers, and cluster center distances for column B. FIGS. 47-50 depict examples of the subset of rows with the associated row data, row points, clusters, cluster centers, and cluster center distances for column D. FIGS. 51-54 depict examples of the subset of rows with the associated row data, row points, clusters, cluster centers, and cluster center distances for column E. FIGS. 55-58 depict examples of the subset of rows with the associated row data, row points, clusters, cluster centers, and cluster center distances for column H. FIGS. 59-62 depict examples of the subset of rows with the associated row data, row points, clusters, cluster centers, and cluster center distances for column J. FIGS. 63-66 depict examples of the subset of rows with the associated row data, row points, clusters, cluster centers, and cluster center distances for column L. FIGS. 67-70 depict examples of the subset of rows with the associated row data, row points, clusters, cluster centers, and cluster center distances for column O. FIGS. 71-74 depict examples of the subset of rows with the associated row data, row points, clusters, cluster centers, and cluster center distances for column P. FIGS. 75-78 depict examples of the subset of rows with the associated row data, row points, clusters, cluster centers, and cluster center distances for column Q. FIGS. 79-82 depict examples of the subset of rows with the associated row data, row points, clusters, cluster centers, and cluster center distances for column T. FIGS. 83-86 depict examples of the subset of rows with the associated row data, row points, clusters, cluster centers, and cluster center distances for column U.

In one embodiment, if there is only one instance of a column in the text rows of a document, the subset for that column is not evaluated and is considered to be a zero subset. Non-zero subsets, which are subsets of rows for columns having more than one instance, are evaluated in this embodiment.

In one embodiment, if there is only one instance of a column in the text rows of the document, the confidence factor for the final subset of rows for that column is zero. For example, since column C of the document 1702 has only a single instance, the confidence factor for the final subset of rows for column C is zero. In other examples, a confidence factor may be calculated for a single occurring column.

In the example of FIGS. 43-46, both text rows 7 and 8 are the same. All columns present in the subset have the same frequency of 2. Each text row has the same row distance and number of row matches. Each text row also has the same row length. In this instance, each row point is the same, and only one cluster is determined. The cluster has only one cluster center, and the distance of each row point to the cluster center is zero. Thus, each text row is in the cluster.

In this instance, cluster 1 includes row points for text rows 7 and 8. Therefore, the final subset of rows for column B is $\omega_B = \{7, 8\}$. The final distances vector corresponds to the final subset of rows, which for $\omega_B$ is $v_{\omega_B} = [0\ 0]$, which indicates there is no distance or difference between the text rows and the master row. The average of the row distances in the final subset, which is the mean of the elements in the final distances vector, is $$\mu^{\nu_{\omega_B}} = 0.$$

The final matches vector is $M_{\omega_B} = [6\ 6]$, which indicates each column matches the optimum set. The average number of row matches between the text rows and the master row for the elements in the final subset of rows for column B is $$\mu_{M_{\omega_B}} = 6.$$

The confidence factor for the final subset of rows for column B is:

$$CF_{\omega_B} = NF_{\omega_X} * \left(\frac{AM_{\omega_X}}{\mu^{\nu_{\omega_X}}}\right) = NF_{\omega_B} * \left(\frac{\mu_{M_{\omega_B}}}{\mu^{\nu_{\omega_B}}}\right) = 0.25 * \frac{6}{0}. \quad (21)$$

The group of elements from both text rows is the same as the optimum set or master row. In this instance where there are no differences between the text rows and the master row and there is a division by zero for the row distances average, the confidence factor is set to a selected high confidence factor value because the row distances in the final subset of rows all are zero. In this example, the selected high confidence factor value is 1.00 E+06. In another instance, where there are very slight differences between the text rows and the master row and there is a division by a very small number close to zero for the row distances average, the confidence factor is set to a selected high confidence factor value because the row distances in the final subset of rows all are very close to zero. Other selected high confidence factor values may be used. Each of the text rows is in the final subset of rows for the selected subset of rows. In this instance, each of text rows 7 and 8 are in the final subset of rows for column B ($\omega_B$).

In the examples of FIGS. 43-85, $\omega_B=\{7, 8\}$, $\omega_D=\{7, 8\}$, $\omega_E=\{2, 3, 4\}$, $\omega_H=\{7, 8\}$, $\omega_J=\{3\}$, $\omega_L=\{2, 7, 8\}$, $\omega_O=\{7, 8\}$, $\omega_P=\{2, 3, 4\}$, $\omega_Q=\{2, 3, 4\}$, $\omega_T=\{7, 8\}$, and $\omega_U=\{2, 3, 4\}$. Where $$CF_{\omega_B} = NF_{\omega_X} * \left(\frac{AM_{\omega_X}}{\mu^{\gamma_{\omega_X}}}\right) = NF_{\omega_X} * \left(\frac{\mu_{M_{\omega_X}}}{\mu^{\gamma_{\omega_X}}}\right),$$

the confidence factors for the other subsets of rows are as follows.

$CF_{\omega_B}=1.00E06$; $CF_{\omega_C}=0$; $CF_{\omega_D}=1.00E06$; $CF_{\omega_E}=1.88$; $CF_{\omega_F}=0$; $CF_{\omega_G}=0$; $CF_{\omega_H}=1.00E06$; $CF_{\omega_I}=0$; $CF_{\omega_J}=0.375$; $CF_{\omega_K}=0$; $CF_{\omega_L}=0.075$; $CF_{\omega_M}=0$; $CF_{\omega_N}=0$; $CF_{\omega_O}=1.00E06$; $CF_{\omega_P}=1.88$; $CF_{\omega_Q}=1.88$; $CF_{\omega_R}=0$; $CF_{\omega_S}=0$; $CF_{\omega_T}=1.00E06$; and $CF_{\omega_U}=1.88$. The confidence factors and the features used in the determination are depicted in FIG. 86.

As described above, each text row has one or more columns identifying an alignment for one or more character blocks, and a final subset of rows is identified for each column in which an alignment for a character block exists for that column. That is, a first final subset of rows having one or more alignments for one or more character blocks in a first column is determined, a second final subset of rows having one or more alignments for one or more character blocks in the second column is determined, etc. The confidence factors are then determined for each final subset of rows.

Each text row 1-8 in the document 1702 may have one or more confidence factors corresponding to the final subsets of rows having that text row as an element. The clustering module 404 determines the best confidence factor from the confidence factors corresponding to the final subsets of rows having that text row as an element. That is, if a text row is an element in a particular final subset of rows, the confidence factor for that subset of rows is considered for the text row. The confidence factors for each final subset of rows in which the particular text row is an element are compared for the particular text row, and the best confidence factor is determined and selected for the particular text row.

For example, text row 1 has no non-zero confidence factors because $\omega_A$ does not include row 1, $\omega_H$ does not include row 1, and the confidence factor for column F is zero because there is only one instance of column F in the document. Text row 2 is an element in each of the final subsets of rows $\omega_A$, $\omega_E$, $\omega_L$, $\omega_P$, $\omega_Q$, and $\omega_U$. Therefore, for row 2, the confidence factors for the final subsets of rows $\omega_A$, $\omega_E$, $\omega_L$, $\omega_P$, $\omega_Q$, and $\omega_U$ are compared to each other to determine the best confidence factor. The same process then is completed for each of text rows 3-8, comparing the confidence factors corresponding to each final subset of rows in which that text row is an element.

In one embodiment, if a subset of rows has only one column or each column in the text row has only a single instance in the document, or one or more columns in the text row are not in the final subset of rows for the text row and the remaining confidence factors for the text row are zero, such that the confidence factors for the text row all are zero, the text row is placed in its own class. However, other examples exist.

Referring again to the final subsets of rows, $\omega_A=\{2, 3, 4, 5\}$, $\omega_B=\{7, 8\}$, $\omega_D=\{7, 8\}$, $\omega_E=\{2, 3, 4\}$, $\omega_H=\{7, 8\}$, $\omega_J=\{3\}$, $\omega_L=\{2, 7, 8\}$, $\omega_O=\{7, 8\}$, $\omega_P=\{2, 3, 4\}$, $\omega_Q=\{2, 3, 4\}$, $\omega_T=\{7, 8\}$, and $\omega_U=\{2, 3, 4\}$. In this example, text row 1 has no non-zero subsets being evaluated. Text row 1 includes columns A, F, and H. However, $\omega_A$ does not include text row 1, $\omega_H$ does not include text row 1, and the confidence factor for column F is zero because there is only one instance of column F in the document. Text row 6 has no non-zero subsets being evaluated because $\omega_A$ does not include text row 6, and the confidence factors for all other columns in text row 6 are zero because each other column in the text row has only one instance. Therefore, text rows 1 and 6 each are in their own class. The confidence factors for each of the text rows are depicted in FIG. 87.

In one example, the best confidence factor is the highest confidence factor. For example, text row 2 is an element of final subsets of rows $\omega_A$, $\omega_E$, $\omega_L$, $\omega_P$, $\omega_Q$, and $\omega_U$. Therefore, the confidence factors for text row 2 include $CF_{\omega_A}=1.67$, $CF_{\omega_E}=1.88$, $CF_{\omega_L}=0.075$, $CF_{\omega_P}=1.88$, $CF_{\omega_Q}=1.88$, and $CF_{\omega_U}=1.88$. In text row 2, the best confidence factor is 1.88 for each of $CF_{\omega_E}$, $CF_{\omega_P}$, $CF_{\omega_Q}$, and $CF_{\omega_U}$. The system sequentially determines the best confidence factor for each row. Therefore, the best confidence factor for text row 3 is 1.88 for $CF_{\omega_E}$, $CF_{\omega_L}$, $CF_{\omega_Q}$, and $CF_{\omega_U}$. The best confidence factor for text row 4 is 1.88 for $CF_{\omega_E}$, $CF_{\omega_P}$, $CF_{\omega_Q}$, and $CF_{\omega_U}$. The best confidence factor for text row 5 is 1.67 for $CF_{\omega_A}$. The confidence factor for text row 6 is 0. The best confidence factor for text row 7 is 1.00 E+06 for each of $CF_{\omega_B}$, $CF_{\omega_D}$, $CF_{\omega_O}$, and $CF_{\omega_T}$. The best confidence factor for text row 8 is 1.00 E+06 for each of $CF_{\omega_B}$, $CF_{\omega_D}$, $CF_{\omega_O}$, and $CF_{\omega_T}$. The confidence factor for text row 1 is 0.

One or more text rows having the same best confidence factor are classified together as a class by the classifier module 308. In the example of FIG. 17, text row 1 does not have a best confidence factor that is the same as the best confidence factor for any other row, and its confidence factor is zero. Therefore, it is in a class by itself. Text rows 2-4 have the same best confidence factor and, therefore, are classified as being in the same class. Text row 5 does have a best confidence factor but does not have a best confidence factor that is the same as the best confidence factor for any other text row, and it is in a class by itself. Text row 6 does not have a best confidence factor that is the same as the best confidence factor for any other text row, its confidence factor is zero, and it is in a class by itself. Text rows 7-8 have the same best confidence factor and, therefore, are classified in the same class. In one optional embodiment, each class then is labeled with a class label.

Figure 89:
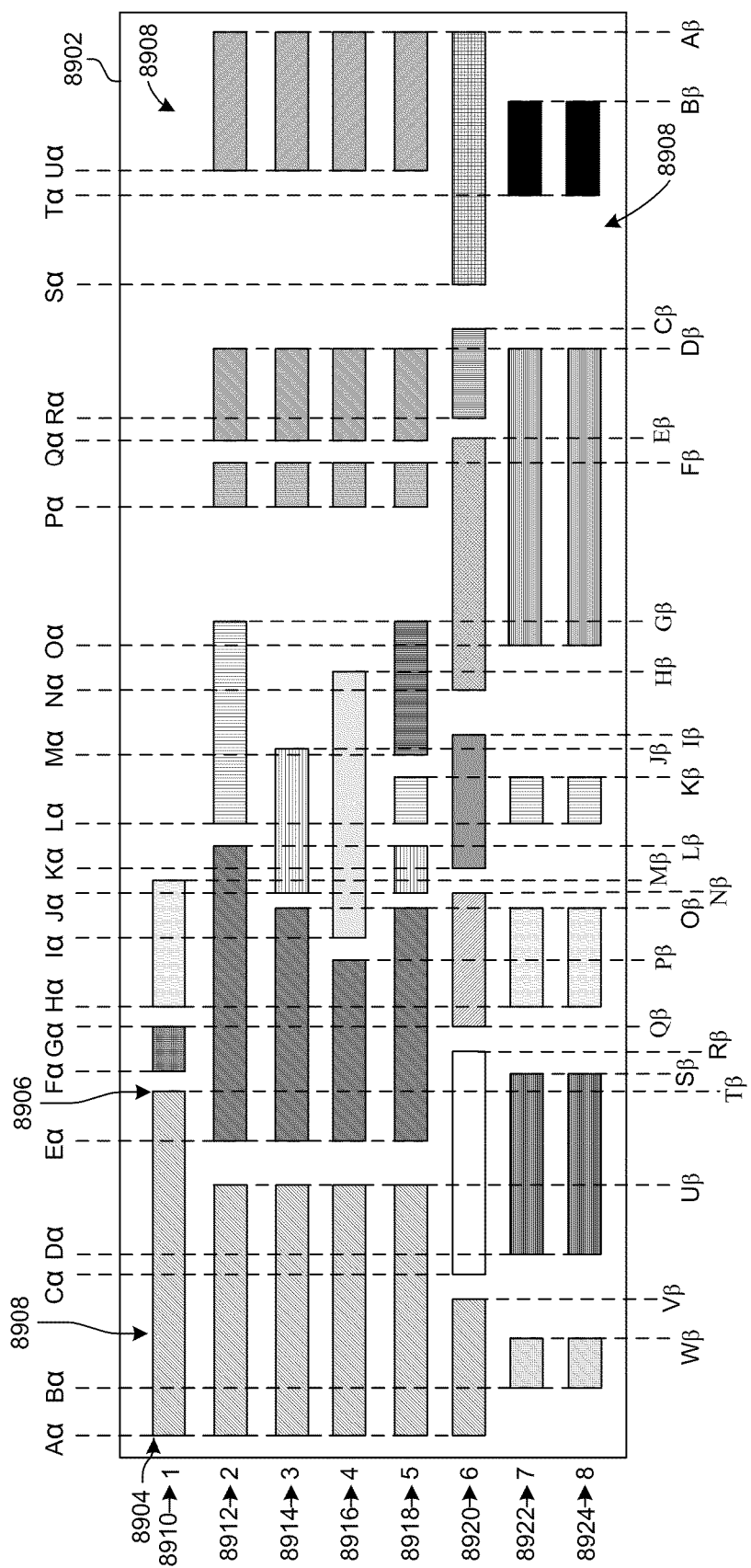
FIG. 89 is a diagram of a document having two alignments.

FIG. 89 depicts an example of a document 8902 processed by a classification system 210A of the forms processing system 104A for two alignments, such as the left alignment and right alignment of character blocks in one or more columns. The left alignment in this example is the alignment of columns at the left sides 8904 of the character blocks 8906, and the right alignment is the alignment of columns at the right sides 8908 of the character blocks. In this example, the document 8902 has eight text rows 8910-8924 (corresponding to text rows 1-8), and the character blocks in the document have left alignments for columns A alpha to U alpha (A$\alpha$-U$\alpha$) and right alignments for columns A beta to W beta (A$\beta$-W$\beta$).

The character blocks 8906 in each column A$\alpha$-U$\alpha$ and A$\beta$-W$\beta$ are designated with the patterns identified in FIG. 17 to more readily visually identify the character blocks associated with the columns in this example. The patterns and the designations are not needed for the processing. The designation of the columns is for exemplary purposes in this example. Columns may be designated in other ways for other examples, such as with one or more coordinates or through labeling. Designations are not used in other instances. Alternately, character blocks are labeled, the labeling process identifies the horizontal component, and columns are not separately identified or designated.

For representation purposes, upper case omega (Ω) is the set of rows in the document 8902, where each row has one or more alignments of character blocks in one or more columns, and upper case X prime (X') is the set of columns having character blocks in the document. $\omega_x^i$ (lower case omega, superscript i, subscript x or X) represents an initial subset of text rows (rows) having an alignment of a character block in a selected column x (lower case x or upper case X). For example, the document 8902 of FIG. 89 has eight text rows. Text rows 1, 2, 3, 4, 5, and 6 each have an alignment of a character block in column "Aα;" that is, each of text rows 1-6 have an alignment of a character block at a horizontal location labeled in this example as column Aα, and the column has a coordinate or other horizontal component. Therefore, the initial subset of rows in column "Aα" is $\omega_{A\alpha}^i = \{1, 2, 3, 4, 5, 6\}$.

The forms processing system 104A determines whether each row in the initial subset of rows ($\omega_x^i$) belongs with a final subset of rows ($\omega_X$) for the selected column. While a column may be present in a particular text row (row), that particular row may not ultimately be placed into the final subset of rows for the column. Therefore, a final subset of rows is determined from the initial subset of rows.

The final subsets of rows are used to determine the classes of rows. One or more text rows are placed into a class of rows, and one or more classes of rows may be determined. The initial subsets of rows, final subsets of rows, and classes of rows all refer to text rows. Thus, the initial subset of rows is an initial subset of text rows, the final subset of rows is a final subset of text rows, and the class of rows is a class of text rows.

The subsets module 302 creates each initial subset of rows $\omega_x^i$ by placing each text row containing an alignment of a character block in a selected column (X) in the subset. The text rows having topographical content that is incompatible to the majority of the other rows in the subset are discarded. To do so, a set of columns able to establish a homogeneity or resemblance among the text rows in the selected initial subset of rows is identified and the text rows containing character blocks (i.e. an alignment of character blocks) in those columns are verified. This verification can be performed by identifying an optimum set of columns in the initial subset of rows.

Figures 90, 91:
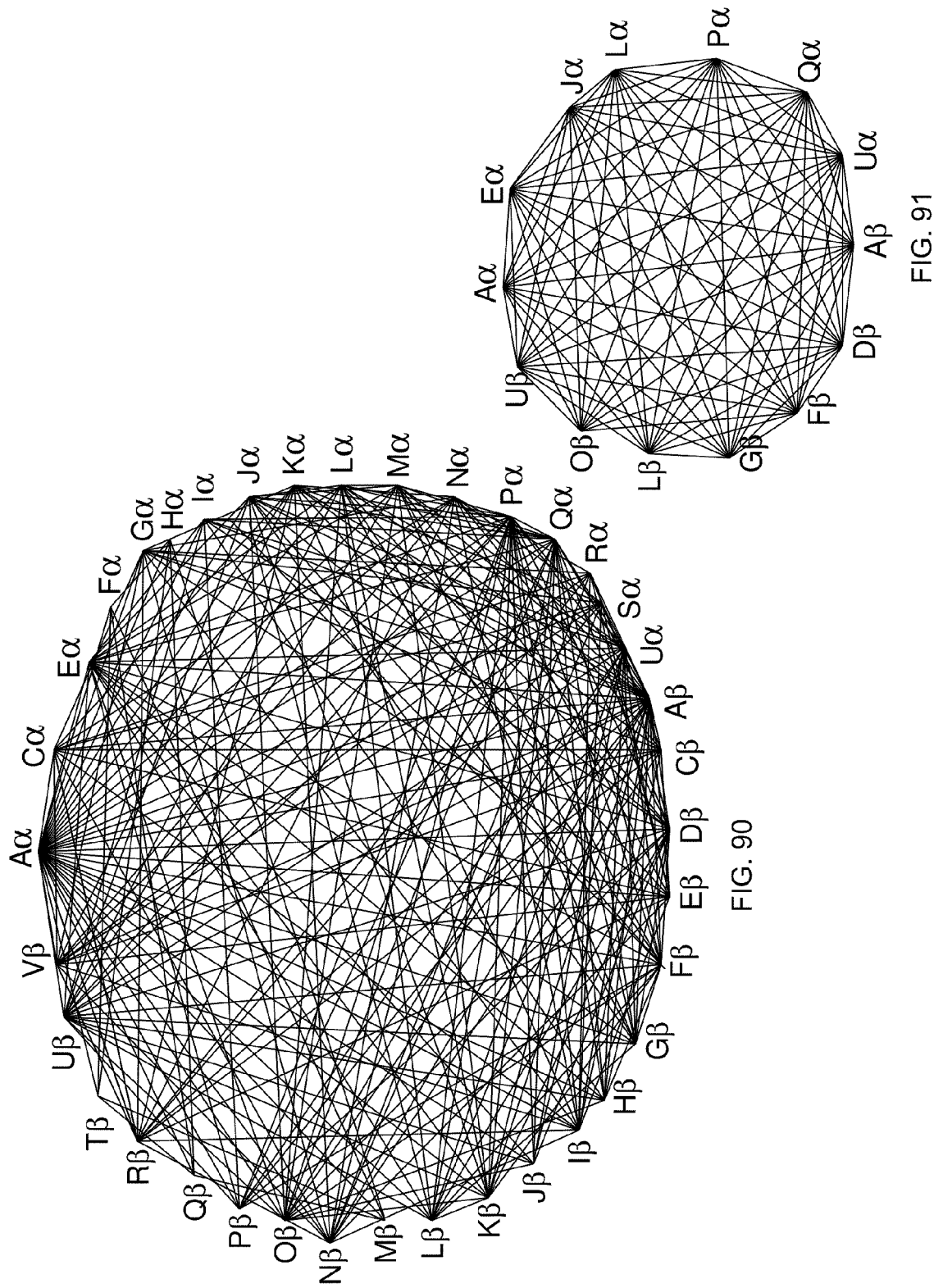
FIG. 90 is a graph of columns associated with column Aα of the document of FIG. 89.
FIG. 91 is a graph of an optimum set for the initial subset of rows for column Aα of the document of FIG. 89.

FIG. 90 depicts an example of a graph with column Aα and columns associated with column Aα. Text rows 1-6 each have a character block in column Aα, and each other column present in text rows 1-6 is associated with column Aα. Column Aα and its associated columns form a set of columns for the initial subset of rows for column Aα. The columns are depicted as nodes, and the lines between each of the nodes are arcs that represent the coexistence between column Aα and its associated columns and between each associated column and other associated columns. Thus, for each column in the initial subset of rows for column Aα ($\omega_{A\alpha}^i$), an arc exists between each column and all other columns appearing on the same rows where that column appears.

From the graph, some nodes have more arcs connected to other nodes, and some nodes have fewer arcs connected to other nodes. The nodes with more arcs are more representative, and the nodes with fewer arcs are less representative. For example, column Fα appears only in conjunction with columns Aα, Hα, Mβ, Qβ, and Tβ. In this instance, the small number of connections to column Fα implies that it is not a crucial column for $\omega_{A\alpha}^i$.

FIG. 91 depicts an example of a graph with an optimum set for column Aα composed of a maximum number of columns being a part of a maximum number of text rows of the initial subset of rows for column Aα at the same time. The nodes depict the columns, and the arcs represent the coexistence between the columns. FIGS. 90 and 91 are presented for exemplary purposes and are not used in processing.

Referring again to FIG. 89, an optimum set is a set of horizontal components, such as columns, having a most representative number of instances in the initial subset of text rows. In one example, the optimum set for a selected subset of rows includes a maximum number of columns being a part of a maximum number of text rows of the initial subset of rows at the same time. In another example, the optimum set is a set of columns having a large number of instances in the initial subset of text rows, the large number of instances includes a number of instances a column occurs in the text rows at or above a threshold number of instances, and the optimum set is a set of columns with each column having a number of instances occurring in the text rows at or above the threshold. An example of a threshold is discussed above. In another example, the large number of instances includes a number of instances occurring in the text rows at or above an average, and the optimum set is a set of columns with each column having a number of instances occurring in the text rows at or above the average number of instances of columns appearing in the text rows.

The optimum set module 304 determines the optimum set by identifying the horizontal components, such as columns, in the initial subset of rows with a large number of instances. For example, columns having a number of instances at or above a threshold or average are determined in one example. Other examples exist.

The optimum set can be represented as a master row, which is a binary vector whose elements identify the horizontal components, such as the columns, in the optimum set. For example, in the master row, "1"s identify the elements in the optimum set and "0"s identify all other columns in the initial subset of rows. The master row has a length equal to the number of columns in the initial subset of rows $\omega_x^i$ with a "1" on every column that is a part of the optimum set. Therefore, the length of the master row is equal to the number of elements in the optimum set in one example. In another example, positive elements identify the elements in the optimum set, such as "1"s, and zero, negative, or other elements identify all other columns in the initial subset of rows. In this example, the master row has a length equal to the number of columns in the initial subset of rows $\omega_x^i$ having a positive element in the optimum set. The length of the master row also is equal to the number of elements in the optimum set in this example. In another example, other selected elements can identify the components of the master row, such as other positive elements, flags, or characters, with non-selected elements identified by zeros, negative elements, other non-positive elements, or other flags or characters.

In one example, the optimum set is determined by generating a histogram of the number of instances of each column in the initial subset of rows $\omega_x^i$. The result is a bimodal plot with one peak produced by the most popular columns and the other peak being represented by the ensemble of columns occurring the least. A thresholding algorithm determines a threshold and splits the columns into separate sets according to the threshold.

FIG. 92 depicts an example of such a histogram for the initial subset of rows in column Aα ($\omega_{A\alpha}^i$). The histogram is generated by the optimum set module 304 and identifies the frequency of each column in the set of columns for the selected initial subset of rows (referred to as the column frequency or column frequencies herein). A column frequency for a selected column therefore is the number of times the selected column is present in an initial subset of rows of the document. Columns not present in the selected initial subset of rows are not present in the histogram of the initial subset of rows in one example. Here, column Aα is present in six of the rows, column Cα is present in 1 row, column Eα is present in four rows, column Aβ is present in five rows, column Cβ is present in one row, etc.

In one embodiment, the optimum set module 304 determines a threshold (T or τ) from the histogram of column frequencies using a thresholding algorithm. In one example, the threshold is determined as an Otsu threshold using an Otsu thresholding algorithm.

The threshold is calculated over the column frequencies (column frequencies threshold), such as over the histogram of the column frequencies. The columns having a column frequency greater than the threshold are the elements in the optimum set, which are indicated in the master row. The master row in this example has "1"s identifying the elements (i.e. columns) in the optimum set and "0"s for the remaining columns.

In the example of FIG. 92, the column frequencies threshold (T1) is 2.99. Therefore, any columns having a frequency greater than 2.99 are the elements of the optimum set and are identified in the master row by the optimum set module. In this example, columns Aα, Eα, Pα, Qα, Uα, Aβ, Dβ, Fβ, and Uβ have a frequency greater than the threshold, are the elements of the optimum set, and are identified in the master row as "1"s. In other examples, columns having a frequency greater than an average are in the optimum set and, therefore, are identified in the master row. In other examples, a column frequency greater than or equal to a threshold or statistical average may be determined by the optimum set module 304, and the columns having a column frequency greater than (or greater than or equal to) the threshold or statistical average are the elements in the optimum set.

Division Module

The division module 306 uses a division algorithm to determine the final subset of rows ($\omega_X$) from the initial subset of rows ($\omega_X^i$). The division algorithm determines a number of elements, such as text rows, of the initial subset of rows that are most similar to each other based on the columns from the optimum set, and those elements or text rows are in, or correspond to, the final subset of rows. For example, each text row has a physical structure defined by the columns (i.e. one or more alignments of one or more character blocks in one or more columns) in the text row, and the division module determines a final subset of rows with one or more text rows having physical structures that are most similar to the set of columns of the optimum set when compared to all physical structures of all of the text rows in the initial subset of rows.

In one embodiment, the division algorithm includes a thresholding algorithm, a clustering algorithm, another unsupervised learning algorithm to deal with unsupervised learning problems, or another algorithm that can split peaks of data into one or more groups. In one example, the division algorithm determines a number of elements, such as text rows, in the initial subset of rows having physical structures of columns that are the closest to the optimum set, which can include the smallest differences and/or the highest similarities (such as the smallest distances and/or the highest matches) to the master row or optimum set, when compared to all elements in the initial subset of rows. The resulting selected text rows are the most similar to each other based on the columns from the master row or elements in the optimum set. In another example, the division algorithm splits the text rows of the initial subset of rows into two groups and determines the group having physical structures of columns that are the closest to the optimum set, which can include the smallest differences and/or the highest similarities (such as the smallest distances and/or the highest matches) to the optimum set as embodied by the master row, when compared to the other group, which is farther from the optimum set, which can include higher differences and/or smaller similarities (such as larger distances and/or lower matches) to the optimum set as embodied by the master row.

Thresholding Module

In one embodiment, the division module 306 is a thresholding module 402 that uses a thresholding algorithm to determine the final subset of rows ($\omega_X$) from the initial subset of rows ($\omega_X^i$). The thresholding algorithm determines the elements, such as text rows, in the initial subset of rows that are the closest to the optimum set by determining the elements having the smallest differences from the optimum set. For example, the elements in the initial distances vector correspond to the text rows in the initial subset of rows, and the distances vector is a measure of the differences between each text row and the optimum set. The selected elements having the smallest differences correspond to text rows selected to be in the final subset of rows.

One or more features are used to compare each text row in the initial subset of rows to the optimum set, as indicated by the elements in the master row. The values of the features may be in a features vector. In one example, a distance is a feature used to compare each row to the optimum set, and the distances are included in a distances vector, such as an initial distances vector or a final distances vector. Other features or feature vectors may be used.

The thresholding module 402 determines an initial distances vector ($v_{\omega_X}^i$) as a vector of the distances from each text row in the selected initial subset of rows ($\omega_X^i$) to its master row. The distance vector may include a standard distance and/or a weighted distance. The standard distance of each text row to the master row (the row distance) was explained above and is given by equation 8. In one instance, the standard row distance is a standard Hamming distance.

The weighted row distance (WD) is a modified standard row distance. In the weighted row distance, only columns having an element in the optimum set, such as a "1" in the master row, are considered. The weighted distance of each text row to the master row is given by:

$$wd_x = wd(r_i, MR_i), \qquad (22)$$

where $r_i$ is the binary vector for the text row, $MR_i$ is the binary vector for the master row, each binary vector has one or more coordinates or components, and the weighted row distance equals the sum of the absolute values of each column of the selected row subtracted from the corresponding column of the master row for columns having an element in the optimum set, such as a "1" in the master row.

So, the weighted row distance is the number of differences or different components between the master row and a selected text row for columns having an element in the optimum set. For one example, the weighted row distance is the number of differences or different components between the master row and a selected text row for columns having a "1" in the master row. In one example, the weighted row distance is a weighted Hamming distance, which is the sum of different coordinates between the text row vector and the master row vector for columns having a "1" in the master row.

For example, FIG. 93 depicts the determination of a weighted Hamming distance from row 1 to the master row 9302 for the right alignments for the initial subset of rows $\omega_{A\alpha}^i = \{1, 2, 3, 4, 5, 6\}$. The left alignments for $\omega_{A\alpha}^i$ are not depicted in the example of FIG. 93, and the weighted Hamming distance for the right alignments for $\omega_{A\alpha}^i$ is equal to 4.

In one example, the forms processing system 104A determines the standard row distance for the left alignments and determines the weighted row distance for the right alignments. In this example, more weight is placed on the left alignments than the right alignments. This may be used, for example, where the left alignments are more important or may provide a better determination of the total classification of text rows into classes. In one example, the weighted distance is used for right alignments (to provide a greater weight for the left alignments) where documents are left justified, for languages written from left to right, and other instances.

The term "combination row distance" means a standard row distance for a first alignment and a weighted row distance for a second alignment. For example, a combination row distance (CD) includes a standard row distance for left alignments and a weighted row distance for right alignments. The term "combination Hamming row distance" means a standard Hamming row distance for a first alignment and a weighted Hamming row distance for a second alignment. For example, a combination Hamming row distance includes a standard Hamming row distance for left alignments and a weighted Hamming row distance for right alignments.

FIGS. 94A-B depict the columns for $\omega_{A\alpha}{}^i$, the row distances determined by the thresholding module 402 for text rows 1-6 of the initial subset of rows $\omega_{A\alpha}{}^i$, and the column frequencies for $\omega_{A\alpha}{}^i$. FIG. 94A includes columns A$\alpha$-U$\alpha$ for the left alignments, and FIG. 94B includes columns A$\beta$-W$\beta$ for the right alignments, the row distances for $\omega_{A\alpha}{}^i$, and the thresholds (T1 and T2) for $\omega_{A\alpha}{}^i$.

In FIGS. 94A-B, the row distances are combination row distances. The row distance of row 1 from the master row is $d_1=cd(r_1, MR)=10$, which includes a standard row distance of 6 for the left alignments and a weighted row distance of 4 for the right alignments. The row distance of row 2 from the master row is $d_2=cd(r_2, MR)=1$, which includes a standard row distance of 1 for the left alignments and a weighted row distance of 0 for the right alignments. The row distance of row 3 from the master row is $d_3=cd(r_3, MR)=1$, which includes a standard row distance of 1 for the left alignments and a weighted row distance of 0 for the right alignments. The row distance of row 4 from the master row is $d_4=cd(r_4, MR)=1$, which includes a standard row distance of 1 for the left alignments and a weighted row distance of 0 for the right alignments. The row distance of row 5 from the master row is $d_5=cd(r_5, MR)=3$, which includes a standard row distance of 3 for the left alignments and a weighted row distance of 0 for the right alignments. The row distance of row 6 from the master row is $d_6=cd(r_6, MR)=13$, which includes a standard row distance of 10 for the left alignments and a weighted row distance of 3 for the right alignments. Therefore, the initial distances vector for the initial subset of rows $\omega_{A\alpha}{}^i$ is $v_{\omega_{A\alpha}}{}^i[10\ 1\ 1\ 1\ 3\ 13]$.

The threshold algorithm is used to determine a threshold for the elements of the initial distances vector ($v_{\omega_X}{}^i$) (initial distances vector threshold). The elements that are less than the threshold are in the final distances vector $v_{\omega_X}$ for the selected initial subset of rows $\omega_X{}^i$. In one example of this embodiment, the threshold is determined as the Otsu threshold using an Otsu thresholding algorithm.

Figure 95:
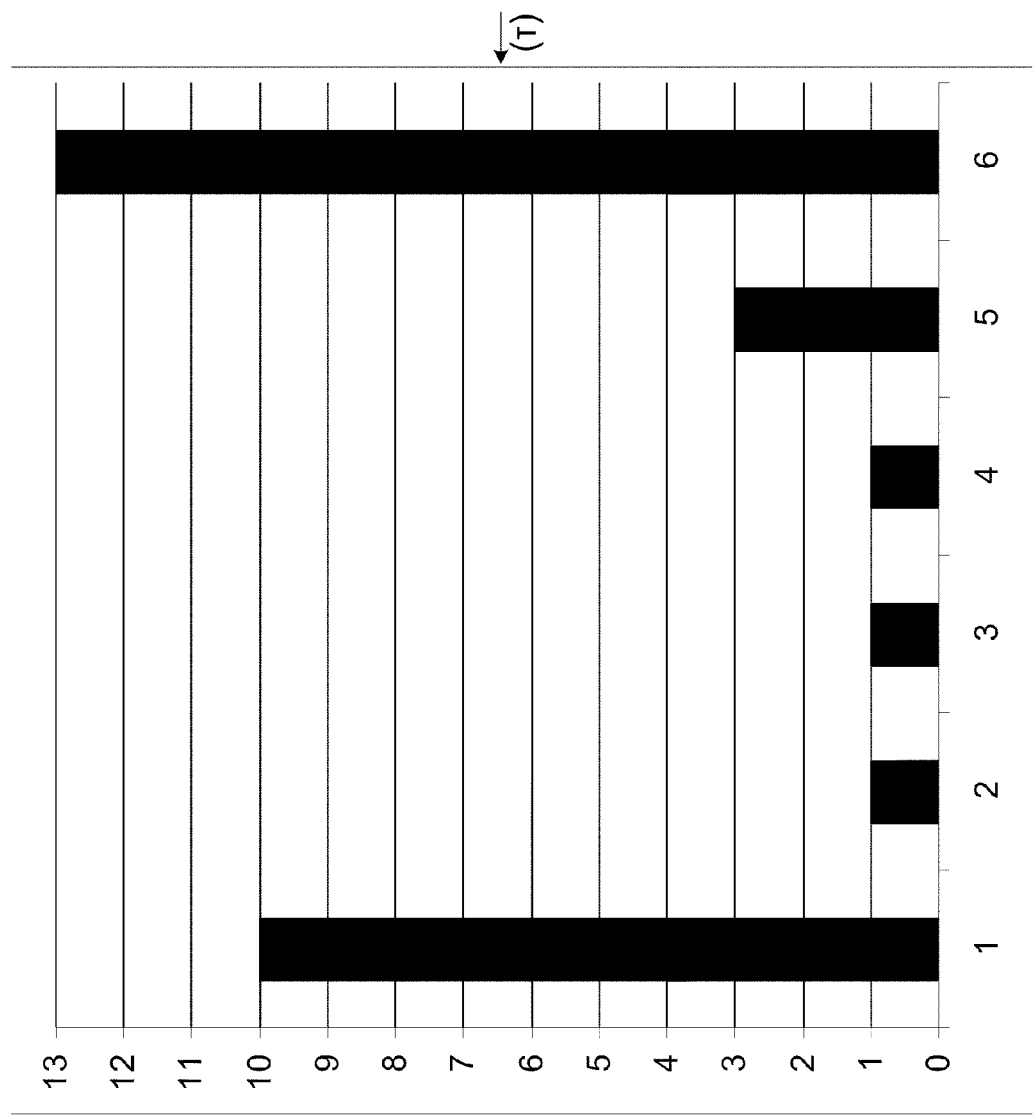
FIG. 95 is a histogram of the initial distances vector for the initial subset of rows for the column Aα.

In the example of the initial subset of rows for column A$\alpha$, the initial distances vector for $\omega_{A\alpha}{}^i$ is $v_{\omega_{A\alpha}}{}^i=[10\ 1\ 1\ 1\ 3\ 13]$, as shown in FIGS. 94A-94B. A thresholding algorithm generates a threshold over an initial distances vector, such as over a histogram of the initial distances vector for $\omega_{A\alpha}{}^i$, as depicted in FIG. 95. When the Otsu thresholding algorithm is applied to the histogram in one example, the initial distances vector threshold (T2) is 6.45. In this example, any elements under the threshold are selected to be in the final distances vector. Therefore, any elements less than 6.45 are in the final distances vector ($v_{\omega_{A\alpha}}$) for the initial subset of rows for column A$\alpha$ ($\omega_{A\alpha}{}^i$). In the case of the initial subset of rows for column A$\alpha$ ($\omega_{A\alpha}{}^i$), the final distances vector is $v_{\omega_{A\alpha}}=[1\ 1\ 1\ 3]$.

The final subset of rows $\omega_X$ corresponds to the elements in the final distances vector $v_{\omega_X}$. In one example, if the distance for a text row (e.g. the distance between the selected text row and the master row) is present in the final distances vector, that text row is present in the final subset of rows. In the example of the initial subset of rows for column A$\alpha$, $\omega_{A\alpha}{}^i=\{1, 2, 3, 4, 5, 6\}$, the initial distances vector is $v_{\omega_{A\alpha}}{}^i[10\ 11\ 1\ 3\ 13]$, and the final distances vector is $v_{\omega_{A\alpha}}=[1\ 1\ 1\ 3]$. In this example, the row distances for text rows 1 and 6 were eliminated through the second thresholding algorithm. Therefore, text rows 1 and 6 are eliminated, and text rows 2-5 are retained, from the initial subset of rows to result in the final subset of rows for column A$\alpha$ ($\omega_{A\alpha}$). In this example, the final subset of rows has text row elements corresponding to the distance elements in the final distances vector, and $\omega_{A\alpha}=\{2, 3, 4, 5\}$.

In another example, elements of the initial distances vector that are less than or equal to the threshold are in the final distances vector. In still another example, elements of the initial distances vector that are less than or alternately less than or equal to an average of the elements in the initial distances vector are in the final distances vector.

Because the initial distances vector and the final distances vector have elements that are measures of distance between the optimum set, as identified by the master row, and the corresponding text row, the elements under the threshold (either less than or less than or equal to) have the smallest distances to the optimum set, as identified by the master row. Each distance measurement in this case is a measurement of how similar a corresponding text row is to the optimum set, as identified by the master row. Therefore, the text rows corresponding to the elements under the threshold are the most similar to the optimum set or master row.

In this example, the Otsu thresholding algorithm determines a threshold of a distances vector to establish the groupings. In this example, the thresholding algorithm uses one feature/one dimension to determine the groupings of text rows, which is the row distance. In this example, the row distance includes the standard row distance, the weighted row distance, or a combination row distance.

The mean of the elements in the final distances vector $$(\mu^{v_{\omega_X}} \text{ or } \mu^v)$$

then is determined by the thresholding module 402. In the case of final distances vector for column A$\alpha$ ($v_{\omega_{A\alpha}}$), the mean of the elements in the final distances vector is $$\mu^{v_{\omega_{A\alpha}}} = 1.5.$$

The variance (var or $\sigma_{\omega_X}$) is the statistical variance of the distances of each row in the final subset of rows $\omega_X$ to its master row, which also is determined by the thresholding module 402. In one example, $\sigma_{\omega_X}$ is given by equation 9. Therefore, the variance for the subset of rows for column A$\alpha$ is given by:

$$\sigma_{\omega_{A\alpha}} = \sigma(v_{\omega_{A\alpha}}) = \frac{1}{n-1}\sum_{i=1}^{n}(v_i - \mu^{v_{\omega_{A\alpha}}})^2 = \frac{1}{3}\sum_{i=1}^{4}(v_i - 1.5)^2 = 1. \quad (23)$$

$$CF_{\omega_{A\alpha}} = \frac{AF^3_{\omega_{A\alpha}} \cdot L_{MR}}{\sigma_{\omega_{A\alpha}} \cdot \mu^{v_{\omega_{A\alpha}}} + 1} = \frac{(4)^3 * 9}{1 * 1.5 + 1} = 230.4. \quad (24)$$

The rows frequency ($F_{\omega_X}$) compares the rows for a selected subset of rows to the document. In one embodiment, the rows frequency is the number of text rows in a selected final subset of rows ($\omega_X$). This frequency sometimes is referred to as the absolute rows frequency (AF) herein. In the example of FIG. 89, the final subset of rows for column A$\alpha$ is $\omega_{A\alpha}=\{2, 3, 4, 5\}$. Here, the absolute rows frequency is $F_{\omega_{A\alpha}}=AF_{\omega_{A\alpha}}=4$.

In another example, the rows frequency is the ratio of the number of text rows in a selected final subset $\omega_X$ to the total number of text rows in the document. In this embodiment, $F_{\omega_X}$=No. of rows in $\omega_X$/No. of rows in the document. This frequency sometimes is referred to as the normalized rows frequency (NF) herein. In the example of FIG. 89, since there are eight text rows in the document, the normalized rows frequency is $F_{\omega_{A\alpha}}=NF_{\omega_{A\alpha}}=4/8=0.5$.

In other embodiments, other frequency values may be used. For example, the frequency may consider all of the text rows in the initial subset of rows instead of, or in addition to, the text rows in the final subset of rows.

To determine the final set of rows to be classified into a class of rows based on the columns, the thresholding module 402 determines a confidence factor (CF) for each final subset of rows ($\omega_X$). The confidence factor is a measure of the homogeneity of the final subset of rows. Once each text row has a confidence factor attributed to it, each text row is assigned to a class based on the highest attributed confidence factor. The confidence factor considers one or more features representing how similar one text row is to other rows in the document. For example, the confidence factor may consider one or more of the rows frequency (the absolute frequency, the normalized frequency, or another frequency value), the variance, the mean of the elements under the threshold, the mean of the elements less than or equal to the threshold, the threshold value, the number of elements in the optimum set, the length of the master row (i.e. the number of non-zero columns in the master row), and/or other variables.

In one example, the confidence factor for a selected final subset of rows having a character block in a selected column ($\omega_X$) is given by a form of the confidence factor ratio in equation 11. Additional or other variables or features may be considered in the numerator or denominator of the confidence factor ratio. For example, the confidence factor may include a frequency and master row length in the numerator and a variance and average row distance in the denominator of the confidence factor ratio. Alternately, the confidence factor may use one or more variables identified above, but not in a ratio or in a different ratio.

In another example, the confidence factor for a selected final subset of rows ($CF_{\omega_X}$) is given by equation 12. The normalized frequency may be used in place of the absolute frequency in other examples.

In one embodiment, if there is only one instance of a column in the text rows of the document, the confidence factor for the subset of rows for that column is zero. For example, since column C$\alpha$ of the document 8902 has only a single instance, the confidence factor for the subset of rows for column C$\alpha$ is zero. In other examples, a confidence factor may be calculated for a single occurring column.

In the above example for the subset of rows in column A$\alpha$, $L_{MR}$=9, which is the number of positive or non-zero elements in the master row. Therefore, the confidence factor for $\omega_{A\alpha}$ in this example is given by:

The thresholding module 402 determines a confidence factor for each final subset of rows in the document 8902. FIGS. 96A-117B depict examples of the subsets of rows for columns B$\alpha$, D$\alpha$, E$\alpha$, H$\alpha$, J$\alpha$, L$\alpha$, O$\alpha$, P$\alpha$, Q$\alpha$, T$\alpha$, U$\alpha$, A$\beta$, B$\beta$, D$\beta$, F$\beta$, G$\beta$, K$\beta$, L$\beta$, O$\beta$, S$\beta$, U$\beta$, and W$\beta$ with the associated frequencies, initial distances vectors, and thresholds. FIGS. 96A-96B depict an example of the subset of rows for column B$\alpha$. FIGS. 97A-97B depict an example of the subset of rows for column D$\alpha$. FIGS. 98A-98B depict an example of the subset of rows for column E$\alpha$. FIGS. 99A-99B depict an example of the subset of rows for column H$\alpha$. FIGS. 100A-100B depict an example of the subset of rows for column J$\alpha$. FIGS. 101A-101B depict an example of the subset of rows for column L$\alpha$. FIGS. 102A-102B depict an example of the subset of rows for column O$\alpha$. FIGS. 103A-103B depict an example of the subset of rows for column P$\alpha$. FIGS. 104A-104B depict an example of the subset of rows for column Q$\alpha$. FIGS. 105A-105B depict an example of the subset of rows for column T$\alpha$. FIGS. 106A-106B depict an example of the subset of rows for column U$\alpha$. FIGS. 107A-107B depict an example of the subset of rows for column A$\beta$ FIGS. 108A-108B depict an example of the subset of rows for column B$\beta$. FIGS. 109A-109B depict an example of the subset of rows for column D$\beta$. FIGS. 110A-110B depict an example of the subset of rows for column F$\beta$. FIGS. 111A-111B depict an example of the subset of rows for column G$\beta$. FIGS. 112A-112B depict an example of the subset of rows for column K$\beta$. FIGS. 113A-113B depict an example of the subset of rows for column L$\beta$. FIGS. 114A-114B depict an example of the subset of rows for column O$\beta$. FIGS. 115A-115B depict an example of the subset of rows for column S$\beta$. FIGS. 116A-116B depict an example of the subset of rows for column U$\beta$. FIGS. 117A-117B depict an example of the subset of rows for column W$\beta$. The thresholds are determined for each initial distances vector for each subset of rows to determine the corresponding final distances vector and the corresponding final subset of rows.

In one embodiment, if there is only one instance of a column in the text rows of a final subset of rows in a document, the subset for that column is not evaluated and is considered to be a zero subset. Non-zero subsets, which are subsets of rows for columns having more than one instance in a document, are evaluated in this embodiment.

In the example of FIG. 96A-96B for column B$\alpha$, both text rows 7 and 8 are the same. All columns present in the subset have the same frequency of 2, including the left alignments and the right alignments. In this instance, the threshold algorithm does not render two non-zero sets of elements based on the columns frequencies. In this instance, the columns frequencies threshold is set at negative one (−1). Another selected low threshold value may be used. The single group of elements from both text rows is the optimum set or master row. Additionally, the distances vector is comprised of all zero elements. Therefore, the threshold algorithm similarly does not render two non-zero sets of elements based on the initial distances vector. In this instance, the initial distances vector threshold is set at negative one (−1). Another selected low threshold value may be used. Each of the text rows is in the final subset of rows for $\omega_{B\alpha}$.

In the examples of FIGS. 96A-117B, $\omega_{A\alpha}=\{2, 3, 4, 5\}$, $\omega_{B\alpha}=\{7, 8\}$, $\omega_{D\alpha}=\{7, 8\}$, $\omega_{E\alpha}=\{2, 3, 4\}$, $\omega_{H\alpha}=\{7, 8\}$, $\omega_{J\alpha}=\{3\}$, $\omega_{L\alpha}=\{7, 8\}$, $\omega_{O\alpha}=\{7, 8\}$, $\omega_{P\alpha}=\{2, 3, 4\}$, $\omega_{Q\alpha}=\{2, 3, 4\}$, $\omega_{T\alpha}=\{7, 8\}$, and $\omega_{U\alpha}=\{2, 3, 4\}$. $\omega_{A\beta}=\{2, 3, 4, 5\}$, $\omega_{B\beta}=\{7, 8\}$, $\omega_{D\beta}=\{2, 3, 4, 5\}$, $\omega_{F\beta}=\{2, 3, 4\}$, $\omega_{G\beta}=\{2\}$, $\omega_{K\beta}=\{7, 8\}$, $\omega_{L\beta}=\{2\}$, $\omega_{O\beta}=\{7, 8\}$, $\omega_{S\beta}=\{7, 8\}$, $\omega_{U\beta}=\{2, 3, 4\}$, and $\omega_{W\beta}=\{7, 8\}$.

Where $$CF_{\omega_X} = \frac{F_{\omega_X}^3 \cdot L_{MR}}{\sigma_{\omega_X} \cdot \mu^{v_{\omega_X}} + 1},$$

the confidence factors for the subsets are as follows. $CF_{\omega_{A\alpha}}=230.4$; $CF_{\omega_{B\alpha}}=96$; $CF_{\omega_{C\alpha}}=0$; $CF_{\omega_{D\alpha}}=96$; $CF_{\omega_{E\alpha}}=121.5$; $CF_{\omega_{F\alpha}}=0$; $CF_{\omega_{G\alpha}}=0$; $CF_{\omega_{H\alpha}}=96$; $CF_{\omega_{I\alpha}}=0$; $CF_{\omega_{J\alpha}}=11$; $CF_{\omega_{K\alpha}}=0$; $CF_{\omega_{L\alpha}}=5.3$; $CF_{\omega_{M\alpha}}=0$; $CF_{\omega_{N\alpha}}=0$; $CF_{\omega_{O\alpha}}=96$; $CF_{\omega_{P\alpha}}=121.5$; $CF_{\omega_{Q\alpha}}=121.5$; $CF_{\omega_{R\alpha}}=0$; $CF_{\omega_{S\alpha}}=0$; $CF_{\omega_{T\alpha}}=96$; and $CF_{\omega_{U\alpha}}=121.5$. $CF_{\omega_{A\beta}}=230.3$, $CF_{\omega_{B\beta}}=96$, $CF_{\omega_{D\beta}}=301.7$, $CF_{\omega_{F\beta}}=121.5$, $CF_{\omega_{G\beta}}=12$, $CF_{\omega_{K\beta}}=96$, $CF_{\omega_{L\beta}}=12$, $CF_{\omega_{O\beta}}=5.3$, $CF_{\omega_{S\beta}}=96$, $CF_{\omega_{U\beta}}=121.5$, and $CF_{\omega_{W\beta}}=96$. The confidence factors and the features used in the determination are depicted in FIG. 118.

As described above, each text row has one or more columns identifying one or more alignments for one or more character blocks, and a final subset of rows is identified for each column in which an alignment for a character block exists for that column. That is, a first final subset of rows having one or more alignments for one or more character blocks in a first column is determined, a second final subset of rows having one or more alignments for one or more character blocks in the second column is determined, etc. The confidence factors are then determined for each final subset of rows.

Each text row 1-8 in the document 8902 may have one or more confidence factors corresponding to the final subsets of rows having that text row as an element. The thresholding module 402 determines the best confidence factor from the confidence factors corresponding to the final subsets of rows having that text row as an element. That is, if a text row is an element in a particular final subset of rows, the confidence factor for that subset of rows is considered for the text row. The confidence factors for each final subset of rows in which the particular text row is an element are compared for the particular text row, and the best confidence factor is determined from that group of confidence factors and selected for the particular row.

For example, text row 1 has no non-zero confidence factors because $\omega_{A\alpha}$ does not include row 1, $\omega_{H\alpha}$ does not include row 1, and the confidence factors for columns F$\alpha$, M$\beta$, Q$\beta$, and T$\beta$ are zero because there is only one instance of each of columns F$\alpha$, M$\beta$, Q$\beta$, and T$\beta$ in the document. Text row 2 is an element in each of the final subsets of rows $\omega_{A\alpha}$, $\omega_{E\alpha}$, $\omega_{P\alpha}$, $\omega_{Q\alpha}$, $\omega_{U\alpha}$, $\omega_{A\beta}$, $\omega_{D\beta}$, $\omega_{F\beta}$, and $\omega_{U\beta}$. Therefore, for text row 2, the confidence factors for the final subsets of rows $\omega_{A\alpha}$, $\omega_{E\alpha}$, $\omega_{P\alpha}$, $\omega_{Q\alpha}$, $\omega_{U\alpha}$, $\omega_{A\beta}$, $\omega_{D\beta}$, $\omega_{F\beta}$, and $\omega_{U\beta}$ are compared to each other to determine the best confidence factor from that group of confidence factors. The same process then is completed for each of text rows 3-8, comparing the confidence factors corresponding to each final subset of rows in which that text row is an element.

In one embodiment, if a subset of rows has only one column or each column in a text row has only a single instance in the document, or one or more columns in the text row are not in the final subset of rows for the text row and the remaining confidence factors for the text row are zero, such that the confidence factors for the text row all are zero, the text row is placed in its own class. However, other examples exist.

Referring again to the final subsets of rows, $\omega_{A\alpha}=\{2, 3, 4, 5\}$, $\omega_{B\alpha}=\{7, 8\}$, $\omega_{D\alpha}=\{7, 8\}$, $\omega E\alpha=\{2, 3, 4\}$, $\omega_{H\alpha}=\{7, 8\}$, $\omega_{J\alpha}=\{3\}$, $\omega_{L\alpha}=\{7, 8\}$, $\omega_{O\alpha}=\{7, 8\}$, $\omega_{P\alpha}=\{2, 3, 4\}$, $\omega_{Q\alpha}=\{2, 3, 4\}$, $\omega_{T\alpha}=\{7, 8\}$, and $\omega_{U\alpha}=\{2, 3, 4\}$. $\omega_{A\beta}=\{2, 3, 4, 5\}$, $\omega_{B\beta}=\{7, 8\}$, $\omega_{D\beta}=\{2, 3, 4, 5\}$, $\omega_{F\beta}=\{2, 3, 4\}$, $\omega_{G\beta}=\{2\}$, $\omega_{K\beta}=\{7, 8\}$, $\omega_{L\beta}=\{2\}$, $\omega_{O\beta}=\{7, 8\}$, $\omega_{S\beta}=\{7, 8\}$, $\omega_{U\beta}=\{2, 3, 4\}$, and $\omega_{W\beta}=\{7, 8\}$. In this example, text row 1 has no non-zero subsets being evaluated. Text row 1 includes columns A$\alpha$, F$\alpha$, H$\alpha$, M$\beta$, Q$\beta$, and T$\beta$. However, $\omega_{A\alpha}$ does not include row 1, $\omega_{H\alpha}$ does not include row 1, and the confidence factors for columns F$\alpha$, M$\beta$, Q$\beta$, and T$\beta$ are zero because there is only one instance of each of columns F$\alpha$, M$\beta$, Q$\beta$, and T$\beta$ in the document. Text row 6 has no non-zero subsets being evaluated because $\omega_{A\alpha}$ does not include row 6, and the confidence factors for all other columns in row 6 are zero because each other column in the row has only one instance. Therefore, text rows 1 and 6 each are in their own class. The confidence factors for each of the text rows are depicted in FIG. 119.

In one example, the best confidence factor is the highest confidence factor. For example, text row 2 is an element of final subsets of rows $\omega_{A\alpha}$, $\omega_{E\alpha}$, $\omega_{P\alpha}$, $\omega_{Q\alpha}$, $\omega_{U\alpha}$, $\omega_{A\beta}$, $\omega_{D\beta}$, $\omega_{F\beta}$, and $\omega_{U\beta}$. Therefore, the confidence factors for row 2 include $CF_{\omega_{A\alpha}}=230.4$; $CF_{\omega_{E\alpha}}=121.5$; $CF_{\omega_{P\alpha}}=121.5$; $CF_{\omega_{Q\alpha}}=121.5$; $CF_{\omega_{U\alpha}}=121.5$; $CF_{\omega_{A\beta}}=230.3$, $CF_{\omega_{D\beta}}=301.7$, $CF_{\omega_{F\beta}}=121.5$, and $CF_{\omega_{U\beta}}=121.5$. In text row 2, the best confidence factor is 230.4 for $CF_{\omega_{A\alpha}}$.

The system sequentially determines the best confidence factor for each row. Therefore, the best confidence factor for text row 3 is 230.4 for $CF_{\omega_{A\alpha}}$. The best confidence factor for text row 4 is 230.4 for $CF_{\omega_{A\alpha}}$. The best confidence factor for text row 5 is 230.4 for $CF_{\omega_{A\alpha}}$. The confidence factor for text row 6 is 0. The best confidence factor for text row 7 is 96 for each of $CF_{\omega_{B\alpha}}$, $CF_{\omega_{D\alpha}}$, $CF_{\omega_{H\alpha}}$, $CF_{\omega_{O\alpha}}$, $CF_{\omega_{T\alpha}}$, $CF_{\omega_{B\beta}}$, $CF_{\omega_{K\beta}}$, $CF_{\omega_{S\beta}}$, and $CF_{\omega_{W\beta}}$. The best confidence factor for text row 8 is 96 for each of $CF_{\omega_{B\alpha}}$, $CF_{\omega_{D\alpha}}$, $CF_{\omega_{H\alpha}}$, $CF_{\omega_{O\alpha}}$, $CF_{\omega_{T\alpha}}$, $CF_{\omega_{B\beta}}$, $CF_{\omega_{K\beta}}$, $CF_{\omega_{S\beta}}$, and $CF_{\omega_{W\beta}}$. The confidence factor for text row 1 is 0.

One or more text rows having the same best confidence factor are classified together as a class by the classifier module 308. In the example of FIG. 89, text row 1 does not have a best confidence factor that is the same as the best confidence factor for any other text row, and its confidence factor is zero. Therefore, it is in a class by itself. Text rows 2-5 have the same best confidence factor and, therefore, are classified as being in the same class. Text row 6 does not have a best confidence factor that is the same as the best confidence factor for any other text row, its confidence factor is zero, and it is in a class by itself. Text rows 7-8 have the same best confidence factor and, therefore, are classified in the same class. In one optional embodiment, each class then is labeled with a class label.

Clustering Module

In another embodiment, the division module 306 is a clustering module 404 that uses a clustering algorithm to determine the final subset of rows ($\omega_X$) from the initial subset of rows ($\omega_X^i$). The clustering algorithm determines the elements in the initial subset of rows that are the closest to the optimum set. The clustering algorithm splits the initial subset of rows into a selected number of sets (or clusters), such as two clusters, so that the text rows in each set form a homogenous set based on the columns they share in common. The most uniform set will be selected as the final subset of rows since it contains the elements closest to the optimum set. In one instance, this is accomplished by determining the elements having smallest differences from, and/or highest matches to, the optimum set as embodied by the master row. The elements in the initial subset of rows correspond to the text rows in the initial subset of rows, and the selected elements having the smallest differences and/or the highest matches to the optimum set correspond to text rows selected to be in the final subset of rows.

As described above, in a fuzzy c-means (FCM) clustering algorithm, each data point or element has a degree of belonging to one or more clusters, rather than belonging completely to just one cluster. Equations 15-18 describe an FCM clustering operation where, in one embodiment of the FCM clustering algorithm.

In one embodiment, the clustering module 404 includes an FCM clustering algorithm that evaluates points representing the subsets of rows. Each point represents a text row in a subset of rows, and each point has data representing the text row and/or the closeness of the text row to the optimum set or master row (row data). The clusters then are determined from the points. Each cluster has a center, and each point is in a cluster based on the distance to the center of the cluster (cluster center distance). Thus, the degree of belonging is based on the cluster center distance.

In one example, the points are three dimensional points. The clusters then are determined in the three dimensional space, where each cluster has a center. In one example, the points are represented in three dimensional space by X, Y, and Z coordinates. Other coordinate or ordinate representations may be used. In other examples, two dimensional points are used, such as with X and Y coordinates or other coordinate or ordinate representations.

In one embodiment, one or more features may be used by the clustering module 404 as row data for the points representing the rows, including a row distance, a row matches, a text row length, and/or other features. The row distance may be a standard row distance, a weighted row distance, or a combination row distance. In one example, the row distance is a standard Hamming distance. In another example, the row distance is a weighted Hamming distance. In another example, the row distance is a combination Hamming distance.

The row distance, row matches, and row length are features used for one or more coordinates of a row point, including two or three dimensional points. The values of the features for each row in a subset are used as the values of a corresponding point in the FCM clustering algorithm. Values for a feature may be in a features vector.

In one example of the FCM clustering algorithm using three dimensional row points, each three dimensional row point has row data values for a text row in a subset, such as a row distance for an X coordinate, a number of row matches for a Y coordinate, and a row length for a Z coordinate. In another example, each row point includes a normalized row distance for an X coordinate, a normalized number of matches for a Y coordinate, and a normalized length of the row for a Z coordinate. In another example, each row point includes an average row distance for an X coordinate, an average number of matches for a Y coordinate, and an average length of the row for a Z coordinate. The row distances in these examples may be a Hamming distance, a normalized Hamming distance, and an average Hamming distance, respectively. In another example, two of the features are used for X and Y coordinates.

Absolute data (raw data), normalized data, or averaged data can be used. Data may be normalized to a value or a range so that one feature is not dominant over one or more other features or so that one feature is not under-represented by one or more other features. For example, the row length may be 1600, while the number of matches is 5. In their raw state, the row length may have a more dominant effect or representation than the number of row matches. If each of the features is normalized to a selected value or range, such as from zero to one, zero to ten, negative one to one, or another selected range, each of the features has a more equal representation in the clustering algorithm.

In one embodiment of normalizing data, a row distance is normalized for each row point by adding all row distances for all row points for a subset to determine a row distances sum and dividing each row distance by the row distances sum. Similarly, all row matches for all row points for a subset are added to determine a row matches sum and the number of row matches for each row point is divided by the row matches sum, and all row lengths for all row points for a subset are added to determine a row lengths sum and the row length for each row point is divided by the row lengths sum.

Other methods may be used to normalize the data. For example, a data element may be normalized using a standard deviation of all elements in the group, such as the standard deviation of all distances for a subset. In another example, the minimum and/or maximum values of elements in a group are used to define a range, such as from zero to one, zero to ten, negative one to one, or another selected range, and a particular data element is normalized by the minimum and/or maximum values. In another example, each data element is normalized according to the maximum value in the group of data elements by dividing each data element by the maximum value. Other examples exist.

In one example, the clustering module 404 uses three features for a three dimensional row point to determine the groupings of text rows, which are the row distance, the number of row matches, and the row length. In other examples, the clustering module 404 uses two features for a two dimensional row point to determine the groupings of text rows, which are the row distance and the number of row matches. In another example, the clustering module 404 uses three features for a three dimensional row point to determine the groupings of text rows, which include at least the row distance and the number of row matches.

FIGS. 120A-124 depict an example of text rows, raw row data, normalized row data, row points for row data that has been normalized, centers for two clusters, and cluster center distances for each row point to each cluster center for the initial subset of rows for column A$\alpha$ ($\omega_{A\alpha}^{i}$) of FIG. 89. In one example, the forms processing system 104A determines the clusters for the text rows of FIG. 89 using a clustering algorithm where the number of clusters is set to 2, the termination criterion is 100 iterations or having an objective function difference less than 1e−7, and the weighting factor is 2. However, other termination criterion, cluster numbers, and weighting factors may be used. In this example, the FCM clustering algorithm places the data points (points) in up to two clusters based on the closeness of each point to the center of one of the clusters.

FIGS. 120A-120B depict an example of the text rows and master row for the initial subset of rows for column A$\alpha$, along with the frequency of text blocks in each column of the initial subset of rows. The initial subset of rows for column A$\alpha$ has six text rows.

FIG. 121 depicts row points with raw row data for the text rows in $\omega_{A\alpha}^{i}$. The row points are three dimensional row points with row distance, number of row matches, and row length as features or coordinates for each point. In this example, point 1 corresponds to text row 1, point 2 corresponds to text row 2, etc. In this example, the row distance is a combination row distance.

Point 1 includes a row distance from text row 1 to the master row for $\omega_{A\alpha}^{i}$, a number of row matches between text row 1 and the master row for $\omega_{A\alpha}{}^i$, and the row length of text row 1. Similarly, point 2 includes a row distance from text row 2 to the master row for $\omega_{A\alpha}{}^i$, a number of row matches between text row 2 and the master row for $\omega_{A\alpha}{}^i$, and the row length of text row 2. Points 3-6 similarly are determined as the corresponding row distances, number of row matches, and row lengths for the corresponding text rows. In this example, the row distances are combination Hamming distances. In FIG. 121, the row length is significantly larger than the row distance or the row matches.

Figures 122, 123:
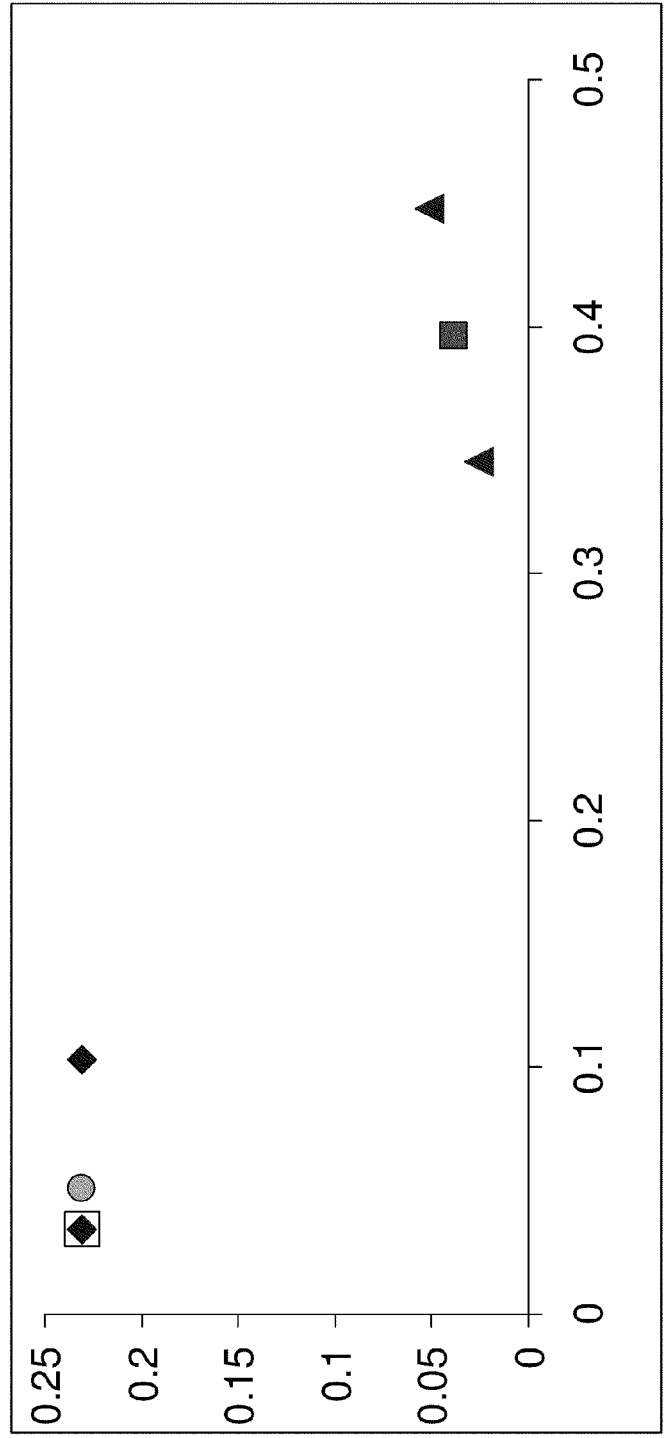
FIG. 122 is a table of normalized data for the row distances, row matches, and row lengths of the row points for the initial subset of rows for column Aα of the document of FIG. 89.
FIG. 123 is a plot of the row points and cluster centers for the initial subset of rows for column Aα of the document of FIG. 89.

FIG. 122 depicts an example of normalized row point data and the row point centers. In the example of FIG. 122, the row distance is normalized by adding all row distances for the initial subset of rows for column A$\alpha$ to determine a row distances sum and dividing each row distance by the row distances sum to determine the normalized row distances. Similarly, the number of row matches for each row point is divided by the row matches sum to determine the normalized row matches, and the row length for each row point is divided by the row lengths sum to determine the normalized row lengths.

Two clusters are determined in the example of FIG. 122 using the FCM clustering algorithm. The cluster centers are determined from the normalized row point data, and the cluster centers are depicted in the example of FIG. 122. However, in other examples, the row data is not normalized, and the centers are determined from the row data, whether the row data is raw data, averaged data, or otherwise.

FIG. 123 depicts a plot with the row points and cluster centers for the two clusters. The row points are assigned in the plot to one of the two clusters, and the distances are determined between each row point and the center of the cluster to which it is assigned. The center for cluster 1 is identified by the circle, and the points assigned to cluster 1 are identified by a diamond, with the diamond and square combination representing three points. The center of cluster 2 is identified by the shaded square, and the points assigned to cluster 2 are identified by triangles.

FIG. 124 depicts an example of the distances from each row point to each cluster center (cluster center distances, cluster distances, or center distances). The cluster center distance is a numerical interpretation of the degree of belonging of a particular row point to one of the clusters. Since there are two clusters, the cluster center distances are a numerical interpretation of the degree of belonging of each row point to each of the two clusters.

For example, row point 1 is a distance of 0.375 from cluster center 1 and a distance of 0.0776 from cluster center 2. Therefore, text row 1 belongs to the first cluster with a degree of belonging equal to 0.375 and belongs to the second cluster with a degree of belonging equal to 0.0776.

The row point for a text row is classified in or assigned to a cluster by the clustering module 404 based on the cluster center distance, which identifies the degree of belonging. In one example, a row point is classified in or assigned to a cluster with the smallest cluster center distance between the row point and a selected cluster. Where there are two clusters, the row point is assigned to the cluster corresponding to the smallest cluster center distance between the row point and that cluster. For example, if a row point is closer to one cluster, it is assigned to that cluster. Since the cluster center distance is a measure of the row point to the center of the cluster, the cluster center distance is a measure of the closeness of a row point to a particular cluster. Therefore, in this instance, the smallest cluster center distance corresponds to a largest degree of belonging, and the largest degree of belonging places a row point in a particular cluster.

In one example of FIG. 124, the cluster center distances are compared for each row point. The row point is assigned to the cluster with the smaller cluster center distance.

The cluster center distance for row point 1 is smaller for cluster 2, the cluster center distance for row point 2 is smaller for cluster 1, the cluster center distance for row point 3 is smaller for cluster 1, the cluster center distance for row point 4 is smaller for cluster 1, the cluster center distance for row point 5 is smaller for cluster 1, and the cluster center distance for row point 6 is smaller for cluster 2. Therefore, row point 1 is assigned to cluster 2, row point 2 is assigned to cluster 1, row point 3 is assigned to cluster 1, row point 4 is assigned to cluster 1, row point 5 is assigned to cluster 1, and row point 6 is assigned to cluster 2.

After the clusters are determined (i.e. the row points corresponding to the text rows have been assigned to a particular cluster), one cluster and its associated row points and text rows is determined by the clustering module 404 to be the closest to the optimum set, as indicated by the elements in the master row, and is selected as a final, included cluster (also referred to as the closest cluster). The other cluster is eliminated from the analysis. The final subset of rows includes the text rows corresponding to the row points of the selected final cluster, and the text rows associated with the row points in the selected final cluster are selected to be included in the final subset of rows.

In one example, the average of the cluster center distances is determined between each row point in the subset of rows and each cluster center (average cluster center distance). The cluster having the smallest average cluster center distance is selected as the final cluster, and the text rows associated with the row points in the selected final cluster are selected to be included in the final subset of rows. In the example of FIG. 124, the distances are determined between each row point in the subset of rows and cluster center 1 and then averaged for cluster 1. The distances also are determined between each row point in the subset of rows and cluster center 2 and then averaged for cluster 2. The average cluster center distance between the row points and cluster 1 is 0.152. The average cluster center distance between the row points and cluster 2 is 0.292. Therefore, cluster 1 is selected as the final cluster since it has the smallest average cluster center distance.

In one example, the average of the row distances (row distances average) of each row point in each cluster is determined. The cluster having the smallest row distances average is selected as the final cluster, and the text rows associated with the row points in the final cluster are selected to be included in the final subset of rows. In the above example, the row distances average for cluster 1 is 1.5, and the row distances average for cluster 2 is 11.5. Therefore, cluster 1 is selected as the final cluster. Alternately, the average of the normalized row distance may be used. Other examples exist.

In another embodiment, the average of the number of row matches (row matches average) of each row point in each cluster is determined. The cluster having the largest row matches average is selected as the final cluster, and the text rows associated with the row points in the final cluster are selected to be included in the final subset of rows. In the above example, the row matches average for cluster 1 is 9, and the row matches average for cluster 2 is 1.5. Therefore, cluster 1 is selected as the final cluster. Alternately, the average of the normalized row matches may be used. In another embodiment, a combination of the average row distance and average row matches, or their normalized values, may be used. Other examples exist.

In still another embodiment, the row distances average and the row matches average of each row point in each cluster are determined. For each cluster, the row matches average is subtracted from the row distances average to determine a cluster closeness value between the selected cluster and the optimum set, as identified by the master row. The cluster having the smallest cluster closeness value is selected as the final cluster, and the text rows associated with the row points in the final cluster are selected to be included in the final subset of rows. In the above example, the row distances average for cluster 1 is 1.5, and the row matches average for cluster 1 is 9. Therefore, the cluster closeness value for cluster 1 is 1.5−9=−7.5. The row distances average for cluster 2 is 11.5, and the row matches average for cluster 2 is 1.5. Therefore, the cluster closeness value for cluster 2 is 11.5−1.5=10. Therefore, cluster 1 has the lower cluster closeness value and is selected as the final cluster. Alternately, the average of the normalized row distance and row matches may be used. Other examples exist.

In this example, cluster 1 includes row points 2, 3, 4, and 5, which correspond to text rows 2, 3, 4, and 5. Therefore, the final subset of rows for column Aα is $\omega_{A\alpha} = \{2, 3, 4, 5\}$.

The elements in the final distances vector correspond to the elements in the final subset of rows, which for $\omega_{A\alpha}$ is $v_{\omega_{A\alpha}} = [1\ 1\ 1\ 3]$. The row distances average in the final subset, which is the mean of the elements in the final distances vector, is $$\mu^{v_{\omega_{A\alpha}}} = 1.5.$$

A final matches vector ($M_{\omega_X}$) is determined by the clustering module 404 as a vector of the matches between each text row in the selected final subset of rows ($\omega_X$) and its master row. For $\omega_{A\alpha}$, $M_{\omega_{A\alpha}} = [9\ 9\ 9\ 9]$. A row matches average $$\left(\mu_{M_{\omega_X}}\right)$$

is the average number of row matches between the text rows and the master row for the elements in a selected final subset of rows. The average number of row matches between the text rows and the master row for the elements in the final subset of rows for column Aα is $$\mu_{M_{\omega_{A\alpha}}} = 9.$$

To determine the final set of rows to be classified into a class of rows based on the columns, the clustering module 404 determines a confidence factor (CF) for each final subset of rows. The confidence factor is a measure of the homogeneity of the final subset of rows. Once each text row has one or more confidence factors attributed to it, each text row is assigned to a class based on the highest attributed confidence factor. The confidence factor considers one or more features representing how similar one text row is to other text rows in the document. In this example, the confidence factor includes a normalized rows frequency for the final subset of rows, an average number of row matches for the final subset of rows, and an average distance between the text rows in the final subset of rows and the master row. However, other features may be used, such as the master row size, the absolute rows frequency, or other features.

In one example, the confidence factor for a selected final subset of rows ($CF_{\omega_X}$) is given by equation 19 where the average number of matches between the text rows and the master row in the final subset of rows is in the numerator of the confidence factor ratio, the average or mean of the distances between the text rows and the master row in the final subset of rows is in the denominator of the confidence factor ratio, and the ratio is multiplied by the normalized frequency for the selected subset of rows. Alternately, the normalized frequency may be considered to be in the numerator of the confidence factor ratio. Other forms of the confidence factor ratio may be used, including powers of one or more features, and another form of the frequency may be used, such as the absolute frequency.

Therefore, the confidence factor for $\omega_{A\alpha}$ in this example is given by:

$$CF_{\omega_X} = NF_{\omega_X} * \left(\frac{AM_{\omega_X}}{\mu^{v_{\omega_X}}}\right) = NF_{\omega_{A\alpha}} * \left(\frac{\mu_{M_{\omega_{A\alpha}}}}{\mu^{v_{\omega_{A\alpha}}}}\right) = 0.5 * \frac{9}{1.5} = 3. \quad (25)$$

The clustering module 404 determines a confidence factor for each final subset of rows in the document 8902. FIGS. 125A-212 depict examples of the subsets of rows for columns Bα, Dα, Eα, Hα, Jα, Lα, Oα, Pα, Qα, Tα, Uα, Aβ, Bβ, Dβ, Fβ, Gβ, Kβ, Lβ, Oβ, Sβ, Uβ, and Wβ with the associated row data, row points, clusters, cluster centers, and cluster center distances. The clusters are determined for each initial subset of rows to determine the corresponding final subset of rows.

FIGS. 125A-128 depict examples of the subset of rows with the associated row data, row points, clusters, cluster centers, and cluster center distances for column Bα. FIGS. 129A-132 depict examples of the subset of rows with the associated row data, row points, clusters, cluster centers, and cluster center distances for column Dα. FIGS. 133A-136 depict examples of the subset of rows with the associated row data, row points, clusters, cluster centers, and cluster center distances for column Eα. FIGS. 137A-140 depict examples of the subset of rows with the associated row data, row points, clusters, cluster centers, and cluster center distances for column Hα. FIGS. 141A-144 depict examples of the subset of rows with the associated row data, row points, clusters, cluster centers, and cluster center distances for column Jα. FIGS. 145A-148 depict examples of the subset of rows with the associated row data, row points, clusters, cluster centers, and cluster center distances for column Lα. FIGS. 149A-152 depict examples of the subset of rows with the associated row data, row points, clusters, cluster centers, and cluster center distances for column Oα. FIGS. 153A-156 depict examples of the subset of rows with the associated row data, row points, clusters, cluster centers, and cluster center distances for column Pα. FIGS. 157A-160 depict examples of the subset of rows with the associated row data, row points, clusters, cluster centers, and cluster center distances for column Qα. FIGS. 161A-164 depict examples of the subset of rows with the associated row data, row points, clusters, cluster centers, and cluster center distances for column Tα. FIGS. 165A-168 depict examples of the subset of rows with the associated row data, row points, clusters, cluster centers, and cluster center distances for column Uα. FIGS. 169A-172 depict examples of the subset of rows with the associated row data, row points, clusters, cluster centers, and cluster center distances for column Aβ. FIGS. 173A-176 depict examples of the subset of rows with the associated row data, row points, clusters, cluster centers, and cluster center distances for column Bβ. FIGS. 177A-180 depict examples of the subset of rows with the associated row data, row points, clusters, cluster centers, and cluster center distances for column Dβ. FIGS. 181A-184 depict examples of the subset of rows with the associated row data, row points, clusters, cluster centers, and cluster center distances for column Fβ. FIGS. 185A-188 depict examples of the subset of rows with the associated row data, row points, clusters, cluster centers, and cluster center distances for column Gβ. FIGS. 189A-192 depict examples of the subset of rows with the associated row data, row points, clusters, cluster centers, and cluster center distances for column Kβ. FIGS. 193A-196 depict examples of the subset of rows with the associated row data, row points, clusters, cluster centers, and cluster center distances for column Lβ. FIGS. 197A-200 depict examples of the subset of rows with the associated row data, row points, clusters, cluster centers, and cluster center distances for column Oβ. FIGS. 201A-204 depict examples of the subset of rows with the associated row data, row points, clusters, cluster centers, and cluster center distances for column Sβ. FIGS. 205A-208 depict examples of the subset of rows with the associated row data, row points, clusters, cluster centers, and cluster center distances for column Uβ. FIGS. 209A-212 depict examples of the subset of rows with the associated row data, row points, clusters, cluster centers, and cluster center distances for column Wβ.

In one embodiment, if there is only one instance of a column in the text rows of a document, the subset for that column is not evaluated and is considered to be a zero subset. Non-zero subsets, which are subsets of rows for columns having more than one instance, are evaluated in this embodiment.

In one embodiment, if there is only one instance of a column in the text rows of the document, the confidence factor for the final subset of rows for that column is zero. For example, since column Cα of the document 8902 has only a single instance, the confidence factor for the subset of rows for column Cα is zero. In other examples, a confidence factor may be calculated for a single occurring column.

In the example of FIGS. 125B-128 for column Bα, both text rows 7 and 8 are the same. All columns present in the subset have the same frequency of 2. Each text row has the same row distance and number of row matches. Each text row also has the same row length. In this instance, each row point is the same, and only one cluster is determined. The cluster has only one cluster center, and the distance of each row point to the cluster center is zero. Thus, each text row is in the cluster.

In this instance, cluster 1 includes row points for text rows 7 and 8. Therefore, the final subset of rows for column Bα is $\omega_{B\alpha} = \{7, 8\}$. The final distances vector corresponds to the final subset of rows, which for $\omega_{B\alpha}$ is $v_{\omega_{B\alpha}} = [0\ 0]$, which indicates there is no distance or difference between the text rows and the master row. The average of the row distances in the final subset, which is the mean of the elements in the final distances vector, is $$\mu^{v_{\omega_{B\alpha}}} = 0.$$

The final matches vector is $M_{\omega_{B\alpha}} = [12\ 12]$, which indicates each column matches the optimum set. The average number of row matches between the text rows and the master row for the elements in the final subset of rows for column Bα is $$\mu_{M_{\omega_{B\alpha}}} = 12.$$

The confidence factor for the final subset of rows for column B is:

$$CF_{\omega_{B\alpha}} = NF_{\omega_X} * \left(\frac{AM_{\omega_X}}{\mu^{v_{\omega_X}}}\right) = NF_{\omega_{B\alpha}} * \left(\frac{\mu_{M_{\omega_{B\alpha}}}}{\mu^{v_{\omega_{B\alpha}}}}\right) = 0.25 * \frac{12}{0}. \quad (26)$$

The group of elements from both text rows is the same as the optimum set, as identified in the master row. In this instance where there are no differences between the text rows and the master row and there is a division by zero for the row distances average, the confidence factor is set to a selected high confidence factor value because the row distances in the final subset of rows all are zero. In this example, the selected high confidence factor value is 1.00 E+06. In another instance, where there are very slight differences between the text rows and the master row and there is a division by a very small number close to zero for the row distances average, the confidence factor is set to a selected high confidence factor value because the row distances in the final subset of rows all are very close to zero. Other selected high confidence factor values may be used. Each of the text rows is in the final subset of rows for the selected subset of rows. In this instance, each of text rows 7 and 8 are in the final subset of rows for column Bα ($\omega_{B\alpha}$).

In the examples of FIGS. 120A-212, $\omega_{A\alpha}=\{2, 3, 4, 5\}$, $\omega_{B\alpha}=\{7, 8\}$, $\omega_{D\alpha}=\{7, 8\}$, $\omega_{E\alpha}=\{2, 3, 4\}$, $\omega_{H\alpha}=\{7, 8\}$, $\omega_{J\alpha}=\{3\}$, $\omega_{L\alpha}=\{5, 7, 8\}$, $\omega_{O\alpha}=\{7, 8\}$, $\omega_{P\alpha}=\{2, 3, 4\}$, $\omega_{Q\alpha}=\{2, 3, 4\}$, $\omega_{T\alpha}=\{7, 8\}$, and $\omega_{U\alpha}=\{2, 3, 4\}$. $\omega_{A\beta}=\{2, 3, 4, 5\}$, $\omega_{B\beta}=\{7, 8\}$, $\omega_{D\beta}=\{2, 3, 4, 5\}$, $\omega_{F\beta}=\{2, 3, 4\}$, $\omega_{G\beta}=\{2\}$, $\omega_{K\beta}=\{7, 8\}$, $\omega_{L\beta}=\{2\}$, $\omega_{O\beta}=\{5, 7, 8\}$, $\omega_{S\beta}=\{7, 8\}$, $\omega_{U\beta}=\{2, 3, 4\}$, and $\omega_{W\beta}=\{7, 8\}$.

Where $$CF_{\omega_X} = NF_{\omega_X} * \left(\frac{AM_{\omega_X}}{\mu^{v_{\omega_X}}}\right) = NF_{\omega_{A\alpha}} * \left(\frac{\mu_{M_{\omega_{A\alpha}}}}{\mu^{v_{\omega_{A\alpha}}}}\right),$$

the confidence factors for the subsets are as follows. $CF_{\omega_{A\alpha}}=3$; $CF_{\omega_{B\alpha}}=1E+06$; $CF_{\omega_{C\alpha}}=0$; $CF_{\omega_{D\alpha}}=1E+06$; $CF_{\omega_{E\alpha}}=3.38$; $CF_{\omega_{F\alpha}}=0$; $CF_{\omega_{G\alpha}}=0$; $CF_{\omega_{H\alpha}}=1E+06$; $CF_{\omega_{J\alpha}}=0$; $CF_{\omega_{L\alpha}}=1E+06$; $CF_{\omega_{K\alpha}}=0$; $CF_{\omega_{L\alpha}}=0.265$; $CF_{\omega_{M\alpha}}=0$; $CF_{\omega_{N\alpha}}=0$; $CF_{\omega_{O\alpha}}=1E+06$; $CF_{\omega_{P\alpha}}=3.38$; $CF_{\omega_{Q\alpha}}=3.38$; $CF_{\omega_{R\alpha}}=0$; $CF_{\omega_{S\alpha}}=0$; $CF_{\omega_{T\alpha}}=1E+06$; and $CF_{\omega_{U\alpha}}=3.38$. $CF_{\omega_{A\beta}}=3$, $CF_{\omega_{B\beta}}=1E+06$, $CF_{\omega_{D\beta}}=2.5$, $CF_{\omega_{F\beta}}=3.38$, $CF_{\omega_{G\beta}}=1E+06$, $CF_{\omega_{K\beta}}=1E+06$, $CF_{\omega_{L\beta}}=1E+06$, $CF_{\omega_{O\beta}}=0.265$, $CF_{\omega_{S\beta}}=1E+06$, $CF_{\omega_{U\beta}}=3.38$, and $CF_{\omega_{W\beta}}=1E+06$. The confidence factors and the features used in the determination are depicted in FIG. 213.

As described above, each text row has one or more columns identifying an alignment for one or more character blocks, and a final subset of rows is identified for each column in which an alignment for a character block exists for that column. That is, a first final subset of rows having one or more alignments for one or more character blocks in a first column is determined, a second final subset of rows having one or more alignments for one or more character blocks in the second column is determined, etc. The confidence factors are then determined for each final subset of rows.

Each text row 1-8 in the document 8902 may have one or more confidence factors corresponding to the final subsets of rows having that text row as an element. The clustering module 404 determines the best confidence factor from the confidence factors corresponding to the final subsets of rows having that text row as an element. That is, if a text row is an element in a particular final subset of rows, the confidence factor for that subset of rows is considered for the text row. The confidence factors for each final subset of rows in which the particular text row is an element are compared for the particular text row, and the best confidence factor is determined and selected for the particular text row.

For example, text row 1 has no non-zero confidence factors because $\omega_{A\alpha}$ does not include row 1, $\omega_{H\alpha}$ does not include row 1, and the confidence factors for columns F$\alpha$, M$\beta$, Q$\beta$, and T$\beta$ are zero because there is only one instance of each of columns F$\alpha$, M$\beta$, Q$\beta$, and T$\beta$ in the document. Text row 2 is an element in each of the final subsets of rows $\omega_{A\alpha}$, $\omega_{E\alpha}$, $\omega_{P\alpha}$, $\omega_{Q\alpha}$, $\omega_{U\alpha}$, $\omega_{A\beta}$, $\omega_{D\beta}$, $\omega_{F\beta}$, and $\omega_{U\beta}$. Therefore, for text row 2, the confidence factors for the final subsets of rows $\omega_{A\alpha}$, $\omega_{E\alpha}$, $\omega_{P\alpha}$, $\omega_{Q\alpha}$, $\omega_{U\alpha}$, $\omega_{A\beta}$, $\omega_{D\beta}$, $\omega_{F\beta}$, and $\omega_{U\beta}$ are compared to each other to determine the best confidence factor from that group of confidence factors. The same process then is completed for each of text rows 3-8, comparing the confidence factors corresponding to each final subset of rows in which that text row is an element.

In one embodiment, if a subset of rows has only one column or each column in a text row has only a single instance in the document, or one or more columns in the text row are not in the final subset of rows for the text row and the remaining confidence factors for the text row are zero, such that the confidence factors for the text row all are zero, the text row is placed in its own class. However, other examples exist.

Referring again to the final subsets of rows, $\omega_{A\alpha}=\{2, 3, 4, 5\}$, $\omega_{B\alpha}\{7, 8\}$, $\omega_{D\alpha}=\{7, 8\}$, $\omega_{E\alpha}=\{2, 3, 4\}$, $\omega_{H\alpha}=\{7, 8\}$, $\omega_{J\alpha}=\{3\}$, $\omega_{L\alpha}=\{7, 8\}$, $\omega_{O\alpha}=\{7, 8\}$, $\omega_{P\alpha}=\{2, 3, 4\}$, $\omega_{Q\alpha}=\{2, 3, 4\}$, $\omega_{T\alpha}=\{7, 8\}$, and $\omega_{U\alpha}=\{2, 3, 4\}$. $\omega_{A\beta}=\{2, 3, 4, 5\}$, $\omega_{B\beta}=\{7, 8\}$, $\omega_{D\beta}=\{2, 3, 4, 5\}$, $\omega_{F\beta}=\{2, 3, 4\}$, $\omega_{G\beta}=\{2\}$, $\omega_{K\beta}=\{7, 8\}$, $\omega_{L\beta}=\{2\}$, $\omega_{O\beta}=\{5, 7, 8\}$, $\omega_{S\beta}=\{7, 8\}$, $\omega_{U\beta}=\{2, 3, 4\}$, and $\omega_{W\beta}=\{7, 8\}$. In this example, text row 1 has no non-zero subsets being evaluated. Text row 1 includes columns A$\alpha$, F$\alpha$, H$\alpha$, M$\beta$, Q$\beta$, and T$\beta$. However, $\omega_{A\alpha}$ does not include row 1, $\omega_{H\alpha}$ does not include row 1, and the confidence factors for columns F$\alpha$, M$\beta$, Q$\beta$, and T$\beta$ are zero because there is only one instance of each of columns F$\alpha$, M$\beta$, Q$\beta$, and T$\beta$ in the document. Text row 6 has no non-zero subsets being evaluated because $\omega_{A\alpha}$ does not include row 6, and the confidence factors for all other columns in row 6 are zero because each other column in the row has only one instance. Therefore, text rows 1 and 6 each are in their own class. The confidence factors for each of the text rows are depicted in FIG. 214.

In one example, the best confidence factor is the highest confidence factor. For example, text row 2 is an element of final subsets of rows $\omega_{A\alpha}$, $\omega_{E\alpha}$, $\omega_{P\alpha}$, $\omega_{Q\alpha}$, $\omega_{U\alpha}$, $\omega_{A\beta}$, $\omega_{D\beta}$, $\omega_{F\beta}$, and $\omega_{U\beta}$. Therefore, the confidence factors for row 2 include $CF_{\omega_{A\alpha}}=3$; $CF_{\omega_{E\alpha}}=3.38$; $CF_{\omega_{P\alpha}}=3.38$; $CF_{\omega_{Q\alpha}}=3.38$; $CF_{\omega_{U\alpha}}=3.38$; $CF_{\omega_{A\beta}}=3$; $CF_{\omega_{D\beta}}=2.5$; $CF_{\omega_{F\beta}}=3.38$; and $CF_{\omega_{U\beta}}=3.38$. In text row 2, the best confidence factor is 3.38 for $CF_{\omega_{E\alpha}}$, $CF_{\omega_{P\alpha}}$, $CF_{\omega_{Q\alpha}}$, $CF_{\omega_{U\alpha}}$, $CF_{\omega_{F\beta}}$, and $CF_{\omega_{U\beta}}$.

The system sequentially determines the best confidence factor for each row. Therefore, the best confidence factor for text row 3.38 for $CF_{\omega_{E\alpha}}$, $CF_{\omega_{P\alpha}}$, $CF_{\omega_{Q\alpha}}$, $CF_{\omega_{U\alpha}}$, $CF_{\omega_{F\beta}}$, and $CF_{\omega_{U\beta}}$. The best confidence factor for text row 4 is 3.38 for $CF_{\omega_{E\alpha}}$, $CF_{\omega_{P\alpha}}$, $CF_{\omega_{Q\alpha}}$, $CF_{\omega_{U\alpha}}$, $CF_{\omega_{F\beta}}$, and $CF_{\omega_{U\beta}}$. The best confidence factor for text row 5 is 3 for $CF_{\omega_{A\alpha}}$ and $CF_{\omega_{A\beta}}$. The confidence factor for text row 6 is 0. The best confidence factor for text row 7 is 1 E+06 for each of $CF_{\omega_{B\alpha}}$, $CF_{\omega_{D\alpha}}$, $CF_{H\alpha}$, $CF_{\omega_{O\alpha}}$, $CF_{\omega_{T\alpha}}$, $CF_{\omega_{B\beta}}$, $CF_{\omega_{K\beta}}$, $CF_{\omega_{S\beta}}$, and $CF_{\omega_{W\beta}}$. The best confidence factor for text row 8 is 1 E+06 for each of $CF_{\omega_{B\alpha}}$, $CF_{\omega_{D\alpha}}$, $CF_{\omega_{H\alpha}}$, $CF_{\omega_{O\alpha}}$, $CF_{\omega_{T\alpha}}$, $CF_{\omega_{B\beta}}$, $CF_{\omega_{K\beta}}$, $CF_{\omega_{S\beta}}$, and $CF_{\omega_{W\beta}}$. The confidence factor for text row 1 is 0.

One or more text rows having the same best confidence factor are classified together as a class by the clustering module 308. In the example of FIG. 89, text row 1 does not have a best confidence factor that is the same as the best confidence factor for any other text row, and its confidence factor is zero. Therefore, it is in a class by itself. Text rows 2-4 have the same best confidence factor and, therefore, are classified as being in the same class. Text row 5 does not have a best confidence factor that is the same as the best confidence factor for any other text row, and it is in a class by itself. Text row 6 does not have a best confidence factor that is the same as the best confidence factor for any other text row, its confidence factor is zero, and it is in a class by itself. Text rows 7-8 have the same best confidence factor and, therefore, are classified in the same class. In one optional embodiment, each class then is labeled with a class label.

In one embodiment, a document 1702 or 8902 is turned 90 degrees so that the text rows are vertical instead of horizontal. The text rows in this embodiment are processed the same as described above. In one example, the document is rotated 90 degrees so that the text rows are horizontal. In another embodiment, while the text rows in the raw document data are vertical, the text rows contain a horizontally written language, and the text rows are processed as horizontal texts rows.

Figure 215:
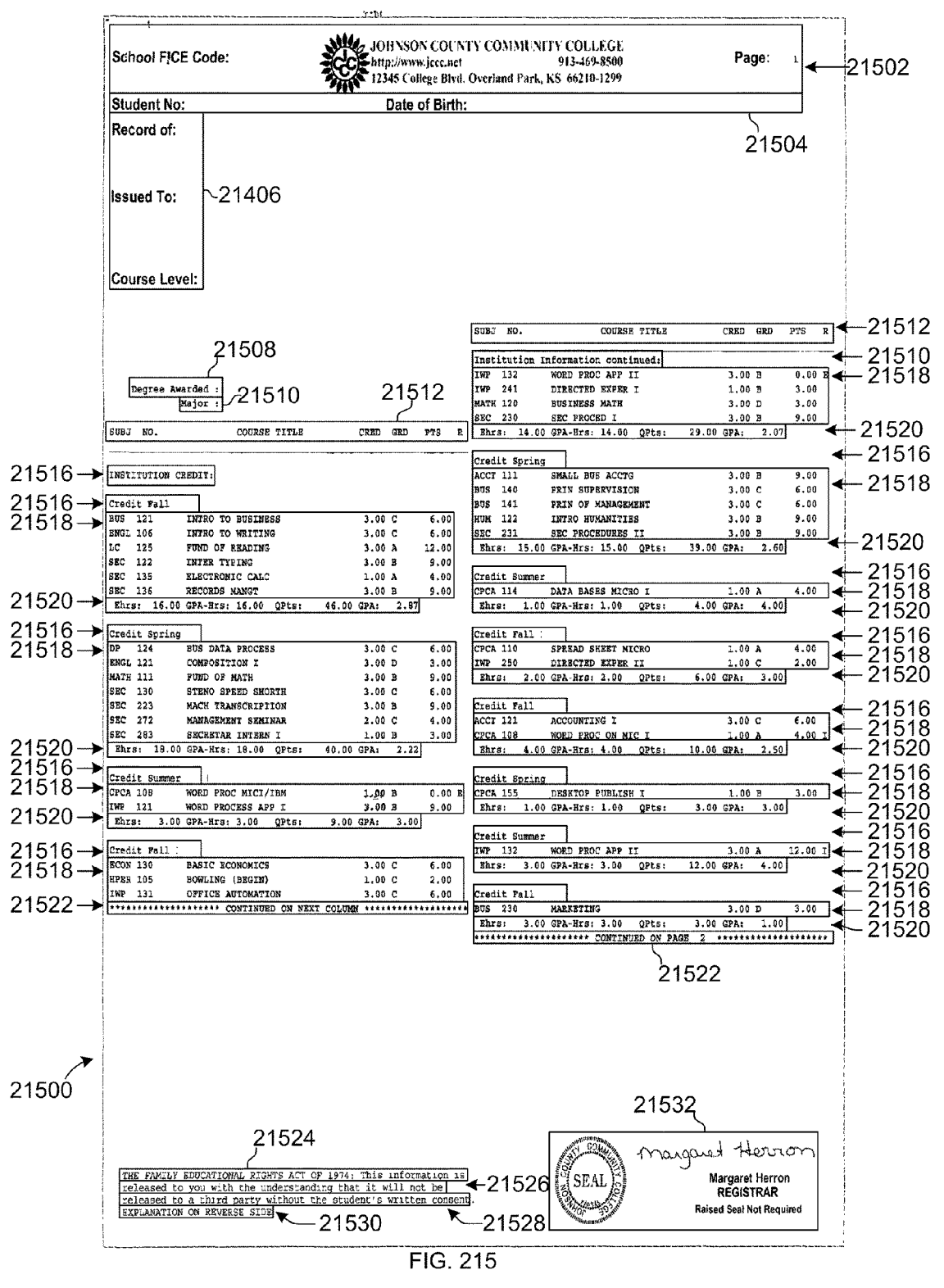

FIG. 215 depicts an exemplary embodiment of a document image of a transcript 21500 with classes 21502-21532 determined by the document processing system 102A. Each text row in the transcript 21500 is assigned to one of the classes 21502-21532, and text rows having the same or similar physical structures are assigned to the same class.

Figure 216:
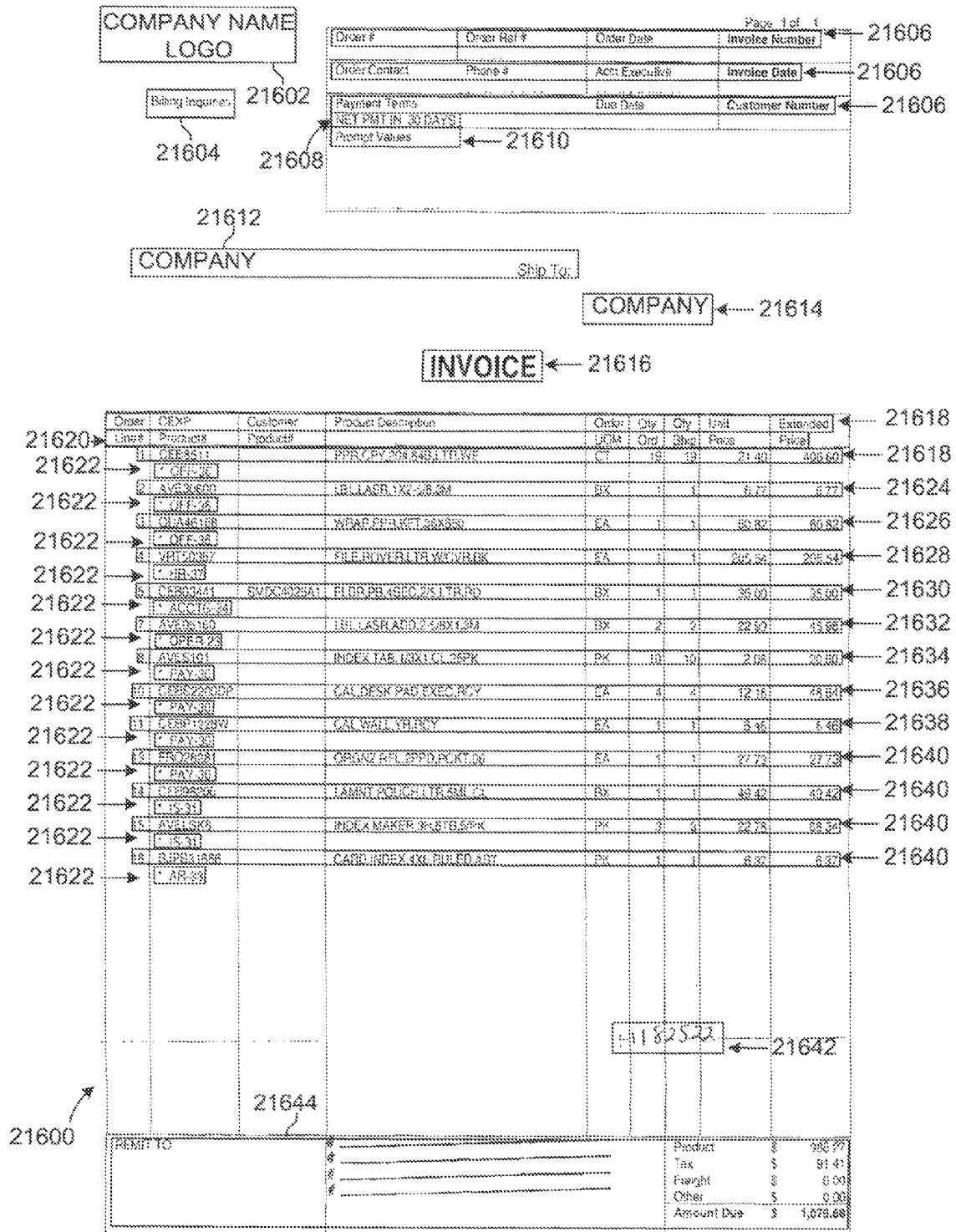
FIG. 216 is a document image of an invoice with classes determined according to an embodiment of the present invention.

FIG. 216 depicts an exemplary embodiment of a document image of an invoice 21600 with classes 21602-21644 determined by the document processing system 102A. Each text row in the transcript 21600 is assigned to one of the classes 21602-21644, and text rows having the same or similar physical structures are assigned to the same class.

Figure 217:
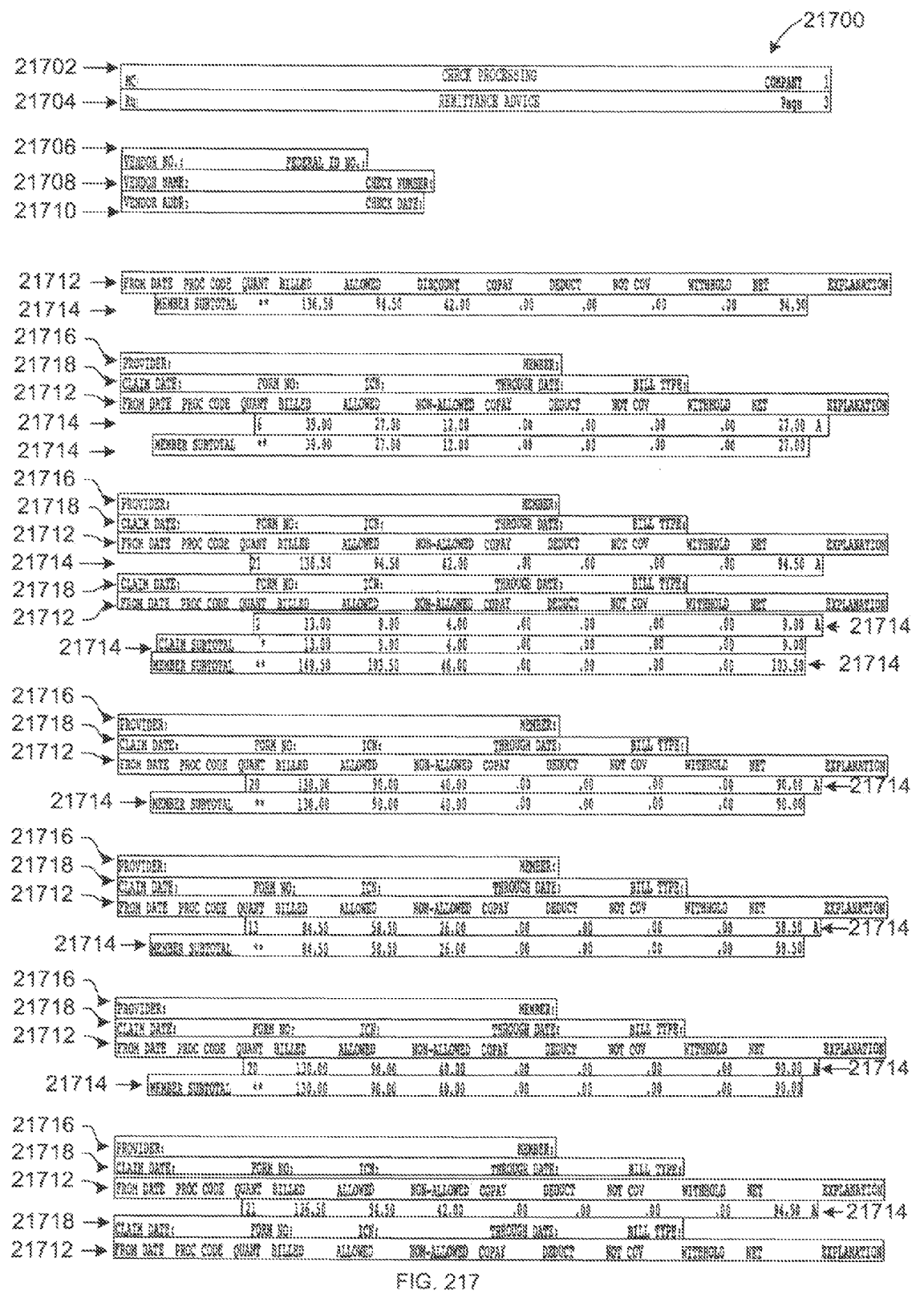

FIG. 217 depicts an exemplary embodiment of a document image of an explanation of benefits 21700 with classes 21702-21718 determined by the document processing system 102A. Each text row in the transcript 21700 is assigned to one of the classes 21702-21718, and text rows having the same or similar physical structures are assigned to the same class.

Those skilled in the art will appreciate that variations from the specific embodiments disclosed above are contemplated by the invention. The invention should not be restricted to the above embodiments, but should be measured by the following claims.

What is claimed is:

1. A system to process at least one document image comprising a plurality of text rows and a plurality of characters, each text row having at least one character, the system comprising:
   at least one processor; and
   a plurality of modules to execute on the at least one processor, the modules comprising:
      a character block creator to create character blocks for the characters in the text rows and to determine positions of alignments of the character blocks; and
      a classification system comprising:
         a subsets module to determine columns for the alignments of the character blocks at the positions of the alignments, each text row having a physical structure defined by the columns of the alignments of the character blocks in that text row, and to determine an initial subset of rows for each column;
         an optimum set module to determine an optimum set of columns for each initial subset of rows;
         a division module to:
            determine a final subset of rows for each initial subset of rows, each final subset of rows comprising at least one text row of a corresponding initial subset of rows having physical structures most similar to a corresponding optimum set when compared to physical structures of all text rows in the corresponding initial subset of rows; determine a confidence factor for each final subset of rows; and determine a best confidence factor for each particular text row in the at least one document image; and a classifier module to create at least one class of text rows, the at least one class comprising at least one particular text row having a same best confidence factor.

2. The system of claim 1 wherein:

the subsets module determines the initial subset of rows for each column having more than one character block aligned in that column in the text rows of the at least one document image, each initial subset of rows comprising one or more of the text rows of the at least one document image; and in the division module, each final subset of rows comprises at least one of the one or more text rows of the corresponding initial subset of rows having physical structures that are most similar to the corresponding optimum set when compared to physical structures of all of the one or more text rows in the corresponding initial subset of rows.

3. The system of claim 1 wherein:

the subsets module determines the initial subset of rows for each column having more than one character block aligned in that column in the text rows of the at least one document image, each initial subset of rows comprising one or more of the text rows of the at least one document image having at least one alignment of at least one character block in a selected column, each initial subset of rows having a set of columns comprising the selected column and other columns in the one or more text rows of a corresponding initial subset of rows in which the selected column is present;

in the optimum set module, each optimum set comprises a most representative set of columns selected from the set of columns of the corresponding initial subset of rows; and in the division module:

each final subset of rows comprises at least one of the one or more text rows of the corresponding initial subset of rows having a corresponding physical structure that is most similar to the most representative set of columns of the corresponding optimum set when compared to physical structures of all of the one or more text rows of the corresponding initial subset of rows;

each confidence factor measures a similarity of corresponding physical structures of the at least one of the one or more text rows in one corresponding final subset of rows to each other; and each particular text row has at least one confidence factor corresponding to at least one final subset of rows in which the particular text row is an element.

4. The system of claim 3 wherein the optimum set module determines the optimum set for each initial subset of rows by:

generating a histogram of column frequencies of the set of columns in the corresponding initial subset of rows, each column frequency comprising a number of times a particular column occurs in the corresponding initial subset of rows;

determining a threshold of the column frequencies for the corresponding initial subset of rows; and selecting particular columns having the column frequency above the threshold to be included in the most representative set of columns for the corresponding optimum set.

5. The system of claim 3 wherein:

each corresponding optimum set is represented by a corresponding master row having the set of columns from the corresponding initial subset of rows, each corresponding master row comprising a first indicator in particular columns in the set of columns for the corresponding initial subset of rows that are elements of the corresponding optimum set and a second indicator in other particular columns in the set of columns for the corresponding initial subset of rows that are not elements of the corresponding optimum set; and the division module:

splits the one or more text rows in each corresponding initial subset of rows into at least a first group of text rows and a second group of text rows, the first group of text rows comprising the at least one of the one or more text rows, the at least one of the one or more text rows having at least a smallest distance to the corresponding master row when compared to distances of all of the one or more text rows in the corresponding initial subset of rows, the second group of text rows comprising either no text rows or at least one other text row having at least a larger distance to the corresponding master row when compared to the smallest distance of the at least one of the one or more text rows; and selects the first group of text rows to be in the final subset of rows.

6. The system of claim 3 wherein:

each corresponding optimum set is represented by a corresponding master row having the set of columns from the corresponding initial subset of rows, each corresponding master row comprising a first indicator in particular columns in the set of columns for the corresponding initial subset of rows that are elements of the corresponding optimum set and a second indicator in other particular columns in the set of columns for the corresponding initial subset of rows that are not elements of the corresponding optimum set; and the division module:

splits the one or more text rows in each corresponding initial subset of rows into at least a first group of text rows and a second group of text rows, the first group of text rows comprising the at least one of the one or more text rows, the at least one of the one or more text rows having a smallest distance and a highest matches to the corresponding master row when compared to distances and matches of all of the one or more text rows in the corresponding initial subset of rows, the second group of text rows comprising either no text rows or at least one other text row having a larger distance and a smaller matches to the corresponding master row when compared to the smallest distance and highest matches of the at least one of the one or more text rows; and selects the first group of text rows to be in the final subset of rows.

7. The system of claim 3 wherein:

each optimum set is represented by a corresponding master row having the set of columns from the corresponding initial subset of rows, each corresponding master row comprising a vector comprising a first indicator in particular columns in the set of columns for the corresponding initial subset of rows that are elements of the corresponding optimum set and a second indicator in other particular columns in the set of columns for the corresponding initial subset of rows that are not elements of the corresponding optimum set; and the division module comprises a thresholding module using a thresholding algorithm to:
- determine a distance threshold for each corresponding initial subset of rows for distances from each of the one or more text rows in each corresponding initial subset of rows to the corresponding master row;
- split the one or more text rows in each corresponding initial subset of rows into at least a first group of text rows and a second group of text rows, the first group of text rows comprising at least one first text row with a first distance under the threshold, the second group of text rows comprising either no text rows or at least one second text row with a second distance not under the threshold; and
- select the first group of text rows to be in the corresponding final subset of rows.

8. The system of claim 3 wherein:

each optimum set is represented by a corresponding master row having the set of columns from the corresponding initial subset of rows, each corresponding master row comprising a binary vector comprising a binary 1 in particular columns in the set of columns for the corresponding initial subset of rows that are elements of the corresponding optimum set and a binary 0 in other particular columns in the set of columns for the corresponding initial subset of rows that are not elements of the corresponding optimum set; and the division module comprises a thresholding module using a thresholding algorithm to:
- determine a distance threshold for each corresponding initial subset of rows for distances from each of the one or more text rows in each corresponding initial subset of rows to the corresponding master row;
- split the one or more text rows in each corresponding initial subset of rows into at least a first group of text rows and a second group of text rows, the first group of text rows comprising first text rows with first distances under the threshold, the second group of text rows comprising either no text rows or second text rows with second distances not under the threshold; and
- select the first group of text rows to be in the corresponding final subset of rows.

9. The system of claim 8 wherein:

the thresholding module determines a final distances vector for each final subset of rows, each final distances vector comprising corresponding first distances of a corresponding first group of text rows; and the confidence factor comprises a confidence factor ratio with at least one member of a another group consisting of:
- a rows frequency in the numerator and a variance of the first distances of the first group of text rows in the corresponding final distances vector in a denominator, the rows frequency comprising a number of the first text rows in the corresponding final subset of rows;
- the rows frequency and a master row length in the numerator and the variance and an average of the first distances of the first group of text rows in the corresponding final distances vector in the denominator; and
- a quantity of a rows frequency cubed multiplied by the master row length in the numerator and another quantity of the variance multiplied by the average of the first distances of the first group of text rows in the corresponding final distances vector plus one in the denominator.

10. The system of claim 3 wherein:

each optimum set is represented by a corresponding master row having the set of columns from the corresponding initial subset of rows, each corresponding master row comprising a vector with a first indicator in particular columns in the set of columns for the corresponding initial subset of rows that are elements of the corresponding optimum set and a second indicator in other particular columns in the set of columns for the corresponding initial subset of rows that are not elements of the corresponding optimum set; and the division module comprises a clustering module using a clustering algorithm to:
- determine at least one cluster of at least one row point for each initial subset of rows, each row point corresponding to one of the one or more text rows in the corresponding initial subset of rows and comprising at least two members of a group consisting of a row distance, a row matches, and a row length for the one of the one or more text rows or normalized values thereof;
- determine a cluster closeness value for each cluster in each initial subset of rows, each cluster closeness value based on a row matches average and a row distances average for text rows corresponding to the at least one row point of a corresponding cluster or normalized values thereof;
- determine a final cluster for each initial subset of rows, each final cluster having a smallest cluster closeness value from cluster closeness values of the at least one cluster of the corresponding initial subset of rows, each final cluster comprising at least one of the row points, the at least one of the row points corresponding to the at least one of the one or more text rows of the corresponding initial subset of rows; and
- split the one or more text rows in each corresponding initial subset of rows into at least the final subset of rows and another subset of rows, the final subset of rows comprising the at least one of the one or more text rows of the corresponding initial subset of rows that corresponds to the at least one of the row points of a corresponding final cluster, the other subset of rows comprising either no text rows or at least one other text row of the corresponding initial subset of rows that does not include the at least one of the one or more text rows.

11. The system of claim 3 wherein:

each optimum set is represented by a corresponding master row having the set of columns from the corresponding initial subset of rows, each corresponding master row comprising a binary vector with a binary 1 in particular columns in the set of columns for the corresponding initial subset of rows that are elements of the corresponding optimum set and a binary 0 in other particular columns in the set of columns for the corresponding initial subset of rows that are not elements of the corresponding optimum set; and the division module comprises a clustering module using a clustering algorithm to:
- determine one or more clusters of one or more row points for each initial subset of rows, each row point corresponding to one of the one or more text rows in the corresponding initial subset of rows and comprising at least two members of a group consisting of a row distance, a row matches, and a row length for the one of the one or more text rows or normalized values thereof;

determine a cluster closeness value for each cluster in each initial subset of rows, each cluster closeness value based on a row matches average and a row distances average for text rows corresponding to row points of a corresponding cluster or normalized values thereof;

determine a final cluster for each initial subset of rows, each final cluster having a smallest cluster closeness value from cluster closeness values of the one or more clusters of the corresponding initial subset of rows, each final cluster comprising at least one of the row points, the at least one of the row points corresponding to the at least one of the one or more text rows of the corresponding initial subset of rows; and split the one or more text rows in each corresponding initial subset of rows into at least the final subset of rows and another subset of rows, the final subset of rows comprising the at least one of the one or more text rows of the corresponding initial subset of rows that corresponds to the at least one of the row points of a corresponding final cluster, the other subset of rows comprising either no text rows or at least one other text row of the corresponding initial subset of rows that does not include the at least one of the one or more text rows.

12. The system of claim 11 wherein:
the clustering module determines a final distances vector for each final subset of rows, each final distances vector comprising distances of the at least one of the one or more text rows of the corresponding final subset of rows to the corresponding master row associated with the corresponding final subset of rows, each final distances vector having a final row distances average; and the clustering module determines a final matches vector for each final subset of rows, each final matches vector comprising, for each one of the at least one of the one or more text rows in the corresponding final subset of rows, a sum of matches between a binary 1 in the particular columns of the corresponding master row and another binary 1 in corresponding particular columns of the each one of the at least one of the one or more text rows, each final matches vector having a final row matches average; and the confidence factor comprises a confidence factor ratio with at least one member of a group consisting of:
a normalized rows frequency multiplied by the final row matches average of the final matches vector for the corresponding final subset of rows in a numerator and the final row distances average of the final distances vector for the corresponding final subset of rows in a denominator, the normalized rows frequency comprising a first number of the at least one of the one or more text rows in the corresponding final subset of rows divided by a second number of text rows in the at least one document image; and the final row matches average of the final matches vector in the numerator and the final row distances average of the final distances vector in the denominator.

13. The system of claim 12 wherein the clustering module determines two clusters of the one or more row points for each initial subset of rows.

14. The system of claim 1 wherein the division module comprises at least one member of a group consisting of:
a thresholding module to determine the final subset of rows for each initial subset of rows using a thresholding algorithm; and
a clustering module to determine the final subset of rows for each initial subset of rows using a clustering algorithm.

15. The system of claim 1 wherein the modules further comprise a data extractor to extract data from at least one particular text row in at least one class.

16. The system of claim 15 wherein:
each class has a class physical structure;
the system comprises memory comprising document model data for a plurality of document models and storing the at least one document image, the document model data identifying other class physical structures of other classes of the document models and regions of interest for the other classes of the document models; and
the data extractor:
compares the class physical structures of the classes of the at least one document image to the other class physical structures of the other classes for the document models to identify a matching document model;
when the matching document model is determined, determines a region of interest from the matching document model and extracts the data from a corresponding region of interest in the at least one document image; and
when the matching document model is not determined, stores the class physical structures of the classes of the at least one document image in memory as a new document model.

17. The system of claim 15 wherein the data extractor generates the extracted data to an output system or a user interface.

18. The system of claim 1 wherein the modules comprise:
a line detector module to detect and remove lines when lines exist in the at least one document image and to save positions of vertical lines of the at least one document image in a vertical lines array when vertical lines exist in the at least one document image; and
an alignment system comprising a document block module to determine when at least one line pattern in the vertical lines array identifies at least two document blocks, to split the at least one document image into the at least two document blocks when the at least one line pattern is determined, and to vertically align the at least two document blocks before the classification system determines the columns.

19. The system of claim 1 wherein the modules further comprise:
a line detector module to detect vertical lines; and
an alignment system comprising a line pattern module to:
detect a center line splitting the at least one document image into at least two document blocks;
split the at least one document image into the at least two document blocks when the center line is detected; and
vertically align the at least two document blocks before the classification system determines the columns.

20. The system of claim 1 wherein:
the modules further comprise an alignment system comprising a document block module to determine when at least one white space area is a white space divider that divides the at least one document image into at least two document blocks, to split the at least one document image into the at least two document blocks when the at least one white space is determined to be the white space divider, and to vertically align the at least two document blocks before the classification system determines the columns.

21. The system of claim 1 wherein the positions comprise spatial positions.

22. A system to process at least one document image comprising a plurality of text rows and a plurality of characters, each text row having at least one character, the system comprising:
at least one processor; and
a plurality of modules to execute on the at least one processor, the modules comprising:
a character block creator to create character blocks for the characters in the text rows and to determine positions of alignments of the character blocks; and
a classification system comprising:
a subsets module to determine columns for the alignments of the character blocks at the positions of the alignments, each text row having a physical structure defined by the columns of the alignments of the character blocks in that text row, and to determine an initial subset of rows for each column, each initial subset of rows comprising one or more of the text rows of the at least one document image having at least one alignment of at least one character block in a selected column, each initial subset of rows having a set of columns comprising the selected column and other columns in the one or more text rows of a corresponding initial subset of rows in which the selected column is present;
an optimum set module to determine an optimum set of columns for each initial subset of rows by:
generating a histogram of column frequencies of the set of columns in the corresponding initial subset of rows, each column frequency comprising a number of times a particular column occurs in the corresponding initial subset of rows;
determining a threshold of the column frequencies for the corresponding initial subset of rows; and
selecting particular columns having the column frequency above the threshold to be included in a corresponding optimum set;
a division module to:
determine a final subset of rows for each initial subset of rows, each final subset of rows comprising at least one text row of the corresponding initial subset of rows having physical structures most similar to the corresponding optimum set when compared to physical structures of all text rows in the corresponding initial subset of rows;
determine a confidence factor for each final subset of rows; and
determine a best confidence factor for each particular text row in the at least one document image; and
a classifier module to create at least one class of text rows, the at least one class comprising at least one particular text row having a same best confidence factor.

23. The system of claim 22 wherein:
the subsets module determines the initial subset of rows for each column having more than one character block aligned in that column in the text rows of the at least one document image; and
in the division module:

each final subset of rows comprises at least one of the one or more text rows of the corresponding initial subset of rows having a corresponding physical structure that is most similar to the corresponding optimum set when compared to physical structures of all of the one or more text rows of the corresponding initial subset of rows;
each confidence factor measures a similarity of corresponding physical structures of the at least one of the one or more text rows in one corresponding final subset of rows to each other; and
each particular text row has at least one confidence factor corresponding to at least one final subset of rows in which the particular text row is an element.

24. The system of claim 22 wherein:
each optimum set is represented by a corresponding master row having the set of columns from the corresponding initial subset of rows, each corresponding master row comprising a vector comprising a first indicator in particular columns in the set of columns for the corresponding initial subset of rows that are elements of the corresponding optimum set and a second indicator in other particular columns in the set of columns for the corresponding initial subset of rows that are not elements of the corresponding optimum set; and
the division module comprises a thresholding module using a thresholding algorithm to:
determine a distance threshold for each corresponding initial subset of rows for distances from each of the one or more text rows in each corresponding initial subset of rows to the corresponding master row;
split the one or more text rows in each corresponding initial subset of rows into at least a first group of text rows and a second group of text rows, the first group of text rows comprising at least one first text row with a first distance under the threshold, the second group of text rows comprising either no text rows or at least one second text row with a second distance not under the threshold; and
select the first group of text rows to be in the corresponding final subset of rows.

25. The system of claim 22 wherein:
each optimum set is represented by a corresponding master row having the set of columns from the corresponding initial subset of rows, each corresponding master row comprising a binary vector comprising a binary 1 in particular columns in the set of columns for the corresponding initial subset of rows that are elements of the corresponding optimum set and a binary 0 in other particular columns in the set of columns for the corresponding initial subset of rows that are not elements of the corresponding optimum set; and
the division module comprises a thresholding module using a thresholding algorithm to:
determine a distance threshold for each corresponding initial subset of rows for distances from each of the one or more text rows in each corresponding initial subset of rows to the corresponding master row;
split the one or more text rows in each corresponding initial subset of rows into at least a first group of text rows and a second group of text rows, the first group of text rows comprising first text rows with first distances under the threshold, the second group of text rows comprising either no text rows or second text rows with second distances not under the threshold; and select the first group of text rows to be in the corresponding final subset of rows.

26. The system of claim 25 wherein:
the thresholding module determines a final distances vector for each final subset of rows, each final distances vector comprising corresponding first distances of a corresponding first group of text rows; and
the confidence factor comprises a confidence factor ratio with at least one member of a another group consisting of:
  a rows frequency in the numerator and a variance of the first distances of the first group of text rows in the corresponding final distances vector in a denominator, the rows frequency comprising a number of the first text rows in the corresponding final subset of rows;
  the rows frequency and a master row length in the numerator and the variance and an average of the first distances of the first group of text rows in the corresponding final distances vector in the denominator; and
  a quantity of a rows frequency cubed multiplied by the master row length in the numerator and another quantity of the variance multiplied by the average of the first distances of the first group of text rows in the corresponding final distances vector plus one in the denominator.

27. The system of claim 22 wherein:
each optimum set is represented by a corresponding master row having the set of columns from the corresponding initial subset of rows, each corresponding master row comprising a vector with a first indicator in particular columns in the set of columns for the corresponding initial subset of rows that are elements of the corresponding optimum set and a second indicator in other particular columns in the set of columns for the corresponding initial subset of rows that are not elements of the corresponding optimum set; and
the division module comprises a clustering module using a clustering algorithm to:
  determine at least one cluster of at least one row point for each initial subset of rows, each row point corresponding to one of the one or more text rows in the corresponding initial subset of rows and comprising at least two members of a group consisting of a row distance, a row matches, and a row length for the one of the one or more text rows or normalized values thereof;
  determine a cluster closeness value for each cluster in each initial subset of rows, each cluster closeness value based on a row matches average and a row distances average for text rows corresponding to the at least one row point of a corresponding cluster or normalized values thereof;
  determine a final cluster for each initial subset of rows, each final cluster having a smallest cluster closeness value from cluster closeness values of the at least one cluster of the corresponding initial subset of rows, each final cluster comprising at least one of the row points, the at least one of the row points corresponding to the at least one of the one or more text rows of the corresponding initial subset of rows; and
  split the one or more text rows in each corresponding initial subset of rows into at least the final subset of rows and another subset of rows, the final subset of rows comprising the at least one of the one or more text rows of the corresponding initial subset of rows that corresponds to the at least one of the row points of a corresponding final cluster, the other subset of rows comprising either no text rows or at least one other text row of the corresponding initial subset of rows that does not include the at least one of the one or more text rows.

28. The system of claim 22 wherein:
each optimum set is represented by a corresponding master row having the set of columns from the corresponding initial subset of rows, each corresponding master row comprising a binary vector with a binary 1 in particular columns in the set of columns for the corresponding initial subset of rows that are elements of the corresponding optimum set and a binary 0 in other particular columns in the set of columns for the corresponding initial subset of rows that are not elements of the corresponding optimum set; and
the division module comprises a clustering module using a clustering algorithm to:
  determine one or more clusters of one or more row points for each initial subset of rows, each row point corresponding to one of the one or more text rows in the corresponding initial subset of rows and comprising at least two members of a group consisting of a row distance, a row matches, and a row length for the one of the one or more text rows or normalized values thereof;
  determine a cluster closeness value for each cluster in each initial subset of rows, each cluster closeness value based on a row matches average and a row distances average for text rows corresponding to row points of a corresponding cluster or normalized values thereof;
  determine a final cluster for each initial subset of rows, each final cluster having a smallest cluster closeness value from cluster closeness values of the one or more clusters of the corresponding initial subset of rows, each final cluster comprising at least one of the row points, the at least one of the row points corresponding to the at least one of the one or more text rows of the corresponding initial subset of rows; and
  split the one or more text rows in each corresponding initial subset of rows into at least the final subset of rows and another subset of rows, the final subset of rows comprising the at least one of the one or more text rows of the corresponding initial subset of rows that corresponds to the at least one of the row points of a corresponding final cluster, the other subset of rows comprising either no text rows or at least one other text row of the corresponding initial subset of rows that does not include the at least one of the one or more text rows.

29. The system of claim 28 wherein:
the clustering module determines a final distances vector for each final subset of rows, each final distances vector comprising distances of the at least one of the one or more text rows of the corresponding final subset of rows to the corresponding master row associated with the corresponding final subset of rows, each final distances vector having a final row distances average; and
the clustering module determines a final matches vector for each final subset of rows, each final matches vector comprising, for each one of the at least one of the one or more text rows in the corresponding final subset of rows, a sum of matches between a binary 1 in the particular columns of the corresponding master row and another binary 1 in corresponding particular columns of the each one of the at least one of the one or more text rows, each final matches vector having a final row matches average; and the confidence factor comprises a confidence factor ratio with at least one member of a group consisting of:
- a normalized rows frequency multiplied by the final row matches average of the final matches vector for the corresponding final subset of rows in a numerator and the final row distances average of the final distances vector for the corresponding final subset of rows in a denominator, the normalized rows frequency comprising a first number of the at least one of the one or more text rows in the corresponding final subset of rows divided by a second number of text rows in the at least one document image; and
- the final row matches average of the final matches vector in the numerator and the final row distances average of the final distances vector in the denominator.

30. The system of claim 22 wherein the division module comprises at least one member of a group consisting of:
- a thresholding module to determine the final subset of rows for each initial subset of rows using a thresholding algorithm; and
- a clustering module to determine the final subset of rows for each initial subset of rows using a clustering algorithm.

31. The system of claim 22 wherein the modules further comprise a data extractor to extract data from at least one particular text row in at least one class.

32. A non-transitory computer-readable medium encoded with a system to process at least one document image comprising a plurality of text rows and a plurality of characters, each text row having at least one character, the system comprising a plurality of modules to execute on at least one processor, the modules comprising
- a character block creator to create character blocks for the characters in the text rows and to determine positions of alignments of the character blocks; and
- a classification system comprising:
  - a subsets module to determine columns for the alignments of the character blocks at the positions of the alignments, each text row having a physical structure defined by the columns of the alignments of the character blocks in that text row, and to determine an initial subset of rows for each column;
  - an optimum set module to determine an optimum set of columns for each initial subset of rows;
  - a division module to:
    - determine a final subset of rows for each initial subset of rows, each final subset of rows comprising at least one text row of a corresponding initial subset of rows having physical structures most similar to a corresponding optimum set when compared to physical structures of all text rows in the corresponding initial subset of rows;
    - determine a confidence factor for each final subset of rows; and
    - determine a best confidence factor for each particular text row in the at least one document image; and
  - a classifier module to create at least one class of text rows, the at least one class comprising at least one particular text row having a same best confidence factor.

33. The system of claim 32 wherein:
the subsets module determines the initial subset of rows for each column having more than one character block aligned in that column in the text rows of the at least one document image, each initial subset of rows comprising one or more of the text rows of the at least one document image; and in the division module, each final subset of rows comprises at least one of the one or more text rows of the corresponding initial subset of rows having physical structures that are most similar to the corresponding optimum set when compared to physical structures of all of the one or more text rows in the corresponding initial subset of rows.

34. The system of claim 32 wherein:
the subsets module determines the initial subset of rows for each column having more than one character block aligned in that column in the text rows of the at least one document image, each initial subset of rows comprising one or more of the text rows of the at least one document image having at least one alignment of at least one character block in a selected column, each initial subset of rows having a set of columns comprising the selected column and other columns in the one or more text rows of a corresponding initial subset of rows in which the selected column is present;

in the optimum set module, each optimum set comprises a most representative set of columns selected from the set of columns of the corresponding initial subset of rows; and in the division module:
- each final subset of rows comprises at least one of the one or more text rows of the corresponding initial subset of rows having a corresponding physical structure that is most similar to the most representative set of columns of the corresponding optimum set when compared to physical structures of all of the one or more text rows of the corresponding initial subset of rows;
- each confidence factor measures a similarity of corresponding physical structures of the at least one of the one or more text rows in one corresponding final subset of rows to each other; and
- each particular text row has at least one confidence factor corresponding to at least one final subset of rows in which the particular text row is an element.

35. The system of claim 34 wherein the optimum set module determines the optimum set for each initial subset of rows by:
- generating a histogram of column frequencies of the set of columns in the corresponding initial subset of rows, each column frequency comprising a number of times a particular column occurs in the corresponding initial subset of rows;
- determining a threshold of the column frequencies for the corresponding initial subset of rows; and
- selecting particular columns having the column frequency above the threshold to be included in the most representative set of columns for the corresponding optimum set.

36. The system of claim 34 wherein:
each corresponding optimum set is represented by a corresponding master row having the set of columns from the corresponding initial subset of rows, each corresponding master row comprising a first indicator in particular columns in the set of columns for the corresponding initial subset of rows that are elements of the corresponding optimum set and a second indicator in other particular columns in the set of columns for the corresponding initial subset of rows that are not elements of the corresponding optimum set; and the division module:

splits the one or more text rows in each corresponding initial subset of rows into at least a first group of text rows and a second group of text rows, the first group of text rows comprising the at least one of the one or more text rows, the at least one of the one or more text rows having at least a smallest distance to the corresponding master row when compared to distances of all of the one or more text rows in the corresponding initial subset of rows, the second group of text rows comprising either no text rows or at least one other text row having at least a larger distance to the corresponding master row when compared to the smallest distance of the at least one of the one or more text rows; and selects the first group of text rows to be in the final subset of rows.

37. The system of claim 34 wherein:

each corresponding optimum set is represented by a corresponding master row having the set of columns from the corresponding initial subset of rows, each corresponding master row comprising a first indicator in particular columns in the set of columns for the corresponding initial subset of rows that are elements of the corresponding optimum set and a second indicator in other particular columns in the set of columns for the corresponding initial subset of rows that are not elements of the corresponding optimum set; and the division module:

splits the one or more text rows in each corresponding initial subset of rows into at least a first group of text rows and a second group of text rows, the first group of text rows comprising the at least one of the one or more text rows, the at least one of the one or more text rows having a smallest distance and a highest matches to the corresponding master row when compared to distances and matches of all of the one or more text rows in the corresponding initial subset of rows, the second group of text rows comprising either no text rows or at least one other text row having a larger distance and a smaller matches to the corresponding master row when compared to the smallest distance and highest matches of the at least one of the one or more text rows; and selects the first group of text rows to be in the final subset of rows.

38. The system of claim 34 wherein:

each optimum set is represented by a corresponding master row having the set of columns from the corresponding initial subset of rows, each corresponding master row comprising a vector comprising a first indicator in particular columns in the set of columns for the corresponding initial subset of rows that are elements of the corresponding optimum set and a second indicator in other particular columns in the set of columns for the corresponding initial subset of rows that are not elements of the corresponding optimum set; and the division module comprises a thresholding module using a thresholding algorithm to:

determine a distance threshold for each corresponding initial subset of rows for distances from each of the one or more text rows in each corresponding initial subset of rows to the corresponding master row;

split the one or more text rows in each corresponding initial subset of rows into at least a first group of text rows and a second group of text rows, the first group of text rows comprising at least one first text row with a first distance under the threshold, the second group of text rows comprising either no text rows or at least one second text row with a second distance not under the threshold; and select the first group of text rows to be in the corresponding final subset of rows.

39. The system of claim 34 wherein:

each optimum set is represented by a corresponding master row having the set of columns from the corresponding initial subset of rows, each corresponding master row comprising a binary vector comprising a binary 1 in particular columns in the set of columns for the corresponding initial subset of rows that are elements of the corresponding optimum set and a binary 0 in other particular columns in the set of columns for the corresponding initial subset of rows that are not elements of the corresponding optimum set; and the division module comprises a thresholding module using a thresholding algorithm to:

determine a distance threshold for each corresponding initial subset of rows for distances from each of the one or more text rows in each corresponding initial subset of rows to the corresponding master row;

split the one or more text rows in each corresponding initial subset of rows into at least a first group of text rows and a second group of text rows, the first group of text rows comprising first text rows with first distances under the threshold, the second group of text rows comprising either no text rows or second text rows with second distances not under the threshold; and select the first group of text rows to be in the corresponding final subset of rows.

40. The system of claim 39 wherein:

the thresholding module determines a final distances vector for each final subset of rows, each final distances vector comprising corresponding first distances of a corresponding first group of text rows; and the confidence factor comprises a confidence factor ratio with at least one member of a another group consisting of:

a rows frequency in the numerator and a variance of the first distances of the first group of text rows in the corresponding final distances vector in a denominator, the rows frequency comprising a number of the first text rows in the corresponding final subset of rows;

the rows frequency and a master row length in the numerator and the variance and an average of the first distances of the first group of text rows in the corresponding final distances vector in the denominator; and a quantity of a rows frequency cubed multiplied by the master row length in the numerator and another quantity of the variance multiplied by the average of the first distances of the first group of text rows in the corresponding final distances vector plus one in the denominator.

41. The system of claim 34 wherein:

each optimum set is represented by a corresponding master row having the set of columns from the corresponding initial subset of rows, each corresponding master row comprising a vector with a first indicator in particular columns in the set of columns for the corresponding initial subset of rows that are elements of the corresponding optimum set and a second indicator in other particular columns in the set of columns for the corresponding initial subset of rows that are not elements of the corresponding optimum set; and the division module comprises a clustering module using a clustering algorithm to:

determine at least one cluster of at least one row point for each initial subset of rows, each row point corresponding to one of the one or more text rows in the corresponding initial subset of rows and comprising at least two members of a group consisting of a row distance, a row matches, and a row length for the one of the one or more text rows or normalized values thereof;

determine a cluster closeness value for each cluster in each initial subset of rows, each cluster closeness value based on a row matches average and a row distances average for text rows corresponding to the at least one row point of a corresponding cluster or normalized values thereof;

determine a final cluster for each initial subset of rows, each final cluster having a smallest cluster closeness value from cluster closeness values of the at least one cluster of the corresponding initial subset of rows, each final cluster comprising at least one of the row points, the at least one of the row points corresponding to the at least one of the one or more text rows of the corresponding initial subset of rows; and split the one or more text rows in each corresponding initial subset of rows into at least the final subset of rows and another subset of rows, the final subset of rows comprising the at least one of the one or more text rows of the corresponding initial subset of rows that corresponds to the at least one of the row points of a corresponding final cluster, the other subset of rows comprising either no text rows or at least one other text row of the corresponding initial subset of rows that does not include the at least one of the one or more text rows.

42. The system of claim 34 wherein:

each optimum set is represented by a corresponding master row having the set of columns from the corresponding initial subset of rows, each corresponding master row comprising a binary vector with a binary 1 in particular columns in the set of columns for the corresponding initial subset of rows that are elements of the corresponding optimum set and a binary 0 in other particular columns in the set of columns for the corresponding initial subset of rows that are not elements of the corresponding optimum set; and the division module comprises a clustering module using a clustering algorithm to:

determine one or more clusters of one or more row points for each initial subset of rows, each row point corresponding to one of the one or more text rows in the corresponding initial subset of rows and comprising at least two members of a group consisting of a row distance, a row matches, and a row length for the one of the one or more text rows or normalized values thereof;

determine a cluster closeness value for each cluster in each initial subset of rows, each cluster closeness value based on a row matches average and a row distances average for text rows corresponding to row points of a corresponding cluster or normalized values thereof;

determine a final cluster for each initial subset of rows, each final cluster having a smallest cluster closeness value from cluster closeness values of the one or more clusters of the corresponding initial subset of rows, each final cluster comprising at least one of the row points, the at least one of the row points corresponding to the at least one of the one or more text rows of the corresponding initial subset of rows; and split the one or more text rows in each corresponding initial subset of rows into at least the final subset of rows and another subset of rows, the final subset of rows comprising the at least one of the one or more text rows of the corresponding initial subset of rows that corresponds to the at least one of the row points of a corresponding final cluster, the other subset of rows comprising either no text rows or at least one other text row of the corresponding initial subset of rows that does not include the at least one of the one or more text rows.

43. The system of claim 42 wherein:

the clustering module determines a final distances vector for each final subset of rows, each final distances vector comprising distances of the at least one of the one or more text rows of the corresponding final subset of rows to the corresponding master row associated with the corresponding final subset of rows, each final distances vector having a final row distances average; and the clustering module determines a final matches vector for each final subset of rows, each final matches vector comprising, for each one of the at least one of the one or more text rows in the corresponding final subset of rows, a sum of matches between a binary 1 in the particular columns of the corresponding master row and another binary 1 in corresponding particular columns of the each one of the at least one of the one or more text rows, each final matches vector having a final row matches average; and the confidence factor comprises a confidence factor ratio with at least one member of a group consisting of:

a normalized rows frequency multiplied by the final row matches average of the final matches vector for the corresponding final subset of rows in a numerator and the final row distances average of the final distances vector for the corresponding final subset of rows in a denominator, the normalized rows frequency comprising a first number of the at least one of the one or more text rows in the corresponding final subset of rows divided by a second number of text rows in the at least one document image; and the final row matches average of the final matches vector in the numerator and the final row distances average of the final distances vector in the denominator.

44. The system of claim 42 wherein the clustering module determines two clusters of the one or more row points for each initial subset of rows.

45. The system of claim 32 wherein the division module comprises at least one member of a group consisting of:

a thresholding module to determine the final subset of rows for each initial subset of rows using a thresholding algorithm; and a clustering module to determine the final subset of rows for each initial subset of rows using a clustering algorithm.

46. The system of claim 32 wherein the modules further comprise a data extractor to extract data from at least one particular text row in at least one class.

47. The system of claim 46 wherein:

each class has a class physical structure;

the system comprises memory comprising document model data for a plurality of document models and storing the at least one document image, the document model data identifying other class physical structures of other classes of the document models and regions of interest for the other classes of the document models; and the data extractor:
compares the class physical structures of the classes of the at least one document image to the other class physical structures of the other classes for the document models to identify a matching document model;
when the matching document model is determined, determines a region of interest from the matching document model and extracts the data from a corresponding region of interest in the at least one document image; and
when the matching document model is not determined, stores the class physical structures of the classes of the at least one document image in memory as a new document model.

48. The system of claim 46 wherein the data extractor generates the extracted data to an output system or a user interface.

49. The system of claim 32 wherein the modules comprise:
a line detector module to detect and remove lines when lines exist in the at least one document image and to save positions of vertical lines of the at least one document image in a vertical lines array when vertical lines exist in the at least one document image; and
an alignment system comprising a document block module to determine when at least one line pattern in the vertical lines array identifies at least two document blocks, to split the at least one document image into the at least two document blocks when the at least one line pattern is determined, and to vertically align the at least two document blocks before the classification system determines the columns.

50. The system of claim 32 wherein the modules further comprise:
a line detector module to detect vertical lines; and
an alignment system comprising a line pattern module to:
detect a center line splitting the at least one document image into at least two document blocks;
split the at least one document image into the at least two document blocks when the center line is detected; and
vertically align the at least two document blocks before the classification system determines the columns.

51. The system of claim 32 wherein:
the modules further comprise an alignment system comprising a document block module to determine when at least one white space area is a white space divider that divides the at least one document image into at least two document blocks, to split the at least one document image into the at least two document blocks when the at least one white space is determined to be the white space divider, and to vertically align the at least two document blocks before the classification system determines the columns.

52. The system of claim 32 wherein the positions comprise spatial positions.

53. A non-transitory computer-readable medium encoded with a system to process at least one document image comprising a plurality of text rows and a plurality of characters, each text row having at least one character, the system comprising a plurality of modules to execute on at least one processor, the modules comprising:

a character block creator to create character blocks for the characters in the text rows and to determine positions of alignments of the character blocks; and
a classification system comprising:
a subsets module to determine columns for the alignments of the character blocks at the positions of the alignments, each text row having a physical structure defined by the columns of the alignments of the character blocks in that text row, and to determine an initial subset of rows for each column, each initial subset of rows comprising one or more of the text rows of the at least one document image having at least one alignment of at least one character block in a selected column, each initial subset of rows having a set of columns comprising the selected column and other columns in the one or more text rows of a corresponding initial subset of rows in which the selected column is present;
an optimum set module to determine an optimum set of columns for each initial subset of rows by:
generating a histogram of column frequencies of the set of columns in the corresponding initial subset of rows, each column frequency comprising a number of times a particular column occurs in the corresponding initial subset of rows;
determining a threshold of the column frequencies for the corresponding initial subset of rows; and
selecting particular columns having the column frequency above the threshold to be included in a corresponding optimum set;
a division module to:
determine a final subset of rows for each initial subset of rows, each final subset of rows comprising at least one text row of the corresponding initial subset of rows having physical structures most similar to the corresponding optimum set when compared to physical structures of all text rows in the corresponding initial subset of rows;
determine a confidence factor for each final subset of rows; and
determine a best confidence factor for each particular text row in the at least one document image; and
a classifier module to create at least one class of text rows, the at least one class comprising at least one particular text row having a same best confidence factor.

54. The system of claim 53 wherein:
the subsets module determines the initial subset of rows for each column having more than one character block aligned in that column in the text rows of the at least one document image; and
in the division module:
each final subset of rows comprises at least one of the one or more text rows of the corresponding initial subset of rows having a corresponding physical structure that is most similar to the corresponding optimum set when compared to physical structures of all of the one or more text rows of the corresponding initial subset of rows;
each confidence factor measures a similarity of corresponding physical structures of the at least one of the one or more text rows in one corresponding final subset of rows to each other; and
each particular text row has at least one confidence factor corresponding to at least one final subset of rows in which the particular text row is an element.

55. The system of claim 53 wherein:

each optimum set is represented by a corresponding master row having the set of columns from the corresponding initial subset of rows, each corresponding master row comprising a vector comprising a first indicator in particular columns in the set of columns for the corresponding initial subset of rows that are elements of the corresponding optimum set and a second indicator in other particular columns in the set of columns for the corresponding initial subset of rows that are not elements of the corresponding optimum set; and the division module comprises a thresholding module using a thresholding algorithm to:
  determine a distance threshold for each corresponding initial subset of rows for distances from each of the one or more text rows in each corresponding initial subset of rows to the corresponding master row;
  split the one or more text rows in each corresponding initial subset of rows into at least a first group of text rows and a second group of text rows, the first group of text rows comprising at least one first text row with a first distance under the threshold, the second group of text rows comprising either no text rows or at least one second text row with a second distance not under the threshold; and
  select the first group of text rows to be in the corresponding final subset of rows.

56. The system of claim 53 wherein:
each optimum set is represented by a corresponding master row having the set of columns from the corresponding initial subset of rows, each corresponding master row comprising a binary vector comprising a binary 1 in particular columns in the set of columns for the corresponding initial subset of rows that are elements of the corresponding optimum set and a binary 0 in other particular columns in the set of columns for the corresponding initial subset of rows that are not elements of the corresponding optimum set; and the division module comprises a thresholding module using a thresholding algorithm to:
  determine a distance threshold for each corresponding initial subset of rows for distances from each of the one or more text rows in each corresponding initial subset of rows to the corresponding master row;
  split the one or more text rows in each corresponding initial subset of rows into at least a first group of text rows and a second group of text rows, the first group of text rows comprising first text rows with first distances under the threshold, the second group of text rows comprising either no text rows or second text rows with second distances not under the threshold; and
  select the first group of text rows to be in the corresponding final subset of rows.

57. The system of claim 56 wherein:
the thresholding module determines a final distances vector for each final subset of rows, each final distances vector comprising corresponding first distances of a corresponding first group of text rows; and
the confidence factor comprises a confidence factor ratio with at least one member of a another group consisting of:
  a rows frequency in the numerator and a variance of the first distances of the first group of text rows in the corresponding final distances vector in a denominator, the rows frequency comprising a number of the first text rows in the corresponding final subset of rows;

the rows frequency and a master row length in the numerator and the variance and an average of the first distances of the first group of text rows in the corresponding final distances vector in the denominator; and
a quantity of a rows frequency cubed multiplied by the master row length in the numerator and another quantity of the variance multiplied by the average of the first distances of the first group of text rows in the corresponding final distances vector plus one in the denominator.

58. The system of claim 53 wherein:
each optimum set is represented by a corresponding master row having the set of columns from the corresponding initial subset of rows, each corresponding master row comprising a vector with a first indicator in particular columns in the set of columns for the corresponding initial subset of rows that are elements of the corresponding optimum set and a second indicator in other particular columns in the set of columns for the corresponding initial subset of rows that are not elements of the corresponding optimum set; and the division module comprises a clustering module using a clustering algorithm to:
  determine at least one cluster of at least one row point for each initial subset of rows, each row point corresponding to one of the one or more text rows in the corresponding initial subset of rows and comprising at least two members of a group consisting of a row distance, a row matches, and a row length for the one of the one or more text rows or normalized values thereof;
  determine a cluster closeness value for each cluster in each initial subset of rows, each cluster closeness value based on a row matches average and a row distances average for text rows corresponding to the at least one row point of a corresponding cluster or normalized values thereof;
  determine a final cluster for each initial subset of rows, each final cluster having a smallest cluster closeness value from cluster closeness values of the at least one cluster of the corresponding initial subset of rows, each final cluster comprising at least one of the row points, the at least one of the row points corresponding to the at least one of the one or more text rows of the corresponding initial subset of rows; and
  split the one or more text rows in each corresponding initial subset of rows into at least the final subset of rows and another subset of rows, the final subset of rows comprising the at least one of the one or more text rows of the corresponding initial subset of rows that corresponds to the at least one of the row points of a corresponding final cluster, the other subset of rows comprising either no text rows or at least one other text row of the corresponding initial subset of rows that does not include the at least one of the one or more text rows.

59. The system of claim 53 wherein:
each optimum set is represented by a corresponding master row having the set of columns from the corresponding initial subset of rows, each corresponding master row comprising a binary vector with a binary 1 in particular columns in the set of columns for the corresponding initial subset of rows that are elements of the corresponding optimum set and a binary 0 in other particular columns in the set of columns for the corresponding initial subset of rows that are not elements of the corresponding optimum set; and the division module comprises a clustering module using a clustering algorithm to:
- determine one or more clusters of one or more row points for each initial subset of rows, each row point corresponding to one of the one or more text rows in the corresponding initial subset of rows and comprising at least two members of a group consisting of a row distance, a row matches, and a row length for the one of the one or more text rows or normalized values thereof;
- determine a cluster closeness value for each cluster in each initial subset of rows, each cluster closeness value based on a row matches average and a row distances average for text rows corresponding to row points of a corresponding cluster or normalized values thereof;
- determine a final cluster for each initial subset of rows, each final cluster having a smallest cluster closeness value from cluster closeness values of the one or more clusters of the corresponding initial subset of rows, each final cluster comprising at least one of the row points, the at least one of the row points corresponding to the at least one of the one or more text rows of the corresponding initial subset of rows; and
- split the one or more text rows in each corresponding initial subset of rows into at least the final subset of rows and another subset of rows, the final subset of rows comprising the at least one of the one or more text rows of the corresponding initial subset of rows that corresponds to the at least one of the row points of a corresponding final cluster, the other subset of rows comprising either no text rows or at least one other text row of the corresponding initial subset of rows that does not include the at least one of the one or more text rows.

60. The system of claim 59 wherein:
the clustering module determines a final distances vector for each final subset of rows, each final distances vector comprising distances of the at least one of the one or more text rows of the corresponding final subset of rows to the corresponding master row associated with the corresponding final subset of rows, each final distances vector having a final row distances average; and the clustering module determines a final matches vector for each final subset of rows, each final matches vector comprising, for each one of the at least one of the one or more text rows in the corresponding final subset of rows, a sum of matches between a binary 1 in the particular columns of the corresponding master row and another binary 1 in corresponding particular columns of the each one of the at least one of the one or more text rows, each final matches vector having a final row matches average; and the confidence factor comprises a confidence factor ratio with at least one member of a group consisting of:
a normalized rows frequency multiplied by the final row matches average of the final matches vector for the corresponding final subset of rows in a numerator and the final row distances average of the final distances vector for the corresponding final subset of rows in a denominator, the normalized rows frequency comprising a first number of the at least one of the one or more text rows in the corresponding final subset of rows divided by a second number of text rows in the at least one document image; and the final row matches average of the final matches vector in the numerator and the final row distances average of the final distances vector in the denominator.

61. The system of claim 53 wherein the division module comprises at least one member of a group consisting of:
a thresholding module to determine the final subset of rows for each initial subset of rows using a thresholding algorithm; and
a clustering module to determine the final subset of rows for each initial subset of rows using a clustering algorithm.

62. The system of claim 53 wherein the modules further comprise a data extractor to extract data from at least one particular text row in at least one class.

63. A non-transitory computer-readable medium encoded with instructions that, when executed by at least one processor, process at least one document image comprising a plurality of text rows and a plurality of characters, each text row having at least one character, the instructions performing operations comprising:
creating character blocks for the characters in the text rows and determining positions of alignments of the character blocks;
determining columns for the alignments of the character blocks at the positions of the alignments, each text row having a physical structure defined by the columns of the alignments of the character blocks in that text row, and to determine an initial subset of rows for each column, each initial subset of rows comprising one or more of the text rows of the at least one document image having at least one alignment of at least one character block in a selected column, each initial subset of rows having a set of columns comprising the selected column and other columns in the one or more text rows of a corresponding initial subset of rows in which the selected column is present;
determining an optimum set of columns for each initial subset of rows by:
generating a histogram of column frequencies of the set of columns in the corresponding initial subset of rows, each column frequency comprising a number of times a particular column occurs in the corresponding initial subset of rows;
determining a threshold of the column frequencies for the corresponding initial subset of rows; and
selecting particular columns having the column frequency above the threshold to be included in a corresponding optimum set;
determining a final subset of rows for each initial subset of rows, each final subset of rows comprising at least one text row of the corresponding initial subset of rows having physical structures most similar to the corresponding optimum set when compared to physical structures of all text rows in the corresponding initial subset of rows;
determining a confidence factor for each final subset of rows;
determining a best confidence factor for each particular text row in the at least one document image; and
creating at least one class of text rows, the at least one class comprising at least one particular text row having a same best confidence factor.

* * * * *